United States Patent
Satoh et al.

(10) Patent No.: US 11,741,700 B2
(45) Date of Patent: Aug. 29, 2023

(54) IMAGING APPARATUS, IMAGING SYSTEM, IMAGING METHOD, AND IMAGING PROGRAM

(71) Applicant: Sony Corporation, Tokyo (JP)

(72) Inventors: Ryuta Satoh, Tokyo (JP); Suguru Aoki, Tokyo (JP); Keitaro Yamamoto, Tokyo (JP); Ryoji Eki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 17/267,502

(22) PCT Filed: Sep. 2, 2019

(86) PCT No.: PCT/JP2019/034496
§ 371 (c)(1),
(2) Date: Feb. 10, 2021

(87) PCT Pub. No.: WO2020/045682
PCT Pub. Date: Mar. 5, 2020

(65) Prior Publication Data
US 2021/0329164 A1    Oct. 21, 2021

(30) Foreign Application Priority Data

Aug. 31, 2018  (JP) .................................. 2018-163700
Aug. 30, 2019  (JP) .................................. 2019-159150

(51) Int. Cl.
*H04N 23/61* (2023.01)
*H04N 25/441* (2023.01)
(Continued)

(52) U.S. Cl.
CPC ............ *G06V 20/10* (2022.01); *G06F 18/214* (2023.01); *G06F 18/217* (2023.01); *G06V 10/10* (2022.01);
(Continued)

(58) Field of Classification Search
None
See application file for complete search history.

(56) References Cited

U.S. PATENT DOCUMENTS

| 5,578,809 A | 11/1996 | Yamaji |
| 10,380,853 B1 * | 8/2019 | Solh ........................ G06V 10/25 |

(Continued)

FOREIGN PATENT DOCUMENTS

| CN | 101008983 A | 8/2007 |
| CN | 101320425 A | 12/2008 |

(Continued)

OTHER PUBLICATIONS

International Search Report and Written Opinion dated Nov. 26, 2019, received for PCT Application PCT/JP2019/034496, Filed on Sep. 2, 2019, 7 pages including English Translation.

(Continued)

*Primary Examiner* — Twyler L Haskins
*Assistant Examiner* — Wesley J Chiu
(74) *Attorney, Agent, or Firm* — Xsensus LLP

(57) ABSTRACT

An imaging apparatus includes: an imaging unit that has a pixel region in which a plurality of pixels is arranged and that reads and outputs a pixel signal from the pixels included in the pixel region; a unit-of-readout controller that controls a unit of readout set as a part of the pixel region: a recognition unit that has learned training data for each of units of readout; a first output unit that outputs a recognition result of recognition performed by the recognition unit for each of the units of readout; a second output unit that outputs the pixel signal to a subsequent stage; and a trigger generator that generates a trigger signal for controlling a first timing at which the first output unit outputs the recognition result and a second timing at which the second output unit outputs the pixel signal.

17 Claims, 70 Drawing Sheets

(51) Int. Cl.
*H04N 25/445* (2023.01)
*G06V 20/10* (2022.01)
*G06V 10/10* (2022.01)
*G06V 20/56* (2022.01)
*G06F 18/214* (2023.01)
*G06F 18/21* (2023.01)
*H04N 25/75* (2023.01)
*H04N 25/50* (2023.01)
*H04N 25/58* (2023.01)
*H04N 25/79* (2023.01)
*G06V 10/25* (2022.01)

(52) U.S. Cl.
CPC ............. *G06V 10/25* (2022.01); *G06V 20/56* (2022.01); *H04N 23/61* (2023.01); *H04N 25/441* (2023.01); *H04N 25/445* (2023.01); *H04N 25/50* (2023.01); *H04N 25/58* (2023.01); *H04N 25/75* (2023.01); *H04N 25/79* (2023.01)

(56) References Cited

U.S. PATENT DOCUMENTS

| | | |
|---|---|---|
| 2004/0028137 A1 | 2/2004 | Wyn-Harris |
| 2007/0244842 A1 | 10/2007 | Ishii et al. |
| 2009/0032597 A1 | 2/2009 | Barber et al. |
| 2009/0258667 A1 | 10/2009 | Suzuki |
| 2012/0057795 A1 | 3/2012 | Konishi |
| 2013/0088606 A1 | 4/2013 | Yagur |
| 2014/0299665 A1 | 10/2014 | Barber et al. |
| 2015/0365610 A1 | 12/2015 | Dominguez Castro |
| 2016/0021302 A1* | 1/2016 | Cho .................... A61B 5/0037 348/349 |
| 2016/0080636 A1* | 3/2016 | Konishi ............ H04N 5/23218 348/349 |
| 2016/0148079 A1 | 5/2016 | Shen |
| 2016/0379075 A1* | 12/2016 | Ando .................... G06F 18/24 382/103 |
| 2017/0213112 A1 | 7/2017 | Sachs |
| 2018/0092587 A1 | 4/2018 | Tzvieli et al. |
| 2018/0164424 A1 | 6/2018 | Takaki |
| 2021/0312179 A1* | 10/2021 | Lee .......................... G06T 7/11 |

FOREIGN PATENT DOCUMENTS

| | | |
|---|---|---|
| CN | 102194115 A | 9/2011 |
| CN | 102857688 A | 1/2013 |
| CN | 103077407 A | 5/2013 |
| CN | 103080978 A | 5/2013 |
| CN | 103391398 A | 11/2013 |
| CN | 103716661 A | 4/2014 |
| CN | 103942242 A | 7/2014 |
| CN | 104102340 A | 10/2014 |
| CN | 105373785 A | 3/2016 |
| CN | 107563168 A | 1/2018 |
| CN | 107944351 A | 4/2018 |
| CN | 108073943 A | 5/2018 |
| EP | 1 011 074 A2 | 6/2000 |
| JP | 1-93875 A | 4/1989 |
| JP | 2005-341097 A | 12/2005 |
| JP | 2010-020421 A | 1/2010 |
| JP | 2012-208606 A | 10/2012 |
| JP | 2017-112409 A | 6/2017 |
| JP | 2017-207650 A | 11/2017 |
| JP | 2018-117309 A | 7/2018 |
| KR | 20110056616 A | 5/2011 |
| WO | 2008/004578 A1 | 1/2008 |
| WO | WO-2018003212 A1 | 1/2018 |

OTHER PUBLICATIONS

Notonogoro Ignatius Wendianto et al: "Indonesian License Plate Recognition Using Convolutional Neural Network", 2018 6th International Conference On Information and Communication Technology (ICOICT), IEEE, May 3, 2018 (May 3, 2018), pp. 366-369, XP033444437, DOI: 10.1109/COICT.2018.8528781 [retrieved on Nov. 8, 2018].

* cited by examiner

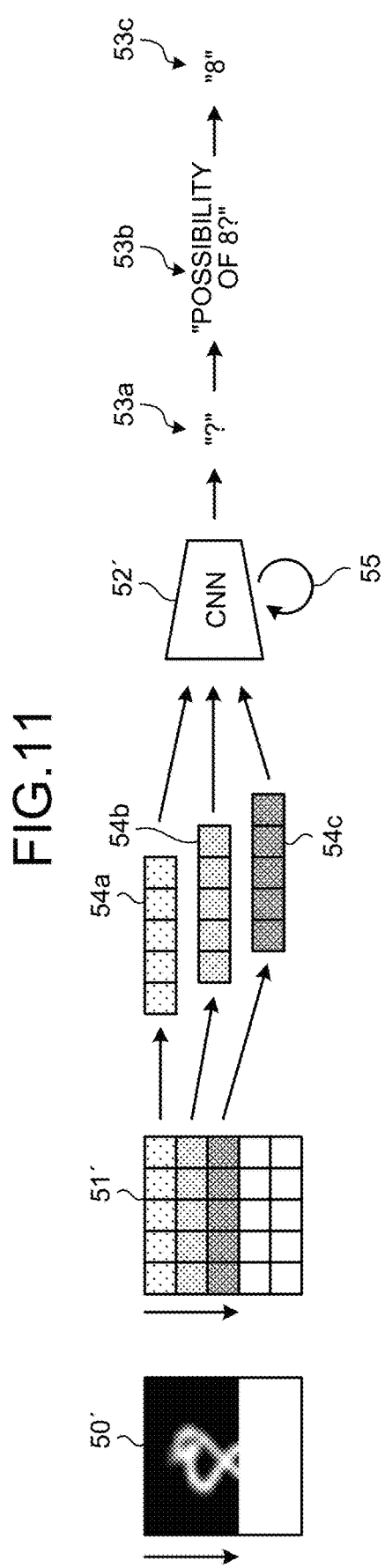

(a) : CNN→FACE AUTHENTICATION FAILS (b) : RNN→FACE AUTHENTICATION SUCCESSFUL

FIG.20A
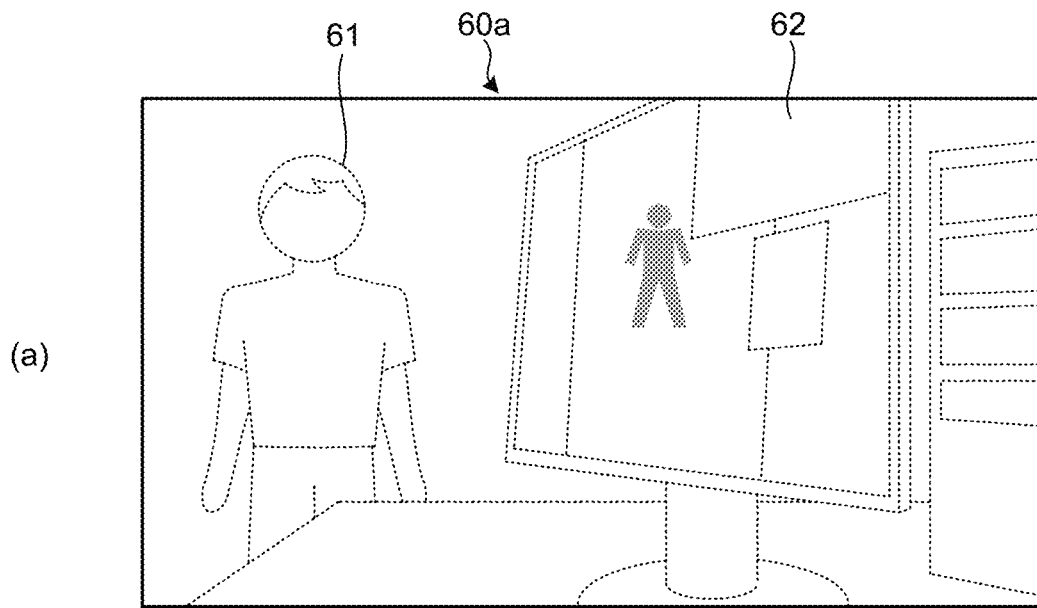
(a)
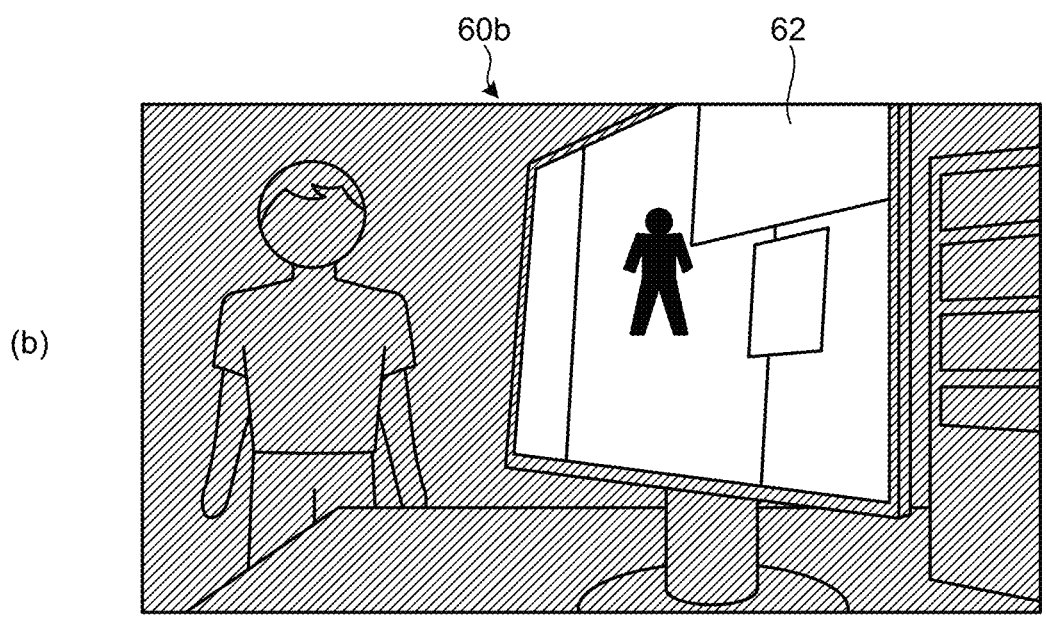
(b)

FIG.20B
(a)
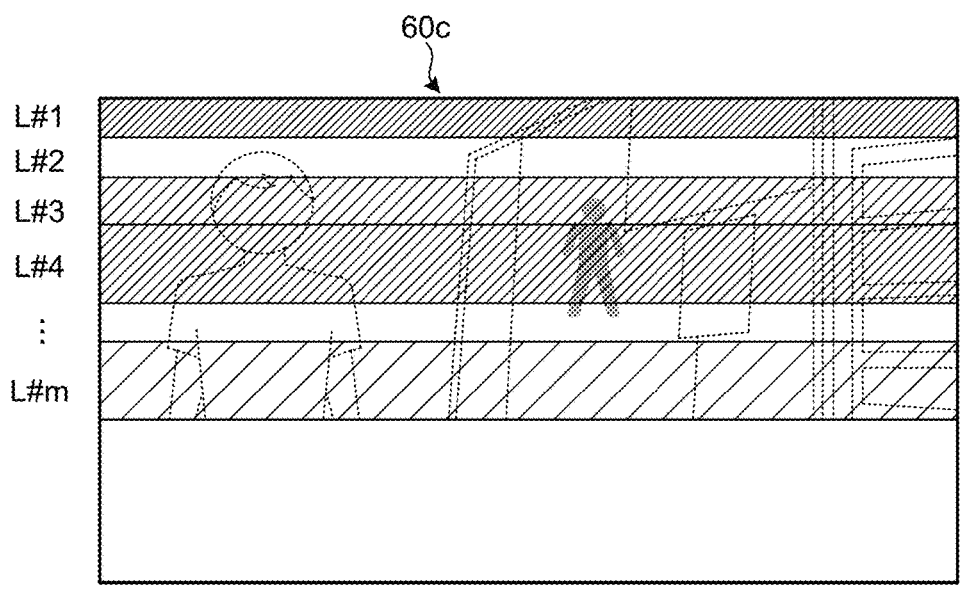
(b)
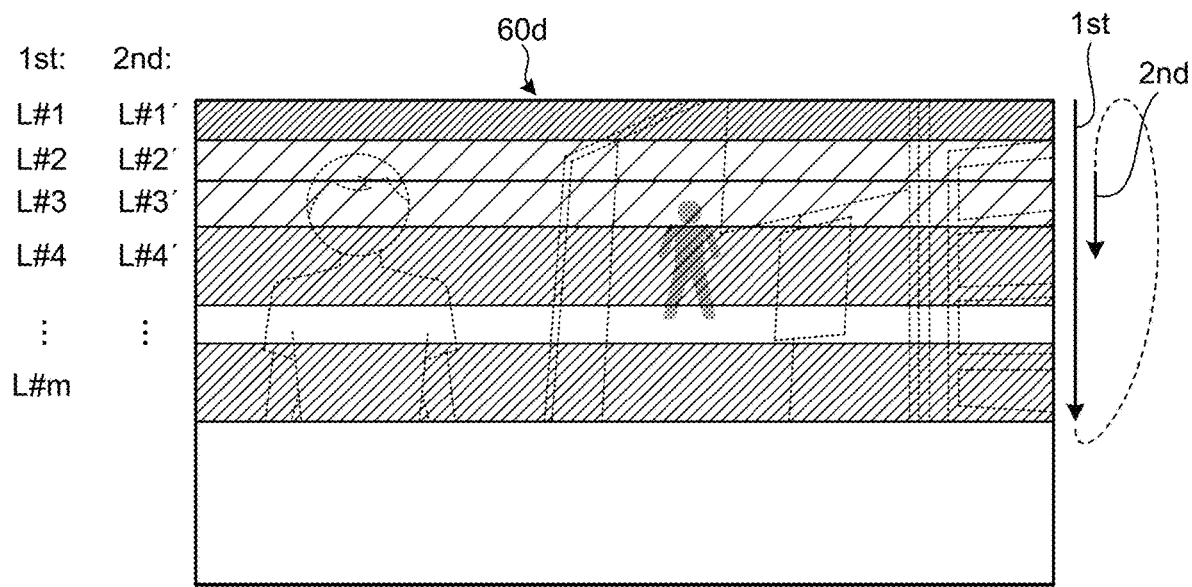

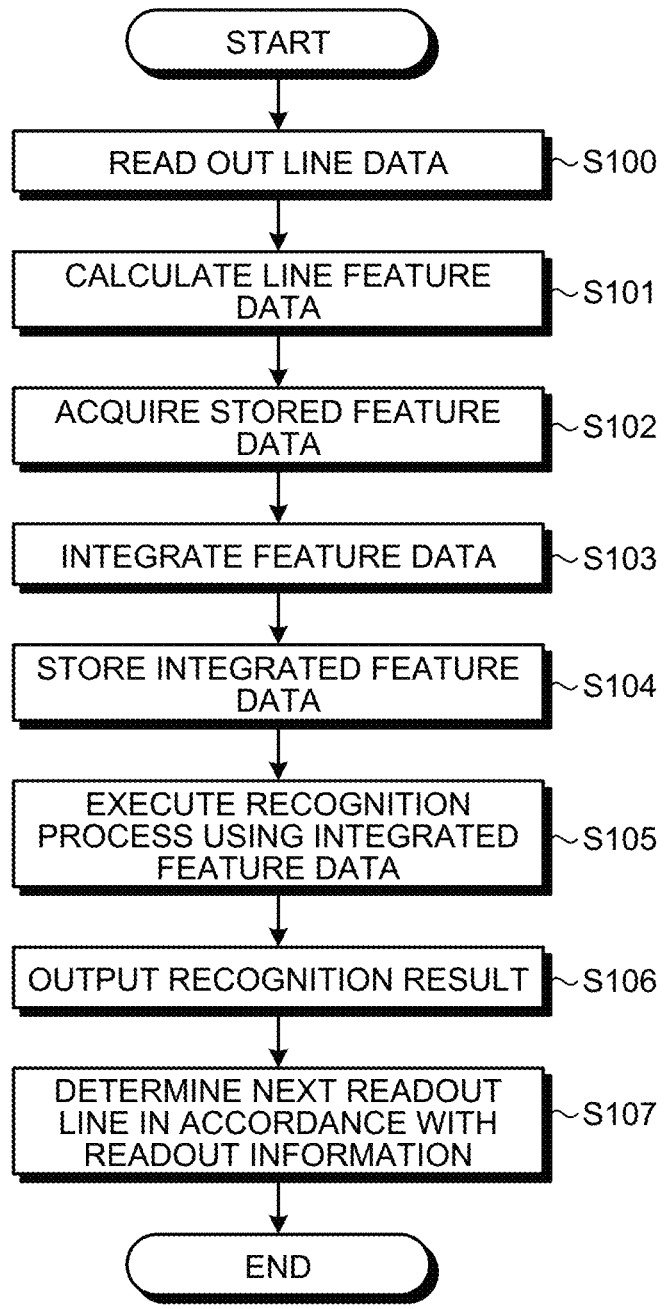

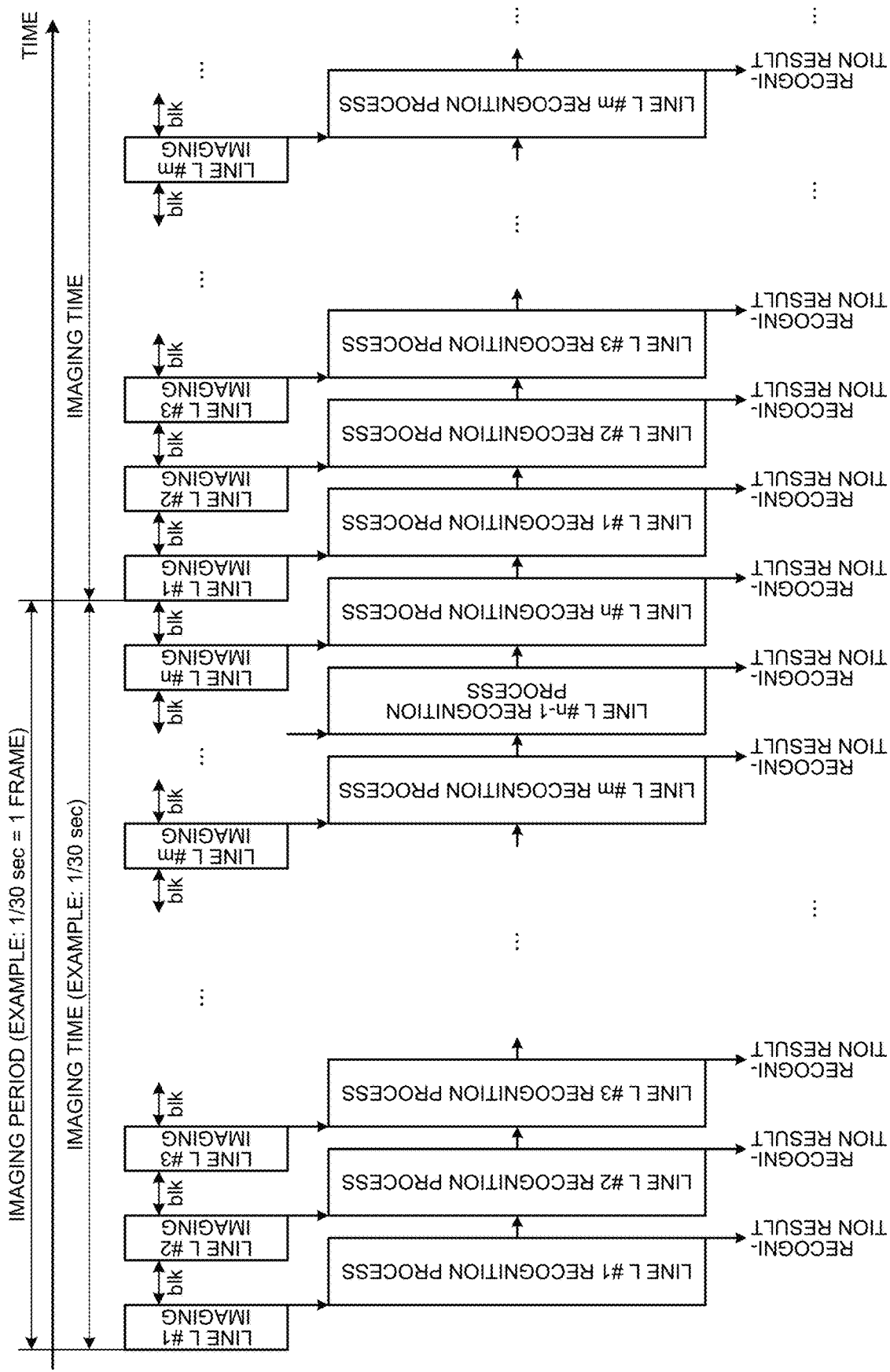

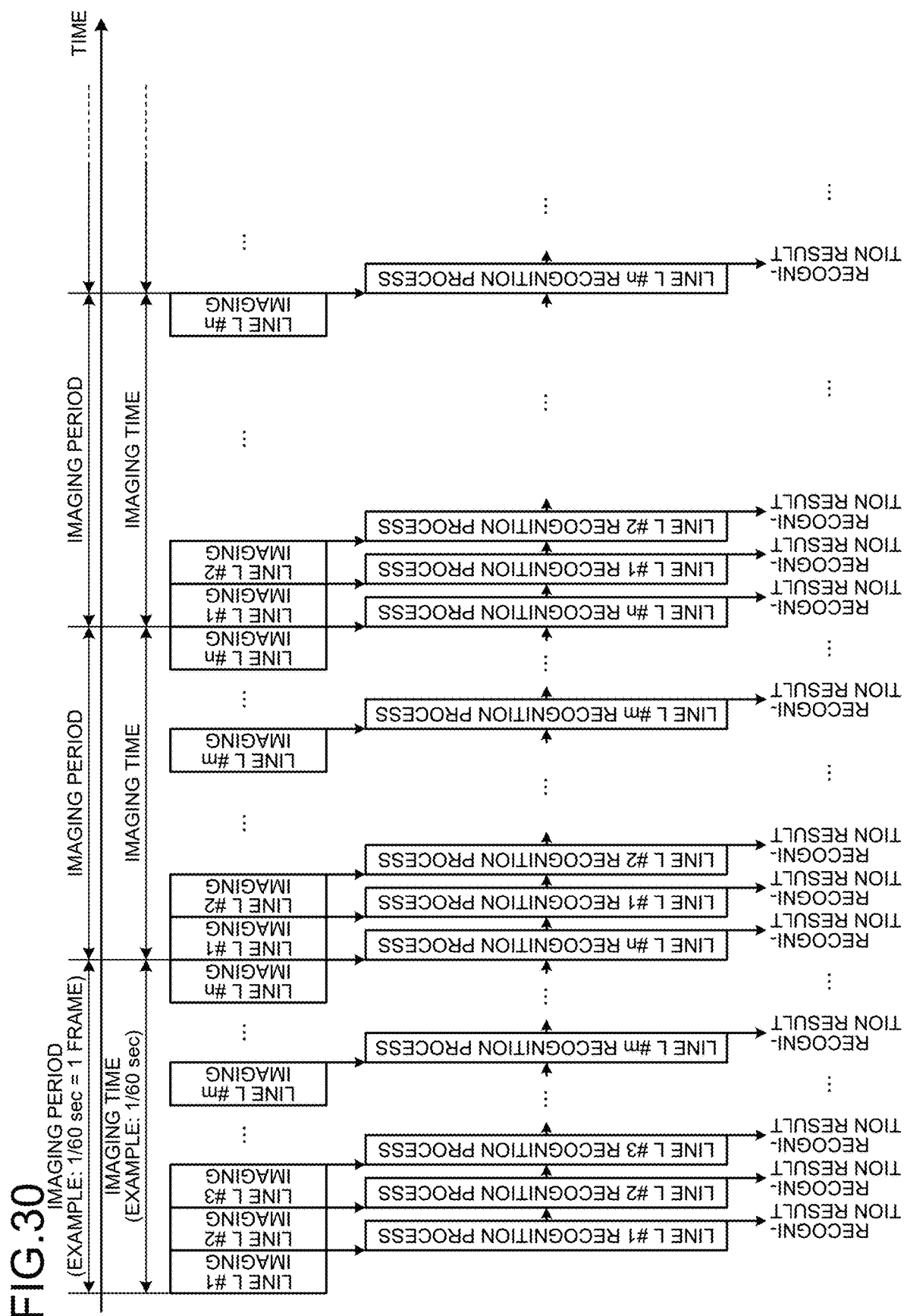

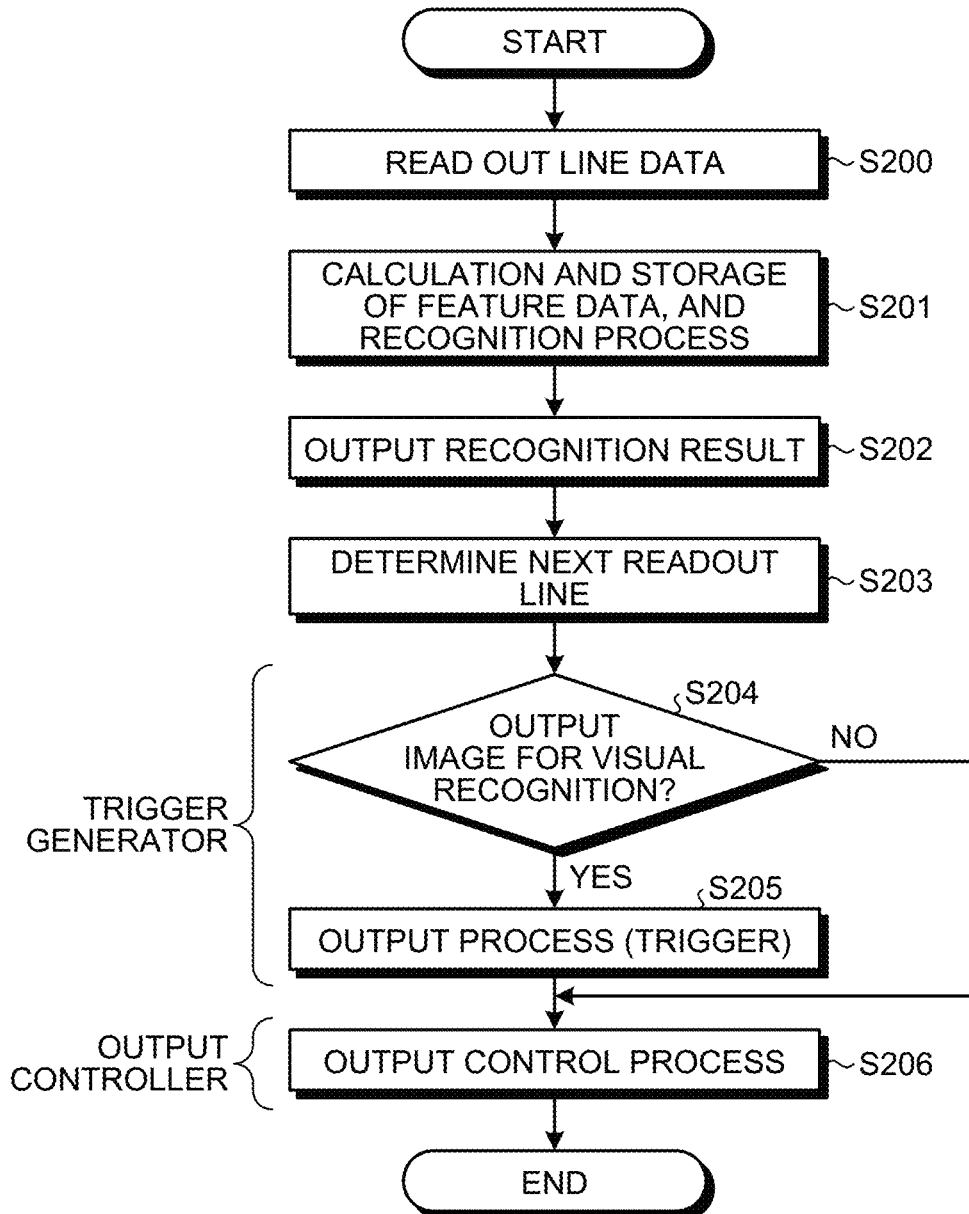

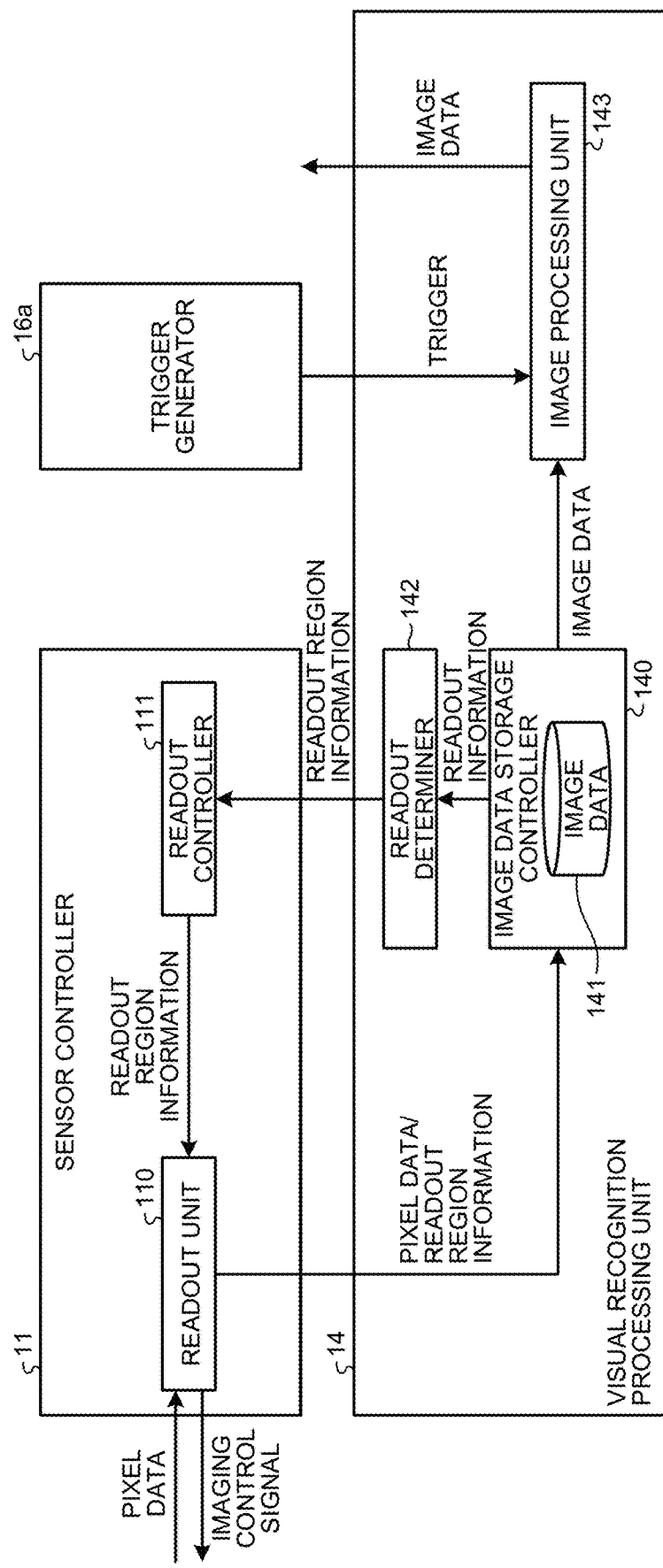

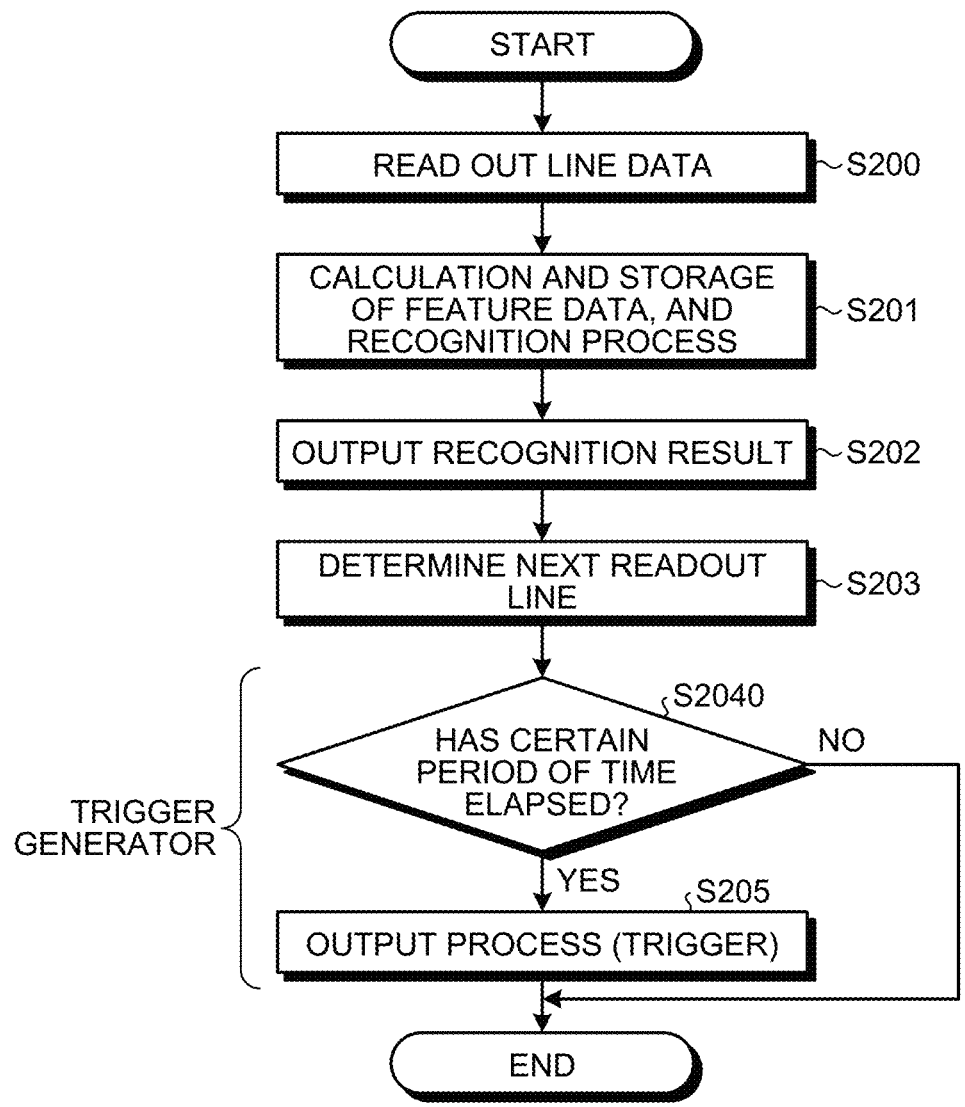

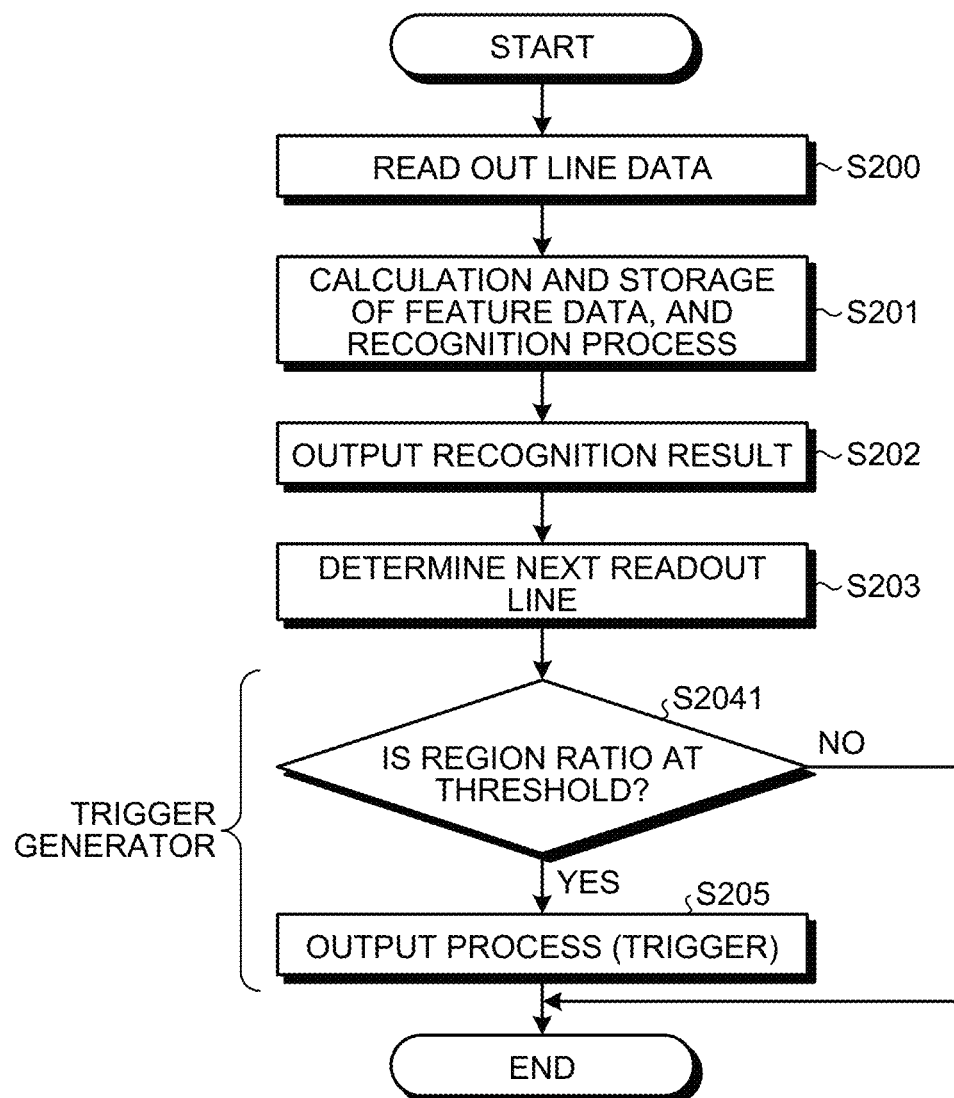

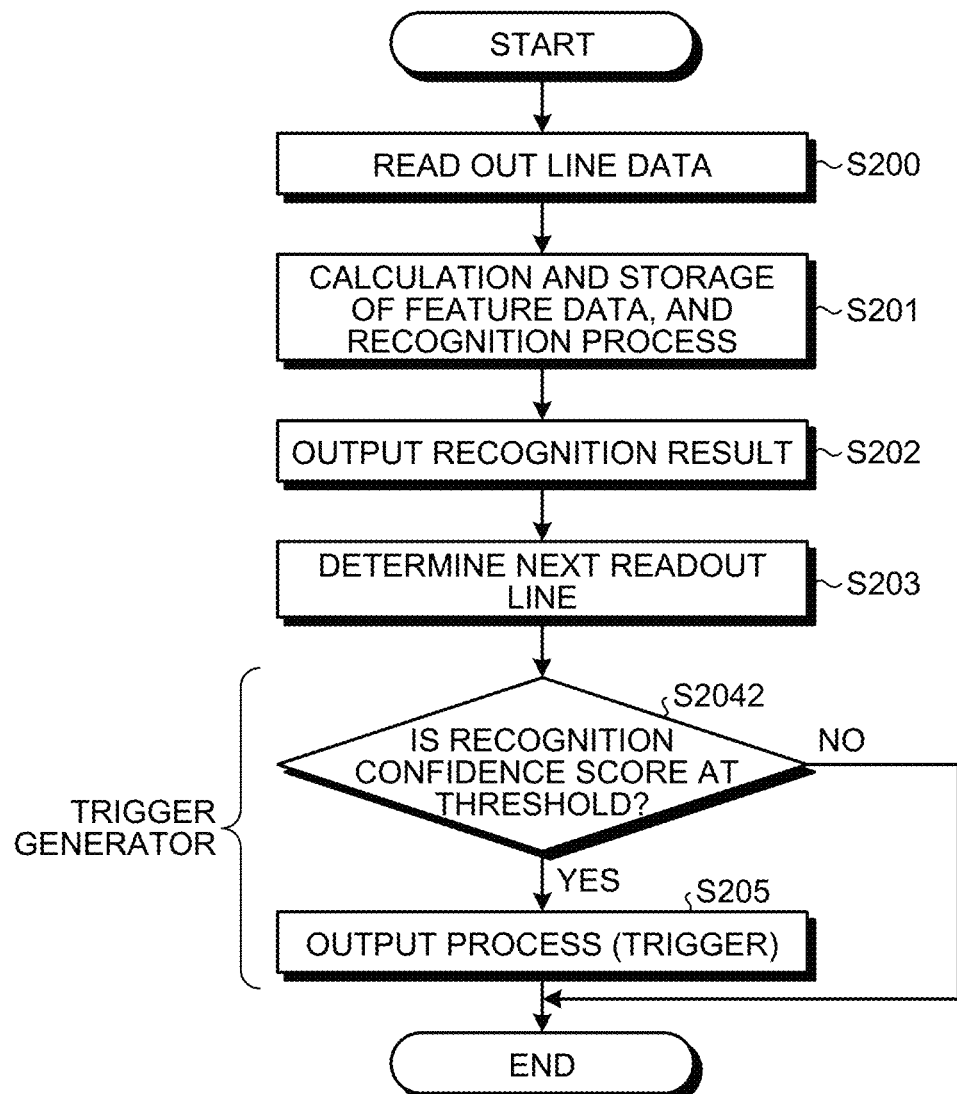

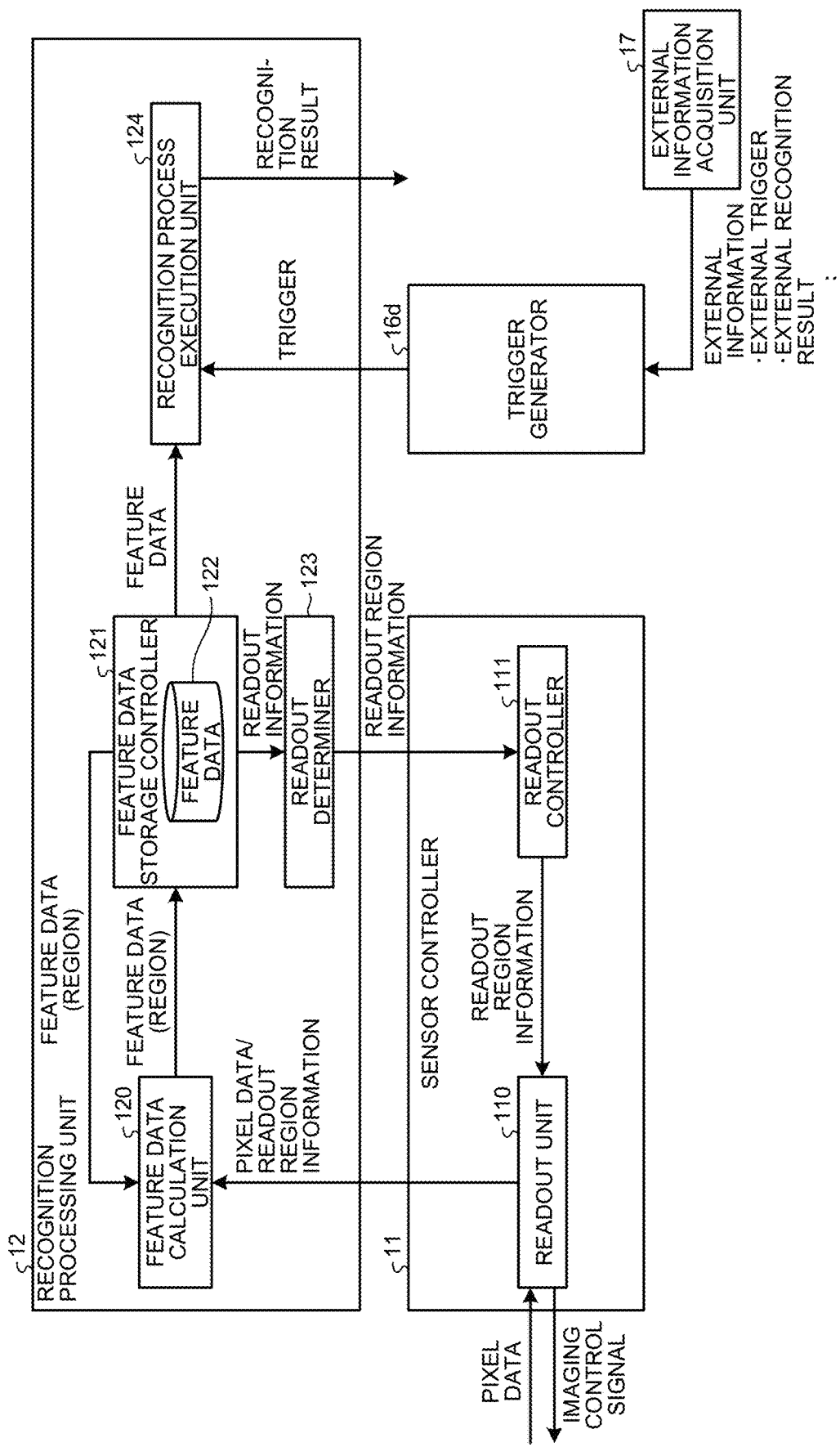

IMAGING APPARATUS, IMAGING SYSTEM, IMAGING METHOD, AND IMAGING PROGRAM

CROSS-REFERENCE TO RELATED APPLICATIONS

The present application is based on PCT filing PCT/JP2019/034496, filed Sep. 2, 2019, which claims priority to JP 2018-163700, filed Aug. 31, 2018, and JP 2019-159150, filed Aug. 30, 2019, the entire contents of each are incorporated herein by reference.

FIELD

The present disclosure relates to an imaging apparatus, an imaging system, an imaging method, and an imaging program.

BACKGROUND

In recent years, with the sophistication of imaging apparatuses such as digital still cameras, digital video cameras, and small cameras mounted on multifunctional mobile phones (smartphones), there have been developments of imaging apparatuses equipped with an image recognition function of recognizing a predetermined object included in a captured image.

CITATION LIST

Patent Literature

Patent Literature 1: JP 2017-112409 A

SUMMARY

Technical Problem

In general, an image suitable for recognition processes in the image recognition function is different from an image suitable for visual recognition by human. Therefore, in an attempt to improve the recognition accuracy in an imaging apparatus equipped with an image recognition function, it might be difficult to use an image captured for the recognition process as an image that can sufficiently provide information as an image for visual recognition.

The present disclosure aims to provide an imaging apparatus, an imaging system, an imaging method, and an imaging program capable of achieving both imaging for recognition processes and imaging for visual recognition.

Solution to Problem

For solving the problem described above, an imaging apparatus according to one aspect of the present disclosure has an imaging unit that has a pixel region in which a plurality of pixels is arranged and that reads and outputs a pixel signal from the pixels included in the pixel region; a unit-of-readout controller that controls a unit of readout set as a part of the pixel region: a recognition unit that has learned training data for each of units of readout; a first output unit that outputs a recognition result of recognition performed by the recognition unit for each of the units of readout; a second output unit that outputs the pixel signal to a subsequent stage; and a trigger generator that generates a trigger signal for controlling a first timing at which the first output unit outputs the recognition result and a second timing at which the second output unit outputs the pixel signal.

BRIEF DESCRIPTION OF DRAWINGS

FIG. 11 is a diagram schematically illustrating an image recognition process for obtaining a recognition result from a part of an image as a recognition target.

FIG. 20A is a schematic view illustrating an application example of the first embodiment.

FIG. 20B is a schematic view illustrating an application example of the first embodiment.

FIG. 28 is a flowchart illustrating an example of the recognition process according to the second embodiment.

FIG. 29B is a time chart illustrating an example of controlling readout and the recognition process according to the second embodiment.

FIG. 30 is a time chart illustrating another example of controlling readout and the recognition process according to the second embodiment.

FIG. 31 is a flowchart of an example illustrating control according to a third embodiment.

FIG. 33B is a functional block diagram illustrating a function of an example on a visual recognition processing unit side of the imaging apparatus according to the third embodiment.

FIG. 34 is a flowchart illustrating an example of a process when a trigger signal is output in accordance with time according to the third embodiment.

FIG. 37 is a flowchart of an example illustrating a process according to the first modification of the third embodiment.

FIG. 40 is a flowchart of an example illustrating a process according to the second modification of the third embodiment.

FIG. 41A is a functional block diagram illustrating a function of an example on a recognition processing unit side of an imaging apparatus according to a third modification of the third embodiment.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

Hereinafter, embodiments of the present disclosure will be described in the following order.

Figure 1:
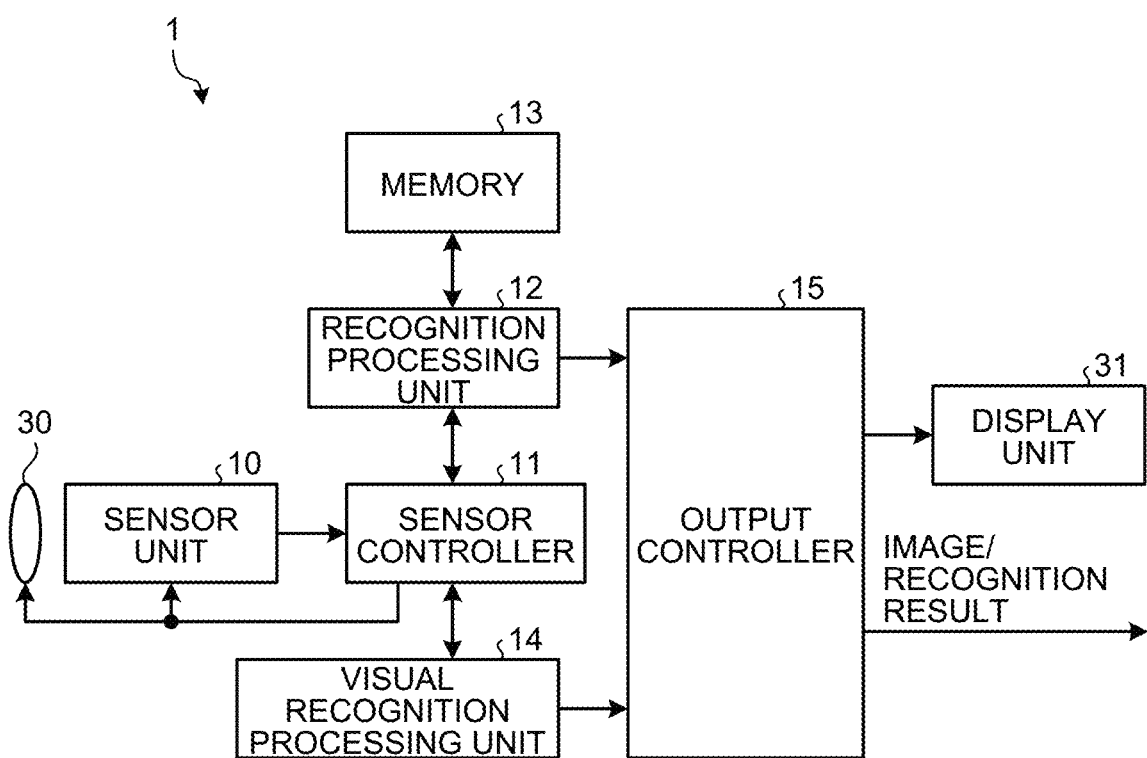
FIG. 1 is a block diagram illustrating a configuration of an example of an imaging apparatus applicable to each of embodiments of the present disclosure.

1. Configuration example according to each of embodiments of the present disclosure
2. Examples of existing technologies applicable to the present disclosure
 2-1. Overview of rolling shutter
 2-2. Overview of global shutter
 2-3. Deep neural network (DNN)
 2-3-1. Overview of convolutional neural network (CNN)
 2-3-2. Overview of recurrent neural network (RNN)
 2-4. Drive speed
3. Overview of present disclosure
4. First Embodiment
 4-1. Operation examples in the recognition processing unit
 4-2. Specific example of operations in the recognition processing unit
 4-3. Application example of the first embodiment
5. Second Embodiment
 5-0-1. Configuration example according to the second embodiment
 5-0-2. Example of processes in the recognition processing unit according to second embodiment
 5-0-3. Details of recognition process according to second embodiment
 5-0-4. Example of control of readout and recognition processes according to second embodiment
6. Third Embodiment
 6-0. Outline of third embodiment
 6-0-1. Example of trigger signal output by time
 6-1. First modification of third embodiment
 6-2. Second modification of third embodiment
 6-3. Third modification of third embodiment
7. Fourth Embodiment
 7-1. First modification of fourth embodiment
 7-2. Second modification of fourth embodiment
8. Fifth Embodiment
 8-0-1. Specific example of mediation process
 8-1. First modification of fifth embodiment
 8-2. Second modification of fifth embodiment
 8-3. Third modification of fifth embodiment
9. Sixth Embodiment 1. Configuration Example According to Each of Embodiments of the Present Disclosure A configuration of an imaging apparatus according to the present disclosure will be schematically described. FIG. 1 is a block diagram illustrating a configuration of an example of an imaging apparatus applicable to each of embodiments of the present disclosure. In FIG. 1, an imaging apparatus 1 includes a sensor unit 10, a sensor controller 11, a recognition processing unit 12, a memory 13, a visual recognition processing unit 14, and an output controller 15. The imaging apparatus 1 is a complementary metal oxide semiconductor (CMOS) image sensor (CIS) in which these individual units are integrally formed by using CMOS. The imaging apparatus 1 is not limited to this example, and may be another type of optical sensor such as an infrared light sensor that performs imaging with infrared light.

a sensor unit 10 outputs a pixel signal corresponding to the light emitted to a light receiving surface via the optical unit 30. More specifically, the sensor unit 10 has a pixel array in which pixels including at least one photoelectric conversion element are arranged in a matrix. The light receiving surface is formed by individual pixels arranged in a matrix in the pixel array. The sensor unit 10 further includes: a drive circuit for driving individual pixels included in the pixel array and a signal processing circuit that performs predetermined signal processing on the signal read out from each of pixels and outputs the processed signal as a pixel signal of each of the pixels. The sensor unit 10 outputs the pixel signal of each of the pixels included in the pixel region as image data in digital format.

Hereinafter, in the pixel array included in the sensor unit 10, a region in which valid pixels for generating the pixel signal are arranged will be referred to as a frame. Frame image data is formed by pixel data based on each of pixel signals output from each of the pixels included in the frame. Furthermore, each of rows in the pixel array of the sensor unit 10 is referred to as a line, and pixel data based on a pixel signal output from each of pixels included in the line will form line image data. The operation in which the sensor unit 10 outputs a pixel signal corresponding to the light applied to the light receiving surface is referred to as imaging. The sensor unit 10 controls the exposure at the time of imaging and the gain (analog gain) of the pixel signal in accordance with the imaging control signal supplied from the sensor controller 11 described below.

Constituted with a microprocessor, for example, the sensor controller 11 controls the readout of pixel data from the sensor unit 10, and outputs pixel data based on each of pixel signals read out from each of pixels included in the frame. The pixel data output from the sensor controller 11 is passed to the recognition processing unit 12 and the visual recognition processing unit 14.

Furthermore, the sensor controller 11 generates an imaging control signal for controlling the imaging in the sensor unit 10. The sensor controller 11 generates the imaging control signal in accordance with instructions from the recognition processing unit 12 and the visual recognition processing unit 14, which will be described below, for example. The imaging control signal contains information indicating the above-described exposure and analog gain set at the time of imaging in the sensor unit 10. The imaging control signal further contains a control signal (vertical synchronization signal, horizontal synchronization signal, or the like) used by the sensor unit 10 to perform imaging operation. The sensor controller 11 supplies the generated imaging control signal to the sensor unit 10.

The optical unit 30 is provided to apply light from the subject to the light receiving surface of the sensor unit 10 and is disposed at a position corresponding to the sensor unit 10, for example. The optical unit 30 includes, for example, a plurality of lenses, a diaphragm mechanism for adjusting the size of an aperture with respect to the incident light, and a focus mechanism for adjusting the focus of light applied to a light receiving surface. The optical unit 30 may further include a shutter mechanism (mechanical shutter) that adjusts the duration for which light is applied to the light receiving surface. The diaphragm mechanism, focus mechanism, and shutter mechanism of the optical unit 30 can be controlled by the sensor controller 11, for example. Not limited to this, the aperture/diaphragm and focus of the optical unit 30 can be controlled from the outside of the imaging apparatus 1. It is also possible to integrally configure the optical unit 30 with the imaging apparatus 1.

The recognition processing unit 12 performs recognition processing on an object included in the image containing pixel data based on the pixel data passed from the sensor controller 11. In the present disclosure, for example, a digital signal processor (DSP) reads out and executes a program that has undergone preliminary learning using training data and that is stored as a learning model in the memory 13, thereby actualizing the recognition processing unit 12 as a machine learning unit that performs the recognition process using a deep neural network (DNN). The recognition processing unit 12 can instruct the sensor controller 11 to read out the pixel data needed for the recognition process from the sensor unit 10. The recognition result obtained by the recognition processing unit 12 is passed to the output controller 15.

The visual recognition processing unit 14 executes processing for obtaining an image suitable for human recognition on the pixel data passed from the sensor controller 11, and outputs image data containing a set of pixel data, for example. For example, an image signal processor (ISP) reads out and executes a program stored beforehand in the memory (not illustrated), thereby actualizing the visual recognition processing unit 14.

For example, in a case where a color filter is provided for each of pixels included in the sensor unit 10 and the pixel data has individual types of color information, namely, information of red (R), green (G), and blue (B), the visual recognition processing unit 14 can execute a demosaic process, a white balance process, or the like. Furthermore, the visual recognition processing unit 14 can instruct the sensor controller 11 to read out the pixel data needed for the visual recognition process from the sensor unit 10. The image data in which pixel data has undergone image processing performed by the visual recognition processing unit 14 is passed to the output controller 15.

The output controller 15 is constituted with a microprocessor, for example, and outputs one or both of the recognition result passed from the recognition processing unit 12 and the image data passed as a visual recognition processing result from the visual recognition processing unit 14, to the outside of the imaging apparatus 1. The output controller 15 can output image data to a display unit 31 having a display device, for example. This enables the user to visually recognize the image data displayed by the display unit 31. The display unit 31 may be built in the imaging apparatus 1 or may be provided outside the imaging apparatus 1.

Figure 2A:
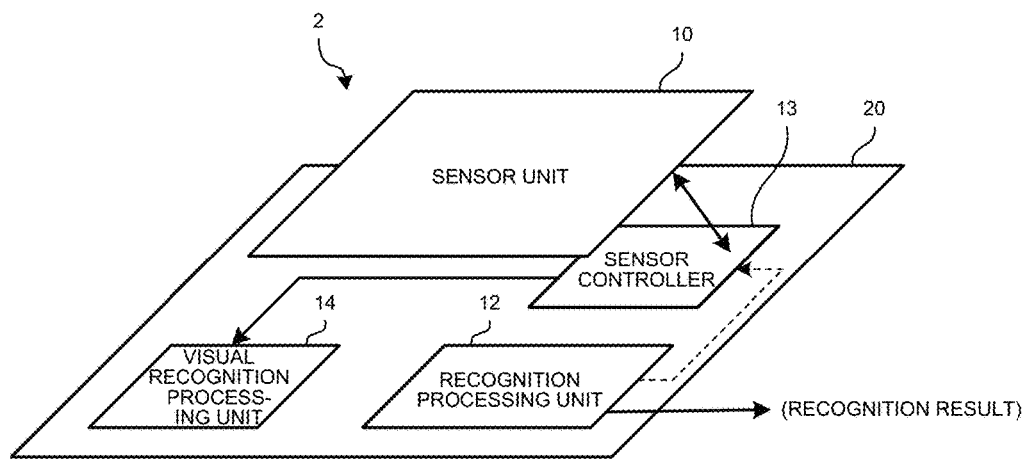
FIG. 2A is a schematic diagram illustrating an example of a hardware configuration of an imaging apparatus according to each of embodiments.
Figure 2B:
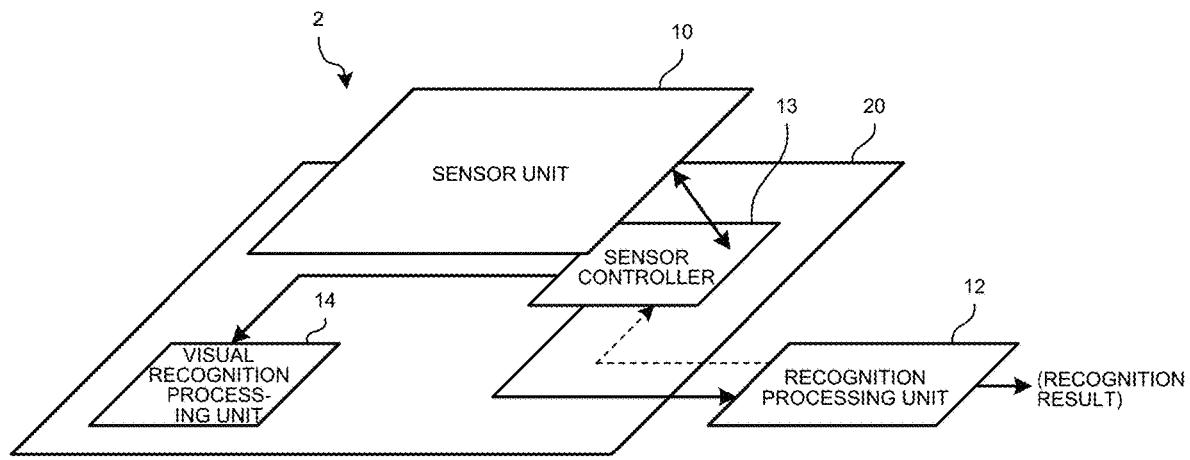
FIG. 2B is a schematic diagram illustrating an example of a hardware configuration of an imaging apparatus according to each of embodiments.

FIGS. 2A and 2B are schematic diagrams illustrating an example of a hardware configuration of the imaging apparatus 1 according to each of embodiments. FIG. 2A in an example in which the sensor unit 10, the sensor controller 11, the recognition processing unit 12, the memory 13, the visual recognition processing unit 14, and the output controller 15, out of the components in FIG. 1, are mounted on one chip 2. Note that FIG. 2A omits illustration of the memory 13 and the output controller 15 for simplification.

In the configuration illustrated in FIG. 2A, the recognition result obtained by the recognition processing unit 12 is output to the outside of the chip 2 via the output controller 15 (not illustrated). Furthermore, in the configuration of FIG. 2A, the recognition processing unit 12 can acquire pixel data for use in recognition from the sensor controller 11 via an internal interface of the chip 2.

FIG. 2B is an example in which the sensor unit 10, the sensor controller 11, the visual recognition processing unit 14, and the output controller 15, out of the components in FIG. 1, are mounted on one chip 2, and the recognition processing unit 12 and the memory 13 (not illustrated) are disposed outside the chip 2. FIG. 2B also omits illustration of the memory 13 and the output controller 15 for simplification, similarly to FIG. 2A.

In the configuration of FIG. 2B, the recognition processing unit 12 acquires pixel data to be used for recognition via an interface provided for inter-chip communication. Furthermore, in FIG. 2B, the recognition result obtained by the recognition processing unit 12 is output from the recognition processing unit 12 directly to the outside, but the output method is not limited to this example. That is, in the configuration of FIG. 2B, the recognition processing unit 12 may return the recognition result to the chip 2 and may perform control to output the result from the output controller 15 (not illustrated) mounted on the chip 2.

In the configuration illustrated in FIG. 2A, the recognition processing unit 12 is mounted on the chip 2 together with the sensor controller 11, enabling high-speed communication between the recognition processing unit 12 and the sensor controller 11 to be executed by the internal interface of the chip 2. On the other hand, the configuration illustrated in FIG. 2A has a difficulty in replacement of the recognition processing unit 12, leading to a difficulty in changing the recognition process. In contrast, the recognition processing unit 12 in the configuration illustrated in FIG. 2B is provided outside the chip 2, there is a need to perform communication between the recognition processing unit 12 and the sensor controller 11 via an interface between the chips. This makes the communication between the recognition processing unit 12 and the sensor controller 11 slower than in the configuration illustrated in FIG. 2A, leading to a possibility of an occurrence of delay in the control. On the other hand, the recognition processing unit 12 can be easily replaced, and thus various recognition processes can be implemented.

Hereinafter, unless otherwise specified, the imaging apparatus 1 has a configuration including the sensor unit 10, the sensor controller 11, the recognition processing unit 12, the memory 13, the visual recognition processing unit 14, and the output controller 15, which are mounted on one chip 2 in FIG. 2A.

In the configuration illustrated in FIG. 2A described above, the imaging apparatus 1 can be formed on one substrate. Not limited to this, the imaging apparatus 1 may be implemented as a stacked CIS in which a plurality of semiconductor chips is stacked and integrally formed.

Figure 3A:
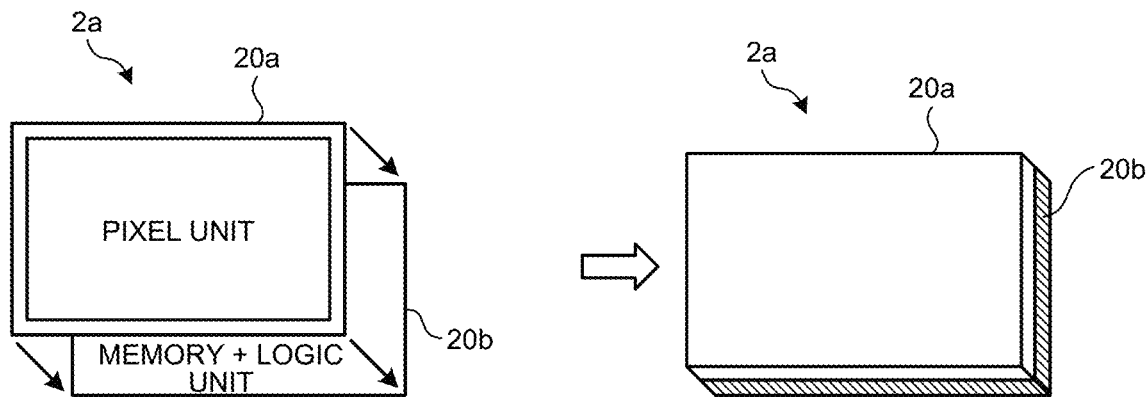
FIG. 3A is a diagram illustrating an example in which an imaging apparatus according to each of embodiments is formed as a stacked CIS with a two-layer structure.

As an example, the imaging apparatus 1 can be formed to have a two-layer structure in which semiconductor chips are stacked in two layers. FIG. 3A is a diagram illustrating an example in which the imaging apparatus 1 according to each of embodiments is formed as a stacked CIS with a two-layer structure. In the structure of FIG. 3A, a pixel unit 20a is formed on a first-layer semiconductor chip, and a memory+ logic unit 20b is formed on a second-layer semiconductor chip. The pixel unit 20a includes at least a pixel array in the sensor unit 10. For example, the memory+logic unit 20b includes the sensor controller 11, the recognition processing unit 12, the memory 13, the visual recognition processing unit 14, and the output controller 15, as well as an interface provided for communication between the imaging apparatus 1 and the outside. The memory+logic unit 20b further includes a part or all of the drive circuit that drives the pixel array in the sensor unit 10. Furthermore, although not illustrated, the memory+logic unit 20b can further include memory used by the visual recognition processing unit 14 for processing image data.

As illustrated on the right side of FIG. 3A, the first-layer semiconductor chip and the second-layer semiconductor chip are bonded together while having electrical contact with each other, enabling the imaging apparatus 1 to be configured as one solid-state imaging element.

Figure 3B:
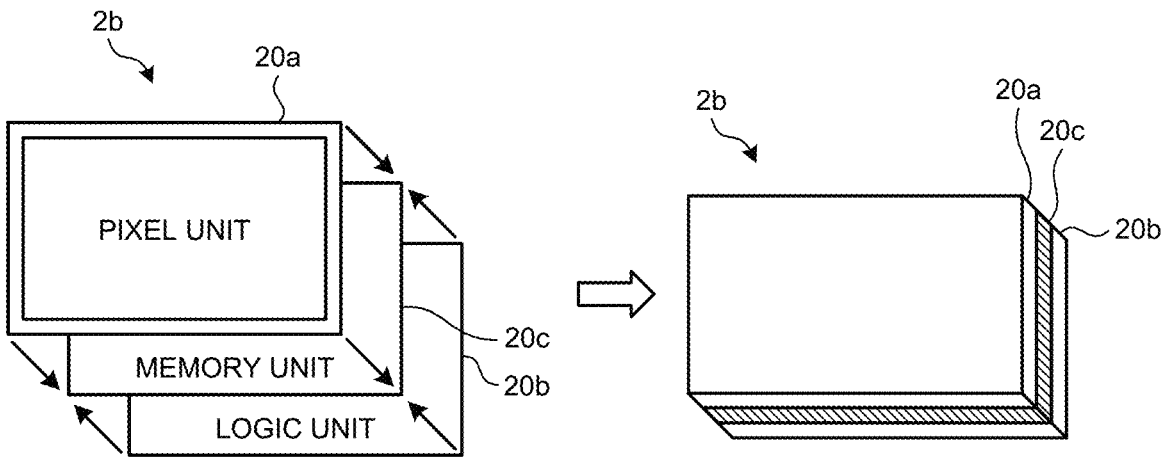
FIG. 3B is a diagram illustrating an example in which an imaging apparatus according to each of embodiments is formed as a stacked CIS with a three-layer structure.

As another example, the imaging apparatus 1 can be formed to have a three-layer structure in which semiconductor chips are stacked in three layers. FIG. 3B is a diagram illustrating an example in which the imaging apparatus 1 according to each of embodiments is formed as a stacked CIS with a three-layer structure. In the structure of FIG. 3B, a pixel unit 20a is formed on a first-layer semiconductor chip, a memory unit 20c is formed on a second-layer semiconductor, and a logic unit 20b' is formed on a third-layer semiconductor chip. In this case, the logic unit 20b' includes the sensor controller 11, the recognition processing unit 12, the visual recognition processing unit 14, the output controller 15, and the interface provided for communication between the imaging apparatus 1 and the outside, for example. Furthermore, the memory unit 20c can include the memory 13 and memory used by the visual recognition processing unit 14 for processing image data, for example. The memory 13 may be included in the logic unit 20b'.

As illustrated on the right side of FIG. 3B, the first-layer semiconductor chip, the second-layer semiconductor chip, and the third-layer semiconductor chip are bonded together while having electrical contact with each other, enabling the imaging apparatus 1 to be configured as one solid-state imaging element.

Figure 4:
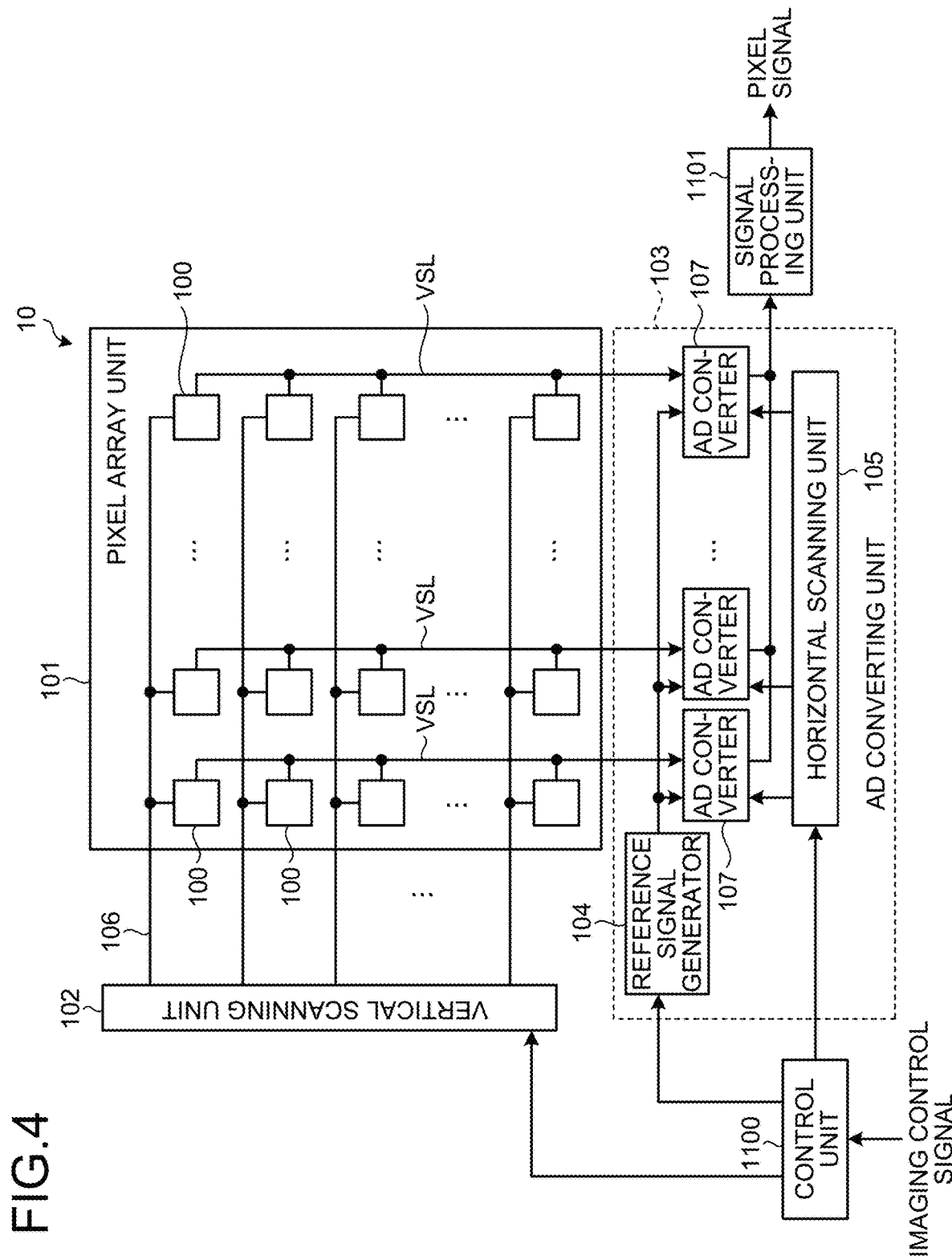
FIG. 4 is a block diagram illustrating a configuration of an example of a sensor unit applicable to each of embodiments.

FIG. 4 is a block diagram illustrating a configuration of an example of the sensor unit 10 applicable to each of embodiments. In FIG. 4, the sensor unit 10 includes a pixel array unit 101, a vertical scanning unit 102, an analog to digital (AD) converting unit 103, a pixel signal line 106, a vertical signal line VSL, a control unit 1100, and a signal processing unit 1101. In FIG. 4, the control unit 1100 and the signal processing unit 1101 can be included in the sensor controller 11 illustrated in FIG. 1, for example.

The pixel array unit 101 includes a plurality of pixel circuits 100 each of which including a photoelectric conversion element using a photodiode, for example, which performs photoelectric conversion on the received light, and a circuit that performs readout of a charge from the photoelectric conversion element. In the pixel array unit 101, the plurality of pixel circuits 100 are arranged in a matrix in the horizontal direction (row direction) and the vertical direction (column direction). In the pixel array unit 101, the arrangement of the pixel circuits 100 in the row direction is referred to as a line. For example, in a case where an image of one frame is formed by 1920 pixels×1080 lines, the pixel array unit 101 includes at least 1080 lines including at least 1920 pixel circuits 100. A pixel signal read out from the pixel circuit 100 included in the frame forms an image (a piece of image data) of one frame.

Hereinafter, an operation of reading out a pixel signal from each of the pixel circuits 100 included in the frame in the sensor unit 10 will be described as an operation of reading out a pixel from the frame, as appropriate. Furthermore, an operation of reading out a pixel signal from each of the pixel circuits 100 of the line included in the frame will be described as an operation of reading out a line, as appropriate, Furthermore, in the pixel array unit 101, the pixel signal line 106 is connected to each of rows and the vertical signal line VSL is connected to each of columns, regarding row and columns of each of the pixel circuits 100. An end of the pixel signal line 106 that is not connected to the pixel array unit 101 is connected to the vertical scanning unit 102. The vertical scanning unit 102 transmits a control signal such as a drive pulse used at the time of readout of a pixel signal from a pixel, to the pixel array unit 101 via the pixel signal line 106 under the control of the control unit 1100 described below. The end of the vertical signal line VSL that is not connected to the pixel array unit 101 is connected to the AD converting unit 103. The pixel signal read out from the pixel is transmitted to the AD converting unit 103 via the vertical signal line VSL.

The readout control of the pixel signal from the pixel circuit 100 will be schematically described. The readout of a pixel signal from the pixel circuit 100 is performed in processes of transferring the charge stored in the photoelectric conversion element by exposure to the floating diffusion layer (FD) and converting the transferred charge in the floating diffusion layer into a voltage. The voltage converted from the charge in the floating diffusion layer is output to the vertical signal line VSL via an amplifier.

More specifically, the pixel circuit 100 is set, during exposure, to turn off (open) the connection between the photoelectric conversion element and the floating diffusion layer so as to store the charge generated by the light incident by the photoelectric conversion, in the photoelectric conversion element. After the end of exposure, the floating diffusion layer and the vertical signal line VSL are connected in accordance with a selection signal supplied via the pixel signal line 106. Furthermore, the floating diffusion layer is connected to the supply line of the power supply voltage VDD or the black level voltage in a short period of time in accordance with a reset pulse supplied via the pixel signal line 106 so as to reset the floating diffusion layer. The reset level voltage (defined as voltage A) of the floating diffusion layer is output to the vertical signal line VSL. Thereafter, the transfer pulse supplied via the pixel signal line 106 turns on (close) the connection between the photoelectric conversion element and the floating diffusion layer so as to transfer the electric charge stored in the photoelectric conversion element to the floating diffusion layer. A voltage (defined as voltage B) corresponding to the amount of charge in the floating diffusion layer is output to the vertical signal line VSL.

The AD converting unit 103 includes an AD converter 107 provided for each of the vertical signal lines VSL, a reference signal generator 104, and a horizontal scanning unit 105. The AD converter 107 is a column AD converter that performs an AD conversion process on each of columns of the pixel array unit 101. The AD converter 107 performs the AD conversion process on the pixel signal supplied from the pixel circuit 100 via the vertical signal line VSL, and thereby generates two digital values (values corresponding to Voltage A and B used in the correlated double sampling (CDS) process for noise reduction.

The AD converter 107 supplies the two generated digital values to the signal processing unit 1101. The signal processing unit 1101 performs the CDS process based on the two digital values supplied from the AD converter 107, and thereby generates a pixel signal (a piece of pixel data) formed of a digital signal. The pixel data generated by the signal processing unit 1101 is output to the outside of the sensor unit 10.

Based on the control signal input from the control unit 1100, the reference signal generator 104 generates a ramp signal as a reference signal, which is used by each of the AD converters 107 to convert the pixel signal into two digital values. The ramp signal is a signal in which the level (voltage value) decreases with a constant slope with respect to the time, or a signal in which the level decreases stepwise. The reference signal generator 104 supplies the generated ramp signal to each AD converter 107. The reference signal generator 104 is configured by using a digital to analog converter (DAC) or the like.

When a ramp signal in which the voltage drops stepwise with a predetermined inclination is supplied from the reference signal generator 104, the counter starts counting in accordance with the clock signal. A comparator compares the voltage of the pixel signal supplied from the vertical signal line VSL with the voltage of the ramp signal, and stops the counting by the counter at the timing when the voltage of the ramp signal crosses the voltage of the pixel signal. The AD converter 107 outputs a value corresponding to the count value at the time when the count is stopped, thereby converting the pixel signal being the analog signal into a digital value.

The AD converter 107 supplies the two generated digital values to the signal processing unit 1101. The signal processing unit 1101 performs the CDS process based on the two digital values supplied from the AD converter 107, and thereby generates a pixel signal (a piece of pixel data) formed of a digital signal. The pixel signal being the digital signal generated by the signal processing unit 1101 is output to the outside of the sensor unit 10.

Under the control of the control unit 1100, the horizontal scanning unit 105 performs selective scanning in which each of the AD converters 107 is selected in a predetermined order so as to sequentially output each of the digital values temporarily held in each of the AD converters 107 to the signal processing unit 1101. The horizontal scanning unit 105 is implemented as a shift register or an address decoder, for example.

Based on the imaging control signal supplied from the sensor controller 11, the control unit 1100 performs drive control of the vertical scanning unit 102, the AD converting unit 103, the reference signal generator 104, the horizontal scanning unit 105, or the like. The control unit 1100 generates various drive signals that make a reference for the operation of the vertical scanning unit 102, the AD converting unit 103, the reference signal generator 104, and the horizontal scanning unit 105. Based on the vertical synchronization signal or the external trigger signal, and the horizontal synchronization signal, included in the imaging control signal, for example, the control unit 1100 generates a control signal to be supplied by the vertical scanning unit 102 to each of the pixel circuits 100 via the pixel signal line 106. The control unit 1100 supplies the generated control signal to the vertical scanning unit 102.

Furthermore, the control unit 1100 passes, for example, information indicating an analog gain included in the imaging control signal supplied from the sensor controller 11 to the AD converting unit 103. Based on the information indicating the analog gain, the AD converting unit 103 controls the gain of the pixel signal input to each of the AD converters 107 included in the AD converting unit 103 via the vertical signal line VSL.

Based on the control signal supplied from the control unit 1100, the vertical scanning unit 102 supplies various signals including a drive pulse in the pixel signal line 106 of the selected pixel row of the pixel array unit 101 to each of the pixel circuits 100 line by line, so as to allow the pixel signal to be output from each of the pixel circuits 100 to the vertical signal line VSL. The vertical scanning unit 102 is implemented as a shift register or an address decoder, for example. Furthermore, the vertical scanning unit 102 controls the exposure in each of the pixel circuits 100 based on the information indicating the exposure supplied from the control unit 1100.

The sensor unit 10 configured in this manner is a column AD type complementary metal oxide semiconductor (CMOS) image sensor in which AD converters 107 are arranged in columns.

2. Examples of Existing Technologies Applicable to the Present Disclosure

Prior to the description of each of embodiments according to the present disclosure, the existing technologies applicable to the present disclosure will be outlined in order to facilitate understanding.

2-1. Overview of Rolling Shutter

Figure 5A:
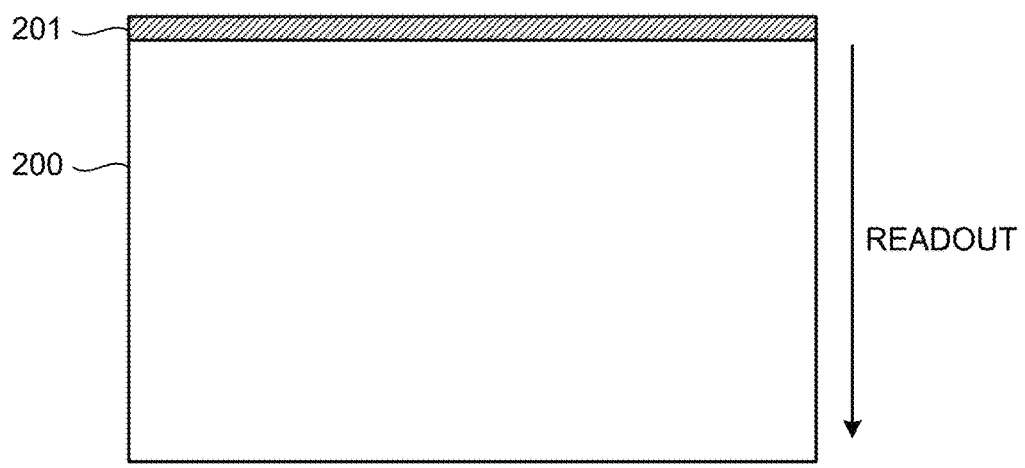
FIG. 5A is a schematic view illustrating a rolling shutter method.
Figure 5B:
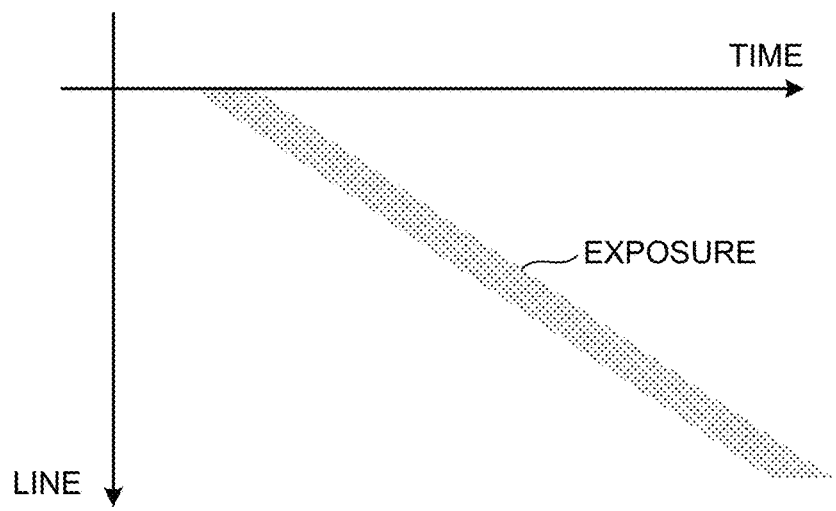
FIG. 5B is a schematic view illustrating a rolling shutter method.
Figure 5C:
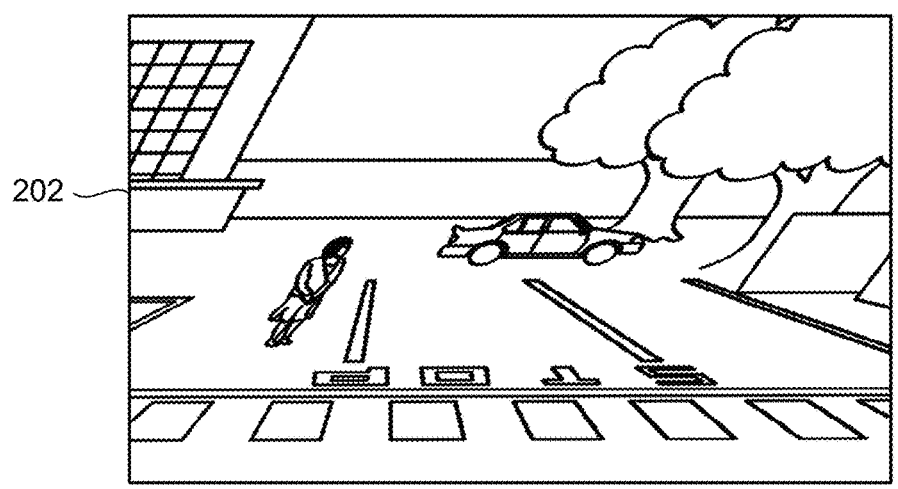
FIG. 5C is a schematic view illustrating a rolling shutter method.

Known imaging methods used at the execution of imaging by the pixel array unit 101 include a rolling shutter (RS) method and a global shutter (GS) method. First, the rolling shutter method will be schematically described. FIGS. 5A, 5B, and 5C are schematic views illustrating the rolling shutter method. In the rolling shutter method, as illustrated in FIG. 5A, imaging is performed in order from line 201 at an upper end of a frame 200, for example, in units of lines.

The above description has described "imaging" as representation of an operation in which the sensor unit 10 outputs a pixel signal corresponding to the light applied to the light receiving surface. More specifically, "imaging" is used to represent a series of operations starting from the exposure of a pixel up to the transfer of the pixel signal based on the charge stored by the exposure to the photoelectric conversion element included in the pixel, to the sensor controller 11. Furthermore, as described above, a frame refers to a region of the pixel array unit 101 in which the pixel circuit 100 valid for generating a pixel signal is arranged.

For example, in the configuration of FIG. 4, exposure is simultaneously executed for each of the pixel circuits 100 included in one line. After the end of the exposure, the pixel signals based on the charges stored by the exposure are simultaneously transferred in each of the pixel circuits 100 included in the line via each of the vertical signal lines VSL corresponding to each of the pixel circuits 100. By sequentially executing this operation in units of line, it is possible implement imaging with a rolling shutter.

FIG. 5B schematically illustrates an example of a relationship between imaging and time in the rolling shutter method. In FIG. 5B, the vertical axis represents the line position and the horizontal axis represents the time. In the rolling shutter method, since the exposure for each of lines is performed sequentially in the order of lines, the timing of exposure in each of the lines shifts sequentially with the position of the line, as illustrated in FIG. 5B. Therefore, for example, in a case where the horizontal positional relationship between the imaging apparatus 1 and the subject changes at high speed, the captured image of the frame 200 is distorted as illustrated in FIG. 5C. In the example of FIG. 5C, the image 202 corresponding to the frame 200 is an image inclined at an angle corresponding to the speed and direction of change in the horizontal positional relationship between the imaging apparatus 1 and the subject.

Figure 6A:
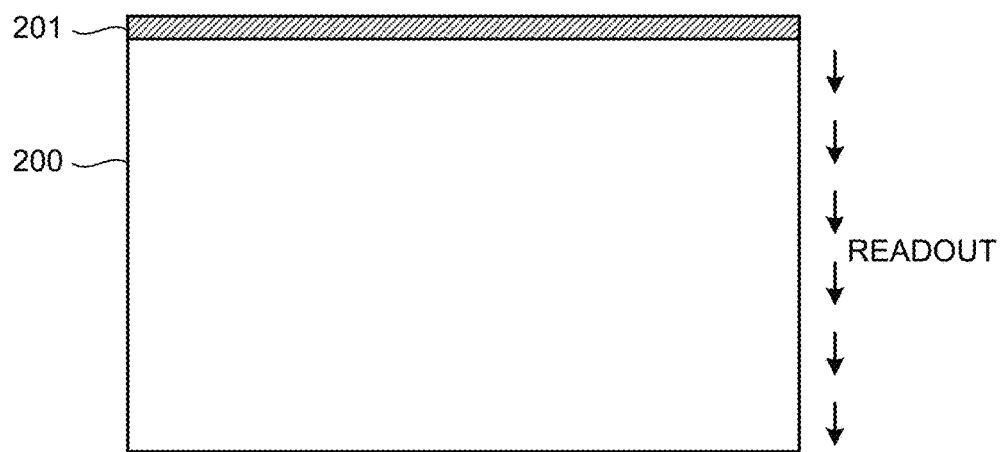
FIG. 6A is a schematic diagram illustrating line thinning in the rolling shutter method.
Figure 6B:
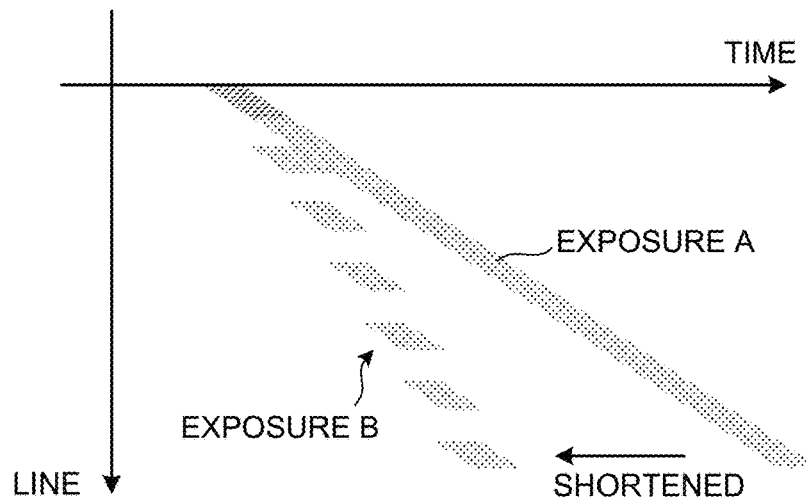
FIG. 6B is a schematic diagram illustrating line thinning in the rolling shutter method.
Figure 6C:
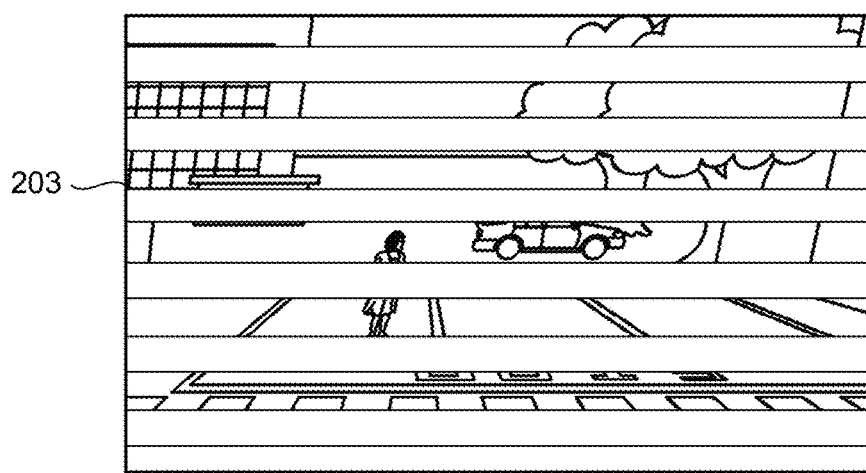
FIG. 6C is a schematic diagram illustrating line thinning in the rolling shutter method.

In the rolling shutter method, it is also possible to thin out lines for imaging. FIGS. 6A, 6B, and 6C are schematic views illustrating line thinning in the rolling shutter method. As illustrated in FIG. 6A, similarly to the example of FIG. 5A described above, imaging is performed in units of line from line 201 at the upper end of the frame 200 toward the lower end of the frame 200. At this time, imaging is performed while skipping lines at predetermined numbers.

Here, for the sake of explanation, it is assumed that imaging is performed every other line by performing one-line thinning. That is, after the imaging of the nth line, the imaging of the (n+2) line is performed. At this time, the time from the imaging of the nth line to the imaging of the (n+2) line is assumed to be equal to the time from the imaging of the nth line to the imaging of the (n+1) line when the thinning is not performed.

FIG. 6B schematically illustrates an example of a relationship between imaging and time when one-line thinning is performed in the rolling shutter method. In FIG. 6B, the vertical axis represents the line position and the horizontal axis represents the time. In FIG. 6B, exposure A corresponds to the exposure of FIG. 5B without thinning, and exposure B illustrates the exposure when one-line thinning is performed. As illustrated in the exposure B, execution of line thinning makes it possible to reduce the deviation of the exposure timing at the same line position as compared with the case where the line thinning is not executed. Therefore, as illustrated as image 203 in FIG. 6C, the distortion in the inclination direction occurring in the image of the captured frame 200 is smaller compared to the case where the line thinning illustrated in FIG. 5C is not performed. On the other hand, the resolution of the image when line thinning is performed is lower compared to the case where line thinning is not performed.

Figure 7A:
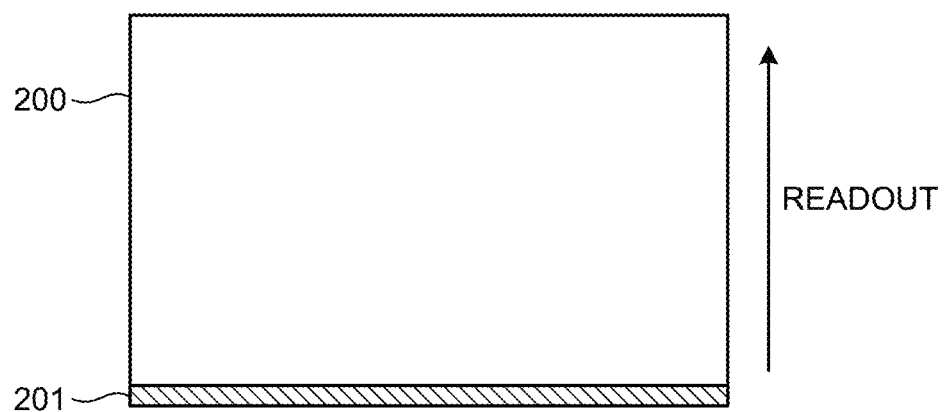
FIG. 7A is a diagram schematically illustrating an example of another imaging method in the rolling shutter method.
Figure 7B:
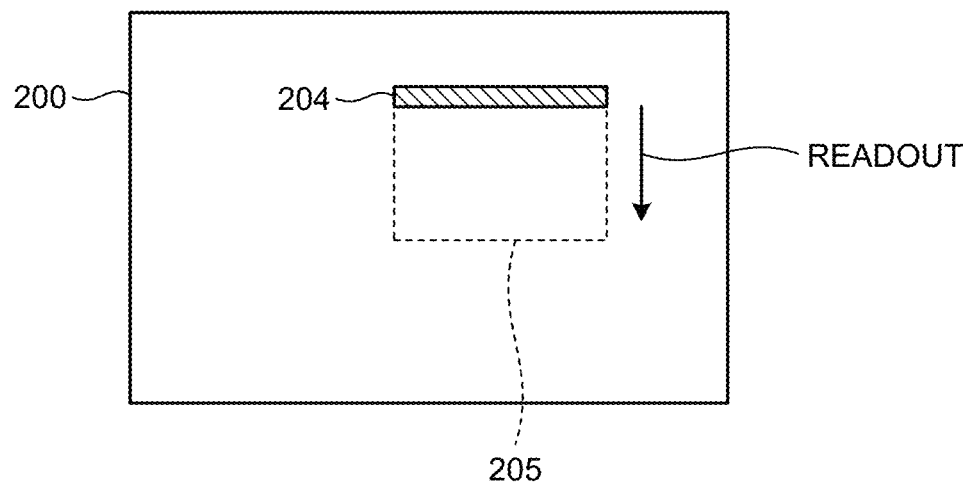
FIG. 7B is a diagram schematically illustrating an example of another imaging method in the rolling shutter method.

The above description is an example of the rolling shutter method in which imaging is performed sequentially in the order of lines from the upper end to the lower end of the frame 200. However, the present has been described, but the present disclosure is not limited to this example. FIGS. 7A and 7B are diagrams schematically illustrating examples of other imaging methods in the rolling shutter method. For example, as illustrated in FIG. 7A, it is possible, in the rolling shutter method, to perform imaging sequentially in the order of lines from the lower end to the upper end of the frame 200. In this case, the direction of the distortion of the image 202 in the horizontal direction would be opposite to the direction in the case where the images are imaged sequentially in the order of lines from the upper end to the lower end other frame 200.

Furthermore, by setting the range of the vertical signal line VSL used for the transfer of the pixel signal, for example, it is also possible to selectively read out a part of the line. Furthermore, by individually setting the line used for imaging and the vertical signal line VSL used for the transfer of the pixel signal, it is also possible to set the imaging start/end lines to positions other than the upper end and the lower end of the frame 200. FIG. 7B schematically illustrates an example in which a region 205 having a rectangular shape and width and height less than the width and height of the frame 200 is set as an imaging range. In the example of FIG. 7B, imaging is performed sequentially in the order of lines from line 204 at the upper end of the region 205 toward the lower end of the region 205.

2-2. Overview of Global Shutter

Figure 8A:
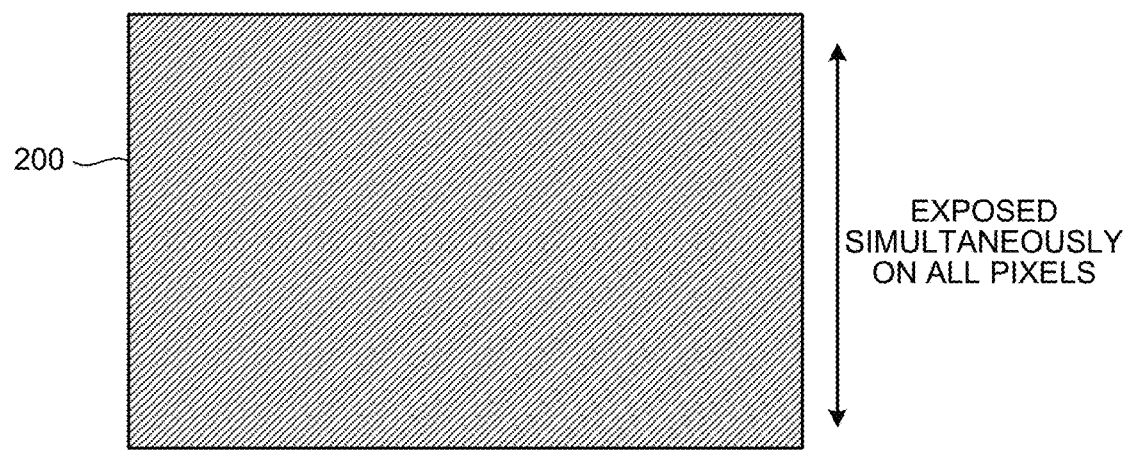
FIG. 8A is a schematic diagram illustrating a global shutter method.
Figure 8B:
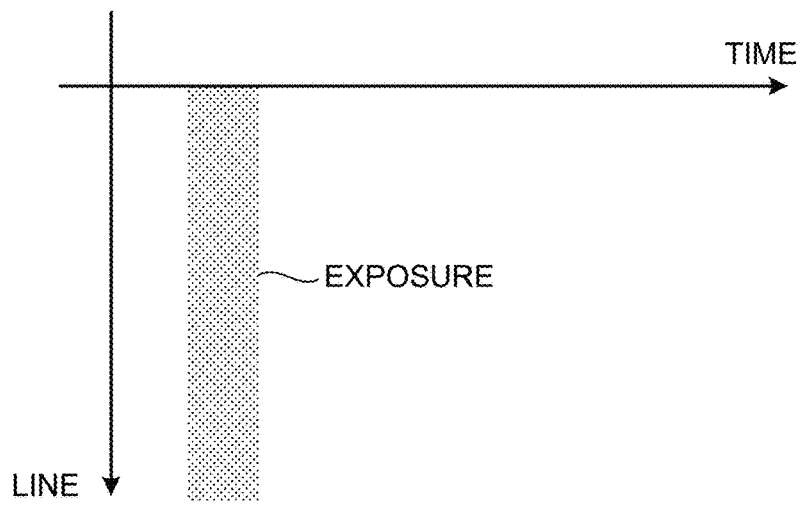
FIG. 8B is a schematic diagram illustrating a global shutter method.
Figure 8C:
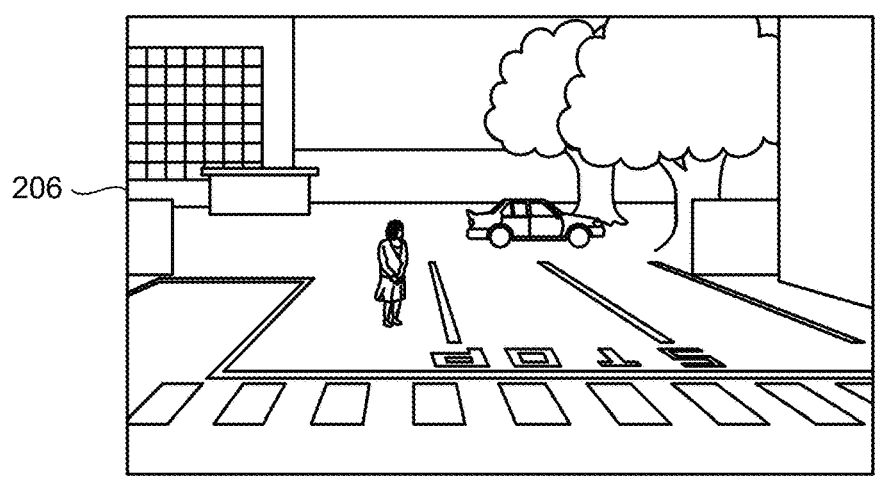
FIG. 8C is a schematic diagram illustrating a global shutter method.

Next, the global shutter (GS) method will be schematically described as an imaging method at the time of imaging by using the pixel array unit 101. FIGS. 8A, 8B, and 8C are schematic views illustrating the global shutter method. As illustrated in FIG. 8A, the global shutter method simultaneously exposes in all-pixel circuits 100 included in the frame 200.

When the global shutter method is implemented in the configuration of FIG. 4, it is conceivable, as an example, to use a configuration of the pixel circuits 100 in which a capacitor is further provided between the photoelectric conversion element and the FD. In addition, the configuration further includes a first switch provided between the photoelectric conversion element and the capacitor, and a second switch provided between the capacitor and the floating diffusion layer, individually, and the opening and closing of each of the first and second switches is controlled by pulses supplied via the pixel signal line 106.

In such a configuration, in all the pixel circuits 100 included in the frame 200, the first and second switches are set to open during the exposure period, and then, at completion of the exposure, the first switch is switched from open to closed state so as to transfer the charge from the photoelectric conversion element to the capacitor. Thereafter, with the capacitor regarded as a photoelectric conversion element, the charge will be read out from the capacitor in the sequence similar to the sequence used in the readout operation for the rolling shutter method above described. This makes it possible to perform simultaneous exposure in all the pixel circuits 100 included in the frame 200.

FIG. 8B schematically illustrates an example of a relationship between imaging and time in the global shutter method. In FIG. 8B, the vertical axis represents the line position and the horizontal axis represents the time. In the global shutter method, exposure is performed simultaneously in all the pixel circuits 100 included in the frame 200. This makes it possible to obtain the exposure timing which is same for each of lines, as illustrated in FIG. 8B. Therefore, for example, even in a case where the horizontal positional relationship between the imaging apparatus 1 and the subject changes at high speed, an image 206 captured in the frame 200 has no distortion due to the change as illustrated in FIG. 8C.

The global shutter method makes it possible to ensure the simultaneity of exposure timing in the all-pixel circuit 100 included in the frame 200. Therefore, by controlling the timing of each of pulses supplied by the pixel signal line 106 of each of lines and the timing of transfer by each of the vertical signal lines VSL, it is possible to achieve sampling (readout of the pixel signal) in various patterns.

Figure 9A:
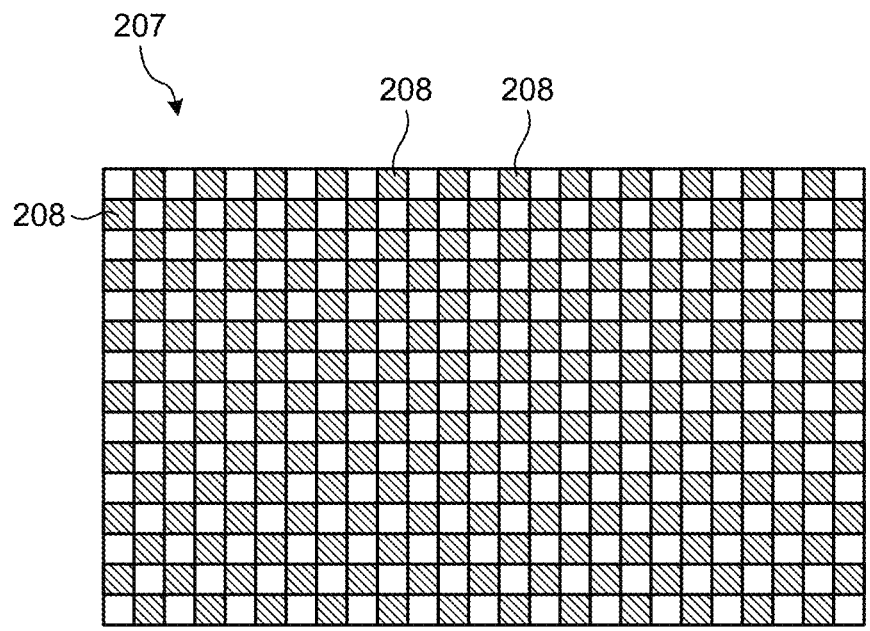
FIG. 9A is a diagram schematically illustrating an example of a sampling pattern implementable in the global shutter method.
Figure 9B:
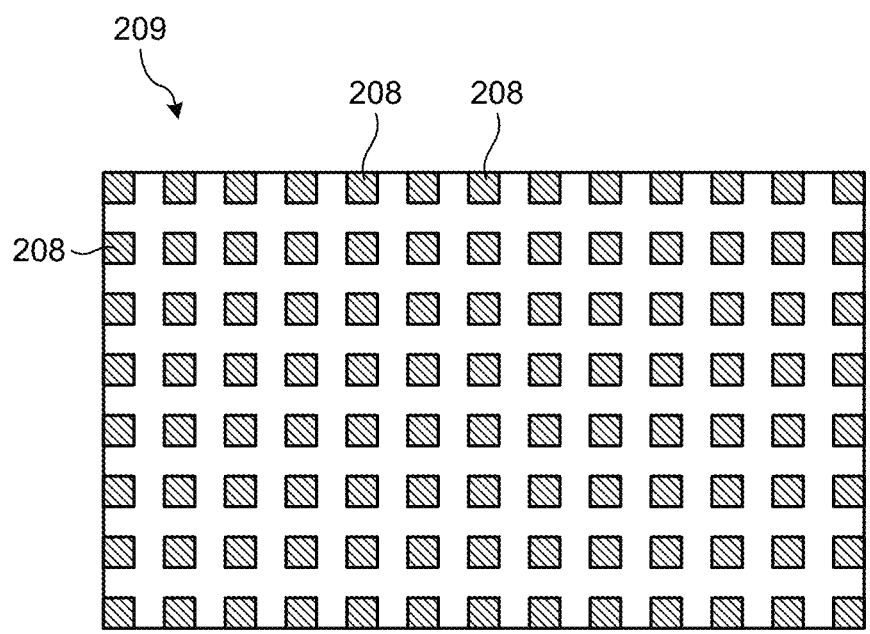
FIG. 9B is a diagram schematically illustrating an example of a sampling pattern implementable in the global shutter method.

FIGS. 9A and 9B are diagrams schematically illustrating an example of a sampling pattern that can be achieved in the global shutter method. FIG. 9A is an example in which a sample 208 of pixel signal readout is extracted in a checkered pattern from each of the pixel circuits 100 arranged in a matrix included in the frame 200. Furthermore, FIG. 9B is an example of extracting the sample 208 of pixel signal readout, from each of the pixel circuits 100 in a grid pattern. Furthermore, in the global shutter method as well, imaging can be performed sequentially in the order of lines similarly to the rolling shutter method described above.

(2-3. Deep Neural Network (DNN))

Next, a recognition process using a deep neural network (DNN) applicable to each of embodiments will be schematically described. In each of embodiments, the recognition process for image data is performed by using a convolutional neural network (CNN) and a recurrent neural network (RNN) in particular, among the DNNs. Hereinafter, the "recognition process for image data" will be referred to as an "image recognition process" or the like, as appropriate.

2-3-1. Overview of CNN

Figure 10:
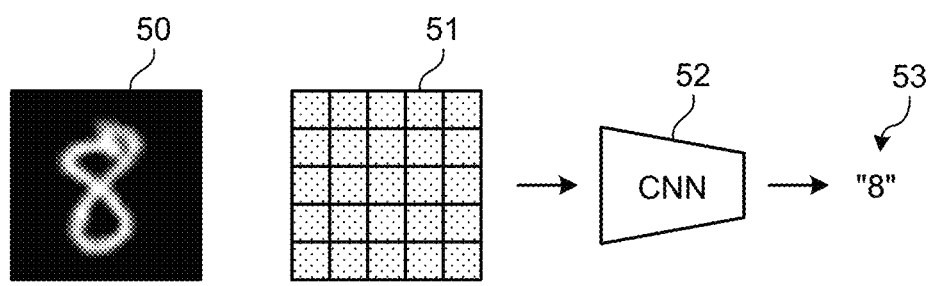
FIG. 10 is a diagram schematically illustrating an image recognition process performed by a CNN.

First, a CNN will be described schematically. In the image recognition process using a CNN, an image recognition process is performed based on image information provided by pixels arranged in a matrix. FIG. 10 is a diagram schematically illustrating an image recognition process performed by a CNN. Pixel information 51 for the whole of an image 50 including a drawing of a number "8", which is an object as a recognition target, is processed by a CNN 52 that has been trained in a predetermined manner. With this process, the number "8" is recognized as a recognition result 53.

In contrast, it is also possible to apply the process by the CNN based on an image for each of lines to obtain the recognition result from a part of the image as a recognition target. FIG. 11 is a diagram schematically illustrating an image recognition process of obtaining a recognition result from a part of the image as a recognition target. In FIG. 11, an image 50' is a partially acquired image of the number "8", which is an object as a recognition target, obtained in units of line. For example, pieces of pixel information 54a, 54b, and 54c for individual lines forming pixel information 51' of an image 50' are sequentially processed by a CNN 52' that has been trained in a predetermined manner.

For example, here is an assumable case where a recognition result 53a obtained by the recognition process performed by the CNN 52' for the pixel information 54a of the first line is not a valid recognition result. Here, a valid recognition result refers to a recognition result for which a score indicating the reliability of the recognized result is a predetermined value or higher. The CNN 52' performs an internal state update 55 based on this recognition result 53a. Next, the pixel information 54b of the second line undergoes a recognition process performed by the CNN 52', which has performed internal state update 55 based on the previous recognition result 53a. In FIG. 11, as a result of this process, a recognition result 53b indicating that the number as the recognition target is either "8" or "9" has been obtained. Furthermore, based on this recognition result 53b, internal information of CNN 52' is updated 55. Next, the pixel information 54c of the third line undergoes a recognition process performed by the CNN 52', which has performed internal state update 55 based on the previous recognition result 53b. As a result, in FIG. 11, the number as the recognition target is narrowed down to "8" out of "8" or "9".

Here, the recognition process illustrated in FIG. 11 updates the internal state of the CNN using the result of the previous recognition process. Next, the CNN whose internal state has been updated uses pixel information of the line adjacent to the line on which the previous recognition process has been performed to perform the recognition process. That is, the recognition process illustrated in FIG. 11 is executed sequentially in the order of lines for the image with the internal state of the CNN updated based on the previous recognition result. Therefore, the recognition process illustrated in FIG. 11 is a process that is recurrently executed sequentially in the order of lines and can be considered to have a structure equivalent to the process of an RNN.

2-3-2. Overview of RNN

Figure 12A:
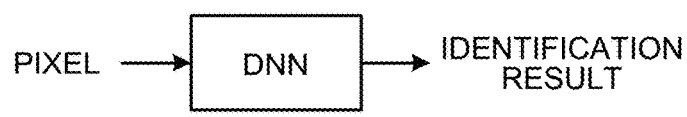
FIG. 12A is a diagram schematically illustrating an example of an identification process performed by DNN when time series information is not used.
Figure 12B:
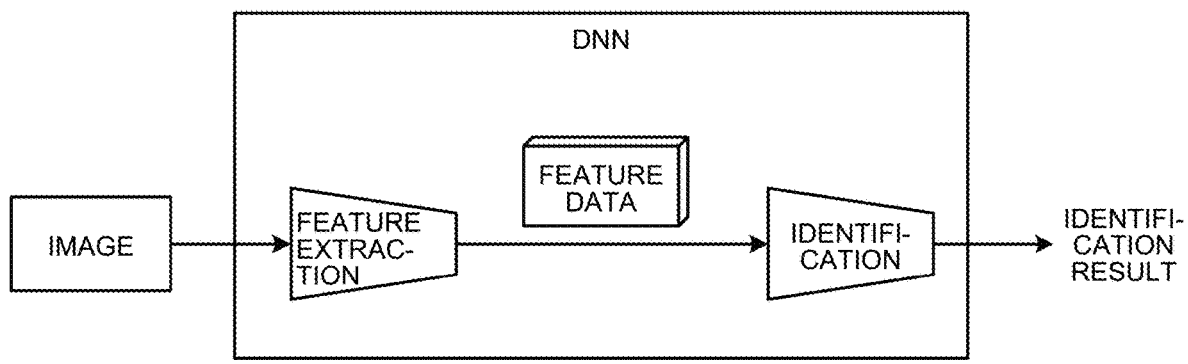
FIG. 12B is a diagram schematically illustrating an example of an identification process performed by DNN when time series information is not used.

Next, the RNN will be described schematically. FIGS. 12A and 12B are diagrams schematically illustrating an example of an identification process (recognition process) performed by a DNN when time series information is not used. In this case, one image is input to a DNN as illustrated in FIG. 12A. The DNN performs an identification process on the input image and outputs a result of the identification.

FIG. 12B is a diagram for providing more specific illustration of the process of FIG. 12A. As illustrated in FIG. 12B, the DNN executes a feature extraction process and an identification process. The DNN performs a feature extraction process on the input image, thereby extracting a feature data of the image. In addition, the DNN executes the identification process on the extracted feature data and obtains the identification result.

Figure 13A:
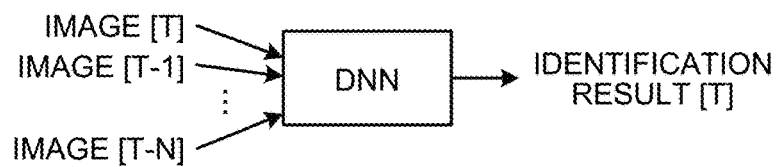
FIG. 13A is a diagram schematically illustrating a first example of an identification process performed by DNN when time series information is used.
Figure 13B:
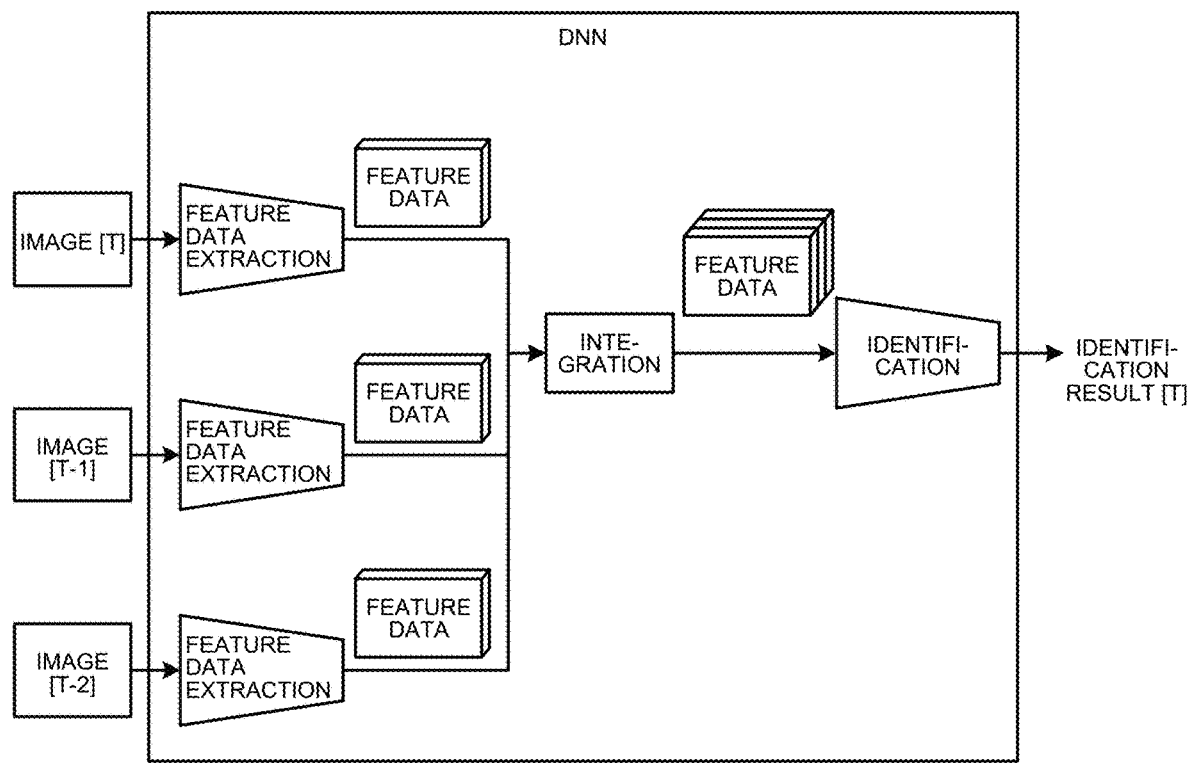
FIG. 13B is a diagram schematically illustrating the first example of an identification process performed by DNN when time series information is used.

FIGS. 13A and 13B are diagrams schematically illustrating a first example of an identification process performed by a DNN when time series information is used. In the examples of FIGS. 13A and 13B, identification process with the DNN is performed using a fixed number of pieces of past information in the time series. In the example of FIG. 13A, an image [T] at time T, an image [T−1] at time T−1 before time T, and an image [T−2] at time T−2 before time T−1 are input to the DNN. The DNN executes an identification process on each of the input images [T], [T−1], and [T−2], thereby obtaining an identification result [T] at time T.

FIG. 13B is a diagram for providing more specific illustration of the process of FIG. 13A. As illustrated in FIG. 13B, the DNN executes the feature extraction process described with reference to FIG. 12B above on each of the input images [T], [T−1], and [T−2], thereby extracting pieces of feature data individually corresponding to the images [T], [T−1], and [T−2]. The DNN integrates the feature data obtained based on these images [T], [T−1], and [T−2], and further executes an identification process on the integrated feature data, thereby obtaining an identification result [T] at time T.

The methods of FIGS. 13A and 13B would make it necessary to have a plurality of configurations for performing feature data extraction, as well as necessary to have a configuration for performing feature data extraction in accordance with the number of usable past images, leading to enlargement of the DNN configuration.

Figure 14A:
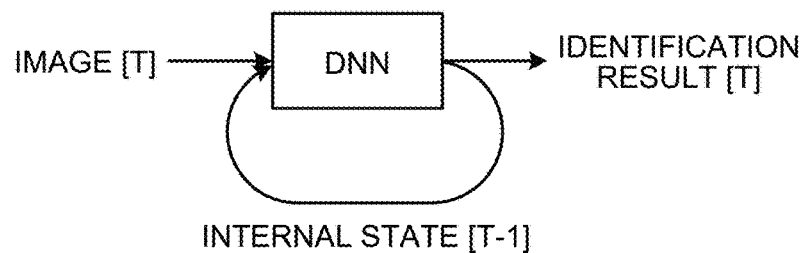
FIG. 14A is a diagram schematically illustrating a second example of an identification process performed by DNN when time series information is used.
Figure 14B:
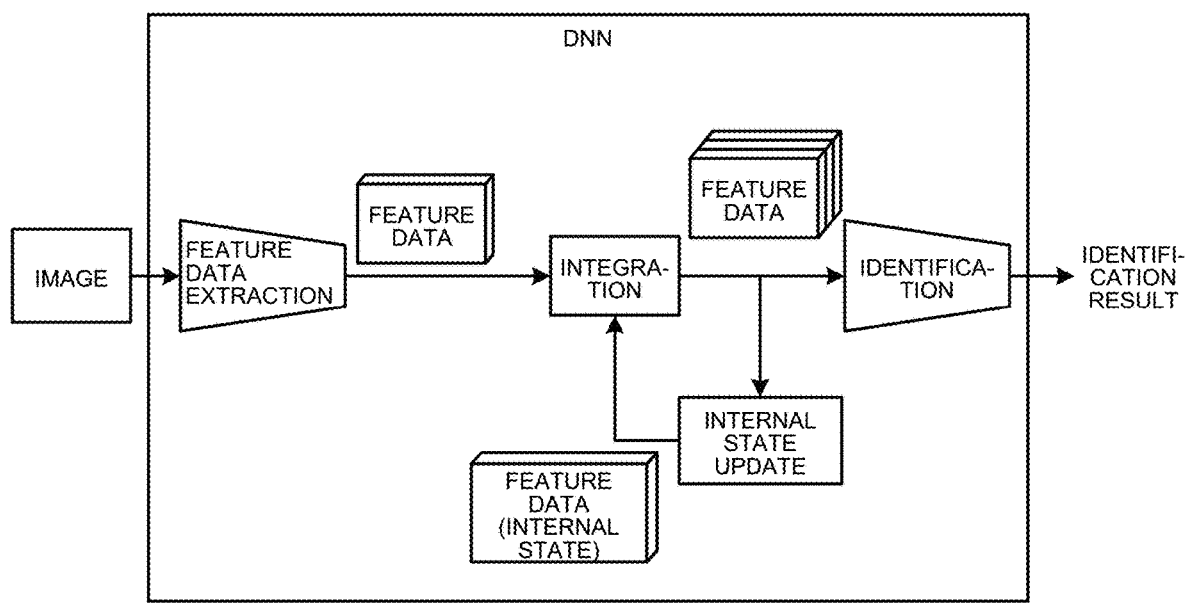
FIG. 14B is a diagram schematically illustrating the second example of an identification process performed by DNN when time series information is used.

FIGS. 14A and 14B are diagrams schematically illustrating a second example of an identification process performed by a DNN when time series information is used. In the example of FIG. 14A, an image [T] at time T is input to the DNN whose internal state has been updated to the state of time T−1, thereby obtaining an identification result [T] at time T.

FIG. 14B is a diagram for providing more specific illustration of the process of FIG. 14A. As illustrated in FIG. 14B, the DNN executes the feature extraction process described above with reference to FIG. 12B on the input image [T] at time T, thereby extracting the feature data corresponding to the image [T]. In the DNN, the internal state has been updated by the image before time T, and the feature data related to the updated internal state is retained. The feature related to the retained internal information and the feature data on the image [T] are integrated, and the identification process is executed on the integrated feature data.

The identification process illustrated in FIGS. 14A and 14B is executed using the DNN whose internal state has been updated using the immediately preceding identification result, and thus is a recurrent process. A DNN that performs a recurrent process in this manner is referred to as a recurrent neural network (RNN). The identification process performed by RNN is typically used in moving image recognition, or the like, in which it is possible to improve the identification accuracy by sequentially updating the internal state of the DNN with a frame image updated in time series, for example.

In the present disclosure, RNNs are applied to rolling shutter method structures. That is, in the rolling shutter method, pixel signals are read out sequentially in the order of lines. The pixel signals read out sequentially in the order of lines are applied to the RNN as information on the time series. This makes it possible to execute the identification process based on a plurality of lines with a smaller configuration compared with the case of using a CNN (refer to FIG. 13B). Not limited to this, an RNN can also be applied to the structure of the global shutter method. In this case, for example, it is conceivable to regard adjacent lines as information in time series.

2-4. Drive Speed

Figure 15A:
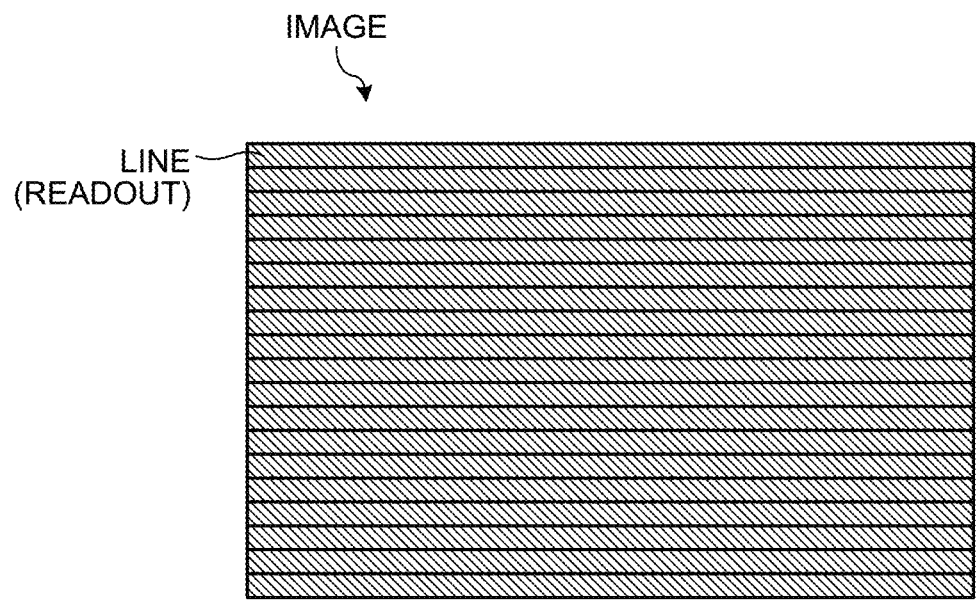
FIG. 15A is a diagram illustrating a relationship between a frame drive speed and a pixel signal readout amount.
Figure 15B:
FIG. 15B is a diagram illustrating a relationship between a frame drive speed and a pixel signal readout amount.

Next, a relationship between the frame drive speed and the pixel signal readout amount will be described with reference to FIGS. 15A and 15B. FIG. 15A is a diagram illustrating an example of reading out all the lines in the image. Here, it is assumed that the resolution of the image as a recognition process target is 640 pixels horizontally× 480 pixels vertically (480 lines). In this case, when driving at a drive speed of 14400 [lines/sec], it is possible to output at 30 [frame per second (fps)].

Next, here is an assumable case of performing imaging while thinning of lines. For example, as illustrated in FIG. 15B, it is assumed that imaging is performed by skipping every other line, namely, imaging is performed by readout using ½ thinning. As a first example of ½ thinning, driving at a drive speed of 14400 [lines/sec] as described above halves the number of lines read out from the image. Although the resolution is reduced, it is possible to achieve an output at the rate 60 [fps], which is twice as fast as a case without thinning, leading to improvement of the frame rate. A second example of ½ thinning is a case where driving is performed at a drive speed of 7200 [fps], which is half of the first example. In this case, although the frame rate will be 30 [fps] similarly to the case without thinning, power saving is achieved.

When reading out an image line, it is possible to select whether thinning is not performed, thinning is performed to increase the drive speed, or thinning is performed and the drive speed is kept at the same speed as the case without thinning, in accordance with the purpose of the recognition process based on the pixel signal to read out.

3. Overview of Present Disclosure

Figure 16:
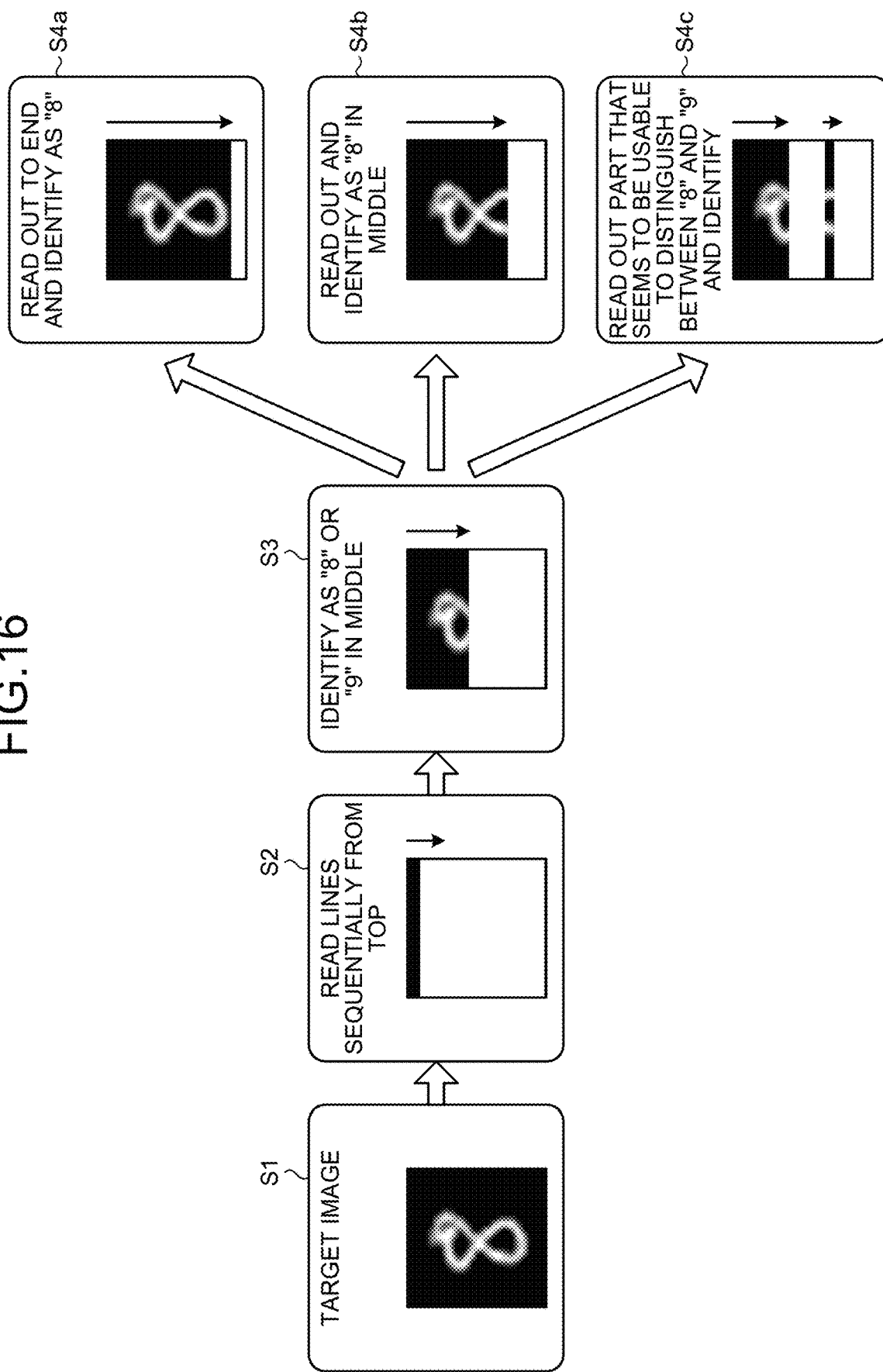
FIG. 16 is a schematic diagram schematically illustrating a recognition process according to each of embodiments of the present disclosure.

Hereinafter, each of embodiments of the present disclosure will be described in more detail. First, the processes according to each of embodiments of the present disclosure will be schematically described. FIG. 16 is a schematic diagram schematically illustrating a recognition process according to each of embodiments of the present disclosure. In FIG. 16, in Step S1, an imaging apparatus 1 (refer to FIG. 1) according to each of embodiments starts imaging of a target image, as a recognition target.

Note that the target image is an image in which a hand-written number "8", for example. Furthermore, as preconditions, the memory 13 preliminarily stores a learning model trained to be able to identify numbers by predetermined training data, as a program, and the recognition processing unit 12 reads out this program from the memory 13 and executes the program, thereby enabling identification of the numbers included in the image. Furthermore, the imaging apparatus 1 shall perform imaging by the rolling shutter method. Even when the imaging apparatus 1 performs imaging by the global shutter method, the following processes can be applied similarly to the case of the rolling shutter method.

When the imaging is started, the imaging apparatus 1 sequentially reads out the frame in units of line from the upper end side to the lower end side of the frame in Step S2.

When the line is read out up to a certain position, the recognition processing unit 12 identifies the number "8" or "9" from the image of the read out lines (Step S3). For example, the numbers "8" and "9" include a feature common to the upper half part. Accordingly, at a point where the line is read out in order from the top and the feature is recognized, the recognized object can be identified as either the number "8" or the number "9".

Here, as illustrated in Step S4a, the whole picture of the recognized object appears by reading up to the line at the lower end of the frame or the line near the lower end, and the object which has been identified as either the number "8" or "9" in Step S2 is now determined as the number "8".

In contrast, Steps S4b and S4c are processes related to the present disclosure.

As illustrated in Step S4b, when the line is read further from the line position read out in Step S3, the recognized object can be identified as the number "8" even before reaching the lower end of the number "8". For example, the lower half of the number "8" and the lower half of the number "9" have different features. By reading out the line to the part that clarifies the difference in the feature, it is possible to identify whether the object recognized in Step S3 is the number "8" or "9". In the example of FIG. 16, the object is determined to be the number "8" in Step S4b.

Furthermore, as illustrated in Step S4c, it is also conceivable to further read out from the line position of Step S3 in the state of Step S3 so as to jump to a line position where the object identified in Step S3 seems to be able to be determined as either the number "8" or the number "9". By reading out the line reached by the jump, it is possible to determine whether the object identified in Step S3 is the number "8" or "9". The line position reached by the jump can be determined based on a learning model preliminarily trained based on predetermined training data.

Here, in a case where the object is identified in Step S4b or Step S4c described above, the imaging apparatus 1 can end the recognition process. This makes it possible to shorten the recognition process and save power in the imaging apparatus 1.

Note that the training data is data that holds a plurality of combinations of input signals and output signals for each unit of readout. As an example, in the task of identifying numbers described above, data for each unit of readout (line data, subsampled data, or the like) is applicable as an input signal, and data indicating a "correct number" is applicable as an output signal. As another example, in a task of detecting an object, data for each unit of readout (line data, subsampled data, or the like) is applicable as an input signal, and an object class (human/vehicle/non-object), coordinates of the object (x, y, h, w), or the like, is applicable as an output signal. Furthermore, the output signal may be generated only from the input signal by using self-supervised learning.

4. First Embodiment

Next, a first embodiment of the present disclosure will be described.

4-1. Operation Example in the Recognition Processing Unit

In the imaging apparatus 1 according to a first embodiment, as described above, the recognition processing unit 12 reads out and executes a program stored in the memory 13 as a learning model trained in advance based on predetermined training data, thereby functioning as a recognizer using a DNN.

Figure 17:
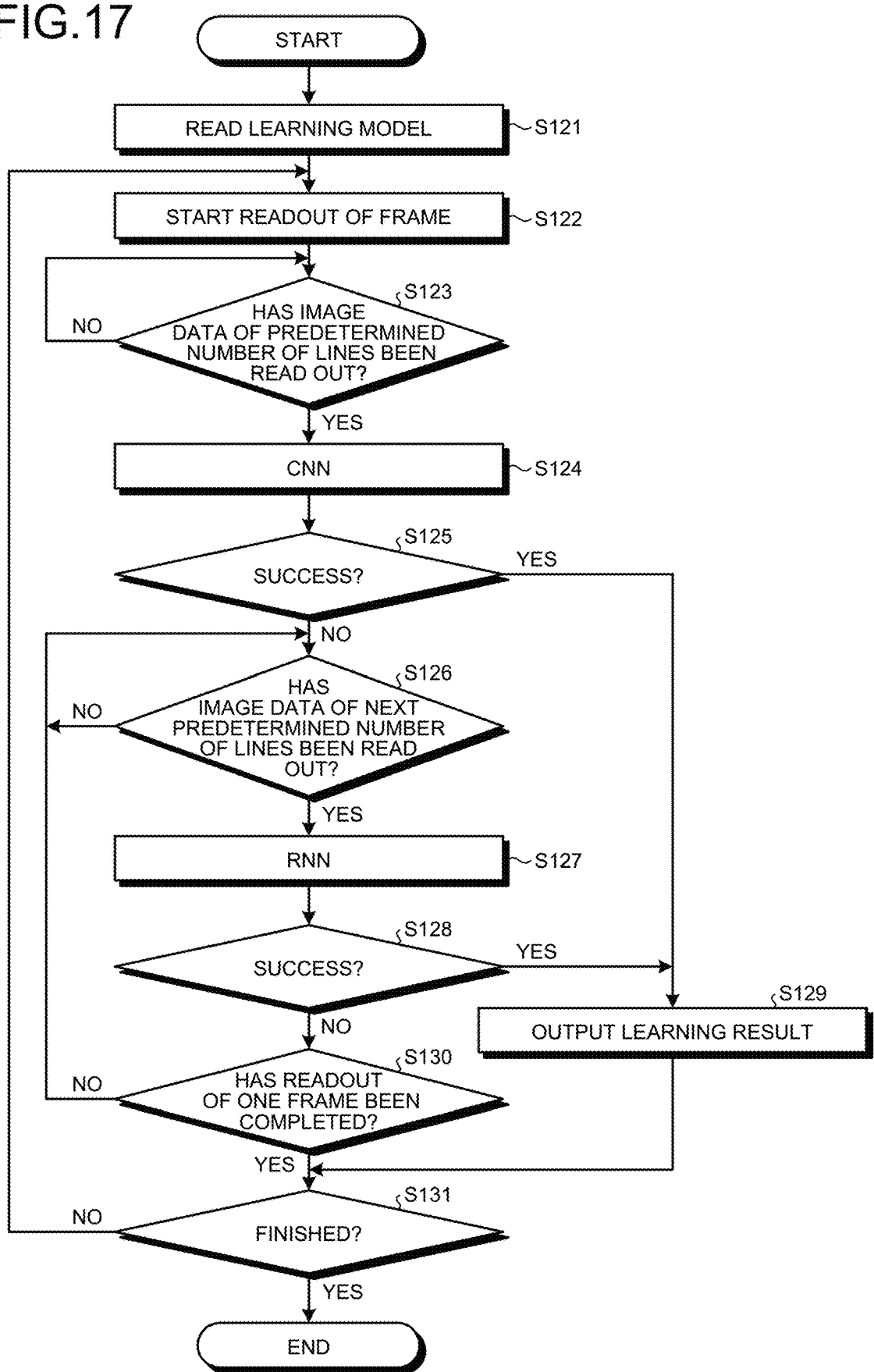
FIG. 17 is a flowchart illustrating an example of a recognition process performed by a recognition processing unit according to a first embodiment.

FIG. 17 is a flowchart illustrating an example of a recognition process performed by the recognition processing unit 12 according to the first embodiment. In FIG. 17, in Step S121, the DSP constituting the recognition processing unit 12 in the imaging apparatus 1 reads out the learning model from the memory 13 and executes it. With this processes, the DSP functions as the recognition processing unit 12.

Next, in Step S122, the recognition processing unit 12 in the imaging apparatus 1 instructs the sensor controller 11 to start readout of a frame from the sensor unit 10. In this frame readout, for example, one frame of image data is sequentially read out in units of line (also referred to as units of row). The recognition processing unit 12 determines whether a predetermined number of lines of image data in one frame has been read out.

When the recognition processing unit 12 determines that the image data of a predetermined number of lines in one frame has been read out (Step S123, "YES"), the recognition processing unit 12 proceeds to the process of Step S124. In Step S124, the recognition processing unit 12 executes a recognition process as a machine learning process using a CNN on the read image data in the predetermined number of lines. That is, the recognition processing unit 12 executes a machine learning process using a learning model on the image data of a predetermined number of lines as a unit region. The machine learning process using a CNN includes execution of various recognition or detection processes such as face detection, face authentication, line-of-sight detection, facial expression recognition, face direction detection, object detection, object recognition, motion (moving body) detection, pet detection, scene recognition, state detection, avoidance target object recognition, and other processes.

Here, the face detection is a process of detecting the face of a person included in the image data. The face authentication is one of biometric authentication, and is a process of authenticating whether the face of a person included in the image data matches the face of a person registered in advance. The line-of-sight detection is a process of detecting the direction of the line of sight of a person included in the image data. Facial expression recognition is a process of recognizing a person's facial expression included in the image data. The face direction detection is a process of detecting the up/down direction of a person's face included in the image data. The object detection is a process of detecting an object included in the image data. The object recognition is a process of recognizing what an object included in the image data is. The motion (moving body) detection is a process of detecting a moving body included in the image data. The pet detection is a process of detecting a pet such as a dog or a cat included in the image data. The scene recognition is a process of recognizing a scene (sea, mountain, or the like) being shot. The state detection is a process of detecting a state (normal state, abnormal state, or the like) of a person or the like included in the image data. The avoidance target object recognition is a process of recognizing an object as an avoidance target that exists in front of the traveling direction in a case where the person moves. The machine learning process executed by the recognition processing unit 12 is not limited to these examples.

In Step S125, the recognition processing unit 12 determines whether the machine learning process using the CNN in Step S124 is successful. When the recognition processing unit 12 determines that the machine learning process using the CNN is successful (Step S125, "YES"), the recognition processing unit 12 proceeds to the process of Step S129. In contrast, when the recognition processing unit 12 determines that the machine learning process using the CNN in Step S124 is a failure (Step S125, "NO"), the recognition processing unit 12 proceeds to the process of Step S126. In Step S126, the recognition processing unit 12 waits for the next predetermined number of lines of image data to be read out from the sensor controller 11 (Step S126, "NO").

In this description, a success in the machine learning process means that a certain detection result, recognition result, or authentication has been obtained in face detection, face authentication, or the like as illustrated above, for example. In contrast, a failure in the machine learning process means that sufficient detection results, recognition results, and authentication have not been obtained in face detection, face authentication, or the like as illustrated above, for example, Next, in Step S126, when the next predetermined number of lines of image data (unit region) is read out (Step S126, "YES"), the recognition processing unit 12 executes in Step S127 the machine learning process using an RNN on the predetermined number of lines of readout image data. The machine learning process using an RNN also utilizes results of the machine learning process using the CNN or the RNN executed so far, for the image data of the same frame.

In a case of having determined in Step S128 that the machine learning process using the RNN in Step S127 is successful (Step S128, "YES"), the recognition processing unit 12 proceeds to the process to Step S129.

In Step S129, the recognition processing unit 12 supplies the machine learning result successfully obtained in Step S124 or Step S127, for example, from the recognition processing unit 12 to the output controller 15. The machine learning result output in Step S129 is a valid recognition result obtained by the recognition processing unit 12, for example. The recognition processing unit 12 may store the machine learning result in the memory 13.

Furthermore, when the recognition processing unit 12 determines in Step S128 that the machine learning process using the RNN in Step S127 is a failure (Step S128, "NO"), the recognition processing unit 12 proceeds to the process of Step S130. In Step S130, the recognition processing unit 12 determines whether the readout of the image data for one frame is completed. When having determined that the readout of the image data for one frame has not been completed (Step S130, "NO"), the recognition processing unit 12 returns the process to Step S126, in which the process for the next predetermined number of lines of image data will be executed.

In contrast, when the recognition processing unit 12 determines in Step S130 that the readout of the image data for one frame is completed (Step S130, "YES"), the recognition processing unit 12 determines whether to end the series of processes of the flowchart in FIG. 17 in Step S131. When the recognition processing unit 12 determines not to end the process (Step S131, "NO"), the recognition processing unit 12 returns the process to Step S122 and executes similar operations on the next frame. When the recognition processing unit 12 determines to end the process (Step S131, "YES"), the recognition processing unit 12 ends the series of processes of the flowchart of FIG. 17.

The determination as to whether to proceed to the next frame in Step S131 may be made based on whether an end instruction has been input from the outside of the imaging apparatus 1, or based on whether the series of processes for the predetermined number of frames of the image data has been completed.

In addition, there is an assumable situation where the machine learning processes such as face detection, face authentication, line-of-sight detection, facial expression recognition, face direction detection, object detection, object recognition, motion (moving body) detection, scene recognition, or state detection are performed successively. In this situation, in a case where the former machine learning process is a failure, the latter machine learning process may be skipped. For example, when face authentication is to be executed after face detection, the latter process of face authentication may be skipped in a case where the face detection has been a failure.

4-2. Specific Example of Operations in the Recognition Processing Unit

Next, operations of the machine learning unit described with reference to FIG. 17 will be described with reference to specific examples. In the following, a case where face detection is executed using DNN will be illustrated.

Figure 18:
FIG. 18 is a view illustrating an example of image data for one frame.
Figure 19:
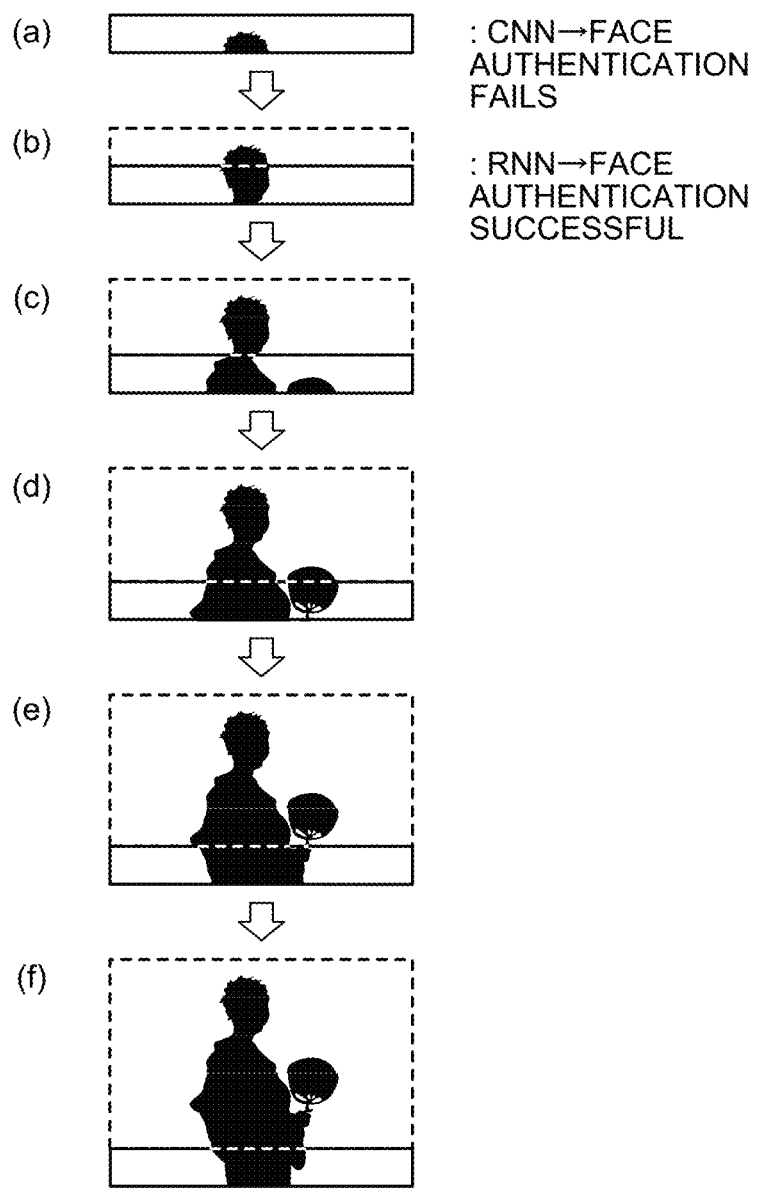
FIG. 19 is a view illustrating a flow of a machine learning process executed by the recognition processing unit according to the first embodiment.

FIG. 18 is a view illustrating an example of image data for one frame. FIG. 19 is a view illustrating a flow of a machine learning process executed by the recognition processing unit 12 according to the first embodiment.

When face detection is executed for image data as illustrated in FIG. 18 by machine learning, as illustrated in Section (a) of FIG. 19, the recognition processing unit 12 first receives an input of a predetermined number of lines of image data (corresponding to Step S123 in FIG. 17). By executing a machine learning process using a CNN on the predetermined number of lines of image data that has been input, the recognition processing unit 12 executes face detection (corresponding to Step S124 in FIG. 17). However, since the image data of the entire face has not been input yet at the stage of Section (a) of FIG. 19, the recognition processing unit 12 fails in face detection (corresponding to "NO" in Step S125 of FIG. 17).

Subsequently, as illustrated in Section (b) of FIG. 19, a next predetermined number of lines of image data is input to the recognition processing unit 12 (corresponding to Step S126 of FIG. 17). While utilizing the result of machine learning process using the CNN executed on the predetermined number of lines of image data input in Section (a) of FIG. 19, the recognition processing unit 12 executes the machine learning process using an RNN on the newly input predetermined number of lines of image data, thereby executing face detection (corresponding to Step S127 in FIG. 17).

At the stage of Section (b) of FIG. 19, image data of the entire face is input together with a predetermined number of lines of pixel data input at the stage of Section (a) of FIG. 19. Accordingly, at the stage of Section (b) of FIG. 19, the recognition processing unit 12 is successful in face detection (corresponding to "YES" in Step S128 of FIG. 17). This causes this operation to output a result of face detection without reading out the next and subsequent pieces of image data (image data in Sections (c) to (f) of FIG. 19) (corresponding to Step S129 in FIG. 17).

In this manner, by executing the machine learning process using a DNN for the predetermined number of lines of the image data, it is possible to omit readout of the image data and execution of the machine learning process after the point where the face detection is successful. This makes it possible to complete the processes such as detection, recognition, and authentication in a short time, leading to the reduction of the processing time and power consumption.

The predetermined number of lines is the number of lines determined by the size of a filter required by the algorithm of the learning model, and the minimum number is one line.

Furthermore, the image data read out from the sensor unit 10 by the sensor controller 11 may be image data thinned out in at least one of the column direction and the row direction. In that case, for example, when the image data is read out every other row in the column direction, the image data on the 2(N−1) (N is an integer of 1 or more) th line will be read out.

Furthermore, in a case where the filter required by the learning model algorithm is formed not in units of line unit but formed as a rectangular region in units of pixels such as 1×1 pixel or 5×5 pixels, image data in a rectangular region corresponding to the shape and size of the filter may be input to the recognition processing unit 12 instead of the predetermined number of lines of image data, as image data for a unit region on which the recognition processing unit 12 executes the machine learning process.

Furthermore, although the above illustrates the CNN and the RNN as examples of the DNN, the present disclosure is not limited to these, and other learning models can be used.

4-3. Application Example of the First Embodiment

Next, an application example of the first embodiment will be described. Here, as an application example of the first embodiment, the following is an example of controlling the exposure in a predetermined number of lines on which next readout is to be performed based on the result of the machine learning process performed by CNN in Step S124 of the flowchart of FIG. 17 and the result of the machine learning process performed by RNN in Step S127, for example. FIGS. 20A and 20B are schematic views illustrating an application example of the first embodiment.

Section (a) of FIG. 20A is a schematic view illustrating an example of an image 60a which is overexposed. The overexposure of the image 60a causes the image 60a to appear whitish as a whole. For example, a monitor 62 as an object included in the image 60a has a phenomenon referred to as blown-out highlight in the screen, making it difficult for the human eye to distinguish the details. On the other hand, a person 61 as another object included in the image 60a is slightly whitish due to overexposure, but appears easily identifiable to the human eye as compared with the monitor 62.

Section (b) of FIG. 20A is a schematic view illustrating an example of an image 60b which is underexposed. The underexposure of the image 60b causes the image 60b to appear blackish as a whole. For example, the person 61 visible in the image 60a is now difficult to identify to the human eye. On the other hand, the monitor 62 included in the image 60b can be identified in detail to the human eye as compared with the image 60a.

FIG. 20B is a schematic diagram illustrating a readout method according to an application example of the first embodiment. Sections (a) and (b) of FIG. 20B illustrate a case where frame readout is started in an underexposed state in Step S122 of the flowchart of FIG. 17 described above.

Section (a) of FIG. 20B illustrates a readout method according to a first example in the application example of the first embodiment. An image 60c of the Section (a) of FIG. 20B indicates, for example, that the recognition process using the CNN in Step S124 regarding a line L #1 at the top of a frame has failed, or a score representing the reliability of the recognition result is a predetermined value or less. In this case, the recognition processing unit 12 instructs the sensor controller 11 to set the exposure of a line L #2 to be read out in Step S126 to an exposure suitable for the recognition process (in this case, set to a larger exposure amount). In FIG. 20B, the lines L #1, L #2, and so on may be one individual line, or may be a plurality of lines adjacent to each other.

In the example in Section (a) of FIG. 20B, the exposure amount for line L #2 is larger than the exposure amount of line L #1. It is assumed, in this case, that the result is overexposure of line L #2 and the recognition process using the RNN in Step S127 has failed or the score is a predetermined value or less. The recognition processing unit 12 instructs the sensor controller 11 to set the exposure amount for line L #3 to be read out after the process returns from the Step S130 to the Step S126 to be smaller than the exposure amount for the line L #2. Similarly, the exposure amount of the next line will be sequentially set also for lines L #4, . . . , L #m, . . . in accordance with the result of the recognition process.

In this manner, by adjusting the exposure amount of the line to be read out next based on the recognition result of a certain line, it is possible to execute the recognition process with higher accuracy.

In addition, as a further application of the above application example, as illustrated in Section (b) of FIG. 20B, there is a conceivable method of re-setting the exposure at a point where readout is done up to a predetermined line and then executing readout again from the first line of the frame. As illustrated in Section (b) of FIG. 20B, the recognition processing unit 12 reads out from line L #1 at the top of the frame to line L #m, for example, similarly to Section (a) described above (1st), and re-sets the exposure based on the recognition result. The recognition processing unit 12 reads out individual lines L #1, L #2, and so on again for the frame based on the re-set exposure (2nd).

In this manner, the exposure is re-set based on the result of readout of a predetermined number of lines, and the lines L #1, L #2, . . . will be read out again from the top of the frame based on the re-set exposure, making it possible to execute the recognition process with higher accuracy.

5. Second Embodiment

5-0-1. Configuration Example According to the Second Embodiment

Figure 21:
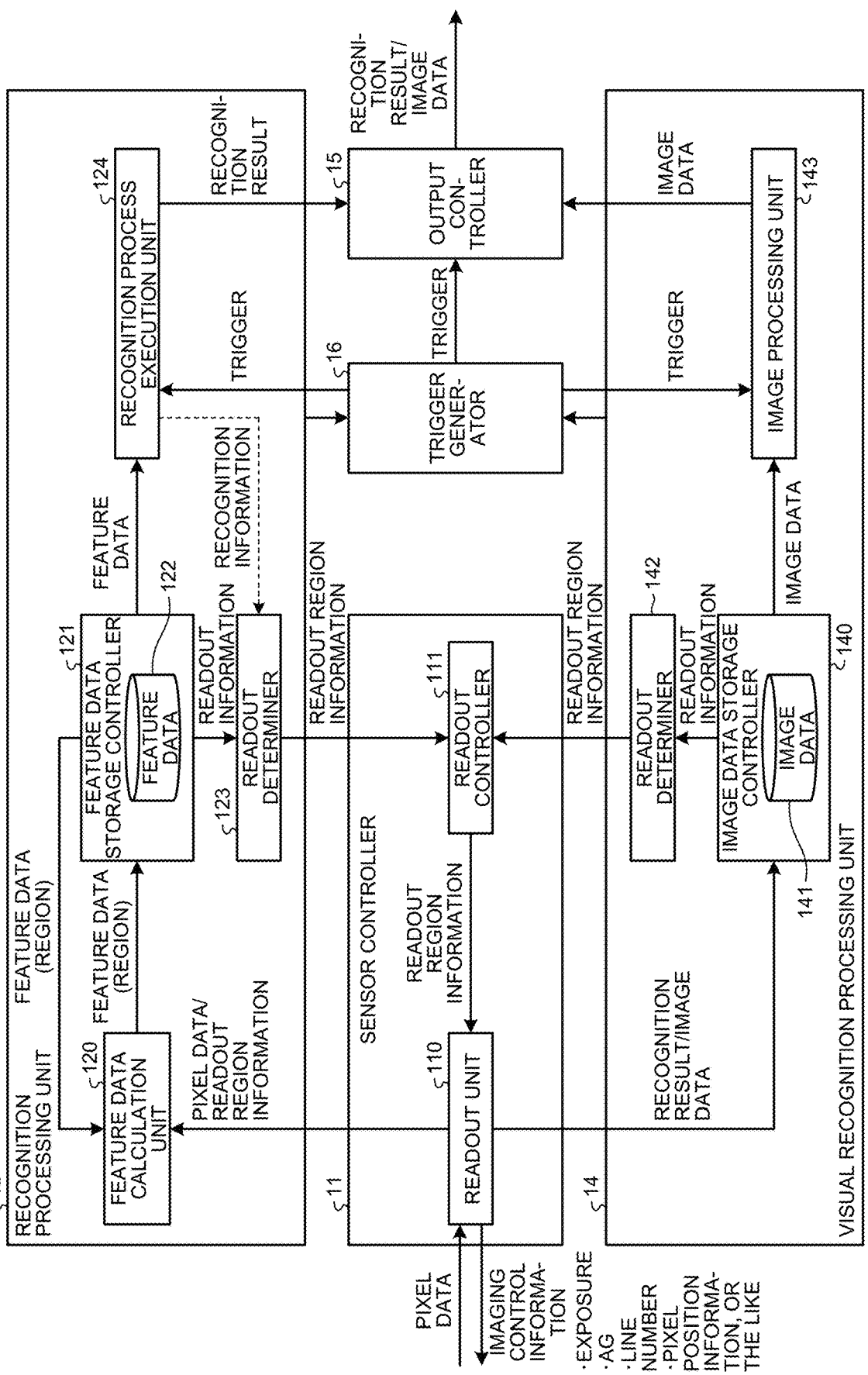
FIG. 21 is a functional block diagram of an example illustrating functions of an imaging apparatus according to a second embodiment.

Next, a second embodiment of the present disclosure will be described. The second embodiment is an extension of the recognition process according to the first embodiment described above. FIG. 21 is a functional block diagram of an example illustrating functions of an imaging apparatus according to the second embodiment. Note that FIG. 21 omits illustration of the optical unit 30, the sensor unit 10, the memory 13 and the display unit 31 illustrated in FIG. 1. Furthermore, FIG. 21 has a trigger generator 16 which is added to the configuration of FIG. 1.

In FIG. 21, the sensor controller 11 includes a readout unit 110 and a readout controller 111. The recognition processing unit 12 includes a feature data calculation unit 120, a feature data storage controller 121, a readout determiner 123, and a recognition process execution unit 124. The feature data storage controller 121 includes a feature data storage unit 122. Furthermore, the visual recognition processing unit 14 includes an image data storage controller 140, a readout determiner 142, and an image processing unit 143. The image data storage controller 140 includes an image data storage unit 141.

In the sensor controller 11, the readout controller 111 receives readout region information indicating a readout region for the readout performed by the recognition processing unit 12, from the readout determiner 123 included in the recognition processing unit 12. The readout region information represents line number(s) of one or more lines. Not limited to this, the readout region information may be information indicating the pixel position in one line. Furthermore, by providing the readout region information obtained by combining one or more line numbers and information indicating the pixel positions of one or more pixels in the line, it is possible to designate various patterns of readout regions. The readout region is equivalent to the units of readout. Not limited to this, the readout region and the units of readout may be different.

Similarly, the readout controller 111 receives readout region information indicating a readout region for the readout performed by the visual recognition processing unit 14, from the readout determiner 142 included in the visual recognition processing unit 14.

Based on these readout determiners 123 and 142, the readout controller 111 passes the readout region information indicating the readout region used for actual readout to the readout unit 110. For example, in a case where there is a conflict between the readout region information received from the readout determiner 123 and the readout region information received from the readout determiner 142, the readout controller 111 can perform mediation and adjustment of the readout region information to be passed to the readout unit 110.

Furthermore, the readout controller 111 can receive information indicating exposure and analog gain from the readout determiner 123 or the readout determiner 142. The readout controller 111 passes the received information indicating the exposure and analog gain to the readout unit 110.

The readout unit 110 reads out the pixel data from the sensor unit 10 in accordance with the readout region information passed from the readout controller 111. For example, the readout unit 110 obtains the line number indicating the line to be read out and the pixel position information indicating the position of the pixel to be read out in the line based on the readout region information, and passes the obtained line number and the pixel position information to the sensor unit 10. The readout unit 110 passes individual pieces of pixel data acquired from the sensor unit 10 to the recognition processing unit 12 and the visual recognition processing unit 14 together with the readout region information.

Furthermore, the readout unit 110 sets the exposure and analog gain (AG) for the sensor unit 10 in accordance with the information indicating the exposure and analog gain received from the readout controller 111. Furthermore, the readout unit 110 can generate a vertical synchronization signal and a horizontal synchronization signal and supply the generated signals to the sensor unit 10.

In the recognition processing unit 12, the readout determiner 123 receives the readout information indicating the readout region to be read out next, from the feature data storage controller 121. The readout determiner 123 generates readout region information based on the received readout information and passes the generated information to the readout controller 111.

Here, the readout determiner 123 can use, for example, information in which readout position information for readout of the pixel data of the units of readout has been added to a predetermined unit of readout, as a readout region indicated in the readout region information. The unit of readout is a set of one or more pixels, and corresponds to the unit of process performed by the recognition processing unit 12 and the visual recognition processing unit 14. As an example, when the unit of readout is a line, a line number [L #x] indicating the line position will be added as the readout position information. Moreover, when the unit of readout is a rectangular region including a plurality of pixels, information indicating the position of the rectangular region in the pixel array unit 101, for example, information indicating the position of the pixel in the upper left corner will be added as the readout position information. The readout determiner 123 preliminarily designates the unit of readout to be applied. Not limited to this, the readout determiner 123 can also determine the unit of readout, for example, in response to an instruction from the outside of the readout determiner 123. Therefore, the readout determiner 123 functions as a unit-of-readout controller that controls the unit of readout.

Note that the readout determiner 123 can also determine a readout region to be read out next based on the recognition information passed from the recognition process execution unit 124, which will be described below, and can generate readout region information indicating the determined readout region.

Similarly, in the visual recognition processing unit 14, the readout determiner 142 receives readout information indicating a readout region to be read out next from the image data storage controller 140, for example. The readout determiner 142 generates readout region information based on the received readout information and passes the generated information to the readout controller 111.

In the recognition processing unit 12, the feature data calculation unit 120 calculates the feature data in the region indicated by the readout region information based on the pixel data and the readout region information passed from the readout unit 110. The feature data calculation unit 120 passes the calculated feature data to the feature data storage controller 121.

As will be described below, the feature data calculation unit 120 may calculate the feature data based on the pixel data passed from the readout unit 110 and the past feature data passed from the feature data storage controller 121. Not limited to this, the feature data calculation unit 120 may acquire information for setting the exposure and analog gain from the readout unit 110, for example, and may further use the acquired information to calculate the feature data.

In the recognition processing unit 12, the feature data storage controller 121 stores the feature data passed from the feature data calculation unit 120 in the feature data storage unit 122. Furthermore, when the feature is passed from the feature data calculation unit 120, the feature data storage controller 121 generates readout information indicating a readout region for the next readout and passes the generated information to the readout determiner 123.

Here, the feature data storage controller 121 can integrated storage of the already stored feature data and the newly passed feature data. Furthermore, the feature data storage controller 121 can delete unnecessary feature data from the feature data stored in the feature data storage unit 122. Examples of the unnecessary feature data can be feature data related to the previous frame or feature data calculated based on a frame image regarding a scene different from the frame image in which the new feature data is calculated and already stored. Furthermore, the feature data storage controller 121 can also delete and initialize all the feature data stored in the feature data storage unit 122 as needed.

Furthermore, the feature data storage controller 121 generates feature data to be used by the recognition process execution unit 124 for the recognition process based on the feature data passed from the feature data calculation unit 120 and the feature data stored in the feature data storage unit 122. The feature data storage controller 121 passes the generated feature data to the recognition process execution unit 124.

The recognition process execution unit 124 executes the recognition process based on the feature data passed from the feature data storage controller 121. The recognition process execution unit 124 performs object detection, face detection, or the like by recognition process. The recognition process execution unit 124 passes the recognition result obtained by the recognition process to the output controller 15. The recognition process execution unit 124 can also pass recognition information including the recognition result generated by the recognition process to the readout determiner 123. The recognition process execution unit 124 can receive feature data from the feature data storage controller 121 and execute the recognition process, for example, in accordance with the execution of a trigger generated by the trigger generator 16.

Meanwhile, in the visual recognition processing unit 14, the image data storage controller 140 receives the pixel data read out from the readout region and the readout region information corresponding to the image data, from the readout unit 110. The image data storage controller 140 stores the pixel data and the readout region information in the image data storage unit 141 in association with each other.

The image data storage controller 140 generates image data used by the image processing unit 143 to perform image processing, based on the pixel data passed from the readout unit 110 and the image data stored in the image data storage unit 141. The image data storage controller 140 passes the generated image data to the image processing unit 143. Not limited to this, the image data storage controller 140 can also pass the pixel data passed from the readout unit 110 to the image processing unit 143 as it is.

Furthermore, the image data storage controller 140 generates readout information indicating a readout region for the next readout based on the readout region information passed from the readout unit 110, and passes the generated readout information to the readout determiner 142.

Here, the image data storage controller 140 can perform integrated storage of already stored image data and newly passed pixel data using addition averaging, for example. Furthermore, the image data storage controller 140 can delete unnecessary image data from among the image data stored in the image data storage unit 141. Example of the unnecessary image data can be image data related to the previous frame, or image data calculated based on a frame image regarding a scene different from the frame image in which new image data is calculated and already stored. Furthermore, the image data storage controller 140 can also delete and initialize all the image data stored in the image data storage unit 141, as needed.

Furthermore, the image data storage controller 140 can acquire information for setting the exposure and analog gain from the readout unit 110, and may store the image data corrected using the acquired information, in the image data storage unit 141.

The image processing unit 143 performs predetermined image processing on the image data passed from the image data storage controller 140. For example, the image processing unit 143 can perform a predetermined image quality enhancement process on the image data. Furthermore, in a case where the passed image data is image data with spatially reduced data by line thinning or the like, it is possible to use an interpolation process to fill image information to the thinned portion. The image processing unit 143 passes the image data that has undergone image processing to the output controller 15.

The image processing unit 143 can receive image data from the image data storage controller 140 and execute image processing, for example, in accordance with the execution of a trigger generated by the trigger generator 16.

The output controller 15 outputs one or both of the recognition result passed from the recognition process execution unit 124 and the image data passed from the image processing unit 143. The output controller 15 outputs one or both of the recognition result and the image data in accordance with the trigger generated by the trigger generator 16, for example.

Based on the information related to the recognition process passed from the recognition processing unit 12 and the information related to the image processing passed from the visual recognition processing unit 14, the trigger generator 16 generates triggers including a trigger to be passed to the recognition process execution unit 124, a trigger to be passed to the image processing unit 143, and a trigger to be passed to the output controller 15. The trigger generator 16 passes each of the generated trigger to the recognition process execution unit 124, the image processing unit 143, and the output controller 15 at predetermined timings, individually.

Figure 22:
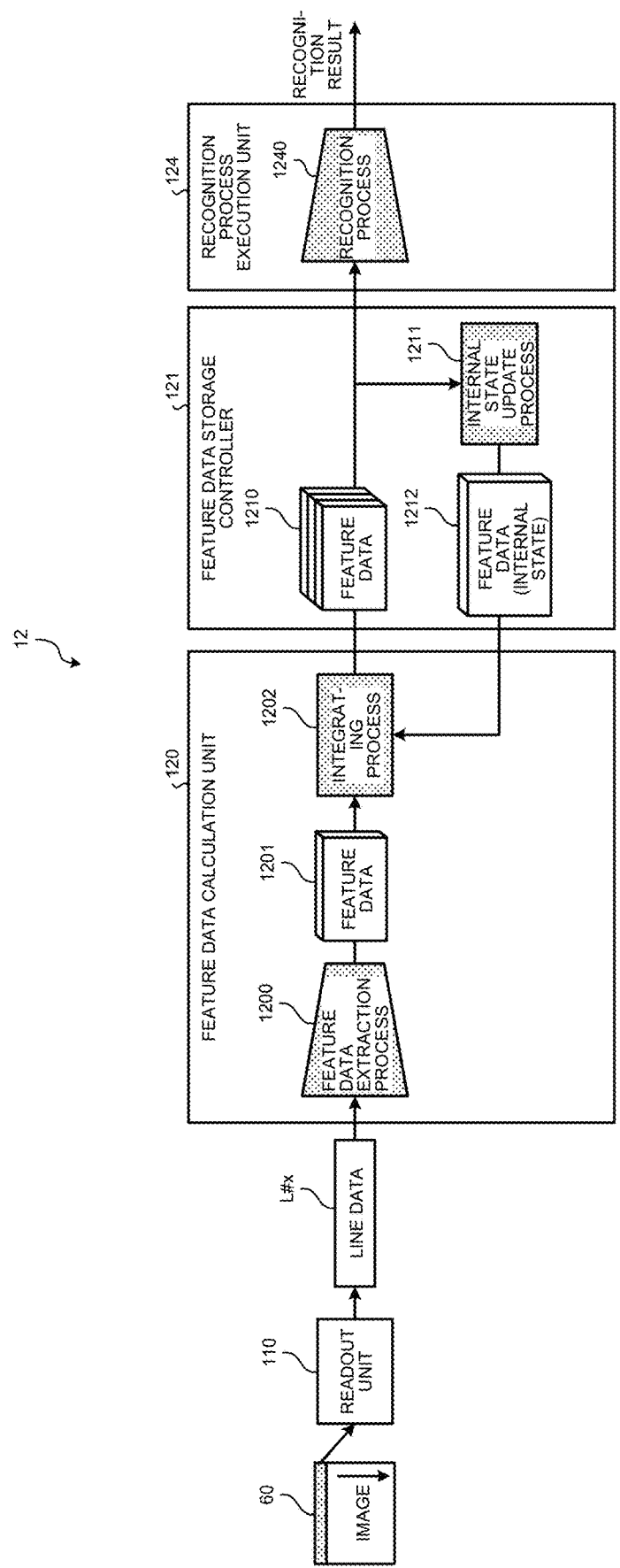
FIG. 22 is a schematic diagram illustrating in more detail an example of processes in the recognition processing unit according to the second embodiment.

5-0-2. Example of Processes in the Recognition Processing Unit According to Second Embodiment FIG. 22 is a schematic diagram illustrating in more detail an example of processes in the recognition processing unit 12 according to a second embodiment. Here, it is assumed that the readout region is a line, and the readout unit 110 reads out pixel data in units of line from the upper end to the lower end of the frame of an image 60. The line image data (line data) of line L #x read out by the readout unit 110 in units of line will be input to the feature data calculation unit 120.

The feature data calculation unit 120 executes a feature data extraction process 1200 and an integrating process 1202. The feature data calculation unit 120 performs the feature data extraction process 1200 on the input line data to extract feature data 1201 from the line data. Here, the feature data extraction process 1200 extracts the feature data 1201 from the line data based on the parameters obtained by learning in advance. Using the integrating process 1202, the feature data 1201 extracted by the feature data extraction process 1200 is integrated with feature data 1212 processed by the feature data storage controller 121. Integrated feature data 1210 is passed to the feature data storage controller 121.

The feature data storage controller 121 executes an internal state update process 1211. The feature data 1210 passed to the feature data storage controller 121 is passed to the recognition process execution unit 124 and undergoes the internal state update process 1211. The internal state update process 1211 reduces the feature data 1210 based on the parameters learned in advance so as to update the internal state of the DNN, and then generates the feature data 1212 corresponding to the updated internal state. The feature data 1212 is integrated with the feature data 1201 by the integrating process 1202. The process performed by the feature data storage controller 121 corresponds to the process using an RNN.

The recognition process execution unit 124 executes a recognition process 1240 on the feature data 1210 passed from the feature data storage controller 121 based on the parameters learned in advance using predetermined training data, for example, and outputs a recognition result.

As described above, based on the parameters learned in advance, the recognition processing unit 12 according to the second embodiment executes processes, specifically, the feature data extraction process 1200, the integrating process 1202, the internal state update process 1211, and the recognition process 1240. Parameter learning is performed using training data based on an assumable recognition target.

Note that the functions of the feature data calculation unit 120, the feature data storage controller 121, the readout determiner 123, and the recognition process execution unit 124 described above are implemented when a program stored in the memory 13 or the like is read to and executed by a DSP included in the imaging apparatus 1, for example. Similarly, the functions of the image data storage controller 140, the readout determiner 142, and the image processing unit 143 described above are implemented when a program stored in the memory 13 or the like is read to and executed by an ISP included in the imaging apparatus 1, for example. These programs may be stored in the memory 13 in advance, or may be supplied to the imaging apparatus 1 from the outside and written to the memory 13.

5-0-3. Details of Recognition Process According to Second Embodiment

Figure 23:
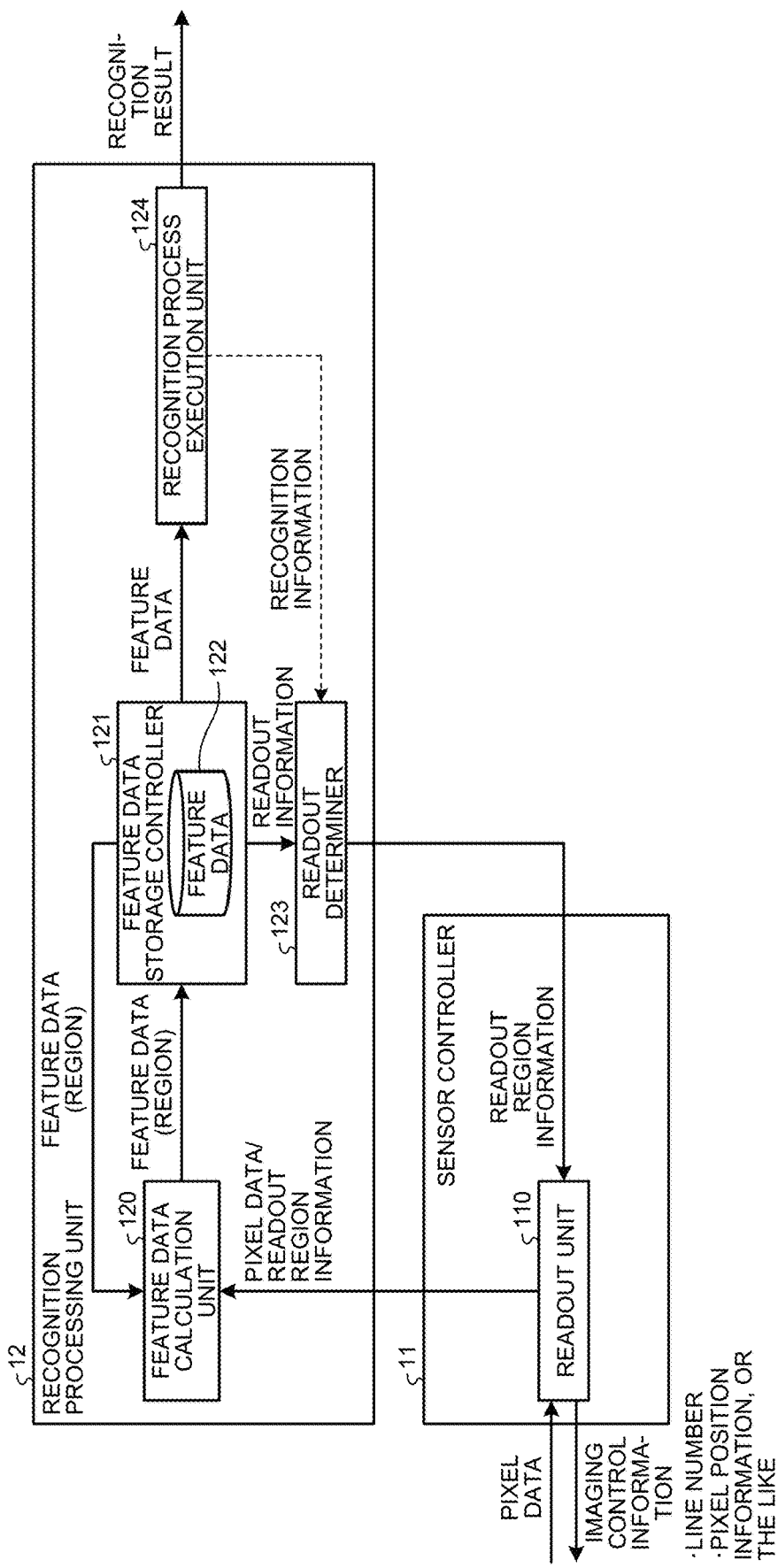
FIG. 23 is a functional block diagram of an example illustrating functions according to the second embodiment.

Next, the second embodiment will be described in more detail. FIG. 23 is a functional block diagram of an example illustrating functions according to the second embodiment. Since the second embodiment mainly describes the recognition process performed by the recognition processing unit 12, FIG. 23 omits illustration of the visual recognition processing unit 14, the output controller 15, and the trigger generator 16, which are illustrated in the configuration of FIG. 21. Furthermore, FIG. 23 omits illustration of the readout controller 111 from the sensor controller 11.

Figure 24:
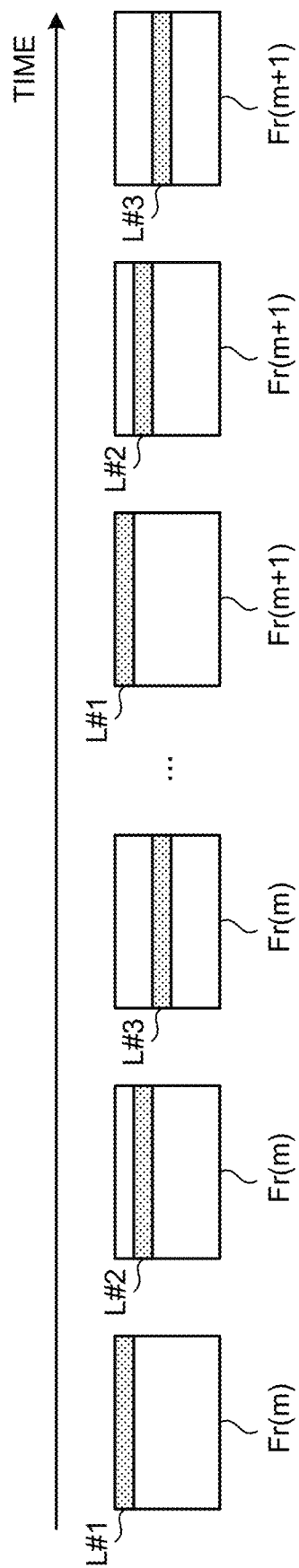
FIG. 24 is a schematic diagram illustrating a frame readout process according to the second embodiment.

FIG. 24 is a schematic diagram illustrating a frame readout process according to the second embodiment. In the second embodiment, the unit of readout is a line, and readout of pixel data is performed sequentially in the order of lines for the frame Fr(x). In the example of FIG. 24, readout of the line is performed in the mth frame Fr(m) sequentially in the order of lines starting from line L #1 at the upper end of the frame Fr(m), so as to continue to line L #2, L #3, and so on. When the line readout in the frame Fr(m) is completed, in the next frame Fr(m+1), which is the (m+1)th frame, readout of the lines is performed sequentially in the order of lines from the upper end line L #1 in a similar manner.

Figure 25:
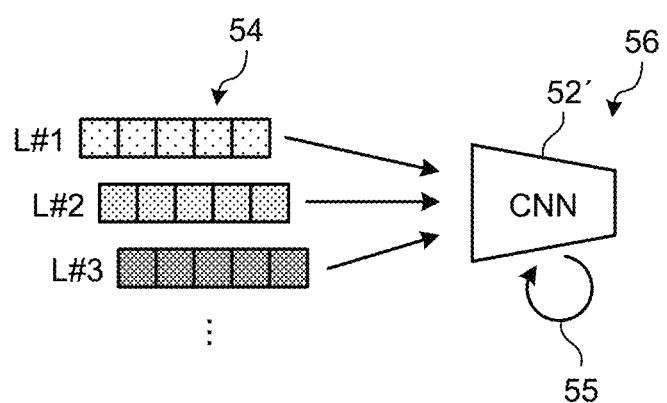
FIG. 25 is a schematic diagram illustrating an outline of a recognition process according to the second embodiment.

FIG. 25 is a schematic diagram schematically illustrating a recognition process according to the second embodiment. As illustrated in FIG. 25, the recognition process is performed by sequentially executing the process performed by a CNN 52' and an internal information update 55 for each of pieces of a pixel information 54 of each of the lines L #1, L #2, L #3, and so on. Therefore, it is sufficient to input the pixel information 54 for one line into the CNN 52', making it possible to form a recognizer 56 on an extremely small scale. Note that the recognizer 56 has a configuration as an RNN because it executes processes of the CNN 52' on sequentially input information and performs the internal information update 55.

By performing the recognition process sequentially in the order of lines using an RNN, a valid recognition result might be obtained without performing readout of all the lines included in the frame. In this case, the recognition processing unit 12 can end the recognition process at a point where a valid recognition result is obtained. An example of ending the recognition process in the middle of frame readout will be described with reference to FIGS. 26 and 27.

Figure 26:
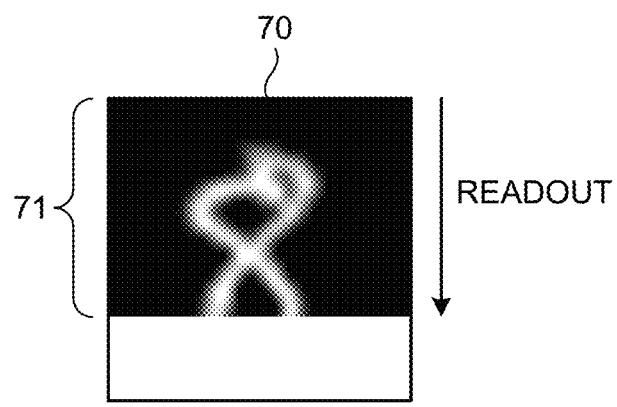
FIG. 26 is a diagram illustrating an example of terminating the recognition process in the middle of frame readout.

FIG. 26 is a diagram illustrating an exemplary case where the recognition target is the number "8". In the example of FIG. 26, the number "8" is recognized at a point where a range 71 of about ¾ of a frame 70 in the vertical direction has been read out. Therefore, the recognition processing unit 12 can output a valid recognition result indicating that the number "8" is recognized at a point where the range 71 has been read out, and can end the line readout process and recognition process for the frame 70.

Figure 27:
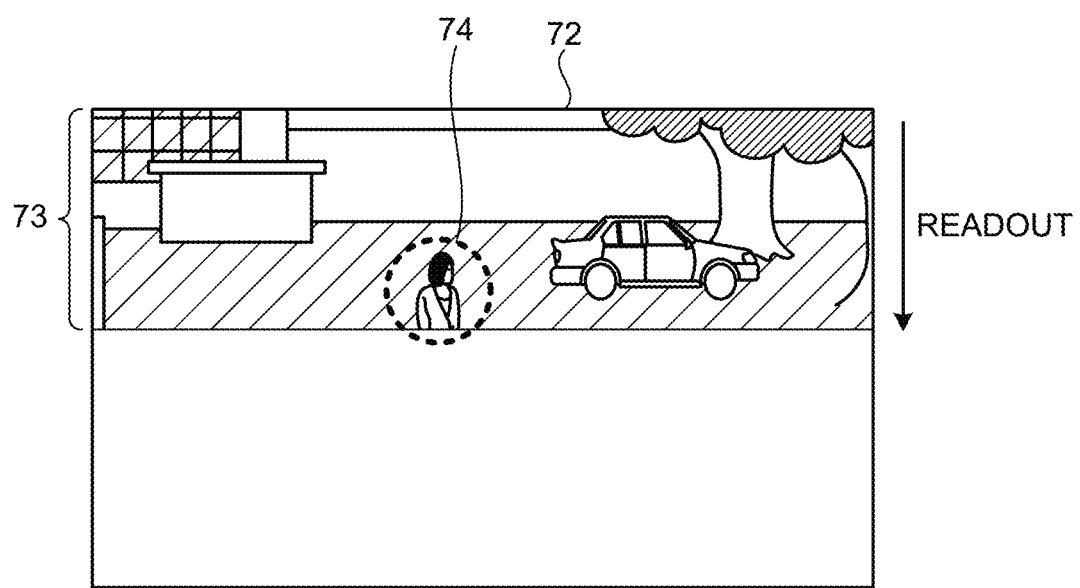
FIG. 27 is a diagram illustrating an example of terminating the recognition process in the middle of frame readout.

FIG. 27 is a diagram illustrating an example when the recognition target is a person. In the example of FIG. 27, a person 74 is recognized at a point where a range 73 of about ½ of a frame 72 in the vertical direction has been read out. Therefore, the recognition processing unit 12 can output a valid recognition result indicating that the person 74 is recognized at a point where the range 73 has been read out, and can end the line readout process and recognition process for the frame 72.

In this manner, in the second embodiment, when a valid recognition result is obtained in the middle of line readout for the frame, it is possible to end the line readout and recognition process. This makes it possible to save power in the recognition process and shorten the time required for the recognition process.

Although the above is an example in which the line readout is performed from the upper end side to the lower end side of the frame, readout direction is not limited to this example. For example, the line readout may be performed from the lower end side to the upper end side of the frame. That is, an object being existence located far away from the imaging apparatus 1 can generally be recognized earlier by performing line readout from the upper end side to the lower end side of the frame. In contrast, an object being existence on the front side with respect to the imaging apparatus 1 can generally be recognized earlier by performing line readout from the lower end side to the upper end side of the frame.

For example, there is a conceivable situation in which the imaging apparatus 1 is installed for in-vehicle application so as to image the front view. In this case, the object in front (for example, a vehicle or a pedestrian in front of the own vehicle) exists in the lower part of the screen to be imaged. Therefore, performing the line readout from the lower end side to the upper end side of the frame will be more effective. In addition, when an Advanced driver-assistance system (ADAS) requires immediate stop, it would be only necessary to recognize at least one corresponding object. In addition, in a case where one object has been recognized, performing line readout from the lower end side of the frame again is considered to be more effective. Furthermore, there are cases where a distant object is to be prioritized, for example, on a highway. In this case, it is preferable to execute the line readout from the upper end side to the lower end side of the frame.

Furthermore, the unit of readout may be set to the column direction among the matrix (row-column) directions in the pixel array unit 101. For example, it is conceivable to use a plurality of pixels arranged in a column in the pixel array unit 101 as the unit of readout. Application of the global shutter method as the imaging method makes it possible to perform column-based readout using columns as the unit of readout. In the global shutter method, it is possible to execute readout by switching between column-based readout and line-based readout. When the reading is fixed to the column-based readout, for example, it is conceivable to rotate the pixel array unit 101 by 90° and use the rolling shutter method.

For example, an object being existence on the left side of the imaging apparatus 1 can be recognized earlier by sequentially reading out from the left end side of the frame by column-based readout. Similarly, an object being existence on the right side with respect to the imaging apparatus 1 can be recognized earlier by sequentially reading out from the right end side of the frame by column-based readout.

In an example of using the imaging apparatus 1 is used for in-vehicle application, for example, when the vehicle is turning, an object being existence on the turning side will be prioritized in some cases. In such a case, it is preferable to perform readout from the end on the turning side by column-based readout. The turning direction can be acquired based on steering information of the vehicle, for example. Not limited to this, for example, it is possible to provide the imaging apparatus 1 with a sensor capable of detecting angular velocity in three directions, and to acquire the turning direction based on the detection result of this sensor.

FIG. 28 is a flowchart illustrating an example of the recognition process according to the second embodiment. The process according to the flowchart of FIG. 28 is a process corresponding to the readout of pixel data in the unit of readout (for example, one line) from a frame, for example. Here, it is assumed that the unit of readout is a line. For example, the readout region information can be represented by a line number indicating a line to be read out.

In Step S100, the recognition processing unit 12 reads out line data from the line indicated by the readout line of the frame. More specifically, in the recognition processing unit 12, the readout determiner 123 passes the line number regarding the line to be read out next, to the sensor controller 11. In the sensor controller 11, the readout unit 110 reads out the pixel data of the line indicated by the line number from the sensor unit 10 as line data in accordance with the passed line number. The readout unit 110 passes the line data read out from the sensor unit 10 to the feature data calculation unit 120. Furthermore, the readout unit 110 passes the readout region information (for example, a line number) indicating the region used for pixel data readout, to the feature data calculation unit 120.

In the next Step S101, the feature data calculation unit 120 calculates the feature data based on the line data based on the pixel data passed from the readout unit 110, and calculates the feature data of the line. In the next Step S102, the feature data calculation unit 120 acquires the feature data stored in the feature data storage unit 122 from the feature data storage controller 121. In the next Step S103, the feature data calculation unit 120 integrates the feature data calculated in Step S101 and the feature data acquired from the feature data storage controller 121 in Step S102. The integrated feature data is passed to the feature data storage controller 121. The feature data storage controller 121 stores the integrated feature data passed from the feature data calculation unit 120 in the feature data storage unit 122 (Step S104).

Note that a series of processes from Step S100 is the process for the first line of a frame, and thus, when the feature data storage unit 122 is initialized, for example, the processes in Steps S102 and S103 can be omitted. At this time, the process according to Step S104 is a process of accumulating the line feature data calculated based on the first line in the feature data storage unit 122.

Furthermore, the feature data storage controller 121 passes the integrated feature data passed from the feature data calculation unit 120 to the recognition process execution unit 124 as well. In Step S105, the recognition process execution unit 124 executes the recognition process using the integrated feature data passed from the feature data storage controller 121. In the next Step S106, the recognition process execution unit 124 outputs the recognition result of the recognition process of Step S105.

In Step S107, the readout determiner 123 in the recognition processing unit 12 determines a readout line for performing the next readout in accordance with the readout information passed from the feature data storage controller 121. For example, the feature data storage controller 121 receives readout region information together with the feature data, from the feature data calculation unit 120. Based on this readout region information, the feature data storage controller 121 determines a readout line to be read out next in accordance with, for example, a predetermined readout pattern (sequentially in the order of lines, in this example). The process from Step S100 is executed again for the determined readout line.

Figure 29A:
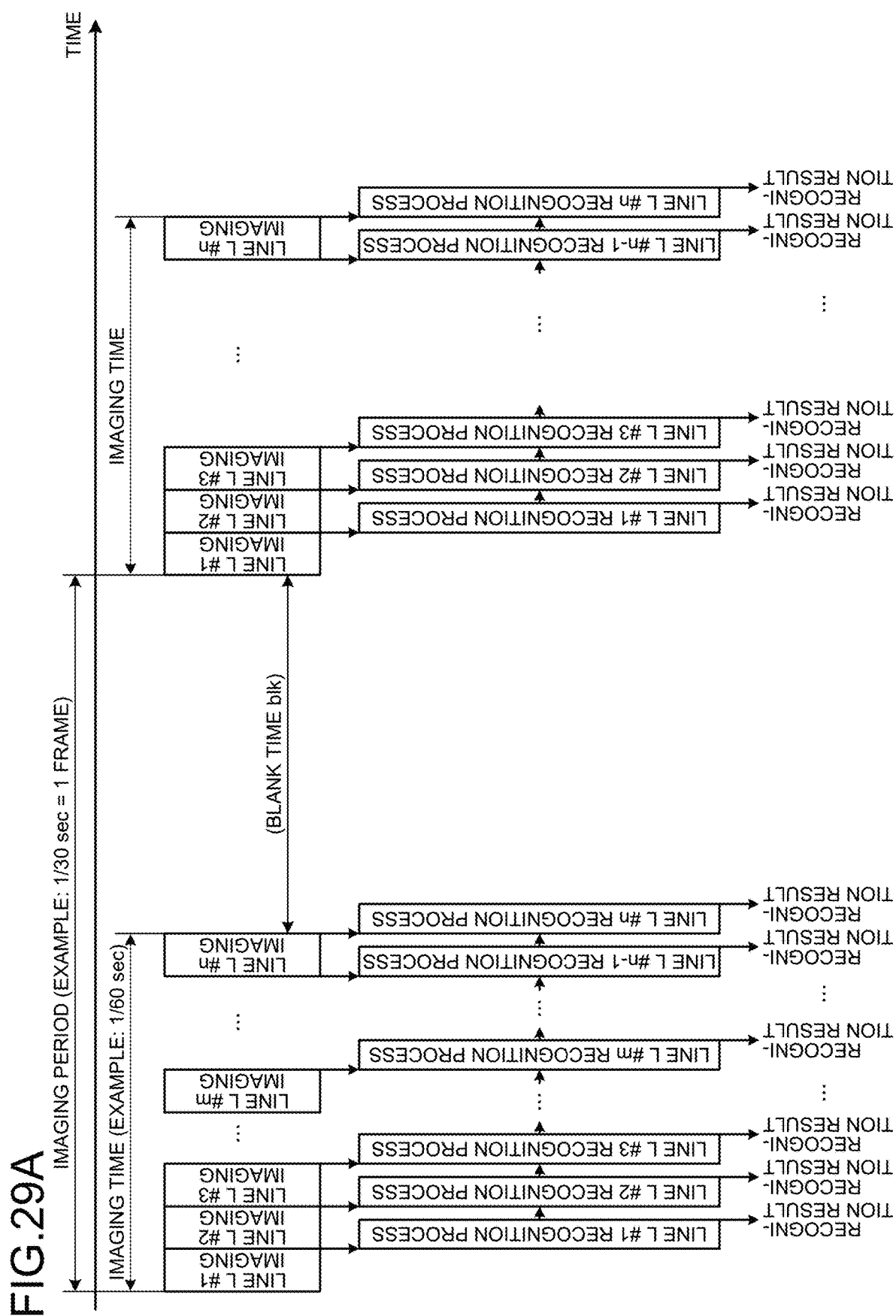
FIG. 29A is a time chart illustrating an example of controlling readout and the recognition process according to the second embodiment.

5-0-4. Example of Control of Readout and Recognition Processes According to Second Embodiment Next, an example of controlling readout and a recognition process according to a second embodiment will be described. FIGS. 29A and 29B are time charts illustrating an example of controlling readout and the recognition process according to the second embodiment. The examples of FIGS. 29A and 29B are examples in which a blank time blk during which no imaging operation is performed is provided within one imaging period (one frame period). FIGS. 29A and 29B illustrate that time passes to the right.

FIG. 29A illustrates an example of assigning ½ of the imaging period continuously to the blank time blk. In FIG. 29A, the imaging period corresponds to a frame period, which is 1/30 [sec], for example. The readout of the frame from the sensor unit 10 is performed in this frame period. The imaging time is a time length required to image all the lines included in the frame. In the example of FIG. 29A, it is assumed that the frame includes n lines, and imaging of n lines from the line L #1 to line L #n is completed in 1/60 [sec], which is ½ the frame period of 1/30 [sec]. The length of time assigned to one-line imaging is 1/(60×n) [sec]. The period of 1/30 [sec] from the timing of imaging the last line L #n in the frame to the timing of imaging the first line L #1 of the next frame is defined as the blank time blk.

For example, at a timing where the imaging of the line L #1 is completed, the imaging of the next line L #2 is started. At the same time, the recognition processing unit 12 executes a line recognition process for the line L #1, that is, a recognition process for the pixel data included in line L #1. The recognition processing unit 12 ends the line recognition process for the line L #1 before the imaging of the next line L #2 is started. When the line recognition process for the line L #1 is completed, the recognition processing unit 12 outputs a recognition result regarding the recognition process.

Similarly for the next line L #2, the imaging of the next line L #3 is started at the timing when the imaging of the line L #2 is completed. Subsequently, the recognition processing unit 12 executes a line recognition process for the line L #2 and ends this executed line recognition process before the start of imaging of the next line L #3. In the example of FIG. 29A, the imaging of the lines L #1, L #2, #3, . . . , L #m, . . . are sequentially executed in this manner. In each of the lines L #1, L #2, L #3, . . . , L #m, . . . , at the timing of the end of imaging, the imaging of the line next to the imaging completed line is started. At the same time as the start, the line recognition process for the imaging completed line is executed.

In this manner, by sequentially executing the recognition process in units of readout (line in this example), it is possible to sequentially obtain the recognition result without inputting all the image data of the frame to the recognizer (recognition processing unit 12), making it possible to reduce the delay until the recognition result is obtained. Furthermore, when a valid recognition result is obtained on a certain line, it is possible to end the recognition process at that point, leading to reduction of time for the recognition process and the power saving. In addition, by propagating information on the time axis and integrating the recognition results for each of lines, it is possible to gradually improve the recognition accuracy.

In the example of FIG. 29A, the blank time blk within the frame period can be used to execute other processes supposed to be executed within the frame period (for example, image processing in the visual recognition processing unit 14 using the recognition result).

FIG. 29B illustrates an example in which a blank time blk is provided for each of times of one line imaging. In the example of FIG. 29B, the frame period (imaging period) is set to 1/30 [sec], similar to the example of FIG. 29A. On the other hand, the imaging time is set to 1/30 [sec], which is the same as the imaging period. Furthermore, it is assumes, in the example of FIG. 29B, that line imaging of n lines, namely, lines L #1 to L #n, are executed at a time interval of 1/(30×n) [sec] in one frame period, and that the imaging time for one line is 1/(60×n) [sec].

In this case, it is possible to provide a blank time blk of 1/(60×n) [sec] for each of imaging times of each of lines L #1 to L #n. In each of the blank times blk of each of the lines L #1 to L #n, it is possible to execute other processes supposed to be executed for the captured image of the corresponding line (for example, image processing in the visual recognition processing unit 14 using the recognition result). At this time, it is possible to assign the time (approximately 1/(30×n) [sec] in this example) until immediately before the end of imaging of the next line of the target line to the other processes. In the example of FIG. 29B, the processing results of the other processes can be output line by line, making it possible to acquire the processing results of the other processes more rapidly.

FIG. 30 is a time chart illustrating another example of controlling readout and the recognition process according to the second embodiment. In the example of FIG. 29 described above, imaging of all lines L #1 to L #n included in the frame is completed in a period of ½ of the frame period, with the remaining ½ period of the frame period set as a blank time. In contrast, in the example illustrated in FIG. 30, imaging of all the lines L #1 to L #n included in the frame is performed using all the frame period without having the blank time within the frame period.

Here, when the imaging time of one line is 1/(60×n) [sec] which is the same as the time of FIGS. 29A and 29B, and the number of lines included in the frame is n which is the same as the number of FIGS. 29A and 29B, the frame period, that is, the imaging period will be 1/60 [sec]. Therefore, in the example in which the blank time blk illustrated in FIG. 30 is not provided, it is possible to increase the frame rate as compared with the examples of FIGS. 29A and 29B described above.

6. Third Embodiment

Next, a third embodiment of the present disclosure will be described. The third embodiment is an example of controlling an output timing of the recognition result by the recognition processing unit 12 and the image data for visual recognition by the visual recognition processing unit 14. In the third embodiment, with reference to FIG. 21, control is performed on the output of the recognition result from the recognition process execution unit 124 and output of the image data from the image processing unit 143 based on a trigger signal generated by the trigger generator 16.

6-0. Outline of Third Embodiment

FIG. 31 is a flowchart of an example illustrating an outline of the output control process according to the third embodiment. The process in the flowchart of FIG. 31 is a process executed for each of times of readout of the unit of readout. In the following, it is assumed that the unit of readout is a line, and the sensor controller 11 reads out pixel data from the sensor unit 10 in the unit of line.

In Step S200, the readout unit 110 reads out pixel data in the unit of line (hereinafter, appropriately referred to as line data) from the sensor unit 10. The readout unit 110 passes the line data read out from the sensor unit 10 to the recognition processing unit 12 and the visual recognition processing unit 14. The visual recognition processing unit 14 passes the pixel data passed from the readout unit 110 to the image data storage controller 140. The image data storage controller 140 stores the received pixel data in the image data storage unit 141 and also passes the pixel data to the image processing unit 143, for example.

Meanwhile, in Step S201, the recognition processing unit 12 executes calculation of the feature data by the feature data calculation unit 120 based on the line data passed from the readout unit 110, storage of the calculated feature data in the feature data storage unit 122, and a recognition process by a recognition process execution unit 124 based on the integrated feature data stored in the feature data storage unit 122, or the like. In the next Step S202, the recognition processing unit 12 outputs a recognition result of the recognition process from the recognition process execution unit 124. In the next Step S203, in the recognition processing unit 12, the readout determiner 123 generates readout region information indicating the next readout line and passes the information to the sensor controller 11.

In the next Step S204, the trigger generator 16 determines whether to output an image for visual recognition from the image processing unit 143 in accordance with, for example, the output of the recognition result in Step S202. In a case where the trigger generator 16 determines not to output the image for visual recognition (Step S204, "No"), the trigger generator 16 proceeds to the process of Step S206. In contrast, when the trigger generator 16 determines to output an image for visual recognition (Step S204, "Yes"), the trigger generator 16 proceeds to the process of Step S205.

In Step S205, the trigger generator 16 executes an output process to output a trigger signal. The trigger signal is passed to the recognition process execution unit 124, the image processing unit 143, and the output controller 15. The recognition process execution unit 124 and the image processing unit 143 output the recognition result and the image data, respectively, in response to the trigger signal. The recognition results and image data output from the recognition process execution unit 124 and the image processing unit 143 are passed to the output controller 15, individually.

In the next Step S206, the output controller 15 performs an output control process in accordance with the trigger signal passed from the trigger generator 16 in Step S205, and outputs a recognition result and image data to the subsequent stage.

In this manner, by controlling the recognition process execution unit 124, the image processing unit 143, and the output controller 15 in accordance with the trigger signal generated by the trigger generator 16, it is possible to output the recognition result and the image data at an appropriate timing.

6-0-1. Example of Trigger Signal Output by Time

Figure 32:
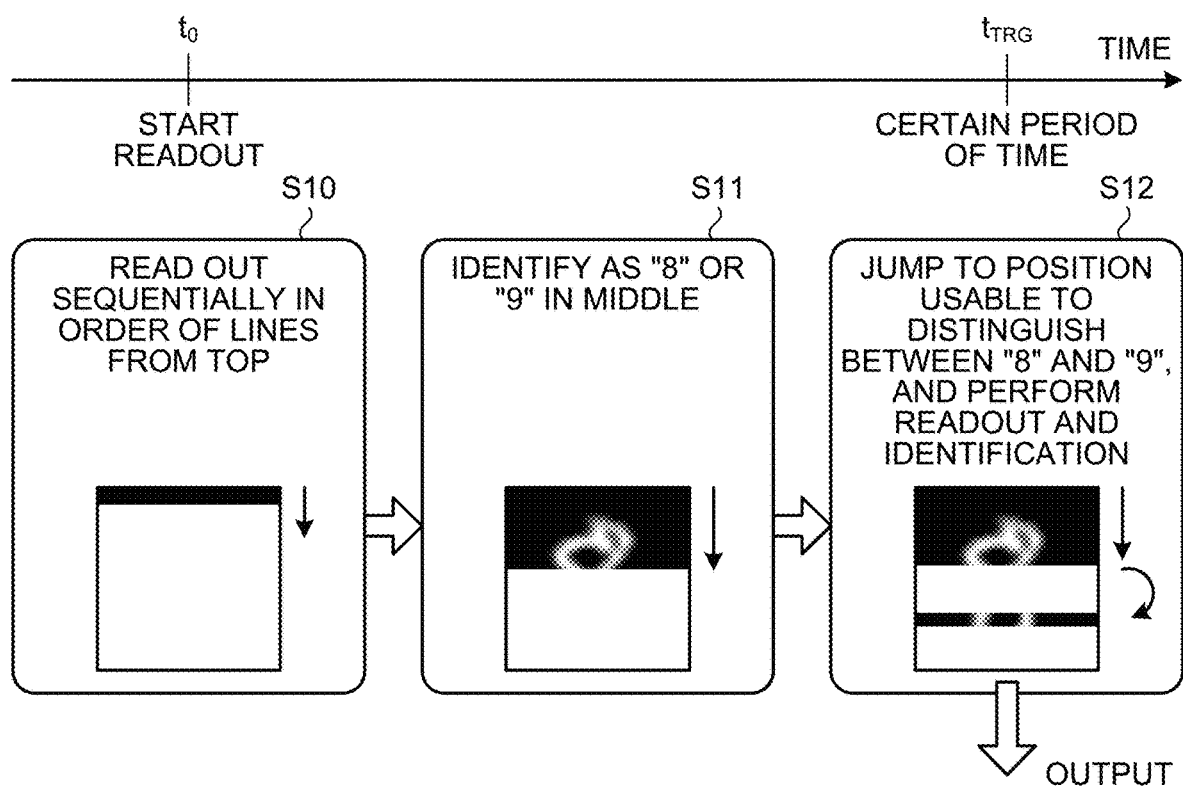
FIG. 32 is a schematic diagram schematically illustrating an example of an output control process according to the third embodiment.

FIG. 32 is a schematic diagram schematically illustrating an example of the output control process according to the third embodiment. Here, a case where the trigger generator 16 outputs a trigger signal based on time will be described.

In FIG. 32, the imaging apparatus 1 (refer to FIG. 1) starts imaging of a target image (handwritten number "8") as a recognition target. In Step S10, the sensor controller 11 starts readout of the frame in the unit of lines in the frame at time to in accordance with the readout region information passed from the recognition processing unit 12. The sensor controller 11 sequentially reads out the frame in the unit of line from the upper end side to the lower end side of the frame.

When the line is read out up to a certain position, the recognition processing unit 12 identifies the number "8" or "9" from the image of the read out lines (Step S11). Based on the integrated feature data passed from the feature data storage controller 121, the readout determiner 123 of the recognition processing unit 12 generates readout region information designating a line from which it is predicted that the object identified in Step S11 can be identified as which of the numbers "8" or "9", and passes the generated information to the readout unit 110. Subsequently, the recognition processing unit 12 executes a recognition process based on the pixel data obtained by readout of the designated line by the readout unit 110 (Step S12).

The trigger generator 16 outputs a trigger signal at time $t_{TRG}$ after passage of a predetermined time from time $t_0$ at which the readout started. For example, when readout of the frame in the unit of line is performed in a frame period, the trigger generator 16 is to output a trigger signal at certain time intervals corresponding to the frame period. In the example of FIG. 32, the time $t_{TRG}$ has elapsed at a point of process of Step S12, and the trigger generator 16 has output a trigger signal. In response to the trigger signal, the recognition process execution unit 124 outputs a recognition result, and the image processing unit 143 outputs image data. Furthermore, in response to the trigger signal, the output controller 15 outputs the recognition result output from the recognition process execution unit 124 and the image data output from the image processing unit 143 to the subsequent stage.

Note that the recognition processing unit 12 executes the process at a timing different from the timing in the visual recognition processing unit 14 and the trigger generator 16. Therefore, the recognition processing unit 12 sometimes completes the recognition process at a time before the time $t_{TRG}$. In that case, the recognition processing unit 12 waits for the next process until the trigger signal is output from the trigger generator 16 at time $t_{TRG}$.

Furthermore, at this time, in a case where there is an unprocessed line that has not been read out from the frame at a point where the recognition process in the recognition processing unit 12 is completed, the visual recognition processing unit 14 can further read out the unprocessed line. The output controller 15 can output the line data regarding the unprocessed line read out by the visual recognition processing unit 14 together with the line data read for the recognition process by the recognition processing unit 12.

There might be cases where the recognition processing unit 12 has not completed the recognition process at a point of time $t_{TRG}$. In that case, the recognition processing unit 12 outputs the recognition result at a point of time in response to a trigger $t_{TRG}$ signal.

Figure 33A:
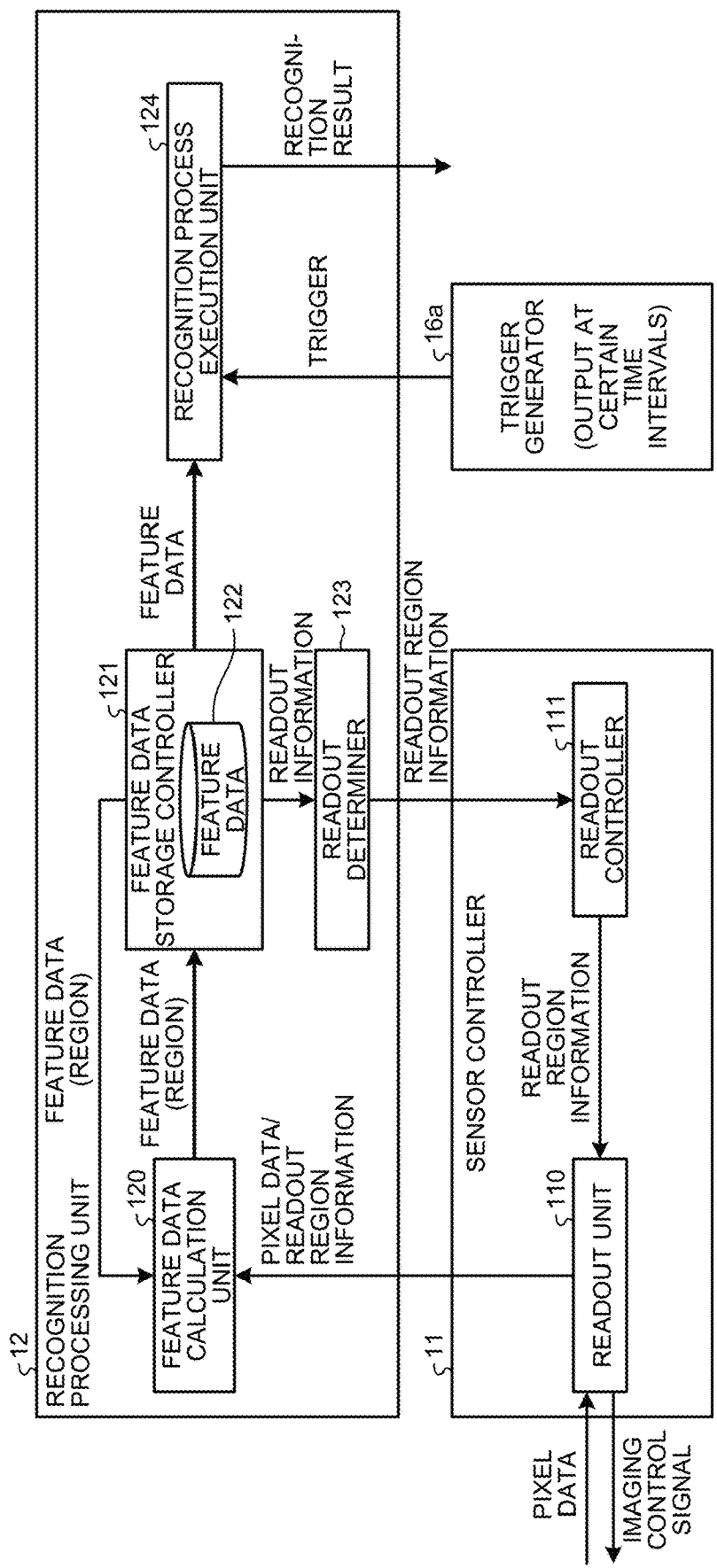
FIG. 33A is a functional block diagram illustrating a function of an example on a recognition processing unit side of the imaging apparatus according to the third embodiment.

FIGS. 33A and 33B are functional block diagrams respectively illustrating exemplary functions of the recognition processing unit 12 side and exemplary functions of the visual recognition processing unit 14 side of the imaging apparatus 1 according to the third embodiment. FIGS. 33A and 33B illustrate, respectively, exemplary functions on the recognition processing unit 12 side and exemplary functions on the visual recognition processing unit 14 side, from the configuration of FIG. 21 described above.

As illustrated in FIG. 33A, a trigger generator 16a outputs a trigger signal to the recognition process execution unit 124 at certain time intervals. Furthermore, as illustrated in FIG. 33B, the trigger generator 16a outputs a trigger signal to the image processing unit 143 at certain time intervals.

FIG. 34 is a flowchart illustrating an example of a process when a trigger signal is output in accordance with time according to the third embodiment. In FIG. 34, the processes of Steps S200 to S203 are similar to the processes of Steps S200 to S203 according to the flowchart of FIG. 31 described above.

That is, in Step S200, the readout unit 110 reads out the line data from the sensor unit 10 and passes the line data to the recognition processing unit 12 and the visual recognition processing unit 14. The visual recognition processing unit 14 passes the pixel data passed from the readout unit 110 to the image data storage controller 140. The image data storage controller 140 stores the received pixel data in the image data storage unit 141 and also passes the pixel data to the image processing unit 143, for example.

In Step S201, the recognition processing unit 12 executes calculation of the feature data based on the line data passed from the readout unit 110, storage of the calculated feature data, a recognition process based on the stored and integrated feature data, or the like. In the next Step S202, the recognition processing unit 12 outputs a recognition result of the recognition process from the recognition process execution unit 124. In the next Step S203, in the recognition processing unit 12, the readout determiner 123 generates readout region information indicating the next readout line and passes the information to the sensor controller 11.

In the next Step S2040, the trigger generator 16 determines whether a certain time has elapsed from the start of line readout in Step S200. In a case where it is determined that the time has not elapsed (Step S2040, "No"), a series of processes according to the flowchart of FIG. 34 is terminated. In contrast, when the trigger generator 16 determines that a certain time has elapsed (Step S2040, "Yes"), the trigger generator 16 proceeds to the process of Step S205.

In Step S205, the trigger generator 16 executes an output process to output a trigger signal. The trigger signal is passed to the recognition process execution unit 124, the image processing unit 143, and the output controller 15. The recognition process execution unit 124 and the image processing unit 143 output the recognition result and the image data, respectively, in response to the trigger signal. The recognition results and image data output from the recognition process execution unit 124 and the image processing unit 143 are output to subsequent stage via the output controller 15, individually.

In this manner, in the third embodiment, since the trigger signal is output by the trigger generator 16 at a fixed period, the recognition result and the image data for visual recognition can be output at a fixed period, for example, a frame period.

6-1. First Modification of Third Embodiment

Next, a first modification of the third embodiment will be described. The first modification of the third embodiment is an example in which the trigger signal is generated in accordance with the region read out from the frame by the sensor controller 11.

Figure 35:
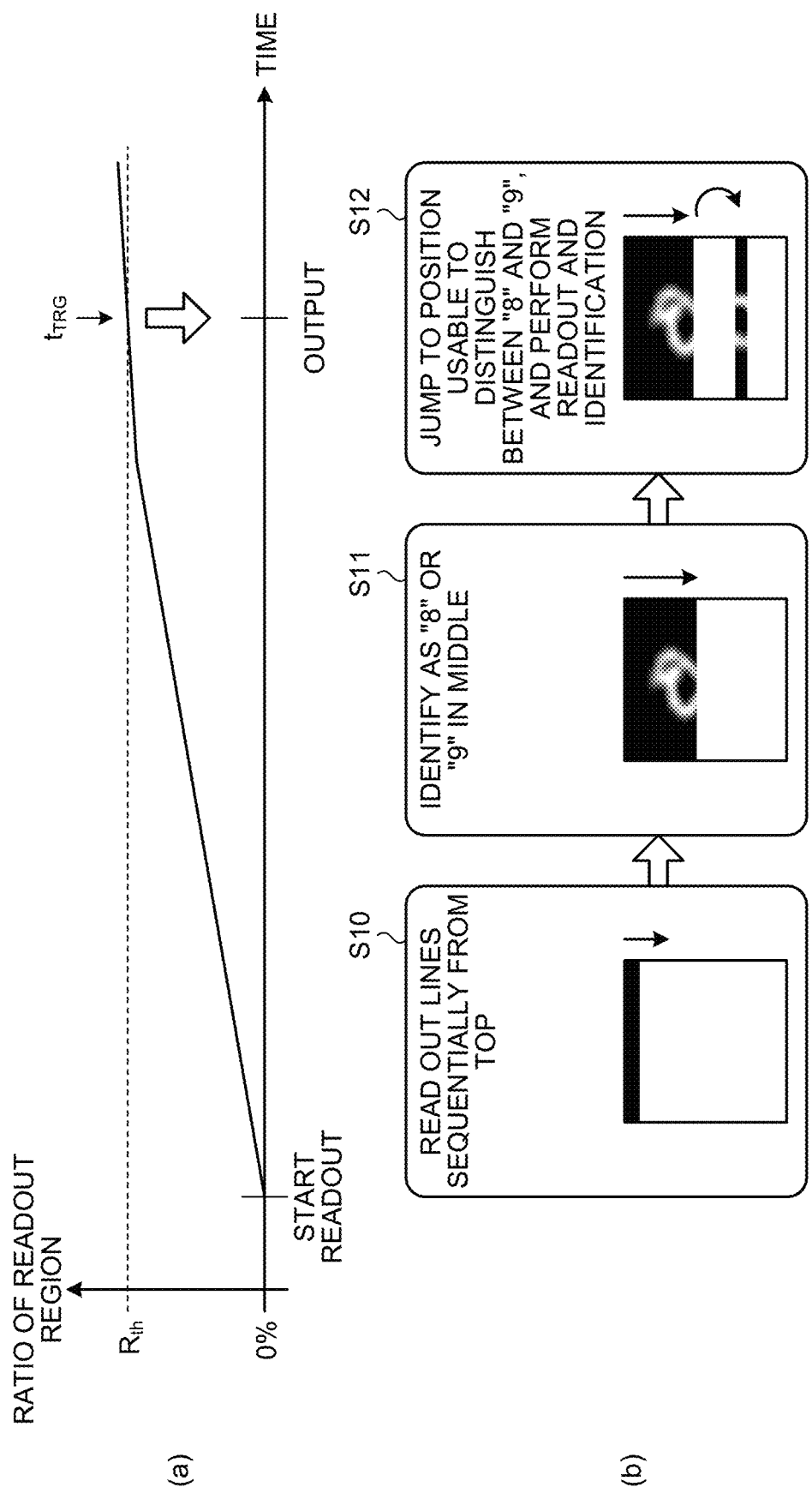
FIG. 35 is a schematic diagram schematically illustrating an example of an output control process according to a first modification of the third embodiment.

FIG. 35 is a schematic diagram schematically illustrating an example of an output control process according to the first modification of the third embodiment. In FIG. 35, Section (a) illustrates a time change of the ratio (ratio of a readout region) of the region read out from the frame by the sensor controller 11 to the entire frame. Furthermore, Section (b) is a diagram corresponding to FIG. 32 described above, and schematically illustrates a state of frame readout by the sensor controller 11. That is, the frames are read out sequentially in the order of lines in Step S10, and the process jumps to the position at which it is predicted that the object is identifiable and the readout is performed in Step S11. Subsequently, the recognition result is output in Step S12.

In Section (a) of FIG. 35, the ratio of the readout region changes at a constant rate up to Step S11 and changes, from Step S11, at a rate lower than in Step S11. Here, the trigger generator 16 generates a trigger signal at time $t_{TRG}$ when the ratio of the readout region reaches a threshold $R_{th}$. In response to the trigger signal, the recognition process execution unit 124 outputs a recognition result, and the image processing unit 143 outputs image data. Furthermore, in response to the trigger signal, the output controller 15 outputs the recognition result output from the recognition process execution unit 124 and the image data output from the image processing unit 143 to the subsequent stage.

Figure 36A:
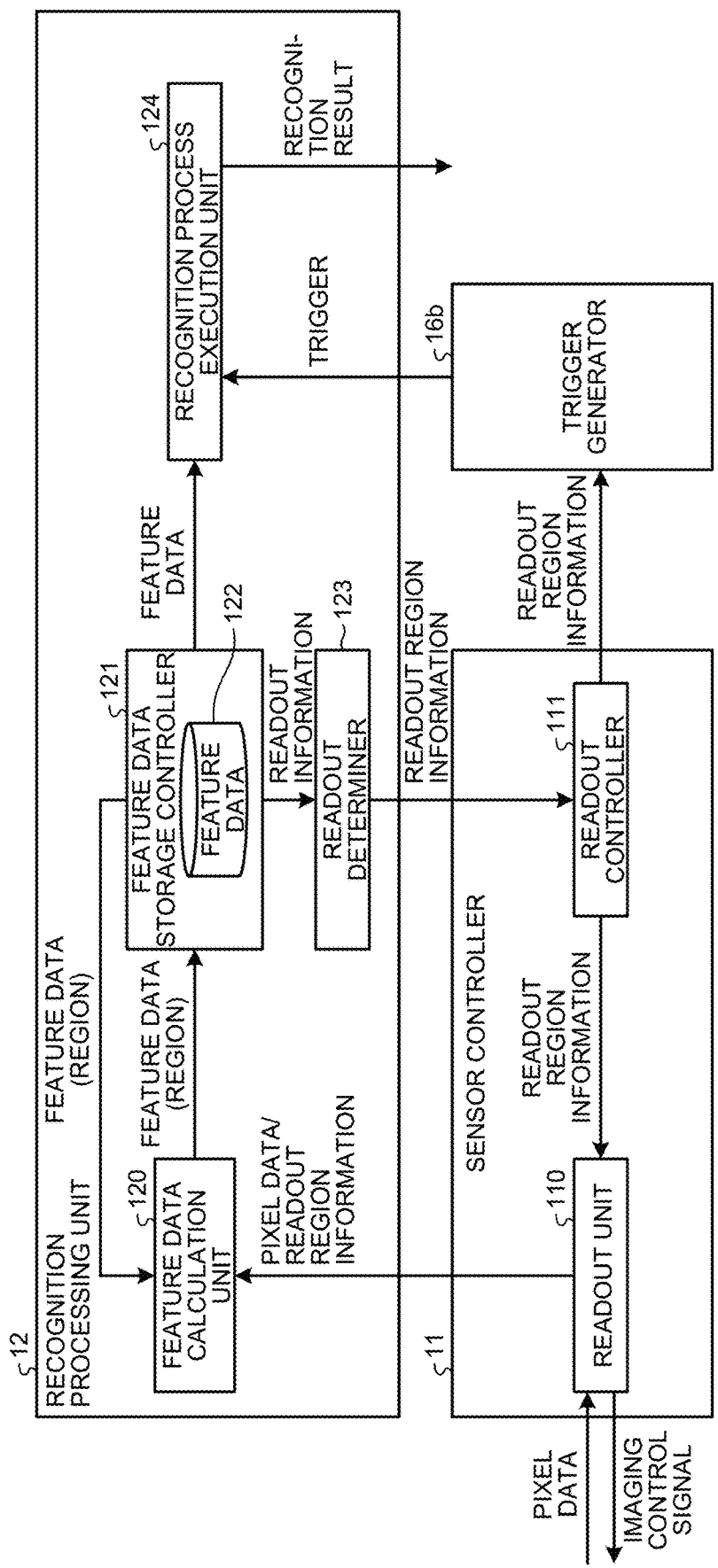
FIG. 36A is a functional block diagram illustrating a function of an example on a recognition processing unit side of the imaging apparatus according to the first modification of the third embodiment.
Figure 36B:
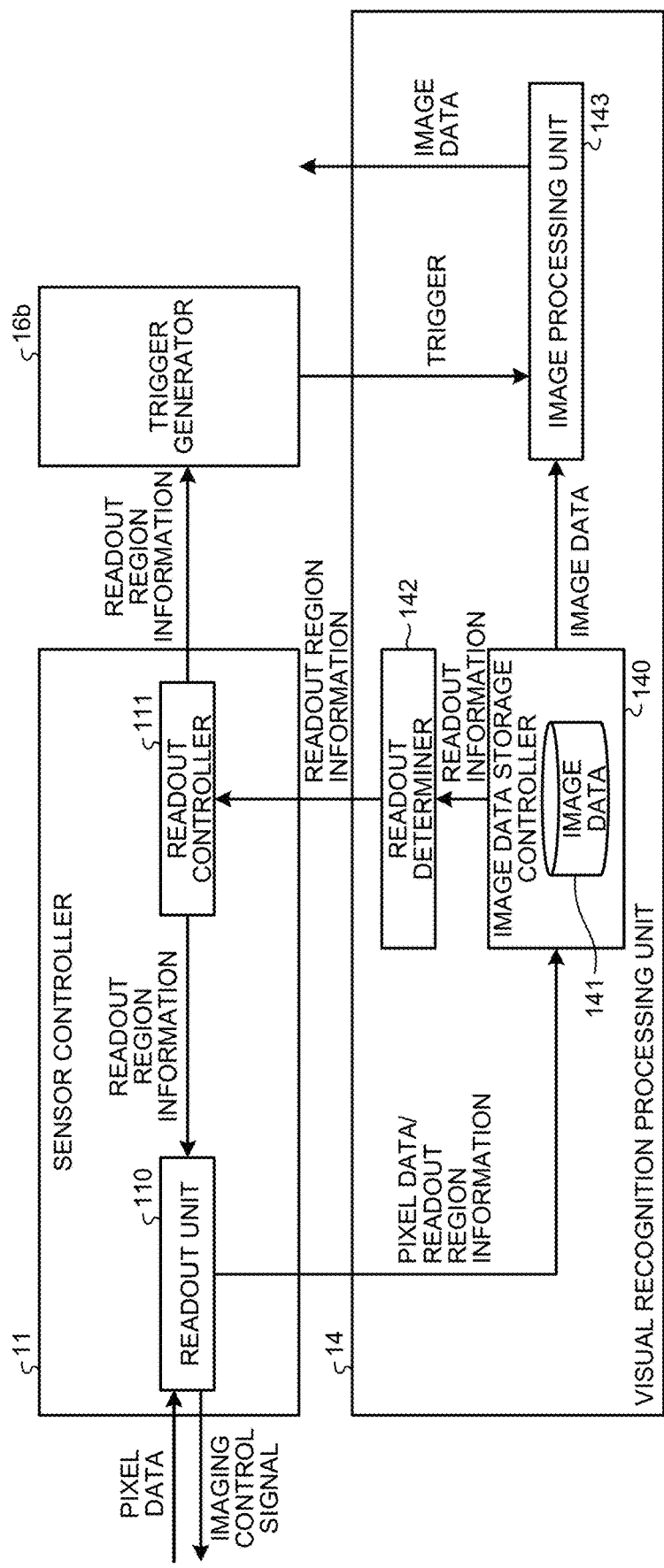
FIG. 36B is a functional block diagram illustrating a function of an example on a visual recognition processing unit side of the imaging apparatus according to the first modification of the third embodiment.

FIGS. 36A and 36B are functional block diagrams respectively illustrating exemplary functions of the recognition processing unit 12 side and exemplary functions of the visual recognition processing unit 14 side of the imaging apparatus 1 according to the first modification of the third embodiment. FIGS. 36A and 36B illustrate, respectively, exemplary functions on the recognition processing unit 12 side and exemplary functions on the visual recognition processing unit 14 side, from the configuration of FIG. 21 described above.

As individually illustrated in FIGS. 36A and 36B, a trigger generator 16b receives the readout region information from the readout controller 111 of the sensor controller 11 and obtains the ratio of the readout region based on the received readout region information. When the trigger generator 16b determines that the ratio of the obtained readout region exceeds the threshold $R_{th}$, the trigger generator 16b generates a trigger signal, and outputs the generated trigger signal individually to the recognition process execution unit 124 (refer to FIG. 36A) and the image processing unit 143 (refer to FIG. 36B).

FIG. 37 is a flowchart of an example illustrating the process according to the first modification of the third embodiment. In FIG. 37, the processes of Steps S200 to S203 are similar to the processes of Steps S200 to S203 according to the flowchart of FIG. 34 described above, and thus the description thereof will be omitted here. In Step S203, the readout determiner 123 in the recognition processing unit 12 passes the readout region information indicating the next readout line to the sensor controller 11, and then, the process proceed to Step S2041.

In Step S2041, the trigger generator 16b determines whether the ratio of the readout region exceeds the threshold $R_{th}$ based on the readout region information received from the sensor controller 11. When it is determined that the ratio does not exceed the threshold $R_{th}$ (Step S2041, "No"), the series of processes according to the flowchart of FIG. 37 ends. Thereafter, the next line data is read out from Step S200, for example.

In contrast, in a case where the trigger generator 16b determines that the ratio of the readout region exceeds the threshold $R_{th}$ (Step S2041, "Yes"), the trigger generator 16b proceeds to the process of Step S205, executes the output process to output the trigger signal. In response to this trigger signal, the recognition process execution unit 124 and the image processing unit 143 output recognition results and image data, respectively.

In this manner, in the first modification of the third embodiment, the trigger signal is output by the trigger generator 16b in accordance with the ratio of the readout region, making it possible to output the image data in a certain region or more in the frame, as image data for visual recognition.

6-2. Second Modification of Third Embodiment

Next, a second modification of the third embodiment will be described. The second modification of the third embodiment is an example in which a trigger signal is generated in accordance with the recognition confidence indicating a confidence level of a recognition processing result of the recognition process execution unit 124.

Figure 38:
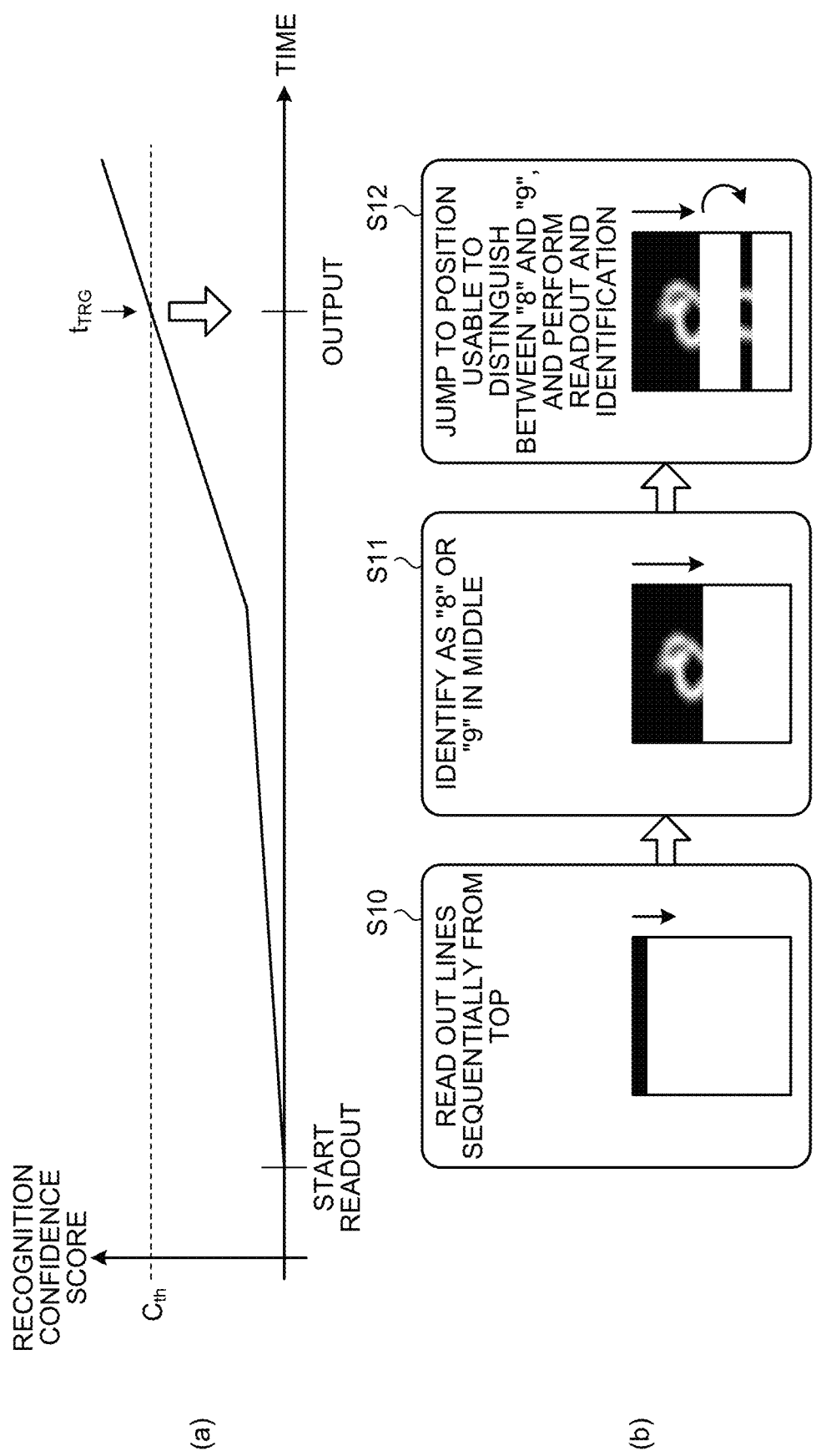
FIG. 38 is a schematic diagram schematically illustrating an example of an output control process according to a second modification of the third embodiment.

FIG. 38 is a schematic diagram schematically illustrating an example of an output control process according to the first modification of the third embodiment. In FIG. 38, Section (a) illustrates the time change of the recognition confidence score indicating the recognition confidence of the recognition process by the recognition process execution unit 124 for the line data read out from the frame by the sensor controller 11. Furthermore, Section (b) is a diagram corresponding to FIG. 32 described above, and schematically illustrates a state of frame readout by the sensor controller 11. That is, the frames are read out sequentially in the order of lines in Step S10, and the process jumps to the position at which it is predicted that the object is identifiable and the readout is performed in Step S11. Subsequently, the recognition result is output in Step S12.

In Section (a) of FIG. 38, the recognition confidence score changes at a constant rate up to Step S11, and after the number "8" or "9" is identified in Step S11, the rate changed at a rate greater than in Step S11. Here, the trigger generator 16 generates a trigger signal at time t TRG when the recognition confidence score reaches a threshold $C_{th}$. In response to the trigger signal, the recognition process execution unit 124 outputs a recognition result, and the image processing unit 143 outputs image data. Furthermore, in response to the trigger signal, the output controller 15 outputs the recognition result output from the recognition process execution unit 124 and the image data output from the image processing unit 143 to the subsequent stage.

Figure 39A:
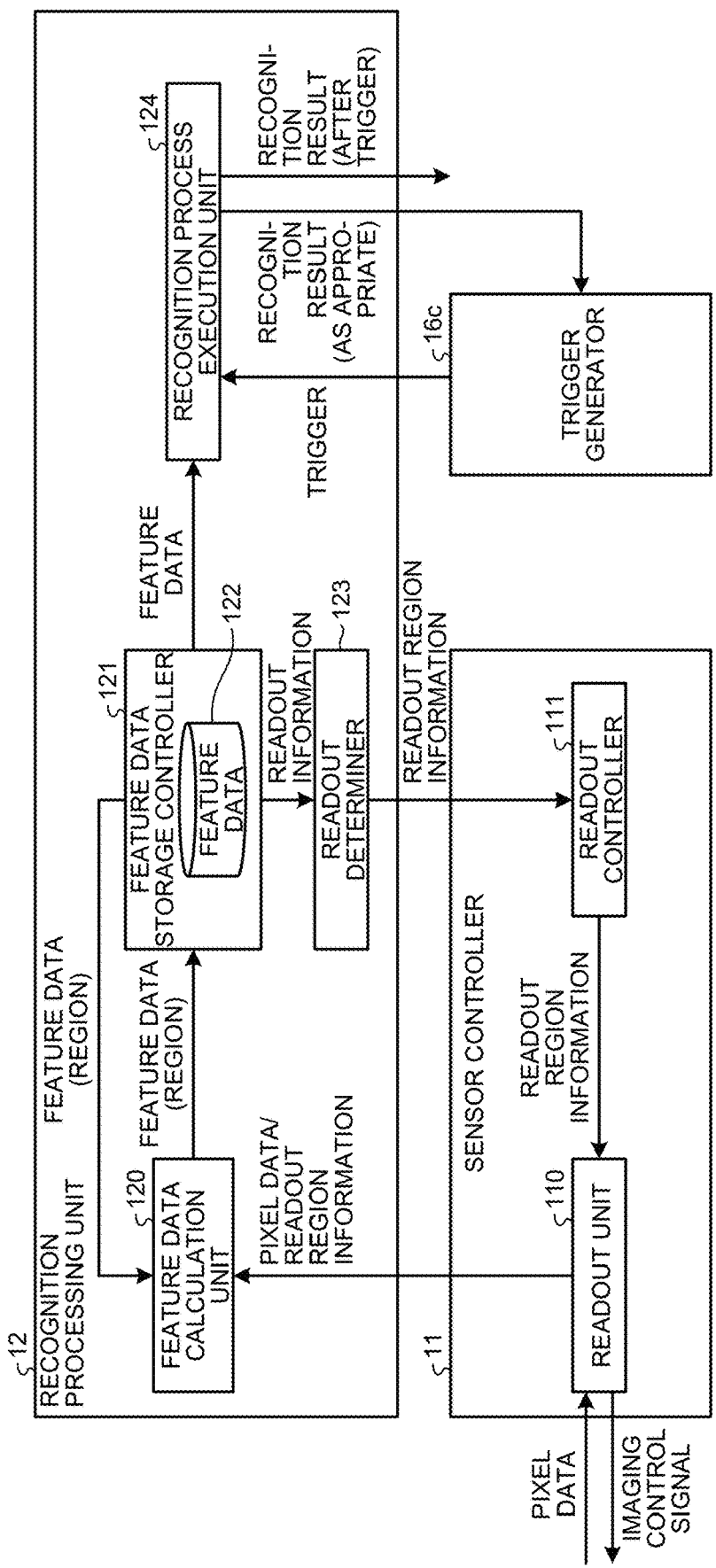
FIG. 39A is a functional block diagram illustrating a function of an example on a recognition processing unit side of the imaging apparatus according to the second modification of the third embodiment.
Figure 39B:
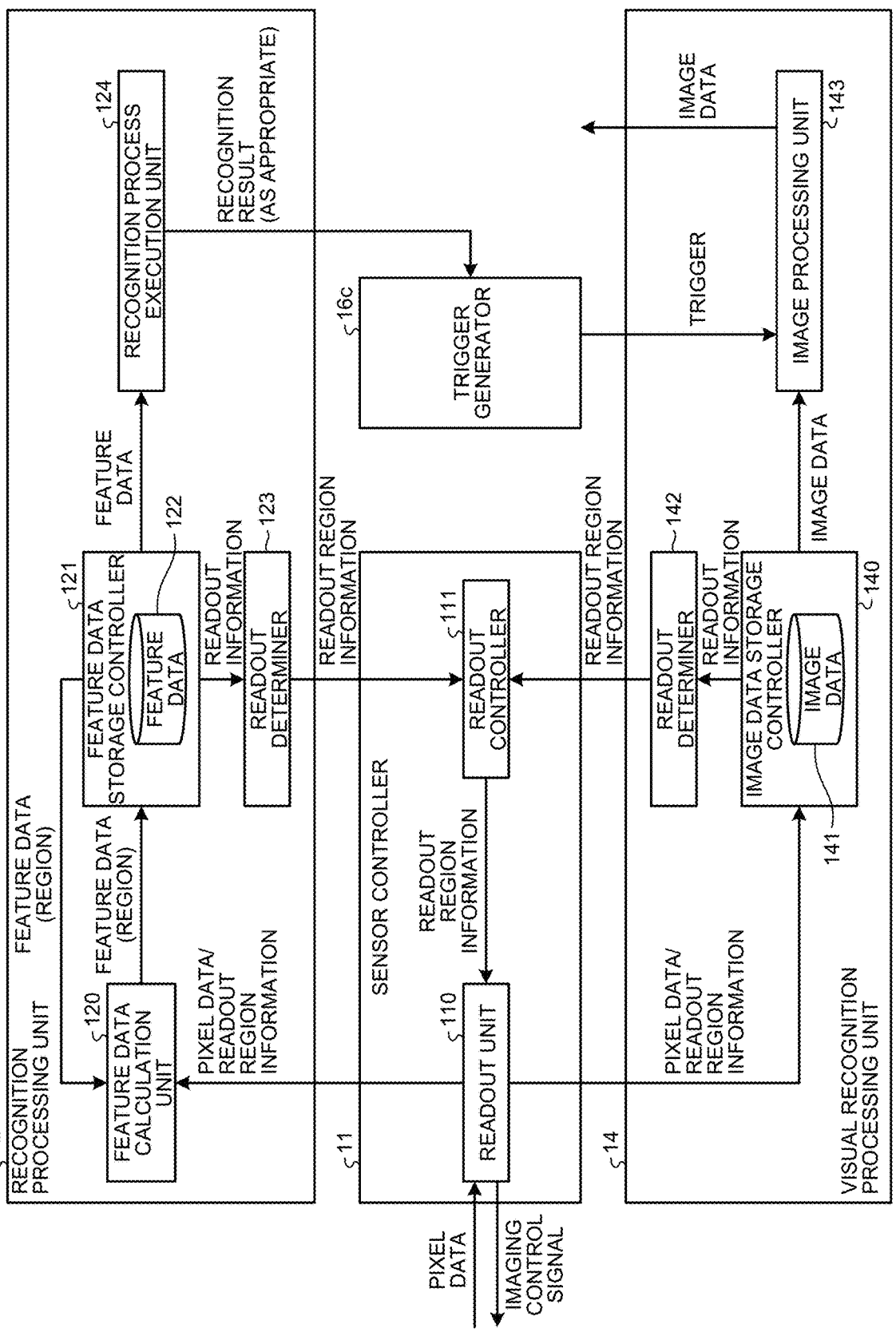
FIG. 39B is a functional block diagram illustrating a function of an example on a visual recognition processing unit recognition processing unit side of the imaging apparatus according to the second modification of the third embodiment.

FIGS. 39A and 39B are functional block diagrams respectively illustrating exemplary functions of the recognition processing unit 12 side and exemplary functions of the visual recognition processing unit 14 side of the imaging apparatus 1 according to the second modification of the third embodiment. FIG. 39A illustrates an example of the function on the recognition processing unit 12 side extracted from the configuration of FIG. 21 described above.

As individually illustrated in FIGS. 39A and 39B, the recognition process execution unit 124 outputs the recognition result including the recognition confidence score as appropriate. A trigger generator 16c receives a recognition result from the recognition process execution unit 124, and acquires the recognition confidence score included in the received recognition result. When the trigger generator 16c determines that the acquired recognition confidence score exceeds the threshold $C_{th}$, the trigger generator 16c generates a trigger signal, and outputs the generated trigger signal individually to the recognition process execution unit 124 (refer to FIG. 39A) and the image processing unit 143 (refer to FIG. 39B).

FIG. 40 is a flowchart of an example illustrating the process according to the second modification of the third embodiment. In FIG. 40, the processes of Steps S200 to S203 are similar to the processes of Steps S200 to S203 according to the flowchart of FIG. 34 described above, and thus the description thereof will be omitted here. In Step S203, the readout determiner 123 in the recognition processing unit 12 passes the readout region information indicating the next readout line to the sensor controller 11, and then, the process proceed to Step S2041.

In Step S2042, the trigger generator 16c determines whether the recognition confidence score included in the recognition result received from the recognition process execution unit 124 exceeds the threshold $C_{th}$. When it is determined that the score does not exceed the threshold $C_h$ (Step S2042, "No"), the series of processes according to the flowchart of FIG. 40 ends. Thereafter, the next line data is read out from Step S200, for example.

In contrast, in a case where the trigger generator 16c determines that the recognition confidence score exceeds the threshold $C_{th}$ (Step S2042, "Yes"), the trigger generator 16c proceeds to the process of Step S205, executes the output process to output the trigger signal. In response to this trigger signal, the recognition process execution unit 124 and the image processing unit 143 output recognition results and image data, respectively.

In this manner, in the second modification of the third embodiment, the trigger generator 16 outputs the trigger signal in accordance with the recognition confidence score, making it possible to acquire higher-accuracy recognition information related to the object included in the image data for visual recognition.

6-3. Third Modification of Third Embodiment

Next, a third modification of the third embodiment will be described. The third modification of the third embodiment is an example in which a trigger signal is generated in accordance with external information acquired from the outside of the imaging apparatus 1.

Figure 41B:
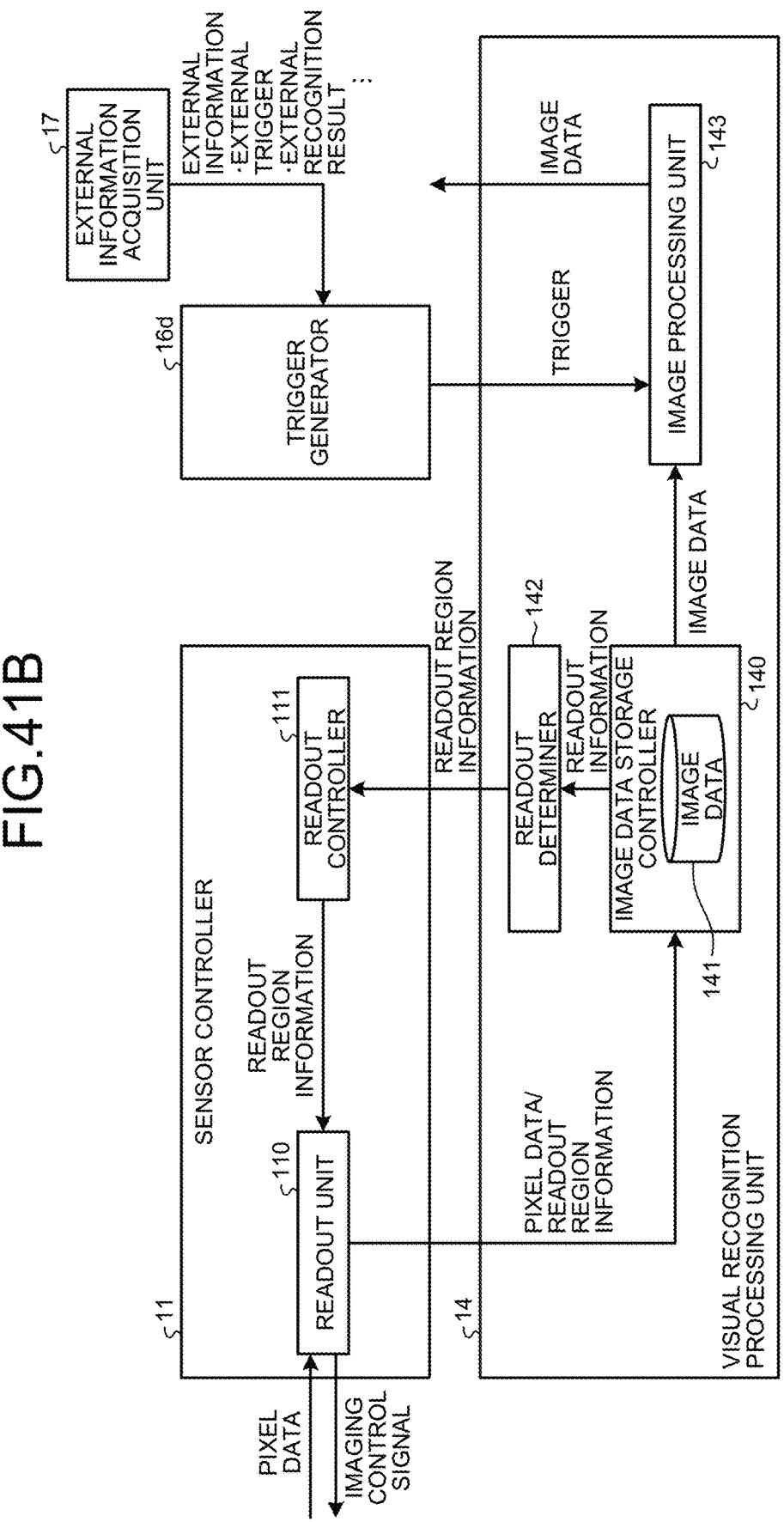
FIG. 41B is a functional block diagram illustrating a function of an example on a visual recognition processing unit side of the imaging apparatus according to the third modification of the third embodiment.

FIGS. 41A and 41B are functional block diagrams respectively illustrating exemplary functions of the recognition processing unit 12 side and exemplary functions of the visual recognition processing unit 14 side of the imaging apparatus 1 according to the third modification of the third embodiment. FIGS. 41A and 41B illustrate, respectively, exemplary functions on the recognition processing unit 12 side and exemplary functions on the visual recognition processing unit 14 side, from the configuration of FIG. 21 described above.

As illustrated in FIGS. 41A and 41B2, the imaging apparatus 1 according to the third modification of the third embodiment includes an external information acquisition unit 17 that acquires information from the outside. The external information acquisition unit 17 passes the external information acquired from the outside to a trigger generator 16d. The trigger generator 16d generates a trigger signal in accordance with the external information passed from the external information acquisition unit 17, and outputs the generated trigger signal individually to the recognition process execution unit 124 (refer to FIG. 41A) and the image processing unit 143 (refer to FIG. 41B).

Here, as the external information acquired by the external information acquisition unit 17, various information that can be acquired from the outside of the imaging apparatus 1 such as a trigger signal from the outside and a recognition result by the external recognition device can be applied. Examples of the external device that outputs such external information include other imaging apparatuses, Laser Imaging Detection and Ranging (LiDAR) system sensor (referred to as LiDAR sensors), or radar devices. For example, when the imaging apparatus 1 is used for in-vehicle applications, it is desirable to enable external information such as recognition information, trigger signals, and vehicle information output from other imaging apparatuses, LiDAR sensors, radar devices, or the like mounted on the same vehicle, to be input to the imaging apparatus 1.

As an example, in a case where the external information is the recognition result by another imaging apparatus or the recognition result by the LiDAR sensor or the radar device, it is conceivable that the trigger generator 16d generates trigger signals in accordance with the recognition confidence score of the recognition result acquired as external information by the external information acquisition unit 17.

Note that when using the external information output from these external devices, it is preferable to execute calibration related to the position of the imaging apparatus 1 with respect to the captured image or related to the time. Furthermore, although the above description is an example in which the external device is used as a master, and the imaging apparatus 1 outputs a trigger signal in response to external information output from the external device, the present disclosure is not limited to this example. For example, it is also allowable to use a configuration in which the imaging apparatus 1 is used as a master, and the trigger generator 16d outputs the trigger signal generated by other methods (ratio of time and readout region, recognition confidence score, or the like) to the external device.

Not limited to the above example, time information acquired by using a Global Navigation Satellite System (GNSS) can also be used as external information. Furthermore, in a case where the imaging apparatus 1 is for in-vehicle applications, the external information acquisition unit 17 can acquire the vehicle information (steering information, speed information, brake information, direction indicator information, or the like) regarding the vehicle on which the imaging apparatus 1 is mounted, as external information.

Figure 42:
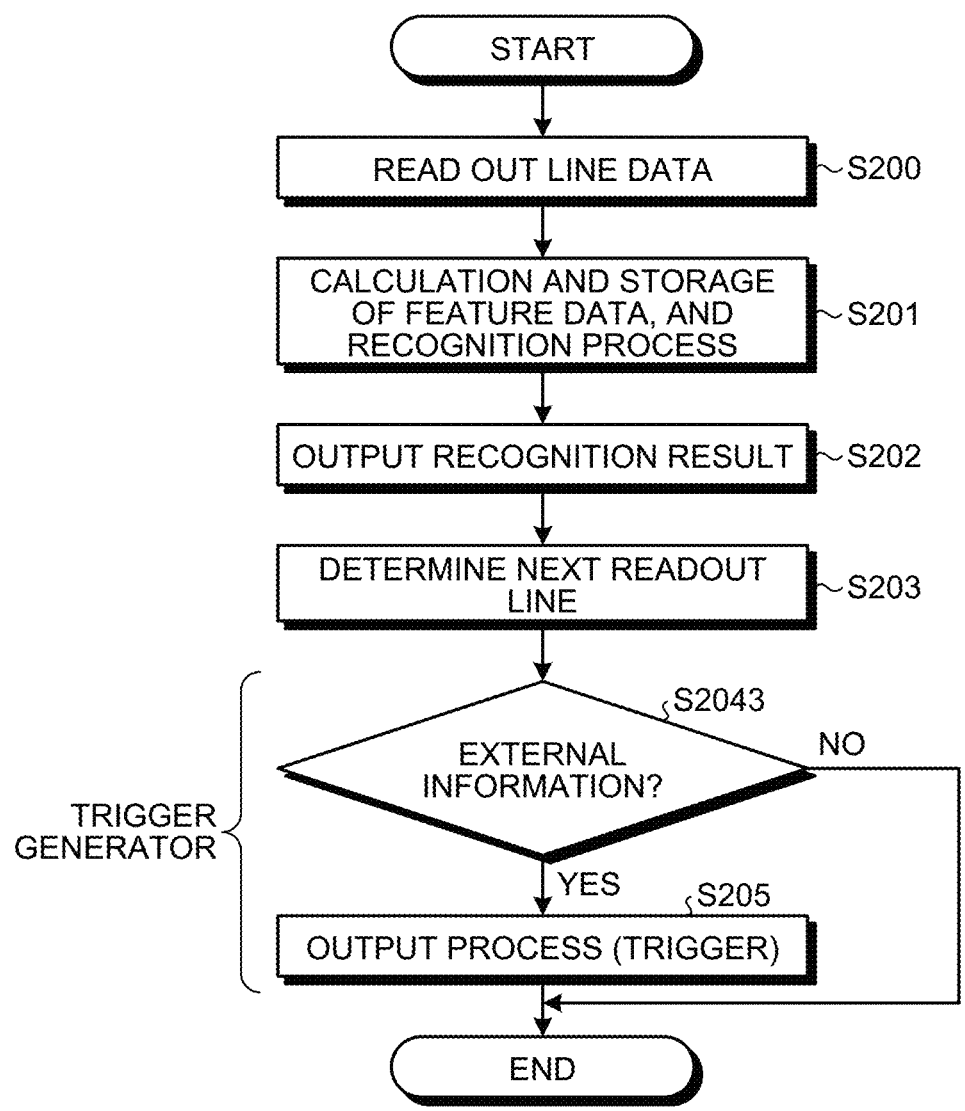
FIG. 42 is a flowchart of an example illustrating a process according to the third modification of the third embodiment.

FIG. 42 is a flowchart of an example illustrating the process according to the third modification of the third embodiment. In FIG. 42, the processes of Steps S200 to S203 are similar to the processes of Steps S200 to S203 according to the flowchart of FIG. 34 described above, and thus the description thereof will be omitted here. In Step S203, the readout determiner 123 in the recognition processing unit 12 passes the readout region information indicating the next readout line to the sensor controller 11, and then, the process proceed to Step S2043.

In Step S2043, the trigger generator 16d determines whether predetermined external information has been acquired by the external information acquisition unit 17. In a case where it is determined that the information has not been acquired (Step S2043, "No"), the series of processes according to the flowchart of FIG. 42 is terminated. Thereafter, the next line data is read out from Step S200, for example.

In contrast, when the trigger generator 16d determines that the predetermined external information has been acquired by the external information acquisition unit (Step S2043, "Yes"), the trigger generator 16d proceeds to the process of Step S205. The trigger generator 16d acquires predetermined external information input from the external device to the external information acquisition unit 17, from the external information acquisition unit 17. The trigger generator 16d executes an output process in accordance with the acquired predetermined external information and outputs a trigger signal. In response to this trigger signal, the recognition process execution unit 124 and the image processing unit 143 output recognition results and image data, respectively.

In this manner, in the third modification of the third embodiment, outputting the trigger signal in accordance with the external information input from the outside makes it possible to use the recognition results obtained by the plurality of sensor devices. Therefore, the imaging apparatus 1 according to the third modification of the third embodiment can be linked with an external device.

7. Fourth Embodiment

Next, a fourth embodiment will be described. The fourth embodiment is an example corresponding to the deviation between the output of the recognition result by the recognition processing unit 12 and the output of the image data for visual recognition by the visual recognition processing unit 14.

Figure 43:
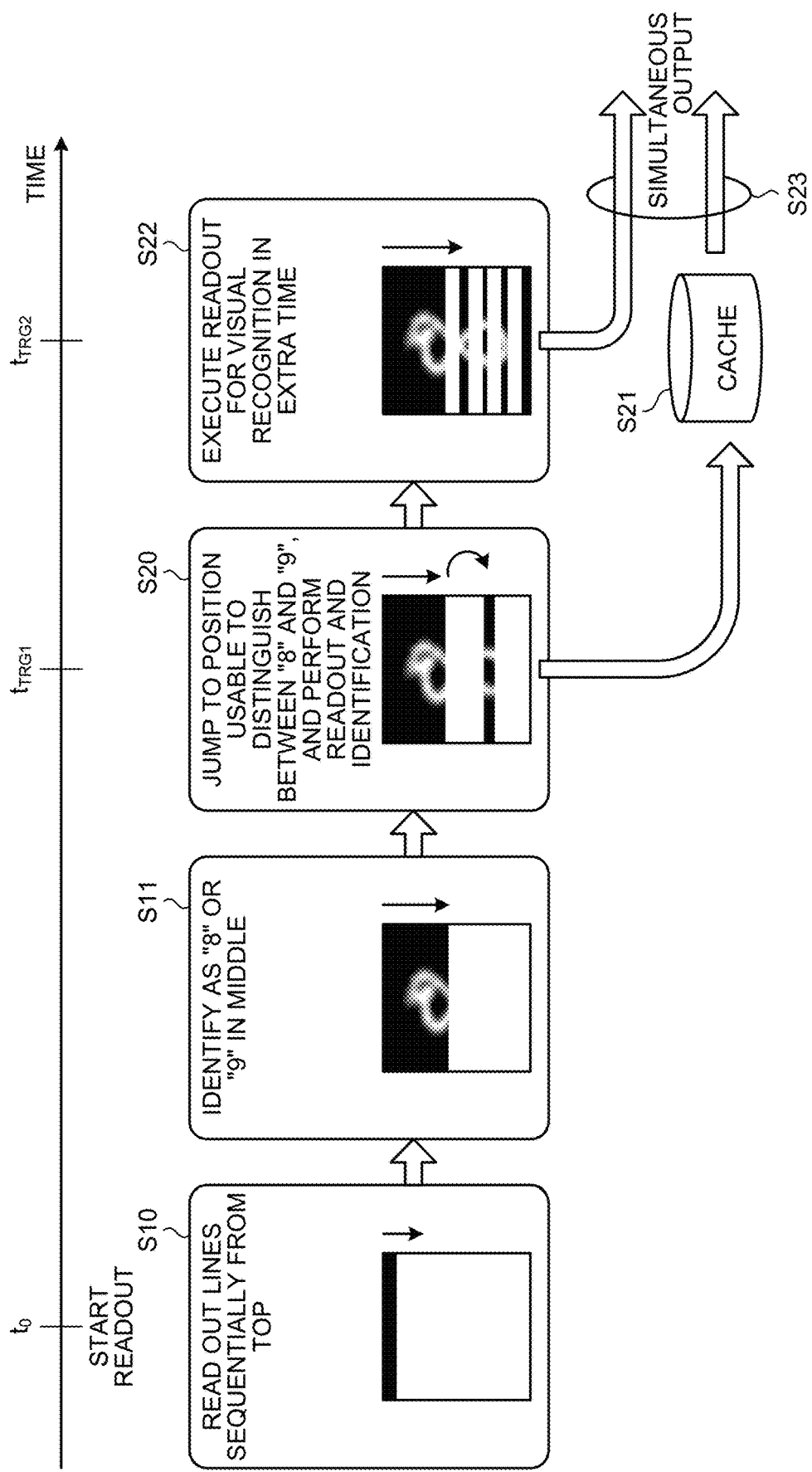
FIG. 43 is a schematic diagram schematically illustrating an example of an output control process according to a fourth embodiment.

FIG. 43 is a schematic diagram schematically illustrating an example of the output control process according to the fourth embodiment. In the fourth embodiment, the trigger signal for the recognition process execution unit 124 and the trigger signal for the image processing unit 143 are output independently. Furthermore, in the following example, the trigger signal for each of the recognition process execution unit 124 and the image processing unit 143 are output in accordance with the ratio of the readout region in each of the processes to the frame described in the second modification of the third embodiment. A threshold of the ratio of the readout region to the process of the recognition process execution unit 124 is defined as a threshold $R_{th1}$, and a threshold of the ratio of the readout region to the process of the image processing unit 143 is defined as a threshold $R_{th2}$.

In FIG. 43, frame readout is started at time t0 (Step S10), and frames are read out sequentially in the order of lines in Step S11. In this example, following Step S11, the process jumps to the line at which it is predicted that the object is identifiable and the readout is performed in Step S20. Here, in the process of Step S20, it is assumed that the ratio of the readout region to the process performed by the recognition process execution unit 124 reaches the threshold $R_{th1}$ at time $t_{TRG1}$. In this case, a trigger signal is output to the recognition process execution unit 124 at time $t_{TRG1}$. The recognition process execution unit 124 outputs a recognition result in response to this trigger signal. The recognition result output at time $t_{TRG1}$ by the recognition process execution unit 124 is cached in a predetermined storage region (referred to as cache memory) (Step S21). When the recognition result is output and cached, the recognition processing unit 12 ends the recognition process.

Here, at a point of time $t_{TRG1}$, it is assumed that a predetermined time, for example, a frame period has not elapsed from time t0 at which frame readout is started.

After the recognition process performed by the recognition processing unit 12 ended in Step S21, the visual recognition processing unit 14 executes frame readout from the read start time to until a predetermined time, for example, a frame period elapses. Here, it is assumed that the ratio of the readout region to the process by the image processing unit 143 reaches a threshold $R_{th2}$ at time $t_{TRG2}$. At this time $t_{TRG2}$, a trigger signal is output to the image processing unit 143.

The image processing unit 143 outputs image data for visual recognition in response to the trigger signal at $t_{TRG2}$. Furthermore, the recognition result cached in Step S21 is read out and output from the cache memory in response to the trigger signal at time $t_{TRG2}$. This makes it possible to simultaneously output the image data for visual recognition and the recognition result.

In the above description, only the recognition result is cached in Step S21. However, the present disclosure is not limited to this example, and the image data for visual recognition may be further cached.

Figure 44:
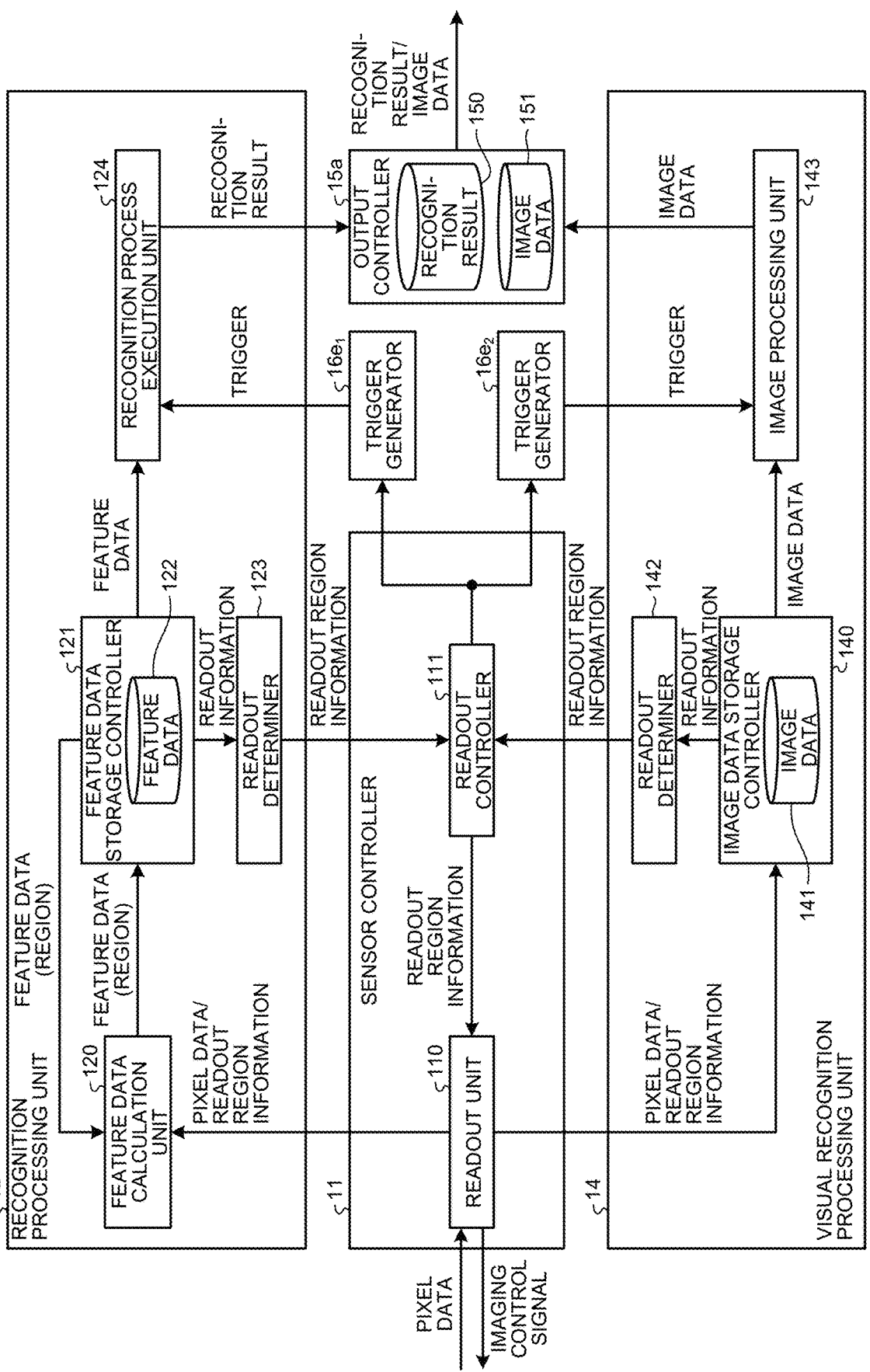
FIG. 44 is a functional block diagram illustrating a function of an example of an imaging apparatus according to the fourth embodiment.

FIG. 44 is a functional block diagram illustrating a function of an example of the imaging apparatus 1 according to the fourth embodiment. In FIG. 44, in the imaging apparatus 1, there are provided two trigger generators, namely, a trigger generator $16_{e1}$ that generates a trigger signal for the recognition process execution unit 124, and a trigger generator $16_{e2}$ that generates a trigger signal for the image processing unit 143.

For the trigger generator $16_{e1}$, the threshold $R_{th1}$ regarding the ratio of the readout region in the recognition process execution unit 124 is set. Similarly, for the trigger generator $16_{e2}$, the threshold $R_{th2}$ regarding the ratio of the readout region in the image processing unit 143 is set. These thresholds $R_{th1}$ and $R_{th2}$ may be preset for the trigger generators $16_{e1}$ and $16_{e2}$, respectively, or may be adaptively set in accordance with the frame readout state, for example.

Furthermore, an output controller 15a includes cache memory 150 that caches a recognition result and cache memory 151 that caches image data for visual recognition.

The readout controller 111 passes readout region information indicating the readout line to be read out next to the trigger generators $16_{e1}$ and $16_{e2}$, individually. The trigger generators $16_{e1}$ and $16_{e2}$ obtain the ratio of the current readout region based on the passed readout region information. The trigger generator $16_{e1}$ outputs a trigger signal to the recognition process execution unit 124 when the obtained ratio of the current readout region reaches the threshold $R_{th1}$. Similarly, the trigger generator $16_{e2}$ outputs a trigger signal to the image processing unit 143 when the obtained ratio of the current readout region reaches the threshold $R_{th2}$.

The recognition result output from the recognition process execution unit 124 in response to the trigger signal is passed to the output controller 15a and stored in the cache memory 150. Similarly, the image data for visual recognition output from the image processing unit 143 in response to the trigger signal is passed to the output controller 15a and stored in the cache memory 151. The output controller 15a outputs the recognition result and the image data for visual recognition stored in the cache memory 150 and 151, respectively, at a predetermined timing, for example, a timing synchronized with the frame period.

Figure 45:
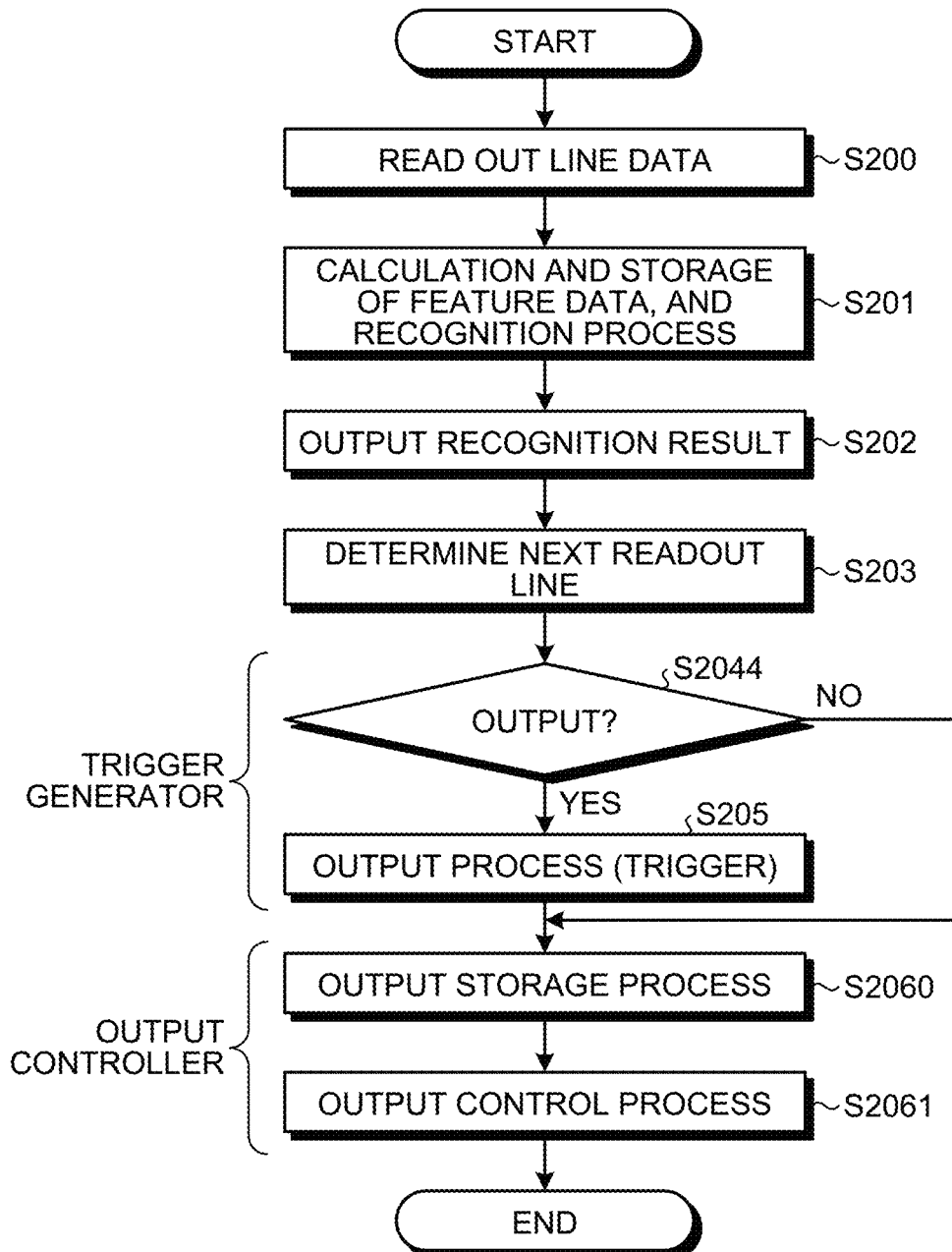
FIG. 45 is a flowchart of an example illustrating processes according to the fourth embodiment.

FIG. 45 is a flowchart of an example illustrating the process according to the fourth embodiment. In FIG. 45, the processes of Steps S200 to S203 are similar to the processes of Steps S200 to S203 according to the flowchart of FIG. 34 described above, and thus the description thereof will be omitted here. In Step S203, the readout determiner 123 in the recognition processing unit 12 passes the readout region information indicating the next readout line to the sensor controller 11, and then, the process proceed to Step S2044.

The processes of Step S2044 and Step S205 following Step S2044 are executed in parallel, for example, in the trigger generators $16_{e1}$ and $16_{e2}$, respectively.

In the trigger generator $16_{e1}$, in Step S2044, it is determined whether to allow the recognition process execution unit 124 to output the recognition result. More specifically, in Step S2044, the trigger generator $16_{e1}$ obtains the ratio of the current readout region based on the readout region information indicating the next readout line determined in Step S203, and determines to allow the recognition process execution unit 124 to output the recognition result in a case where the ratio of the current readout region obtained reaches the threshold $R_{th1}$. When the trigger generator $16_{e1}$ determines that the recognition result is not to be output at a current point (Step S2044, "No"), the trigger generator $16_{e1}$ proceeds to the process of Step S2060.

In contrast, when the trigger generator 16e1 determines that the recognition result is to be output (Step S2044, "Yes"), the process proceed to Step S205. In Step S205, the trigger generator $16_{e1}$ executes an output process of outputting a trigger signal to the recognition process execution unit 124. When the output process is executed, the process proceeds to Step S2060.

The process in the trigger generator $16_{e2}$ is similar to the process in the trigger generator $16_{e1}$. That is, the trigger generator $16_{e2}$ determines, in Step S2044, whether to allow the image processing unit 143 to output the image data for visual recognition. More specifically, in Step S2044, the trigger generator $16_{e2}$ obtains the ratio of the current readout region based on the readout region information indicating the next readout line determined in Step S203, and determines to allow the image processing unit 143 to output the image data for visual recognition in a case where the ratio of the current readout region obtained reaches the threshold $R_{th2}$. When the trigger generator $16_{e2}$ determines not to output the recognition result at a current point (Step S2044, "No"), the trigger generator $16_{e1}$ proceeds to the process of Step S2060.

In contrast, when the trigger generator 15f determines in Step S2044 to output the recognition result (Step S2044, "No"), a trigger generator 15f proceeds to the process of Step S205. In Step S205, the trigger generator $16_{e2}$ executes an output process of outputting a trigger signal to the image processing unit 143. When the output process is executed, the process proceeds to Step S2060.

The process of Step S2060 and the process of Step S2061 following Step S2060 are processes executed by the output controller 15a. The output controller 15a executes the output control process individually on the recognition result output from the recognition process execution unit 124 and the image data for visual recognition output from the image processing unit 143.

The output controller 15a stores the recognition result output from the recognition process execution unit 124 in the cache memory 150 in Step S2060, so as to perform an output storage process. After the output controller 15a has stored the recognition result in the cache memory 150, the output controller 15a proceeds to the process of Step S2061. In Step S2061, the output controller 15a executes the output control process of outputting the recognition result stored in the cache memory 150 at a predetermined timing, for example, a timing synchronized with the frame period.

Similarly, the output controller 15a stores the image data for visual recognition output from the image processing unit 143 in the cache memory 151 in Step S2060, so as to perform performs the output storage process.

After the output controller 15a has stored the image data for visual recognition in the cache memory 150, the output controller 15a proceeds to the process of Step S2061. In Step S2061, the output controller 15a executes the output control process of outputting the image data for visual recognition stored in the cache memory 151 at a predetermined timing, for example, a timing synchronized with the frame period.

Here, the output controller 15a executes the output of the recognition result in Step S2061 in synchronization with the output of the image data for visual recognition. This makes it possible to output the recognition result and the image data for visual recognition without any time lag.

After the output process for the recognition result and the image data for visual recognition have been executed in Step S2061, for example, the line data of the next readout line is read out from Step S200.

In this manner, in the fourth embodiment, the recognition result and the image data for visual recognition are individually cached, and the cached recognition result and the image data for visual recognition are output at a predetermined timing. This makes it possible to output the recognition result and the image data for visual recognition in a state suppressing the time lag between the recognition result and the image data for visual recognition.

7-1. First Modification of Fourth Embodiment

Next, a first modification of the fourth embodiment will be described. In the fourth embodiment described above, the time lag between the recognition result and the image data for visual recognition is suppressed. In contrast, in the first modification of the fourth embodiment, spatial deviation between the recognition result and the image data for visual recognition is to be suppressed. For example, when the imaging apparatus 1 is moving at high speed during imaging for an in-vehicle application, there might be a case of occurrence of a spatial deviation (for example, the positional deviation of the object in the two-dimensional plane) between the recognition result and the image data for visual recognition. Furthermore, in a case where a moving body moving at high speed is imaged by the imaging apparatus 1, spatial deviation might occur in the objects in the image data of the moving body. In the first modification of the fourth embodiment, such a deviation is to be suppressed based on the information acquired from an external sensor.

Figure 46:
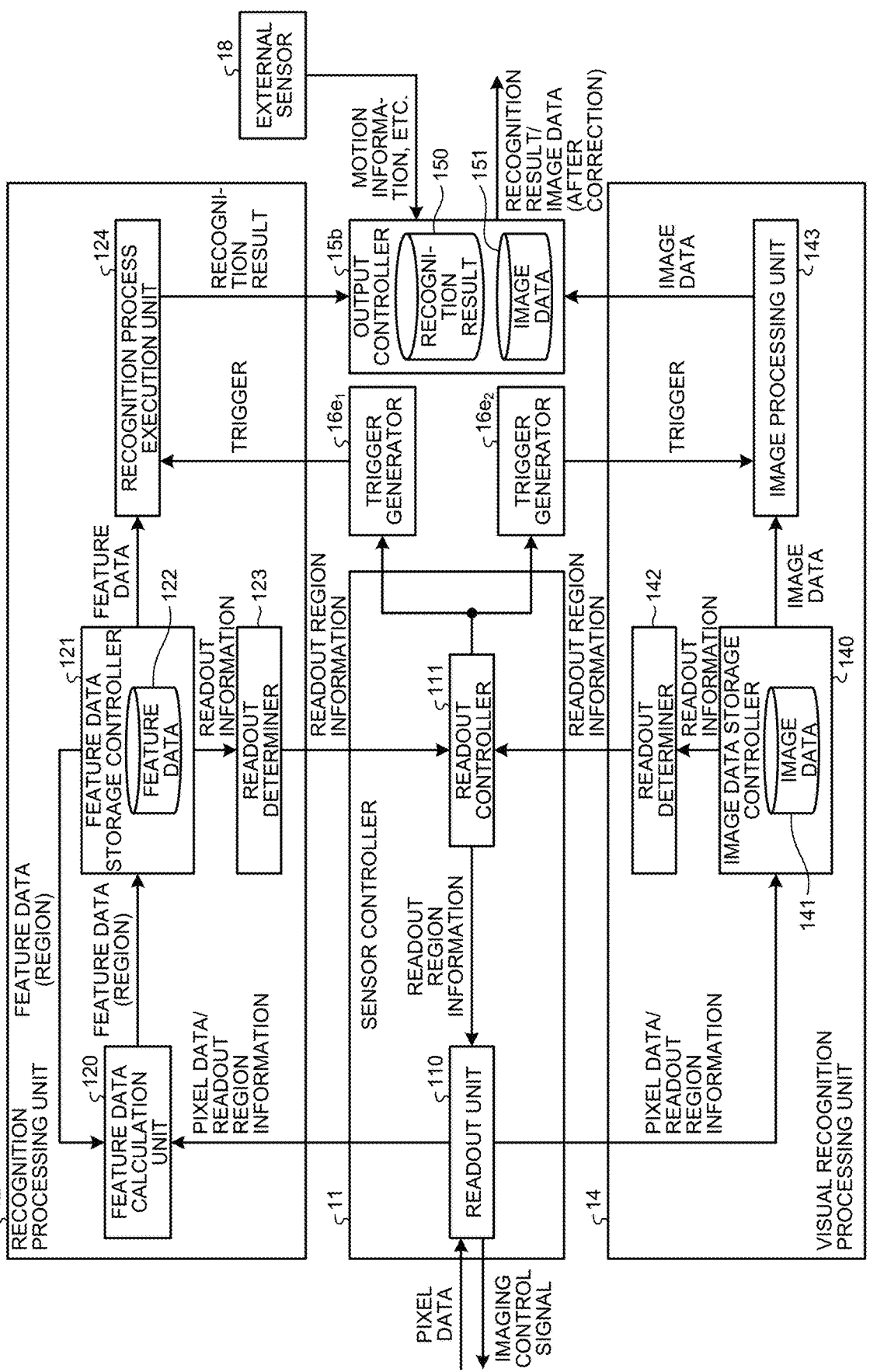
FIG. 46 is a functional block diagram illustrating a function of an example of an imaging apparatus according to a first modification of the fourth embodiment.

FIG. 46 is a functional block diagram illustrating a function of an example of an imaging apparatus 1 according to the first modification of the fourth embodiment. The configuration illustrated in FIG. 46 is an example of suppressing the spatial deviation that occurs when the imaging apparatus 1 moves at high speed.

In the configuration illustrated in FIG. 46, an output of the external sensor 18 is supplied to an output controller 15b, as compared to the configuration illustrated in FIG. 44 described above. The external sensor 18 is, for example, a device capable of detecting the movement of the imaging apparatus 1, and can be implemented by applying an angular velocity sensor mounted on the imaging apparatus. For example, angular velocity in each of directions is measured using a 3-axis gyro sensor, motion information of the imaging apparatus 1 is acquired, and the acquired motion information is input to the output controller 15$b$. Furthermore, the external sensor 18 can be implemented by using another imaging apparatus that performs moving image compression or camera shake correction using motion detection. This another imaging apparatus is movably installed integrally or synchronously with the imaging apparatus 1, and the detection result of motion detection in this another imaging apparatus is to be input to the output controller 15$b$ as motion information of the imaging apparatus 1.

Based on the motion information input from the external sensor 18 and the output timing of each of trigger signals output by the trigger generators $16_{e1}$ and $16_{e2}$, the output controller 15$b$ estimates a spatial deviation amount between the recognition result and the image data for visual recognition. For example, the output controller 15$b$ obtains a difference in the output timing of each of the trigger signals output by the trigger generators $16_{e1}$ and $16_{e2}$.

Note that input timing of the recognition result from the recognition process execution unit 124 to the output controller 15$b$ and the input timing of the image data for visual recognition from the image processing unit 143 to the output controller 15$b$ can be regarded as the output timings of the trigger signals individually output by the trigger generators $16_{e1}$ and $16_{e2}$.

Furthermore, the output controller 15$b$ obtains the movement direction and speed of the imaging apparatus 1 based on the motion information input from the external sensor 18. The output controller 15$b$ calculates the spatial deviation amount between the recognition result and the image data for visual recognition based on the difference in the output timing of individual trigger signals and the movement direction and speed of the imaging apparatus 1. The output controller 15$b$ corrects the image data for visual recognition stored in the cache memory 151 based on the calculated spatial deviation amount. Examples of the correction include trimming on the image data for visual recognition, tilt correction, or the like. The output controller 15$b$ stores the corrected image data for visual recognition in the cache memory 151.

The output controller 15$b$ outputs the recognition result stored in the cache memory 150 and the corrected image data for visual recognition stored in the cache memory 151 at a predetermined timing, for example, a timing synchronized with the frame period.

The above description is an example in which the output controller 15$b$ corrects the image data for visual recognition stored in the cache memory 151 based on the calculated spatial deviation amount. However, the present disclosure is not limited to this example. That is, the output controller 15$b$ can also correct the recognition result stored in the cache memory 150 based on the calculated spatial deviation amount. This includes a case where the output controller 15$b$ corrects the coordinate information of the recognized object included in the recognition result, for example, based on the calculated spatial deviation amount. Furthermore, the output controller 15$b$ may correct the recognition result and the image data for visual recognition, individually.

Figure 47:
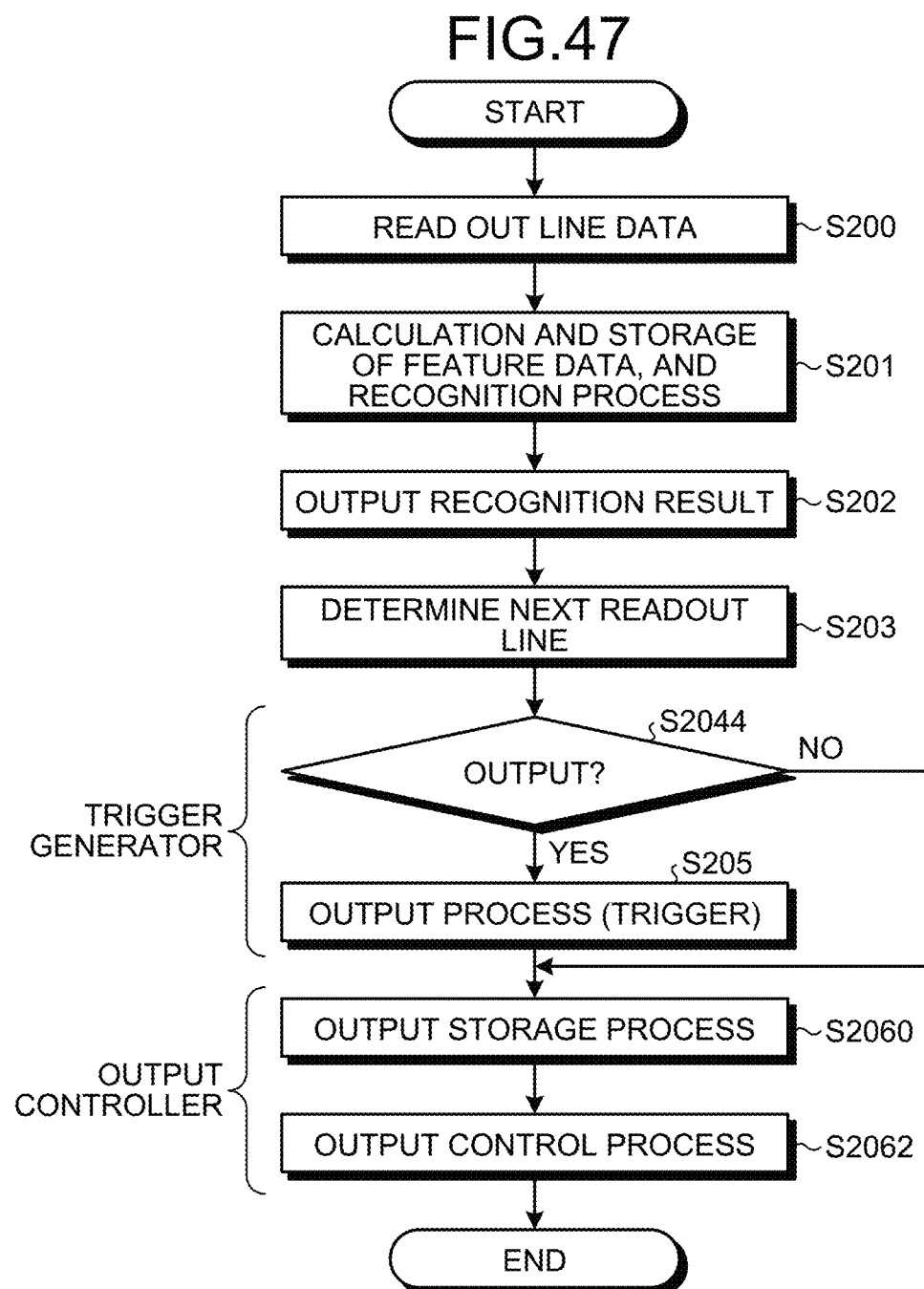
FIG. 47 is a flowchart of an example illustrating a process according to the first modification of the fourth embodiment.

FIG. 47 is a flowchart of an example illustrating the process according to the first modification of the fourth embodiment. In FIG. 47, the processes of Steps S200 to S203 are similar to the processes of Steps S200 to S203 according to the flowchart of FIG. 34 described above, and thus the description thereof will be omitted here. Furthermore, the processes of Step S204 and Step S205 of FIG. 47 are processes similar to the processes of Step S2044 and Step S205 of FIG. 45 described above, and are executed in parallel, for example, in the trigger generators $16_{e1}$ and $16_{e2}$, respectively. Detailed description of the processes of Steps S2044 and S205 will be omitted here.

The trigger generator $16_{e1}$ determines in Step S2044 whether to allow the recognition process execution unit 124 to output the recognition result similarly to Step S2044 of the flowchart of FIG. 45 described above. When the trigger generator $16_{e1}$ determines that the recognition result is not to be output at a current point (Step S2044, "No"), the trigger generator $16_{e1}$ proceeds to the process of Step S2060.

In contrast, when the trigger generator 15$f$ determines in Step S2044 to output the recognition result (Step S2044, "Yes"), the trigger generator 15$f$ proceeds to the process of Step S205. In Step S205, the trigger generator $16_{e1}$ executes an output process of outputting a trigger signal to the recognition process execution unit 124. When the output process is executed, the process proceeds to Step S2060.

The process in the trigger generator $16_{e2}$ is similar to the process in the trigger generator $16_{e1}$. That is, the trigger generator $16_{e2}$ determines, in Step S2044, whether to allow the image processing unit 143 to output the image data for visual recognition. When the trigger generator $16_{e1}$ determines that the recognition result is not to be output at a current point (Step S2044, "No"), the trigger generator $16_{e1}$ proceeds to the process of Step S2060. In contrast, when the trigger generator 15$f$ determines that the recognition result is to be output (Step S2044, "Yes"), the process proceed to Step S205. In Step S205, the trigger generator $16_{e2}$ executes an output process of outputting a trigger signal to the image processing unit 143. When the output process is executed, the process proceeds to Step S2060.

The process of Step S2060 and the process of Step S2062 following Step S2060 are processes executed by the output controller 15$b$. The output controller 15$b$ executes the output control process individually on the recognition result output from the recognition process execution unit 124 and the image data for visual recognition output from the image processing unit 143.

The output controller 15$b$ stores the recognition result output from the recognition process execution unit 124 in the cache memory 150 in Step S2060, so as to perform an output storage process. After the output controller 15$a$ has stored the recognition result in the cache memory 150, the output controller 15$a$ proceeds to the process of Step S2062.

In Step S2062, the output controller 15$b$ performs a correction process on the image data for visual recognition stored in the cache memory 151 in Step S2060 using the motion information input from the external sensor 18, and stores the corrected image data for visual recognition in the cache memory 151. Not limited to this, in Step S2062, the output controller 15$b$ may perform the correction process on the recognition result stored in the cache memory 150 in Step S2060. The output controller 15$b$ stores the corrected recognition result in the cache memory 150.

The output controller 15$b$ outputs the recognition result stored in the cache memory 150 and the corrected image data for visual recognition stored in the cache memory 151 at a predetermined timing.

In this manner, in the first modification of the fourth embodiment, the recognition result and the image data for visual recognition are individually cached, and the recognition result or the image data for visual recognition is corrected using the motion information input from the external sensor 18. This makes it possible to output the recognition result and the image data for visual recognition in a state suppressing the spatial deviation between the recognition result and the image data for visual recognition.

7-2. Second Modification of Fourth Embodiment

Next, a second modification of the fourth embodiment will be described. The second modification of the fourth embodiment is an example in which the readout of pixel data by the visual recognition processing unit 14 after the recognition process by the recognition processing unit 12 is performed at high speed so as to suppress the difference between the output timing of the recognition result and the output timing of the image data for visual recognition.

Figure 48:
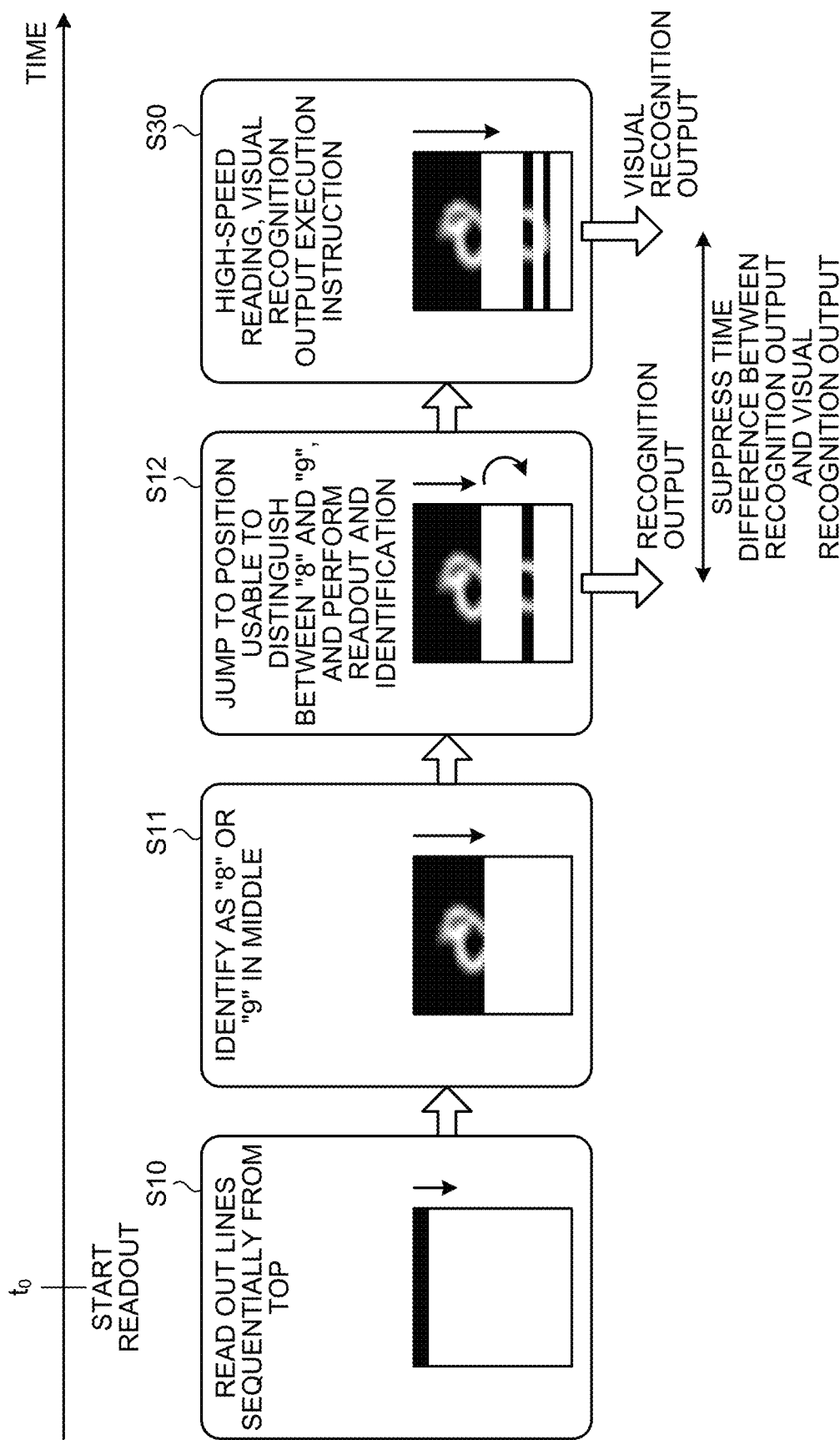
FIG. 48 is a schematic diagram schematically illustrating an example of an output control process according to a second modification of the fourth embodiment.

FIG. 48 is a schematic diagram schematically illustrating an example of an output control process according to the second modification of the fourth embodiment. In FIG. 48, Steps S10 to S12 are diagrams corresponding to FIG. 32 described above, and schematically illustrate a state of frame readout by the sensor controller 11. That is, the frames are read out sequentially in the order of lines in Step S10, and the process jumps to the position at which it is predicted that the object is identifiable and the readout is performed in Step S11. Subsequently, the recognition result is output in Step S12.

In FIG. 48, the recognition result has been output in a state where all the line data of the frame has not been read out in Step S12. Accordingly, in the next Step S20, the visual recognition processing unit 14 performs readout of the line that has not been read out in the processes up to Step S12 in the frame. At this time, the visual recognition processing unit 14 executes frame readout at a readout rate higher than the readout rate regarding the readout performed by the recognition processing unit 12 in the processes up to Step S12. The visual recognition processing unit 14 finishes readout at a predetermined timing and outputs image data for visual recognition.

This makes it possible, in the second modification of the fourth embodiment, to suppress the time difference between the output timing of the recognition result and the output timing of the image data for visual recognition.

Figure 49:
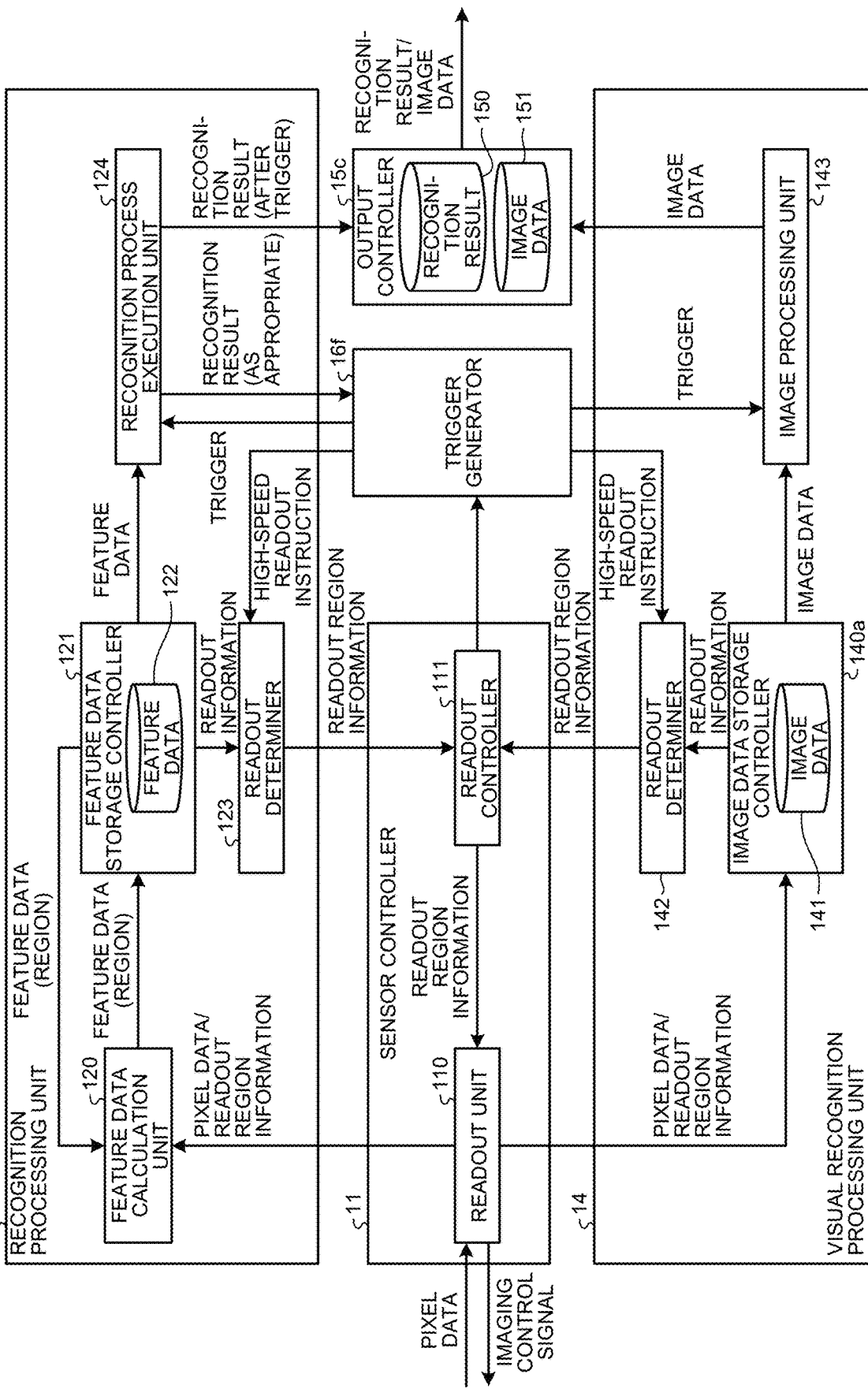
FIG. 49 is a functional block diagram illustrating a function of an example of an imaging apparatus 1 according to the second modification of the fourth embodiment.

FIG. 49 is a functional block diagram illustrating a function of an example of an imaging apparatus 1 according to the second modification of the fourth embodiment. In FIG. 49, supplied with the recognition result from the recognition process execution unit 124 as appropriate, a trigger generator 16f generates a trigger signal based on the recognition confidence score, that is passed in the formed of being included in the recognition result from the recognition process execution unit 124, as described in the second modification of the third embodiment (refer to FIGS. 38 to 40).

The trigger generator 16f generates a trigger signal at time $t_{TRG}$ when the recognition confidence score included in the recognition result passed from the recognition process execution unit 124 reaches the threshold $C_{th}$. In response to this trigger signal, the recognition process execution unit 124 passes the recognition result to an output controller 15c. The output controller 15c stores the received recognition result in the cache memory 150.

On the other hand, the trigger generator 16f outputs a trigger signal to the recognition process execution unit 124, generates a high-speed readout instruction instructing higher speed readout of pixel data from the sensor unit 10, and passes the high-speed readout instruction to the readout determiner 142.

The readout determiner 142 generates readout region information including the high-speed readout instruction passed from the output controller 15b, and passes the generated readout region information to the sensor controller 11. In the sensor controller 11, the readout region information including the high-speed readout instruction is passed from the readout controller 111 to the readout unit 110. In response to the high-speed readout instruction included in the readout region information, the readout unit 110 generates an imaging control signal for driving the sensor unit 10 at a drive speed higher than the drive speed before the occurrence of the trigger signal. The sensor unit 10 drives the sensor unit 10 at high speed in accordance with the imaging control signal, and reads out pixel data at a higher speed than before occurrence of the trigger signal.

The pixel data read out by the readout unit 110 is passed to the image processing unit 143 as image data for visual recognition via the image data storage controller 140. The image processing unit 143 performs image processing on the received image data and passes the processed data to the output controller 15c. The output controller 15c stores the image data passed from the image processing unit 143 in the cache memory 151. The output controller 15c reads out the recognition result stored in the cache memory 150 and the image data for visual recognition stored in the cache memory 151 at a predetermined timing, for example, a timing synchronized with the frame period, and outputs the data individually.

Figure 50:
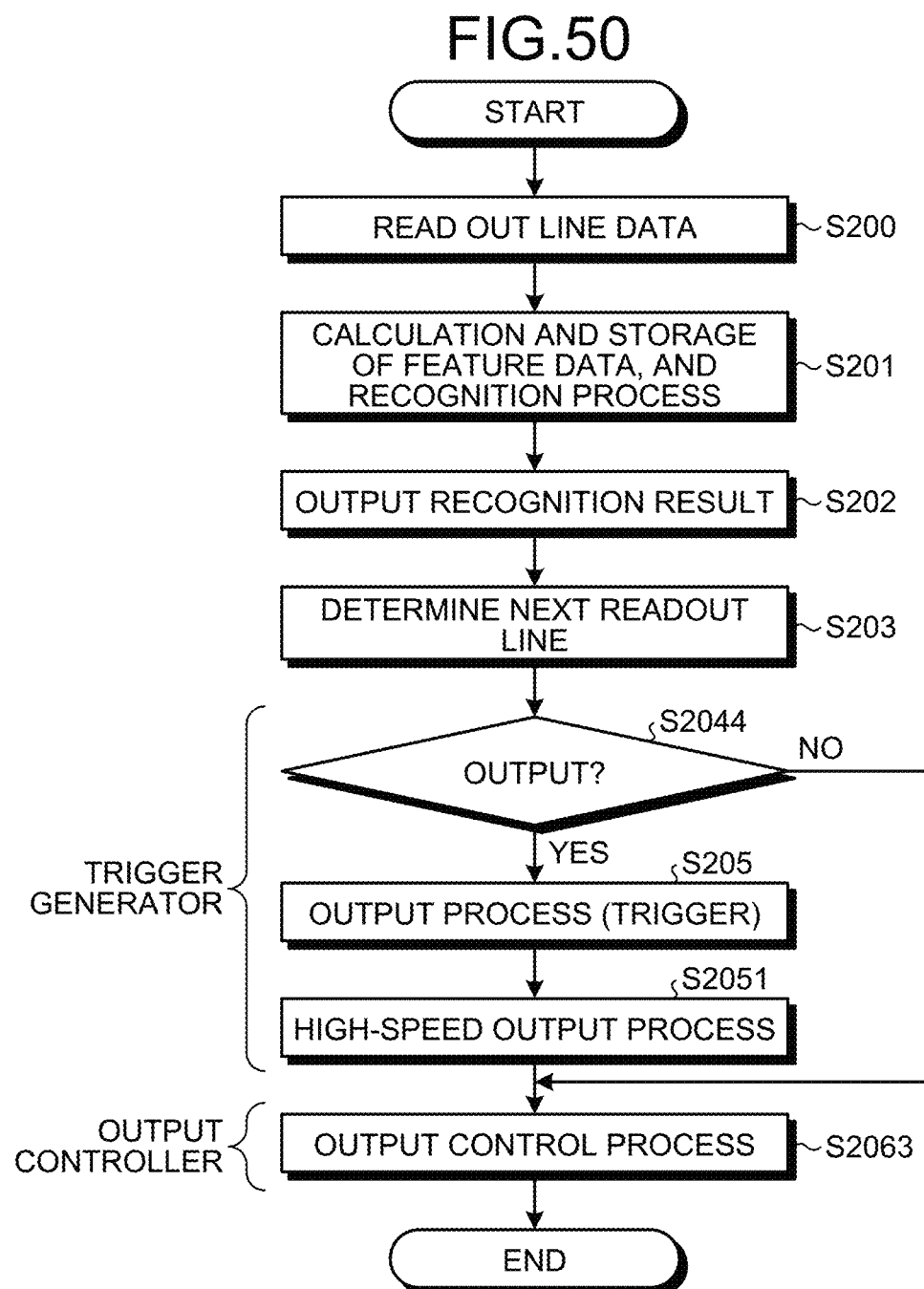
FIG. 50 is a flowchart of an example illustrating a process according to the first modification of the fourth embodiment.

FIG. 50 is a flowchart of an example illustrating the process according to the first modification of the fourth embodiment. In FIG. 50, the processes of Steps S200 to S203 are similar to the processes of Steps S200 to S203 according to the flowchart of FIG. 34 described above, and thus the description thereof will be omitted here. Furthermore, the processes of Step S204 and Step S205 of FIG. 50 are processes similar to the processes of Step S2044 and Step S205 of FIG. 50 described above, and are executed in parallel, for example, in the trigger generators $16_{e1}$ and $16_{e2}$, respectively. Detailed description of the processes of Steps S2044 and S205 will be omitted here.

The trigger generator $16_{e1}$ determines in Step S2044 whether to allow the recognition process execution unit 124 to output the recognition result similarly to Step S2044 of the flowchart of FIG. 45 described above. When the trigger generator $16_{e1}$ determines not to output the recognition result at a current point (Step S2044, "No"), the trigger generator $16_{e1}$ proceeds to the process of Step S2063. In contrast, when the trigger generator 16f determines that the recognition result is to be output (Step S2044, "Yes"), the process proceed to Step S205. In Step S205, the trigger generator $16_{e1}$ executes an output process of outputting a trigger signal to the recognition process execution unit 124. When the output process is executed, the process proceeds to Step S2051.

In Step S2051, a high-speed readout process is performed. That is, in Step S2051, the trigger generator 16f generates a high-speed readout instruction and passes the instruction to the readout determiner 142. This high-speed readout instruction is included in the readout region information generated by the readout determiner 142 and passed to the sensor controller 11. The sensor controller 11 passes the received readout region information to the readout unit 110. The readout unit 110 drives the sensor unit 10 at a higher speed in response to the high-speed readout instruction included in the received readout region information. At this time, the readout unit 110 may perform readout with thinning on the sensor unit 10 to increase the readout speed, or may reduce the bit depth of the image data to be read out so as to increase the readout speed.

Having read out pixel data from the sensor unit 10 driven at high speed, the readout unit 110 passes the pixel data to the visual recognition processing unit 14. The visual recognition processing unit 14 passes the pixel data received from the readout unit 110 to the image processing unit 143 via the image data storage controller 140. The image processing unit 143 performs image processing on the received image data and outputs the processed data as image data for visual recognition. The image data for visual recognition output from the image processing unit 143 is passed to the output controller 15c and stored in the cache memory 151.

In the next Step S2063, the output controller 15c outputs the recognition result stored in the cache memory 150 and the corrected image data for visual recognition stored in the cache memory 151 at a predetermined timing, for example, the timing synchronized with the frame period.

In this manner, in the second modification of the fourth embodiment, after the recognition result is output, the image data for visual recognition is acquired by high-speed readout, and the acquired image data for visual recognition and the recognition result are output at a predetermined timing. This makes it possible to output the recognition result and the image data for visual recognition in a state suppressing the time lag between the recognition result and the image data for visual recognition.

Although the above description is an example in which the high-speed readout for image data for visual recognition is performed after the output of the recognition result, the present disclosure is not limited to this example. That is, high-speed readout for recognition processes may be performed after completion of the readout of the image data for visual recognition process.

In this case, the trigger generator 16f generates a high-speed readout instruction in accordance with the output of the trigger signal to the image processing unit 143, and passes the generated high-speed readout instruction to the readout determiner 123 via a path illustrated in dotted line in FIG. 49. This high-speed readout instruction is included in the readout region information generated by the readout determiner 142 and passed to the sensor controller 11. The sensor controller 11 passes the received readout region information to the readout unit 110. The readout unit 110 drives the sensor unit 10 at a higher speed in response to the high-speed readout instruction included in the received readout region information. The readout unit 110 reads out pixel data from the sensor unit 10 driven at high speed and passes the pixel data to the recognition processing unit 12.

8. Fifth Embodiment

Next, a fifth embodiment will be described. The fifth embodiment is an example in which mediation is performed between the readout region in which the recognition processing unit 12 performs readout and the readout region in which the visual recognition processing unit 14 performs readout. For example, when one of the recognition processing unit 12 or the visual recognition processing unit 14 performs line readout by line thinning and the other performs readout sequentially in the order of lines, the target line of the lineout will differ between the recognition processing unit 12 and the visual recognition processing unit 14 at a certain timing. In such a case, mediation of the readout region is performed between the recognition processing unit 12 and the visual recognition processing unit 14 so as to determine the line as the target of the readout.

Figure 51:
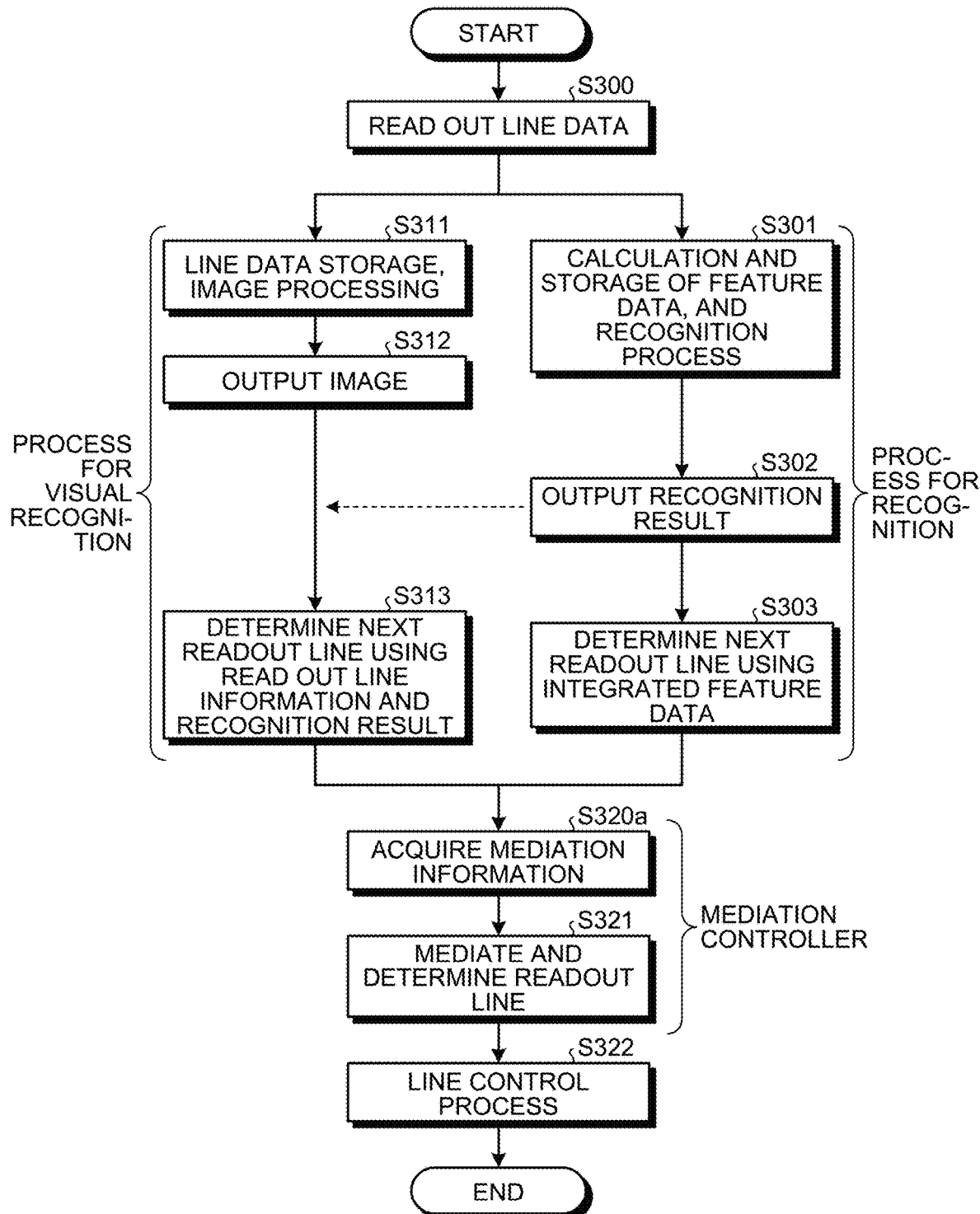
FIG. 51 is a flowchart of an example illustrating an outline of a mediation process according to a fifth embodiment.

FIG. 51 is a flowchart of an example illustrating an outline of a mediation process according to the fifth embodiment. The process in the flowchart of FIG. 51 is a process executed for each of times of readout of the unit of readout. In the following, it is assumed that the unit of readout is a line, and the sensor controller 11 reads out pixel data from the sensor unit 10 in the unit of line.

The process according to the flowchart of FIG. 51 will be described with reference to FIG. 21. In Step S300, the readout unit 110 reads out pixel data (line data) in the unit of line from the sensor unit 10. The readout unit 110 passes the line data read out from the sensor unit 10 to the recognition processing unit 12 and the visual recognition processing unit 14. The visual recognition processing unit 14 passes the pixel data passed from the readout unit 110 to the image data storage controller 140. The image data storage controller 140 stores the received pixel data in the image data storage unit 141, for example, and passes the data to the image processing unit 143.

When the processing of Step S300 is completed, the process proceeds to Step S301 and Step S311. The processes of Steps S301 to S303 are processes in the recognition processing unit 12. In contrast, the processes of Steps S311 to S313 are processes in the visual recognition processing unit 14. The process in the recognition processing unit 12 and the process in the visual recognition processing unit 14 can be executed in parallel.

First, the process by the recognition processing unit 12 from Step S301 will be described. In Step S301, the recognition processing unit 12 executes calculation of the feature data by the feature data calculation unit 120 based on the line data passed from the readout unit 110, storage of the calculated feature data in the feature data storage unit 122, and a recognition process by a recognition process execution unit 124 based on the integrated feature data stored in the feature data storage unit 122, or the like. In the next Step S302, the recognition processing unit 12 outputs a recognition result of the recognition process from the recognition process execution unit 124. In the next Step S303, in the recognition processing unit 12, the readout determiner 123 uses the integrated feature data to generate readout line information indicating the next readout line as readout region information and passes the generated information to the sensor controller 11. When the process of Step S303 is completed, the process proceeds to Step S320a.

Next, the processes performed by the visual recognition processing unit 14 from Step S311 will be described. In Step S311, the visual recognition processing unit 14 executes storage of the line data passed from the readout unit 110 in the image data storage unit 141, image processing on the image data stored in the image data storage unit 141 by the image processing unit 143, or the like. In the next Step S312, the image processing unit 143 in the visual recognition processing unit 14 outputs the image data subjected to the image processing in Step S311. In the next Step S312, the readout determiner 142 in the visual recognition processing unit 14 uses the line information of the line read out in Step S300 and the recognition result output by the recognition processing unit 12 in Step S302 to generate readout line information indicating the next readout line as readout region information and passes the generated information the sensor controller 11. When the processing of Step S313 is completed, the process proceeds to Step S320a.

In Step S320a, the sensor controller 11 acquires mediation information for use in mediation for the readout region by a mediation controller described below. Specific examples of mediation information will be described below.

In the next Step S321, the mediation controller uses the mediation information acquired in Step S320a to determine which of the readout line indicated by the readout line information passed from the recognition processing unit 12 in Step S303 and the readout line indicated by the readout line information passed from the visual recognition processing unit 14 in Step S313 will be used as the readout line for the next readout. In the next Step S322, the sensor controller 11 executes a line control process for performing the readout of the readout line determined by the mediation controller in Step S321.

In this manner, in the fifth embodiment, the mediation controller performs mediation of the readout line to be read out next between the recognition processing unit 12 and the visual recognition processing unit 14 based on the mediation information acquired in a predetermined manner. Therefore, for example, even when the recognition processing unit 12 and the visual recognition processing unit 14 have determined different lines as the readout lines, it is possible to avoid occurrence of a problem in performing readout of lines.

8-0-1. Specific Example of Mediation Process

Figure 52:
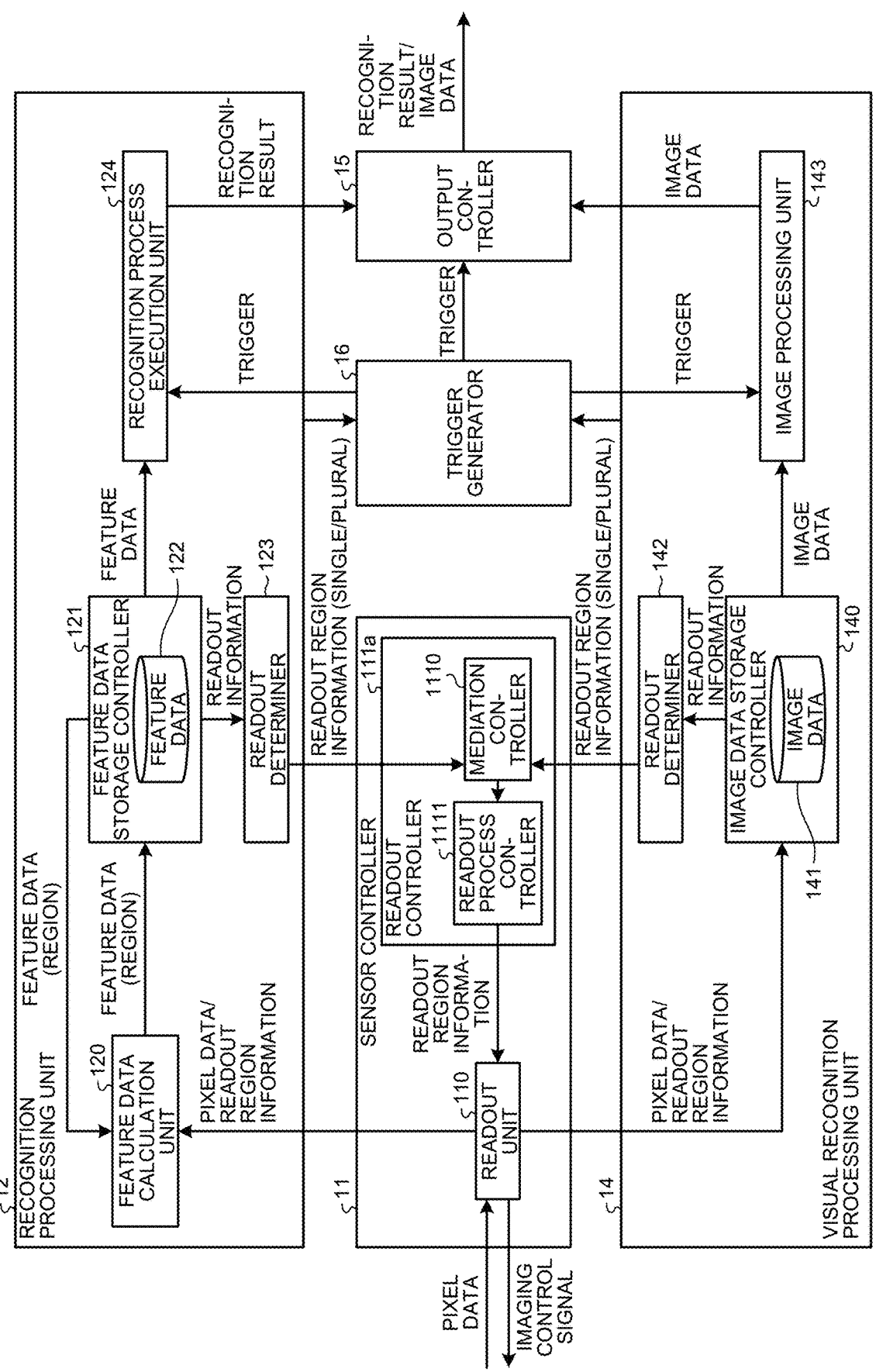
FIG. 52 is a functional block diagram of an example illustrating the function of the imaging apparatus 1 applicable to the fifth embodiment.

Next, the mediation process according to the fifth embodiment will be described more specifically. FIG. 52 is a functional block diagram of an example illustrating the function of the imaging apparatus 1 applicable to the fifth embodiment.

In a configuration illustrated in FIG. 52, a readout controller 111a in the sensor controller 11 includes a mediation controller 1110 and a readout process controller 1111, as compared to the configuration illustrated in FIG. 21. One or more pieces of readout region information individually from the readout determiner 123 of the recognition processing unit 12 and the readout determiner 142 of the visual recognition processing unit 14 are input to the mediation controller 1110 as control signals for controlling the mediation process. In other words, the mediation controller 1110 in this example uses this control signal as mediation information for performing mediation control.

Here, it is assumed that one piece of readout region information indicates one line. That is, the mediation controller 1110 receives input of one or more pieces of line information individually from the readout determiners 123 and 142.

In the fifth embodiment, the mediation controller 1110 obtains a logical product of the control signal input from the readout determiner 123 and the control signal input from the visual recognition processing unit 14 so as to determine one readout line for the next readout.

The mediation controller 1110 passes a control signal indicating a readout line determined by the mediation process to the readout process controller 1111. The readout process controller 1111 passes the received control signal to the readout unit 110 as readout region information indicating a readout line.

In the configuration of FIG. 52, the output controller 15 outputs the recognition result output from the recognition process execution unit 124 and the image data for visual recognition output from the image processing unit 143, to a device in the subsequent stage. Here, the device in the subsequent stage can be implemented by applying another sensor device that performs recognition process. In this case, the recognition result and image data for visual recognition output from the imaging apparatus 1 can be applied to the recognition process on the other sensor device.

Figure 53:
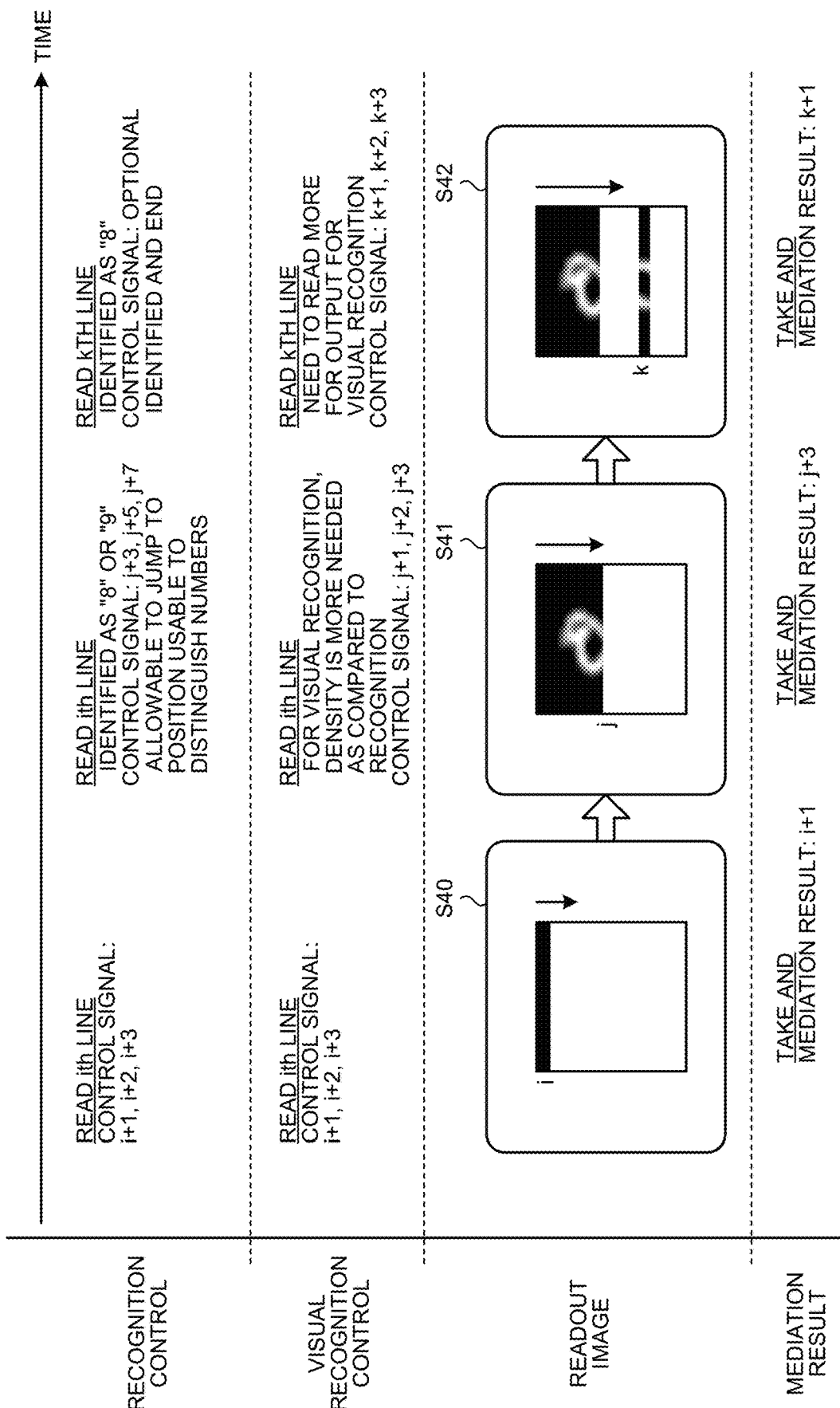
FIG. 53 is a schematic diagram illustrating the mediation process according to the fifth embodiment.

FIG. 53 is a schematic diagram illustrating the mediation process according to the fifth embodiment. FIG. 53 illustrates an example in which the mediation controller 1110 performs a mediation process based on a control signal. Here, the readout region information is used as the control signal.

FIG. 53 illustrates that time passes to the right. Furthermore, the vertical direction indicates the recognition control by the recognition processing unit 12, the visual recognition control by the visual recognition processing unit 14, the readout image read out from the sensor unit 10, and the mediation result by the mediation controller 1110 individually. As described above, the mediation controller 1110 performs mediation by obtaining a logical product of the control signal (readout region information) output by the recognition processing unit 12 and the control signal output by the visual recognition processing unit 14.

In Step S40, the recognition processing unit 12 and the visual recognition processing unit 14 generate readout region information for the readout of the i-th line (i-line). The recognition processing unit 12 outputs readout region information for the readout of the three lines of the (i+1) line, the (i+2) line, and the (i+3) line, individually. Similarly, the visual recognition processing unit 14 also outputs control signals for the readout of the three lines of the (i+1) line, the (i+2) line, and the (i+3) line, individually. The readout region information output from the recognition processing unit 12 and the readout region information output from the visual recognition processing unit 14 are each input to the mediation controller 1110 as control signals to be used by the mediation controller 1110 to perform mediation control.

The mediation controller 1110 obtains the logical product of the individual control signals for the (i+1) line, the (i+2) line, and the (i+3) line from the recognition processing unit 12 and the individual control signals for the (i+1) line, the (i+2) line, and the (i+3) line from the visual recognition processing unit 14. Here, since individual control signals from the recognition processing unit 12 and individual control signals from the visual recognition processing unit 14 match, all the lines indicated by the individual control signals can be read out. The mediation controller 1110 selects the (i+1) line, the (i+2) line, and the (i+3) line one by one in accordance with the readout order in the frame, and sequentially outputs the lines. The mediation controller 1110 first selects, for example, the control signal indicating the (i+1) line, which is closest to the upper end of the frame among the (i+1) line, the (i+2) line, and the (i+3) line, as a mediation result. Thereafter, the mediation controller 1110 selects the control signal indicating the (i+2) line, the control signal indicating the (i+3) line, that is, select control signals one by one sequentially in the order of lines.

The mediation controller 1110 passes the control signal selected as the mediation result to the readout process controller 1111. The readout process controller 1111 passes the control signal received from the mediation controller 1110 to the readout unit 110 as readout region information. The readout unit 110 reads out the line data of the line ((i+1) line) indicated in the readout region information, from the sensor unit 10. The readout unit 110 passes the line data of the (i+1) line read out from the sensor unit 10 to the recognition processing unit 12 and the visual recognition processing unit 14.

With this processes, in Step S40, as illustrated in the readout image of FIG. 53, line data is read out sequentially in the order of lines from, for example, line L #i on the upper end side of the frame toward the lower end side of the frame.

The frame is read out sequentially in the order of lines, and it is assumed that, at a point where the frame is read out up to the jth line (jth line) near the center, for example, the recognition processing unit 12 has recognized the number "8" or "9" based on the read out line data (Step S41).

The recognition processing unit 12 can perform readout by skipping the line to the line from which it is predicted that the object recognized in Step S41 can be identified as which of the numbers "8" or "9". In this example, the recognition processing unit 12 outputs readout region information to individually read out three lines, namely, the (j+3) line, the (j+5) line, and the (j+7) line, so as to perform thinning every one line in the readout. Each of pieces of readout region information output from the recognition processing unit 12 is input to the mediation controller 1110 as each control information for the mediation controller 1110 to perform mediation control.

On the other hand, since the image for visual recognition needs to be dense in the recognition ratio, the visual recognition processing unit 14 has the first (j+1) line, the (j+2) line, and the (j+3) line. The readout region information for reading three lines in sequence is output. Each of pieces of readout region information output from the visual recognition processing unit 14 is input to the mediation controller 1110 as each control information for the mediation controller 1110 to perform mediation control.

The mediation controller 1110 obtains a logical product of each of the control signals passed from the recognition processing unit 12 and each of the control signals passed from the visual recognition processing unit 14. In this case, each of the control signals passed from the recognition processing unit 12 corresponds to the (j+3) line, the (j+5) line, and the (j+7) line, and each of the control signals passed from the visual recognition processing unit 14 corresponds to the (j+1) line, the (j+2) line, and the (j+3) line. Therefore, by obtaining the logical product by the mediation controller 1110, the control signal indicating the (j+3) line is output from the mediation controller 1110 as the mediation result.

Next, it is assumed that at a point when the k-th line on the lower end side of the frame is read out from the j-th line described above in Step S42, the object identified as either the number "8" or "9" in Step S41 is determined to be the number "8". In this case, the recognition processing unit 12 can end the recognition process. When the recognition process is completed, the control signal input from the recognition processing unit 12 to the mediation controller 1110 may be optional.

On the other hand, regarding the image for visual recognition, it is necessary to further read out lines. In this example, the visual recognition processing unit 14 outputs readout region information for the readout of three lines sequentially in the line order of the (k+1) line, the (k+2) line, and the (k+3) line, individually.

When the recognition process by the recognition processing unit 12 is completed, the mediation controller 1110 disregards the control signal input from the recognition processing unit 12, for example. Therefore, for example, the mediation controller 1110 selects the first (k+1) line, the (k+2) line, and the (k+3) line indicated by the control signal input from the visual recognition processing unit 14 one by one in accordance with the readout order within the frame, and sequentially outputs the lines. The mediation controller 1110 first selects, for example, the control signal indicating the (k+1) line, which is closer to the upper end of the frame among the (k+1) line, the (k+2) line, and the (k+3) line, as a mediation result.

In this manner, in the fifth embodiment, the mediation controller 1110 obtains the logical product of each of the control signals input from the recognition processing unit 12 and each of the control signals input from the visual recognition processing unit 14 and thereby performs mediation so as to determine the readout line to be read out next. Therefore, for example, even when the recognition processing unit 12 and the visual recognition processing unit 14 have determined different lines as the readout lines, it is possible to avoid an occurrence of a problem in performing readout of lines.

Incidentally, there may be a case where the line indicated by the control signal input from the recognition processing unit 12 and the line indicated by the control signal input from the visual recognition processing unit 14 are not duplicated. For example, when individual control signals input from the recognition processing unit 12 to the mediation controller 1110 are related to the (i+1) line, the (i+3) line, and the (i+5) line, and individual control signals input from the visual recognition processing unit 14 to the mediation controller 1110 are related to the (i+2) line, the (i+4) line, and the (i+6) line, there would be no duplication between the lines.

Obtaining the logical product of both by the mediation controller 1110 would produce an output of empty set, leading to no determination of the readout line to be read out next. As a first example for avoiding this, it is conceivable to preliminarily determine the control signal to be used with higher priority among the control signal input from the recognition processing unit 12 and the control signal input from the visual recognition processing unit 14. As an example, the control signal input from the recognition processing unit 12 is selected with higher priority over the control signal input from the visual recognition processing unit 14. At this time, it is conceivable to adopt a control signal closer to the control signal input from the visual recognition processing unit 14 among the control signals input from the prioritized recognition processing unit 12.

As a second example, it is conceivable that the recognition processing unit 12 and the visual recognition processing unit 14 set a limit in advance on the number of pieces of readout region information that can be output. For example, in each of the recognition processing unit 12 and the visual recognition processing unit 14, three lines out of sequentially adjacent five lines are selected as candidates.

Figure 54:
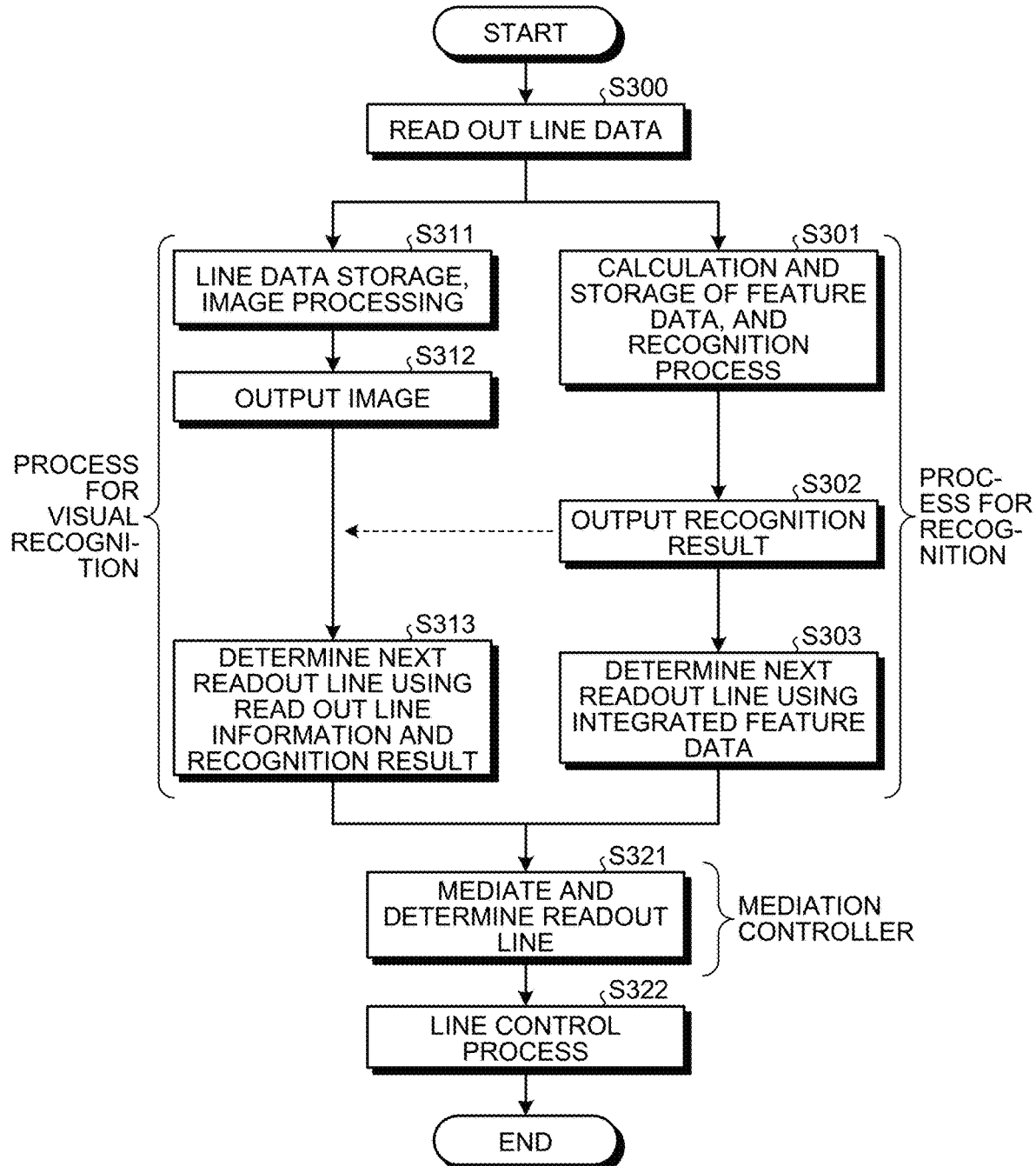
FIG. 54 is an exemplary flowchart illustrating a mediation process according to the fifth embodiment.

FIG. 54 is an example flowchart illustrating the mediation process according to the fifth embodiment. The process according to the flowchart of FIG. 54 is a process executed for each of times of readout of the unit of readout.

In Step S300, the readout unit 110 reads line data from the sensor unit 10. The readout unit 110 passes the line data read out from the sensor unit 10 to the recognition processing unit 12 and the visual recognition processing unit 14. Hereinafter, the processes on the recognition processing unit 12 side of Steps S301 to S303 and the processes on the visual recognition processing unit 14 side in Steps S311 to S313 in FIG. 54 are the same as the corresponding processes in FIG. 51 described above, and thus the explanation here is omitted.

In FIG. 54, in Step S303, as described above, the recognition processing unit 12 generates readout line information indicating the next readout line as readout region information and passes the generated information to the sensor controller 11. The readout region information passed to the sensor controller 11 will be input to the mediation controller 1110 as control information. Similarly, in Step S313, the visual recognition processing unit 14 generates readout line information indicating the next readout line as readout region information and passes the generated information to the sensor controller 11. The readout region information passed to the sensor controller 11 will be input to the mediation controller 1110 as control information.

After a control signal is input from the recognition processing unit 12 and the visual recognition processing unit 14 to the mediation controller 1110 in Steps S303 and S313, the process proceeds to Step S321. In Step S321, the mediation controller performs mediation of individual control signals by using individual control signals input from the recognition processing unit 12 and the visual recognition processing unit 14 as mediation information. This mediation determines which of the readout line indicated by the control signal passed from the recognition processing unit 12 in Step S303 and the readout line indicated by the control signal passed from the visual recognition processing unit 14 in Step S313 is defined as a readout line to be read out next. In the next Step S322, the sensor controller 11 executes a line control process for performing the readout of the readout line determined by the mediation controller in Step S321.

8-1. First Modification of Fifth Embodiment

Figure 55:
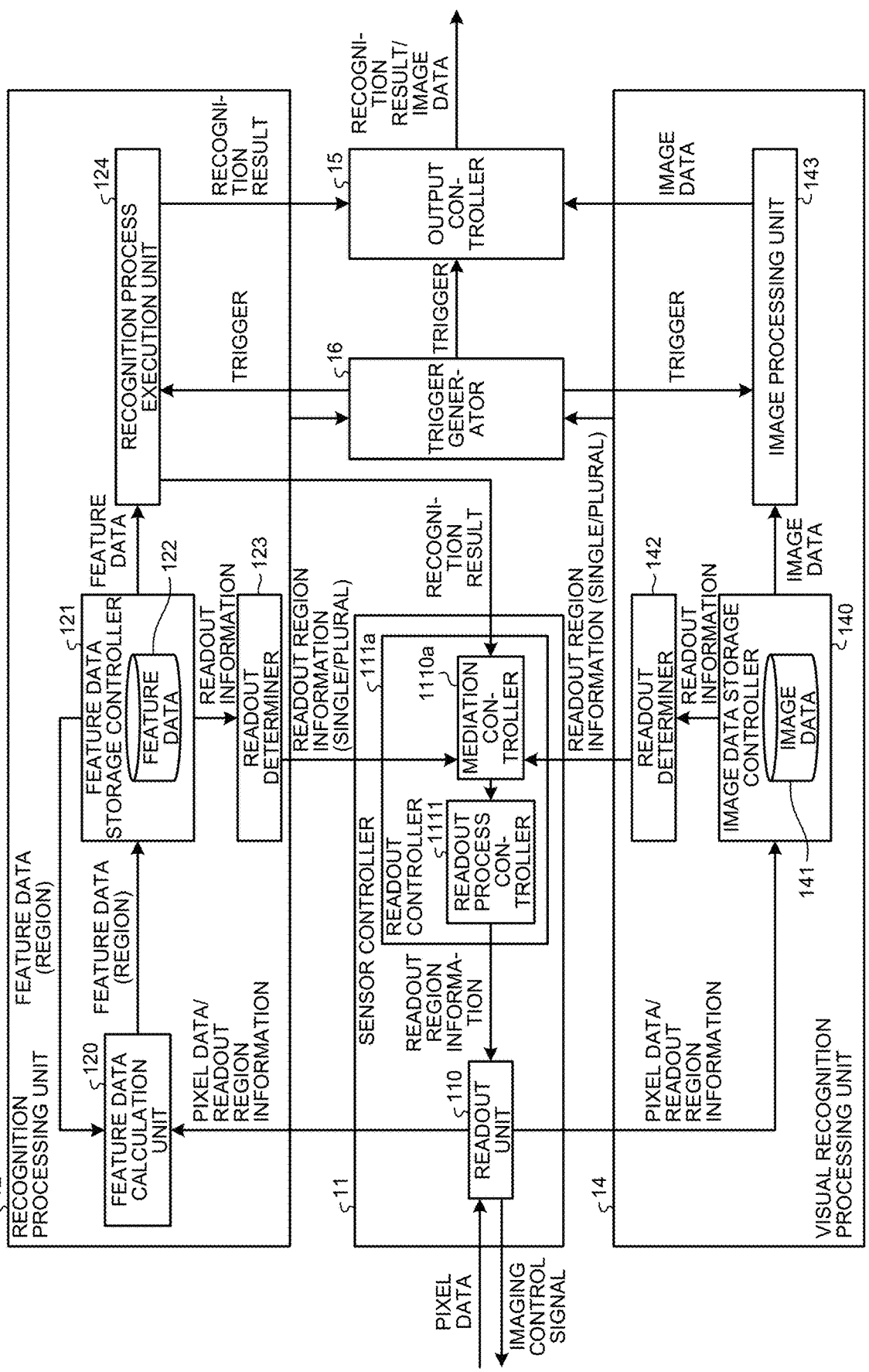
FIG. 55 is a functional block diagram of an example illustrating the function of the imaging apparatus applicable to the first modification of the fifth embodiment.

Next, a first modification of the fifth embodiment will be described. The first modification of the fifth embodiment is an example in which the recognition result by the recognition processing unit 12 is applied as the mediation information used by a mediation controller 1110a for the mediation process. FIG. 55 is a functional block diagram of an example illustrating functions of the imaging apparatus 1 applicable to the first modification of the fifth embodiment.

In the configuration illustrated in FIG. 55, the recognition result output from the recognition process execution unit 124 is input to a mediation controller 1110ab, as compared to the configuration illustrated in FIG. 51 described above. The mediation controller 1110ab according to the first modification of the fifth embodiment uses this recognition result as mediation information, and thereby performs a mediation process between the readout region information input from the recognition processing unit 12 and the readout region information input from the visual recognition processing unit 14.

Figure 56:
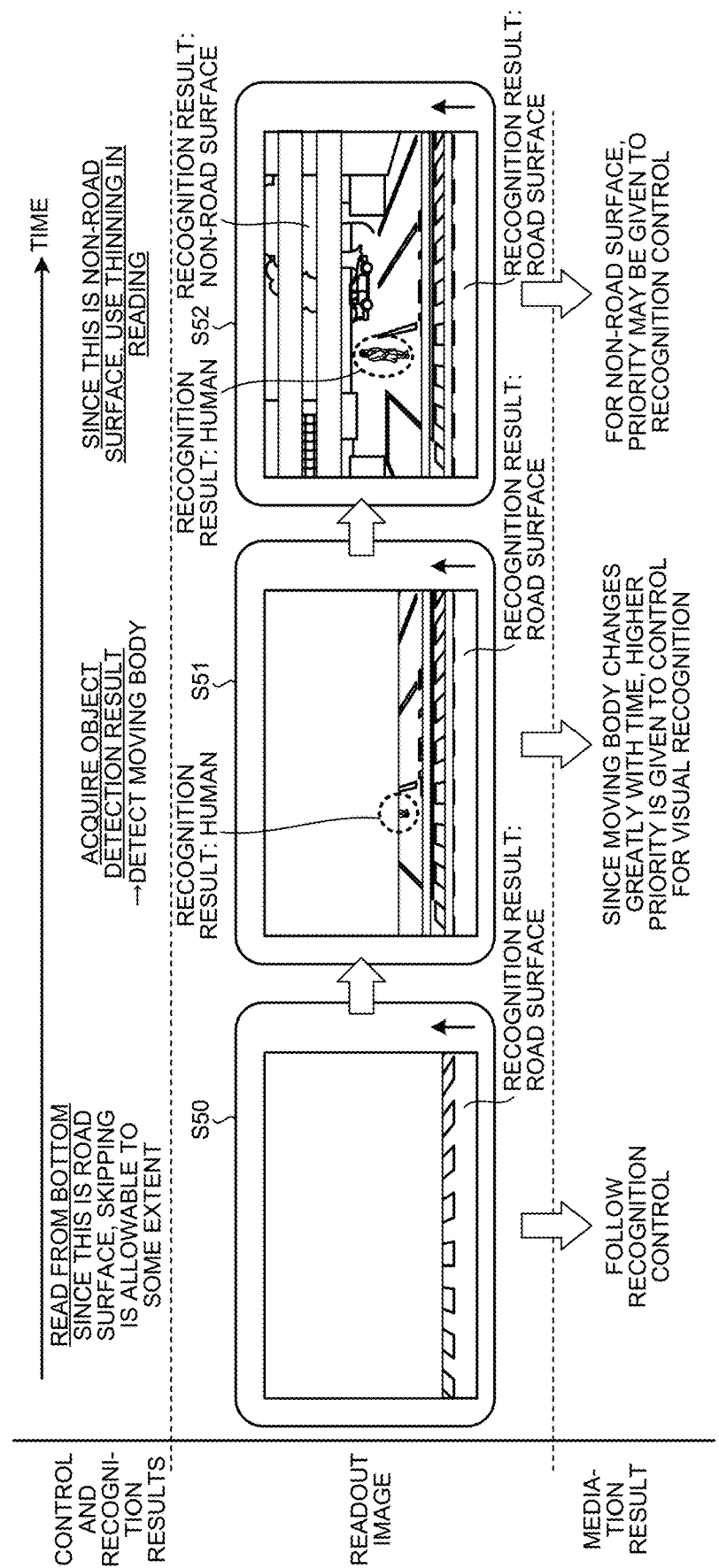
FIG. 56 is a schematic diagram illustrating a first example of a mediation process according to a first modification of the fifth embodiment.

FIG. 56 is a schematic diagram illustrating a first example of the mediation process according to the first modification of the fifth embodiment. FIG. 56 illustrates that time passes to the right. Furthermore, the figure indicates from the top in the vertical direction: the read control and recognition results; the readout image read out by the sensor controller 11; and the mediation result obtained by the mediation controller 1110a. Furthermore, in the example of FIG. 56, the imaging apparatus 1 is used for an in-vehicle application, and the frame is read out in the unit of line from the lower end side to the upper end side.

In the example of FIG. 56, when a moving body is recognized in the recognition process, the control of the visual recognition processing unit 14 is prioritized.

On the lower end side of the frame (Step S50), a road surface is recognized by the recognition process execution unit 124 in the recognition processing unit 12 based on the line data. In this case, since the recognition target is the road surface, the readout can be performed by skipping the lines to some extent. Furthermore, the mediation controller 1110a performs mediation in accordance with the recognition process based on the recognition result. For example, the mediation controller 1110a selects the readout region information input from the recognition processing unit 12 with higher priority over the readout region information input from the visual recognition processing unit 14 in accordance with the recognition result in which the road surface is recognized, and then, passes the selection information to the readout process controller 1111. For example, in a case where the recognition processing unit 12 controls readout by thinning the lines, the readout region information generated by thinning the lines at predetermined intervals would be input to the mediation controller 1110a. The mediation controller 1110a passes the readout region information indicating this thinning to the readout process controller 1111.

It is assumed that the moving body is recognized by the recognition processing unit 12 based on the line data obtained by reading out the lines with thinning. In the example of FIG. 56, in Step S51, the recognition process execution unit 124 acquires an object detection result indicating that an object is detected slightly before the line position of ½ of the frame, and it is detected that the detected object is a moving body (human). In the recognition processing unit 12, the recognition process execution unit 124 passes the recognition result indicating that the human has been recognized to the mediation controller 1110a.

The positional change of a moving body with time is great, and thus, in the case of performing line readout including skipping of lines, the position deviation of the recognized object in each of readout lines would be large, leading to the necessity of correcting the deviation. Therefore, the mediation controller 1110a gives higher priority to the control for visual recognition based on the recognition result indicating that the human has been recognized, and selects the readout region information input from the visual recognition processing unit 14 with higher priority over the readout region information input from the recognition processing unit 12, and passes the selected information to the readout process controller 1111. In this case, the visual recognition processing unit 14 generates, for example, readout region information for sequentially performing readout in the order of lines and inputs the generated information to the mediation controller 1110a.

Furthermore, it is assumed that the line readout has been performed toward the upper end side of the frame, and the recognition result indicating the non-road surface has been obtained by the recognition process execution unit 124 in the recognition processing unit 12. In the case of non-road surface, it is considered that there is no problem in performing line readout by using rougher thinning on the road surface recognized in Step S50. Therefore, the recognition processing unit 12 generates readout region information in which the thinning interval is larger than that in the case of the road surface, and inputs the generated information to the mediation controller 1110a. The mediation controller 1110a selects the readout region information input from the recognition processing unit 12 in accordance with the recognition result indicating non-road surface output from the recognition process execution unit 124 with higher priority over the readout region information input from the visual recognition processing unit 14, and passes the selected information to the readout process controller 1111.

In FIG. 56, Step S52 illustrates that the non-road surface region on the upper end side of the frame is being read out more roughly than the region on the road surface on the lower end side of the frame, in accordance with the readout region information. Furthermore, in Step S52, it is illustrated that the central portion where the human is detected in the frame is read out densely for visual recognition.

Figure 57:
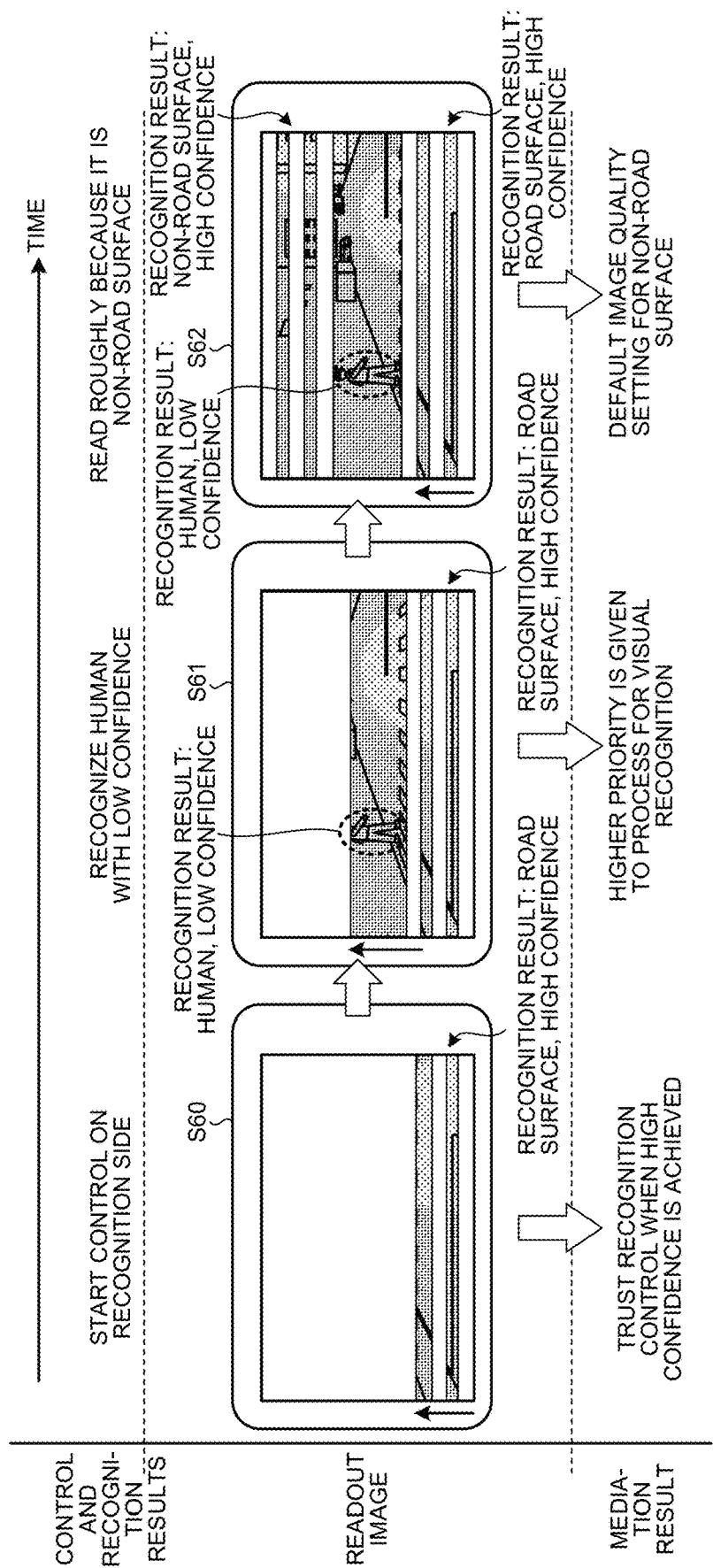
FIG. 57 is a schematic diagram illustrating a second example of the mediation process according to the first modification of the fifth embodiment.

FIG. 57 is a schematic diagram illustrating a second example of the mediation process according to the first modification of the fifth embodiment. Since individual parts of FIG. 57 are similar to the case in FIG. 56 described above, the description thereof will be omitted here. In addition, each of the images illustrated in FIG. 57 is a dark image with low luminance as a whole, in which the front side (lower end side of the frame) is brighter with slightly higher luminance.

In this second example, the mediation controller 1110a uses the confidence indicating the confidence level of the recognition result as the mediation information, and performs mediation between the readout region information input from the recognition processing unit 12 and the readout region information input from the visual recognition processing unit 14.

It is assumed that the line readout is started from the lower end side of the frame, and the road surface is recognized by the recognition process execution unit 124 in the recognition processing unit 12 with a confidence (high confidence) with a predetermined level, based on the line data (Step S60). In this case, since the imaging target is the road surface, the readout can be performed by skipping lines to some extent. The recognition processing unit 12 generates readout region information in which lines have been thinned at predetermined intervals in accordance with the recognition result, and inputs the generated information to the mediation controller 1110a.

Since the recognition result output from the recognition process execution unit 124 has a high level of confidence, the mediation controller 1110a trusts the recognition result, and selects the readout region information indicating thinning input from the recognition processing unit 12 out of the readout region information input from the recognition processing unit 12 and the readout region information input from the visual recognition processing unit 14. The mediation controller 1110a passes the readout region information indicating this thinning to the readout process controller 1111.

It is assumed that the moving body is recognized by the recognition processing unit 12 based on the line data obtained by reading out the lines with thinning. In the example of FIG. 57, in Step S51, the recognition process execution unit 124 recognizes the moving body (human) slightly before the line position of ½ of the frame. Here, in the example of FIG. 57, it is assumed that the portion where the human is recognized has low luminance, and thus, the recognition process execution unit 124 has recognized the detection of the human with a confidence degree (low confidence) less than a predetermined level. The recognition process execution unit 124 passes the recognition result indicating that the human has been recognized with low level of confidence to the mediation controller 1110a.

In this case, since the human is recognized with a low level of confidence, visual confirmation by human is considered to be necessary. Therefore, the mediation controller 1110a gives higher priority to the readout region information output from the visual recognition processing unit 14 over the readout region information output from the recognition processing unit 12.

Here, the mediation controller 1110a can give a readout instruction to the readout process controller 1111 to achieve easer visual recognition in accordance with the confidence output from the recognition process execution unit 124. For example, it would be possible to perform control such that the lines in the line range where a human has been recognized with low confidence is to be read out a plurality of times. In this case, in the visual recognition processing unit 14, the image processing unit 143 or the like can combine the read out line data between the lines having mutually corresponding positions, and further performs image processing (for example, high resolution processing, contrast adjustment) so as to increase the clarity of the image of the person recognized by low confidence.

In addition, when the imaging apparatus 1 is mounted on a vehicle capable of autonomous driving, it is conceivable to set the number of times of readout, the details of image processing, or the like, in accordance with the level of autonomous driving compatible with the vehicle (for example, levels 2 to 4).

Furthermore, it is assumed that the line readout has been performed toward the upper end side of the frame, and the recognition result indicating the non-road surface has been obtained with high confidence by the recognition process execution unit 124 in the recognition processing unit 12 (Step S62). In the case of non-road surface, it is considered that there is no problem in performing line readout by using rougher thinning on the road surface recognized in Step S60. Therefore, the recognition processing unit 12 generates readout region information in which the thinning interval is larger than that in the case of the road surface, and inputs the generated information to the mediation controller 1110a.

Note that it is considered that high image quality would not be required for the non-road surface image, within the image for visual recognition. Therefore, it is conceivable that the visual recognition processing unit 14 outputs image data for visual recognition with default image quality setting in a case where the recognition process execution unit 124 recognizes as non-road surface.

Figure 58:
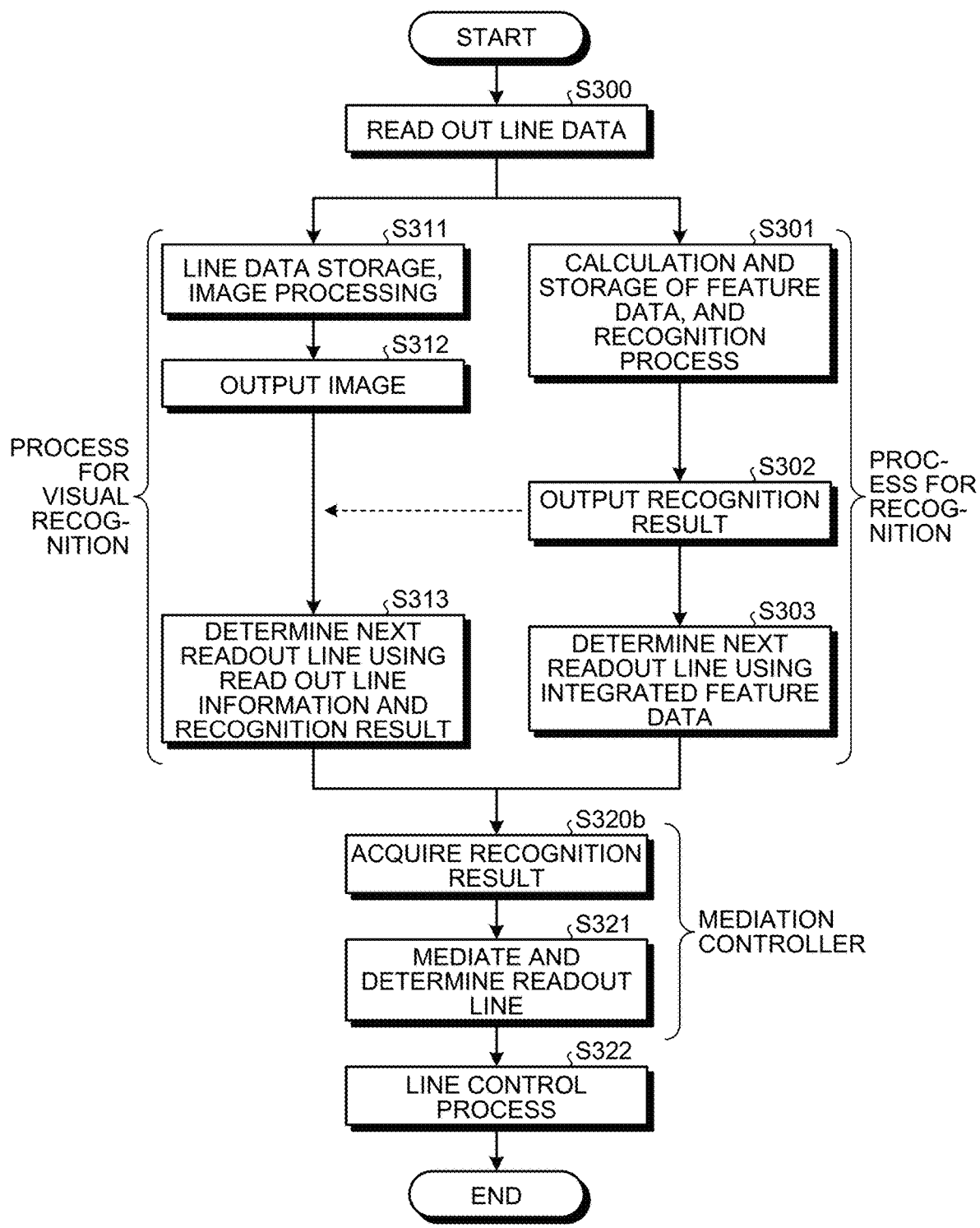
FIG. 58 is a flowchart of an example illustrating the mediation process according to the first modification of the fifth embodiment.

FIG. 58 is a flowchart of an example illustrating the mediation process according to the first modification of the fifth embodiment. The process according to the flowchart of FIG. 58 is a process executed for each of times of readout of the unit of readout.

In Step S300, the readout unit 110 reads line data from the sensor unit 10. The readout unit 110 passes the line data read out from the sensor unit 10 to the recognition processing unit 12 and the visual recognition processing unit 14. Hereinafter, the processes on the recognition processing unit 12 side of Steps S301 to S303 and the processes on the visual recognition processing unit 14 side in Steps S311 to S313 in FIG. 58 are the same as the corresponding processes in FIG. 51 described above, and thus the explanation here is omitted.

In FIG. 58, in Step S303, as described above, the recognition processing unit 12 generates readout line information indicating the next readout line as readout region information and passes the generated information to the sensor controller 11. The readout region information passed to the sensor controller 11 will be input to the mediation controller 1110a as control information. Similarly, in Step S313, the visual recognition processing unit 14 generates readout line information indicating the next readout line as readout region information and passes the generated information to the sensor controller 11. The readout region information passed to the sensor controller 11 will be input to the mediation controller 1110a as control information.

After a control signal is input from the recognition processing unit 12 and the visual recognition processing unit 14 to the mediation controller 1110a in Steps S303 and S313, the process proceeds to Step S320b. In Step S320b, the mediation controller 1110a acquires the recognition result output from the recognition process execution unit 124 as mediation information.

In the next Step S321, a mediation controller 1110b determines which of the readout region information passed from the recognition processing unit 12 in Step S303 and the readout region information passed from the visual recognition processing unit 14 in Step S313 is to be defined as the readout region information indicating the line to be read out next, in accordance with the confidence indicated in the recognition result acquired in Step S320b. In the next Step S322, the sensor controller 11 passes the readout region information determined by the mediation controller 1110b in Step S321 to the readout process controller 1111, and executes the line control process to read out the readout line indicated in the readout region information.

In this manner, in the first modification of the fifth embodiment, it is possible to adaptively determine which of the readout region information output from the recognition processing unit 12 and the readout region information output from the visual recognition processing unit 14 is to be used as the readout region information indicating the readout line to be read out next, in accordance with the recognition result based on the line data. This makes it possible to obtain an appropriate image for visual recognition in accordance with various scenes as imaging targets.

8-2. Second Modification of Fifth Embodiment

Figure 59:
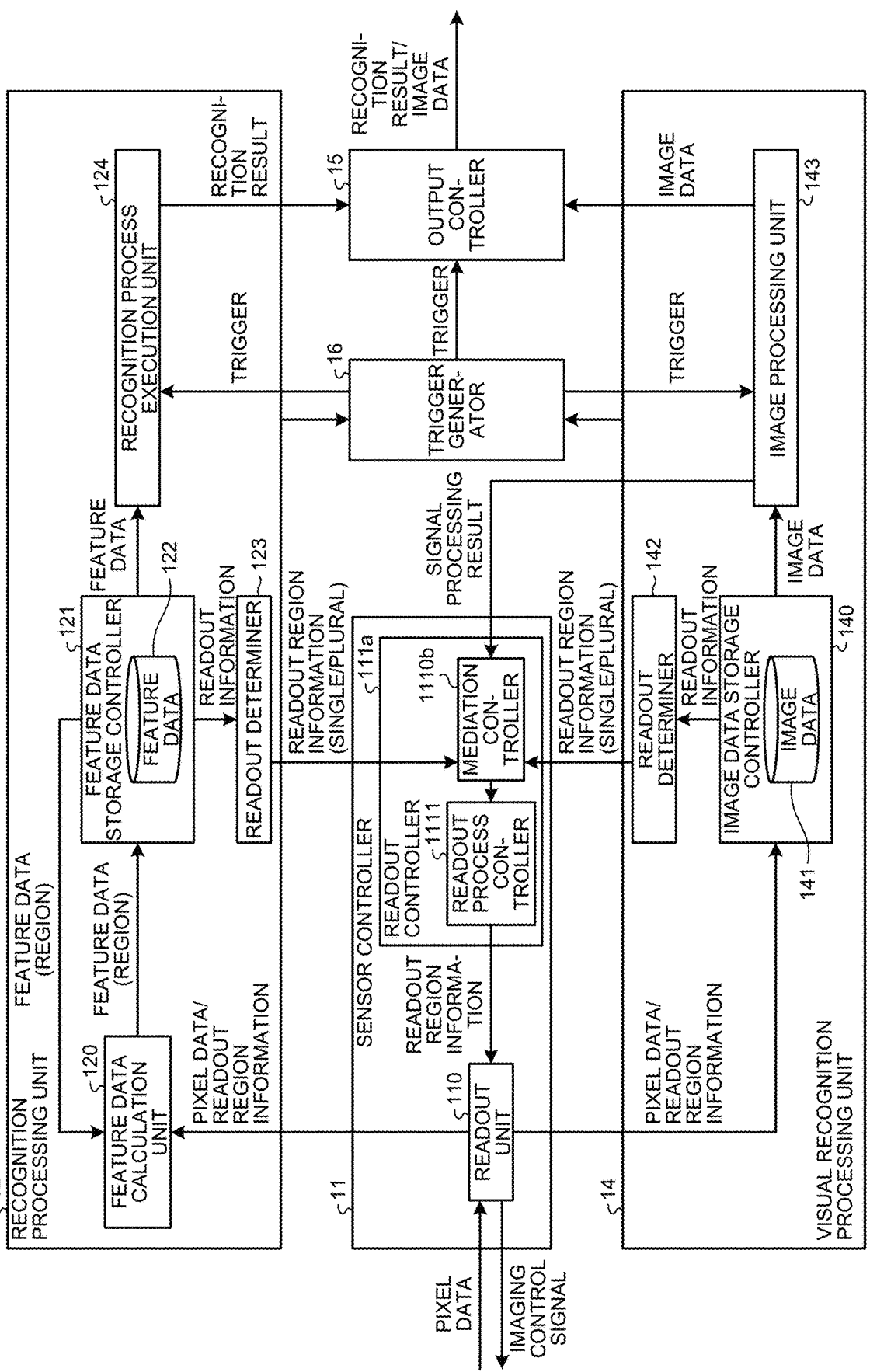
FIG. 59 is a functional block diagram of an example illustrating a function of an imaging apparatus applicable to a second modification of the fifth embodiment.

Next, a second modification of the fifth embodiment will be described. The second modification of the fifth embodiment is an example in which the mediation controller 1110 applies the image for visual recognition output from the visual recognition processing unit 14, as mediation information used for mediation processes. FIG. 59 is a functional block diagram of an example illustrating functions of the imaging apparatus 1 applicable to the second modification of the fifth embodiment.

In the configuration illustrated in FIG. 59, a signal processing result obtained by the image processing unit 143 in the execution of image processing is input to the mediation controller 1110b as compared to the configuration illustrated in FIG. 51 described above. The signal processing result may be non-processed image data for visual recognition output from the image processing unit 143, or may be the image data processed to facilitate the determination by the mediation controller 1110. The mediation controller 1110b according to the second modification of the fifth embodiment uses this signal processing result as mediation information, and thereby performs a mediation process between the readout region information input from the recognition processing unit 12 and the readout region information input from the visual recognition processing unit 14.

Figure 60:
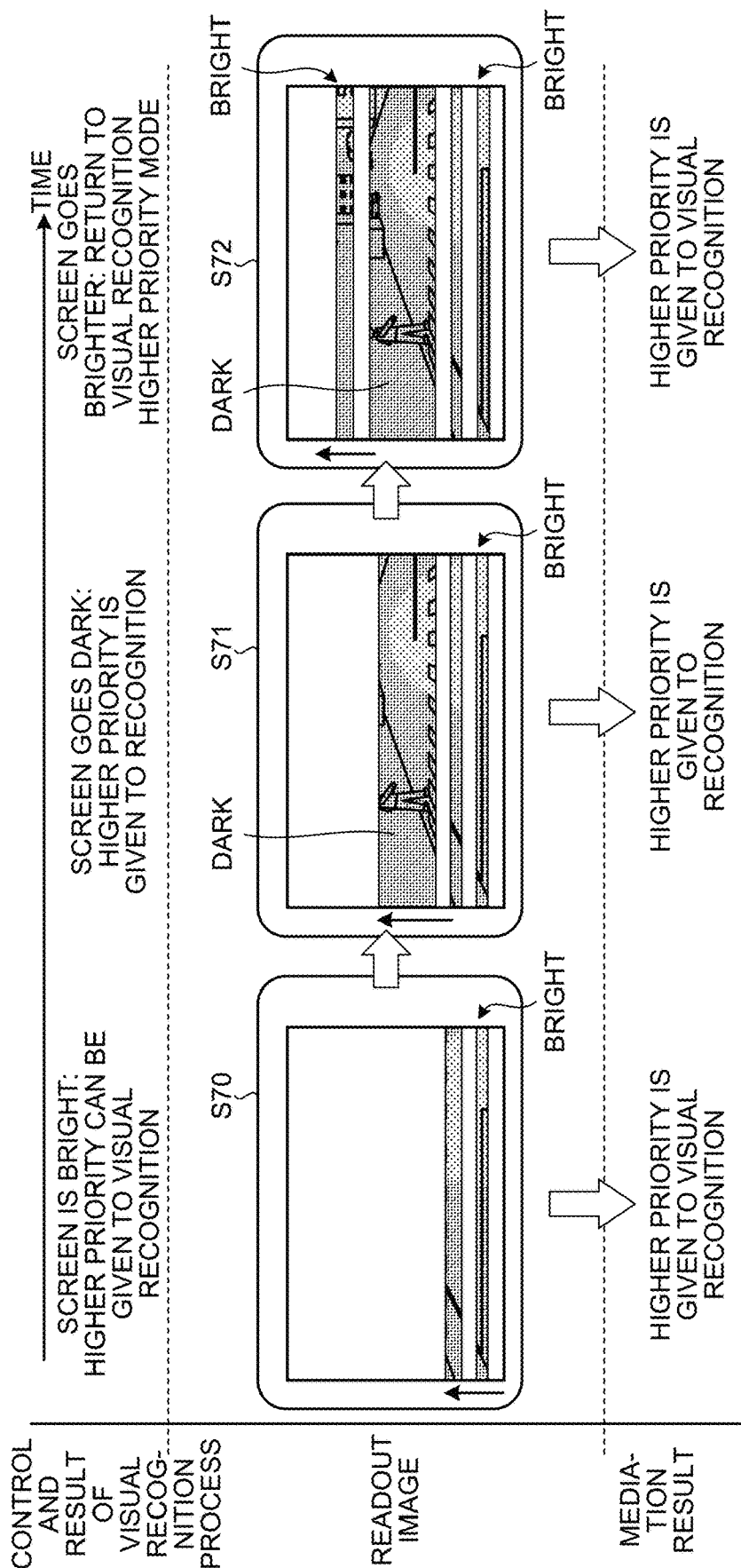
FIG. 60 is a schematic diagram illustrating a mediation process according to the second modification of the fifth embodiment.

FIG. 60 is a schematic diagram illustrating a mediation process according to the second modification of the fifth embodiment. Since individual parts of FIG. 60 are similar to the case in FIG. 60 described above, the description thereof will be omitted here. Furthermore, each of the images illustrated in FIG. 60 corresponds to each of the images used in FIG. 57 described above and is a dark image with low luminance as a whole, in which the front side (lower end side of the frame) is brighter with slightly higher luminance.

As illustrated in Step S70, line readout is started from the lower end side of the frame. The image processing unit 143 calculates the luminance value of the read line data (for example, an average value of the luminance values of individual pieces of pixel data included in the line) and passes a signal processing result including the calculated luminance value, to the mediation controller 1110b. In a case where the luminance value included in the signal processing result passed from the image processing unit 143 is a first threshold or more, the mediation controller 1110b determines that the read out region is bright and suitable for visual recognition, and thus performs controls that gives higher priority to the visual recognition. Specifically, the mediation controller 1110b selects the readout region information output from the visual recognition processing unit 14, out of the readout region information input from the recognition processing unit 12 and the readout region information input from the visual recognition processing unit 14. The mediation controller 1110b selects the readout region information output from the selected visual recognition processing unit 14 as the readout region information indicating the line to be read out next.

In the example of FIG. 60, it is assumed that the visual recognition processing unit 14 is requested to perform line thinning when the luminance value of the line is a predetermined value or more. The visual recognition processing unit 14 generates readout region information for thinning lines at the lower end of this frame, and passes the generated information to the mediation controller 1110.

Based on the line data obtained by subsequently reading out the lines, the image processing unit 143 passes the signal processing result including the luminance value of the line data to the mediation controller 1110b. In a case where the luminance value included in the received signal processing result is less than a first threshold, the mediation controller 1110b determines that the read out region is dark and unsuitable for visual recognition, and thus performs controls that gives higher priority to the recognition. Specifically, the mediation controller 1110b selects the readout region information output from the recognition processing unit 12, out of the readout region information input from the recognition processing unit 12 and the readout region information input from the visual recognition processing unit 14 (Step S71).

The line readout is further performed toward the upper end side of the frame, and the signal processing result including the luminance value of the line data is passed from the image processing unit 143 to the mediation controller 1110b. In a case where the luminance value included in the signal processing result passed from the image processing unit 143 is a first threshold or more, the mediation controller 1110b determines that the read out region is bright and suitable for visual recognition, and thus returns the control to the control that gives higher priority to the visual recognition. Specifically, the mediation controller 1110b selects the readout region information output from the visual recognition processing unit 14, out of the readout region information input from the recognition processing unit 12 and the readout region information input from the visual recognition processing unit 14, as the readout region information indicating the line to be read out next (Step S72).

Although the above description is an example in which the luminance value is determined only by the first threshold, the present disclosure is not limited to this example. For example, it is allowable to provide a second luminance value having a luminance value higher than the value of the first threshold so as to apply this second threshold to the control in which higher priority is given to visual recognition. By using this second threshold, it is possible to avoid a phenomenon referred to as "blown out" state in which the luminance value is saturated in the control of giving higher priority to visual recognition.

Figure 61:
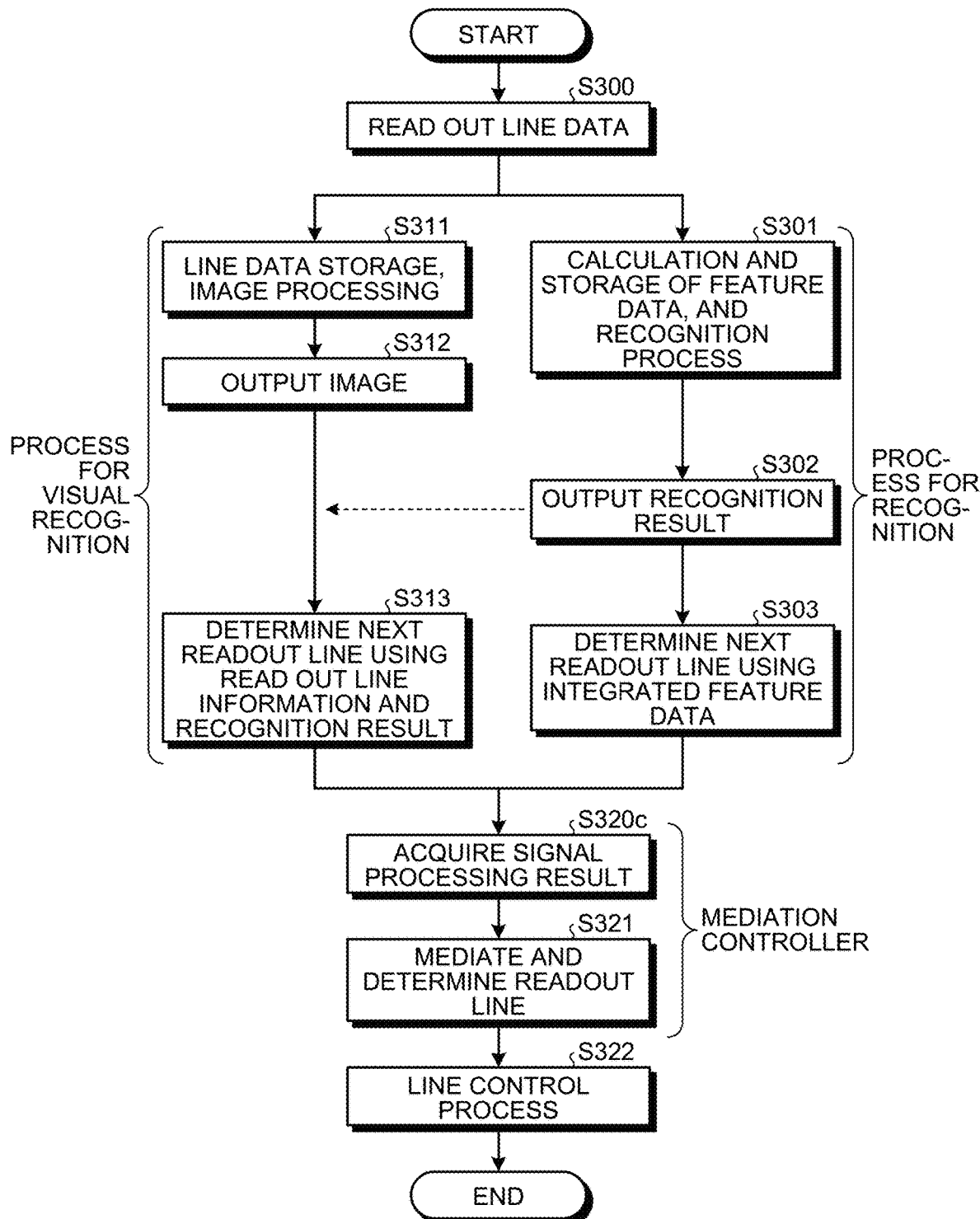
FIG. 61 is a flowchart of an example illustrating the mediation process according to the second modification of the fifth embodiment.

FIG. 61 is a flowchart of an example illustrating the mediation process according to the second modification of the fifth embodiment. The process according to the flowchart of FIG. 61 is a process executed for each of times of readout of the unit of readout.

In Step S300, the readout unit 110 reads line data from the sensor unit 10. The readout unit 110 passes the line data read out from the sensor unit 10 to the recognition processing unit 12 and the visual recognition processing unit 14. Hereinafter, the processes on the recognition processing unit 12 side of Steps S301 to S303 and the processes on the visual recognition processing unit 14 side of Steps S311 to S313 in FIG. 61 are the same as the corresponding processes in FIG. 51 described above, and thus the explanation here is omitted.

In FIG. 61, in Step S303, as described above, the recognition processing unit 12 generates readout line information indicating the next readout line as readout region information and passes the generated information to the sensor controller 11. The readout region information passed to the sensor controller 11 will be input to the mediation controller 1110b as control information. Similarly, in Step S313, the visual recognition processing unit 14 generates readout line information indicating the next readout line as readout region information and passes the generated information to the sensor controller 11. The readout region information passed to the sensor controller 11 will be input to the mediation controller 1110b as control information.

After a control signal is input from the recognition processing unit 12 and the visual recognition processing unit 14 to the mediation controller 1110b in Steps S303 and S313, the process proceeds to Step S320c. In Step S320c, the mediation controller 1110b acquires the signal processing result output from the image processing unit 143 as mediation information.

In the next Step S321, a mediation controller 1110b determines which of the readout region information passed from the recognition processing unit 12 in Step S303 and the readout region information passed from the visual recognition processing unit 14 in Step S313 is to be defined as the readout region information indicating the line to be read out next, in accordance with the luminance value included in the signal processing result acquired in Step S320c. In the next Step S322, the sensor controller 11 passes the readout region information determined by the mediation controller 1110b in Step S321 to the readout process controller 1111, and executes the line control process to read out the readout line indicated in the readout region information.

In this manner, in the second modification of the fifth embodiment, it is possible to adaptively determine which of the readout region information output from the recognition processing unit 12 and the readout region information output from the visual recognition processing unit 14 is to be used as the readout region information indicating the readout line to be read out next, in accordance with the luminance value based on the line data. This makes it possible to obtain an appropriate image for visual recognition in accordance with brightness of the imaging environment.

8-3. Third Modification of Fifth Embodiment

Figure 62:
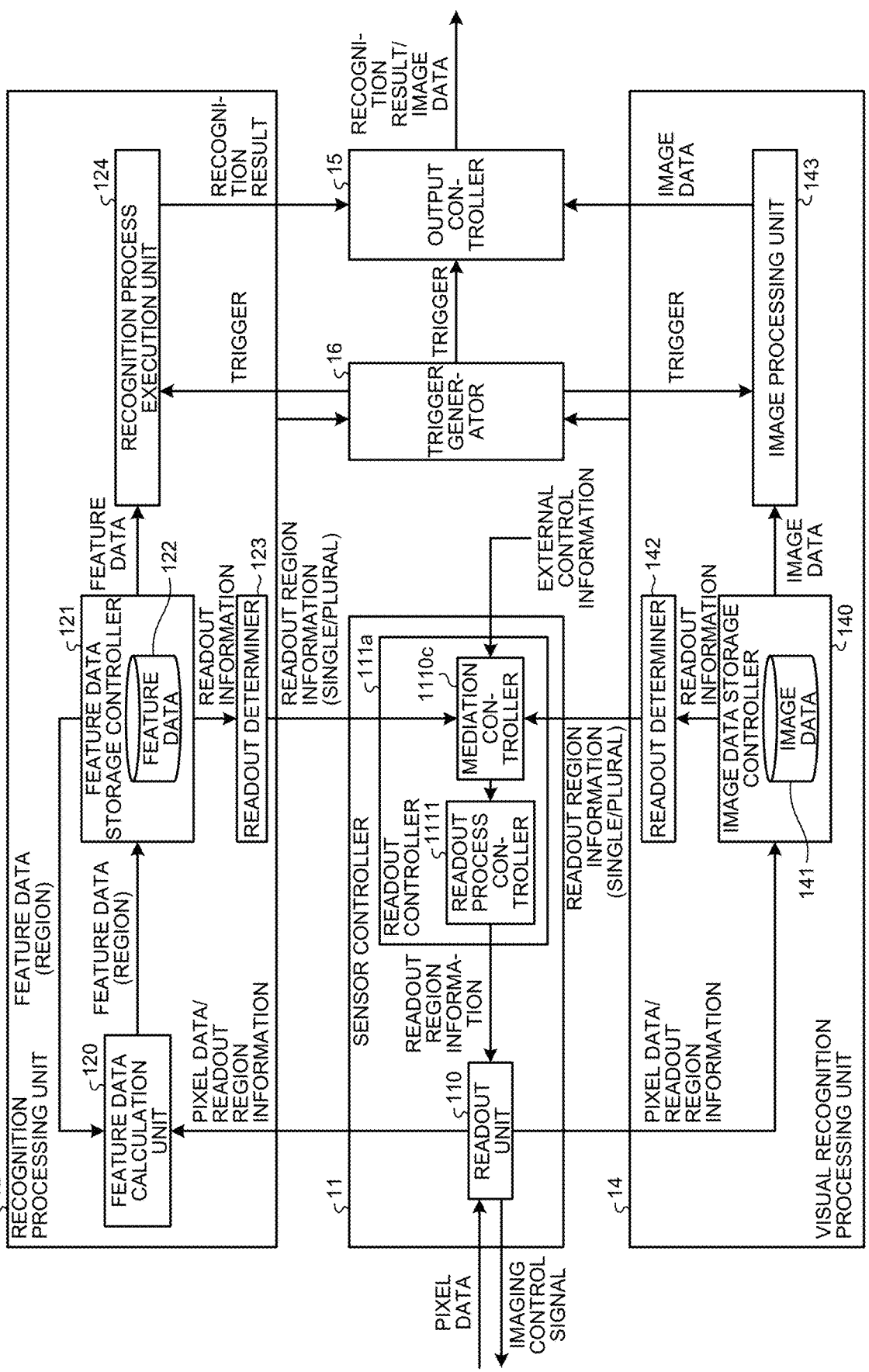
FIG. 62 is a functional block diagram of an example illustrating functions of the imaging apparatus 1 applicable to a third modification of the fifth embodiment.

Next, a third modification of the fifth embodiment will be described. The third modification of the fifth embodiment is an example in which the mediation controller 1110 applies external control information supplied from the outside as the mediation information used for the mediation process. FIG. 62 is a functional block diagram of an example illustrating functions of the imaging apparatus 1 applicable to the third modification of the fifth embodiment.

The configuration illustrated in FIG. 62 is such that external control information can be input to a mediation controller 1110c, as compared to the configuration illustrated in FIG. 51 described above. When the imaging apparatus 1 is mounted on a vehicle capable of autonomous driving, it is possible to apply information indicating the level of autonomous driving compatible with the vehicle (for example, levels 2 to 4) to external control information. Not limited to this, output signals of other sensors can be applied as external control information. In this case, examples of the other sensors include another imaging apparatus, LiDAR sensor, radar device, or the like. Furthermore, it is also possible to use the output of a camera of an electronic mirror that monitors the situation around the vehicle by using the camera and the display as external control information.

The mediation controller 1110c according to the third modification of the fifth embodiment uses this external control information as mediation information, and thereby performs a mediation process between the readout region information input from the recognition processing unit 12 and the readout region information input from the visual recognition processing unit 14.

Figure 63:
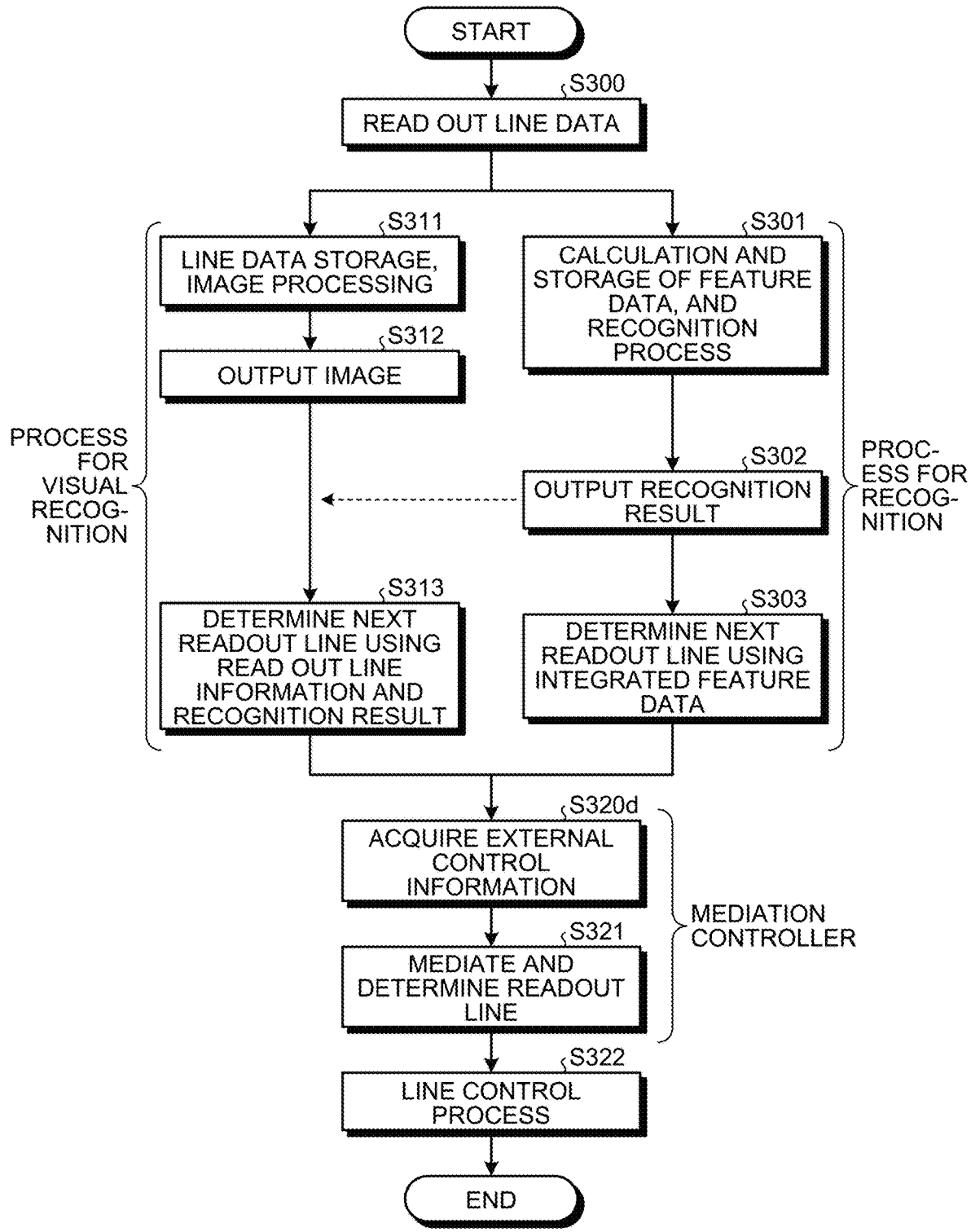
FIG. 63 is a flowchart illustrating an example of a mediation process according to the third modification of the fifth embodiment.

FIG. 63 is a flowchart of an example illustrating the mediation process according to the third modification of the fifth embodiment. The process according to the flowchart of FIG. 63 is a process executed for each of times of readout of the unit of readout.

In Step S300, the readout unit 110 reads line data from the sensor unit 10. The readout unit 110 passes the line data read out from the sensor unit 10 to the recognition processing unit 12 and the visual recognition processing unit 14. Hereinafter, the processes on the recognition processing unit 12 side of Steps S301 to S303 and the processes on the visual recognition processing unit 14 side in Steps S311 to S313 in FIG. 63 are the same as the corresponding processes in FIG. 51 described above, and thus the explanation here is omitted.

In FIG. 63, in Step S303, as described above, the recognition processing unit 12 generates readout line information indicating the next readout line as readout region information and passes the generated information to the sensor controller 11. The readout region information passed to the sensor controller 11 will be input to the mediation controller 1110c as control information. Similarly, in Step S313, the visual recognition processing unit 14 generates readout line information indicating the next readout line as readout region information and passes the generated information to the sensor controller 11. The readout region information passed to the sensor controller 11 will be input to the mediation controller 1110c as control information.

After a control signal is input from the recognition processing unit 12 and the visual recognition processing unit 14 to the mediation controller 1110b in Steps S303 and S313, the process proceeds to Step S320d. In Step S320d, the mediation controller 1110c acquires the external control information input from the external device, as mediation information.

In the next Step S321, a mediation controller 1110b determines which of the readout region information passed from the recognition processing unit 12 in Step S303 and the readout region information passed from the visual recognition processing unit 14 in Step S313 is to be defined as the readout region information indicating the line to be read out next, in accordance with the external control information acquired in Step S320c.

At this time, in a case where the reliability of the recognition information is low when the mediation controller 1110c uses the recognition information input from another sensor as external control information, for example, the mediation controller 1110c controls not to select the readout region information passed from the recognition processing unit 12 in Step S303. Furthermore, regarding the external control information, it is conceivable that, when the imaging apparatus 1 is mounted on a vehicle capable of autonomous driving and uses the information indicating the level of autonomous driving compatible with the vehicle (for example, levels 2 to 4), the readout region information passed from the recognition processing unit 12 in Step S303 will be used with higher priority.

In the next Step S322, the sensor controller 11 passes the readout region information determined by the mediation controller 1110b in Step S321 to the readout process controller 1111, and executes the line control process to read out the readout line indicated in the readout region information.

In this manner, in the third modification of the fifth embodiment, the mediation controller 1110c performs mediation by using the external control information output from the external device as the mediation information. This enables applications in various situations, and in a case where the external device is an external sensor that does not have an output of image data for visual recognition, it is possible to provide an image based on image data for visual recognition to the external sensor.

9. Sixth Embodiment

Figure 64:
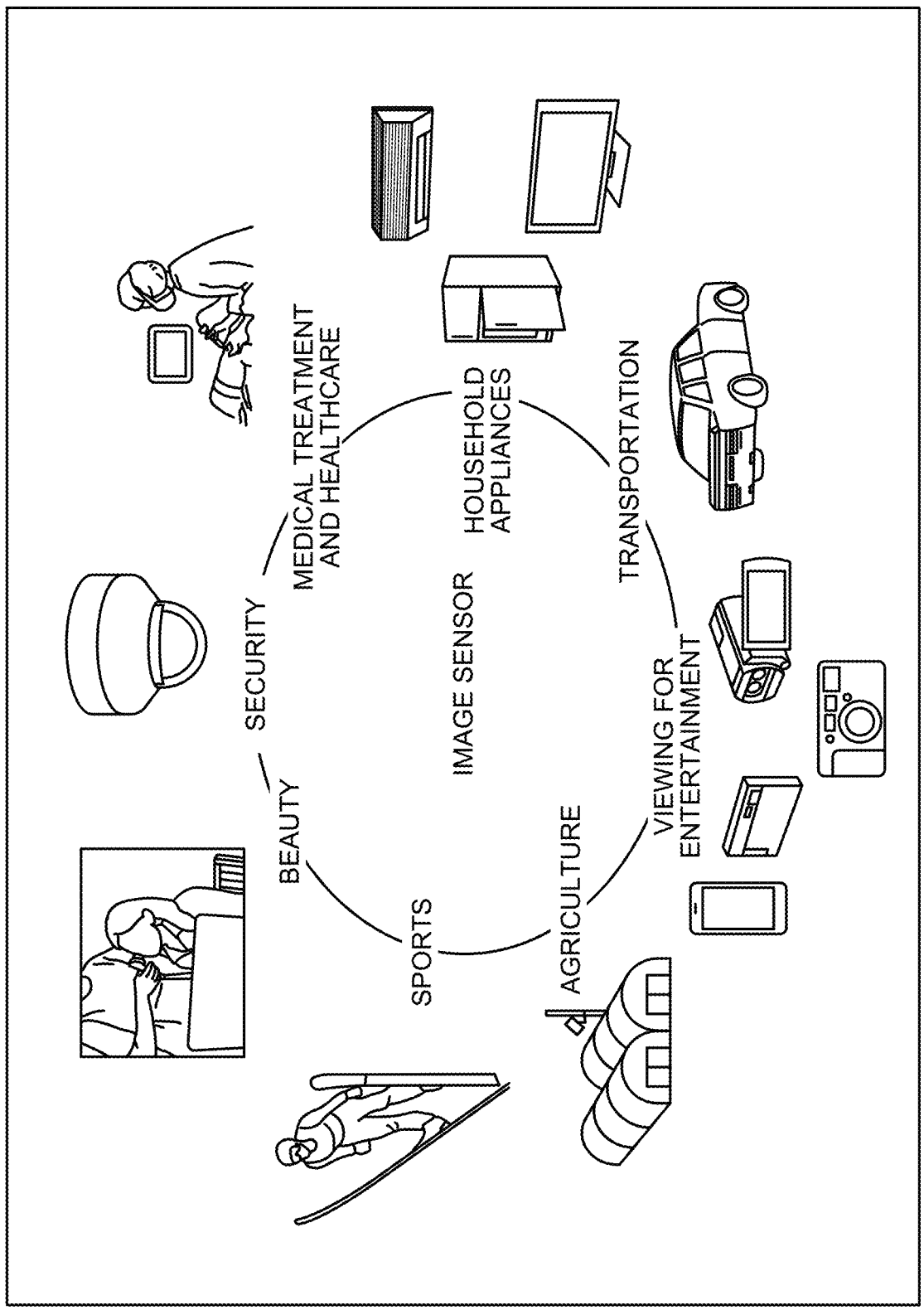
FIG. 64 is a diagram illustrating a usage example of an imaging apparatus to which the technique of the present disclosure is applied.

Next, as a six embodiment, application examples of the imaging apparatus 1 according to the first to fifth embodiments and individual modifications according to the present disclosure will be described. FIG. 64 is a diagram illustrating an example of using the imaging apparatus 1 according to the first to fifth embodiments and individual modifications described above.

The imaging apparatus 1 described above is applicable to the following various situations in which sensing is performed for light including visual light, infrared light, ultraviolet light, and X-ray.

- A device that captures images used for viewing for entertainment, such as digital cameras and mobile devices with a camera function.
- A device for transportation, such as an in-vehicle sensor that images a front, back, surroundings, interior, or the like, of a vehicle in order to ensure safe driving including automatic stop or the like, and to recognize driver's states, a surveillance camera to monitor traveling vehicles and roads, and a range-finding sensor to perform measurement of a distance between vehicles, or the like.
- A device for household appliances including a TV, a refrigerator, an air conditioner, or the like to image user's gesture and perform operation of the apparatus according to the gesture.
- A device used for medical treatment and healthcare, such as endoscopes and devices that perform angiography by receiving infrared light.
- A device used for security, such as surveillance cameras for crime prevention and cameras for personal authentication.
- A device used for beauty, such as a skin measuring device that images the skin and a microscope that images the scalp.
- A device used for sports, such as action cameras and wearable cameras for sports applications.
- A device used for agriculture, such as cameras for monitoring the conditions of fields and crops.

[Further Application Example of Technology According to the Present Disclosure]

The technology according to the present disclosure (the present technology) is applicable to various products. For example, the technology according to the present disclosure may be applied to devices mounted on various moving objects such as automobiles, electric vehicles, hybrid electric vehicles, motorcycles, bicycles, personal mobility, airplanes, drones, ships, and robots.

Figure 65:
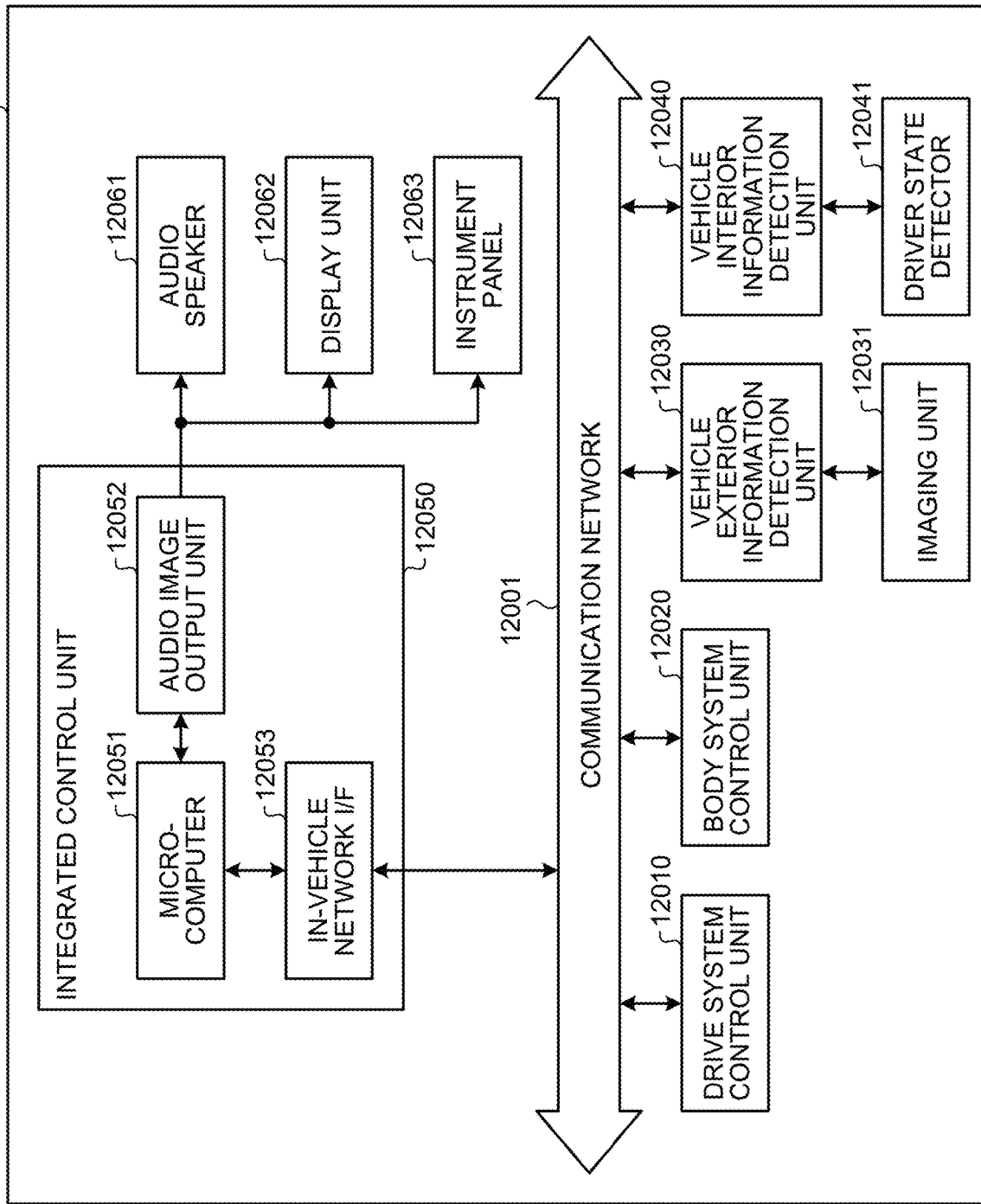
FIG. 65 is a block diagram illustrating an example of a schematic configuration of a vehicle control system.

FIG. 65 is a block diagram illustrating a schematic configuration example of a vehicle control system, which is an example of a mobile control system to which the technique according to the present disclosure is applicable.

A vehicle control system 12000 includes a plurality of electronic control units connected via a communication network 12001. In the example illustrated in FIG. 65, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls operation of the apparatus related to the drive system of the vehicle in accordance with various programs. For example, the drive system control unit 12010 functions as a control apparatus of a driving force generation apparatus that generates a driving force of a vehicle such as an internal combustion engine or a driving motor, a driving force transmission mechanism that transmits a driving force to the wheels, a steering mechanism that adjusts steering angle of the vehicle, a braking apparatus that generates a braking force of the vehicle, or the like.

The body system control unit 12020 controls the operation of various devices mounted on the vehicle body in accordance with various programs. For example, the body system control unit 12020 functions as a control apparatus for a keyless entry system, a smart key system, a power window device, or various lamps such as a head lamp, a back lamp, a brake lamp, a turn signal lamp, or a fog lamp. In this case, the body system control unit 12020 can receive input of radio waves transmitted from a portable device that substitutes for the key or signals from various switches. The body system control unit 12020 receives the input of these radio waves or signals and controls the door lock device, the power window device, the lamp, or the like, of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform an object detection process or a distance detection process of people, vehicles, obstacles, signs, or characters on the road surface based on the received image. The vehicle exterior information detection unit 12030 performs image processing on the received image, for example, and performs an object detection process and a distance detection process based on the result of the image processing.

The imaging unit 12031 is an optical sensor that receives light and outputs an electrical signal corresponding to the amount of received light. The imaging unit 12031 can output the electric signal as an image and also as distance measurement information. The light received by the imaging unit 12031 may be visible light or invisible light such as infrared light.

The vehicle interior information detection unit 12040 detects vehicle interior information. The vehicle interior information detection unit 12040 is connected to a driver state detector 12041 that detects the state of the driver, for example. The driver state detector 12041 may include a camera that images the driver, for example. The vehicle interior information detection unit 12040 may calculate the degree of fatigue or degree of concentration of the driver or may determine whether the driver is dozing off on the basis of the detection information input from the driver state detector 12041.

The microcomputer 12051 can calculate a control target value of the driving force generation apparatus, the steering mechanism, or the braking apparatus on the basis of vehicle external/internal information obtained by the vehicle exterior information detection unit 12030 or the vehicle interior information detection unit 12040, and can output a control command to the drive system control unit 12010. For example, the microcomputer 12051 can perform cooperative control for the purpose of achieving a function of an advanced driver assistance system (ADAS) including collision avoidance or impact mitigation of vehicles, follow-up running based on an inter-vehicle distance, cruise control, vehicle collision warning, vehicle lane departure warning, or the like.

Furthermore, it is allowable such that the microcomputer 12051 controls the driving force generation apparatus, the steering mechanism, the braking apparatus, or the like, on the basis of the information regarding the surroundings of the vehicle obtained by the vehicle exterior information detection unit 12030 or the vehicle interior information detection unit 12040, thereby performing cooperative control for the purpose of autonomous driving or the like, in which the vehicle performs autonomous traveling without depending on the operation of the driver.

Furthermore, the microcomputer 12051 can output a control command to the body system control unit 12020 based on the vehicle exterior information acquired by the vehicle exterior information detection unit 12030. For example, the microcomputer 12051 can control the head lamp in accordance with the position of the preceding vehicle or the oncoming vehicle sensed by the vehicle exterior information detection unit 12030, and thereby can perform cooperative control aiming at antiglare such as switching the high beam to low beam.

The audio image output unit 12052 transmits an output signal in the form of at least one of audio or image to an output apparatus capable of visually or audibly notifying the occupant of the vehicle or the outside of the vehicle of information. In the example of FIG. 65, an audio speaker 12061, a display unit 12062, and an instrument panel 12063 are illustrated as exemplary output apparatuses. The display unit 12062 may include at least one of an on-board display or a head-up display, for example.

Figure 66:
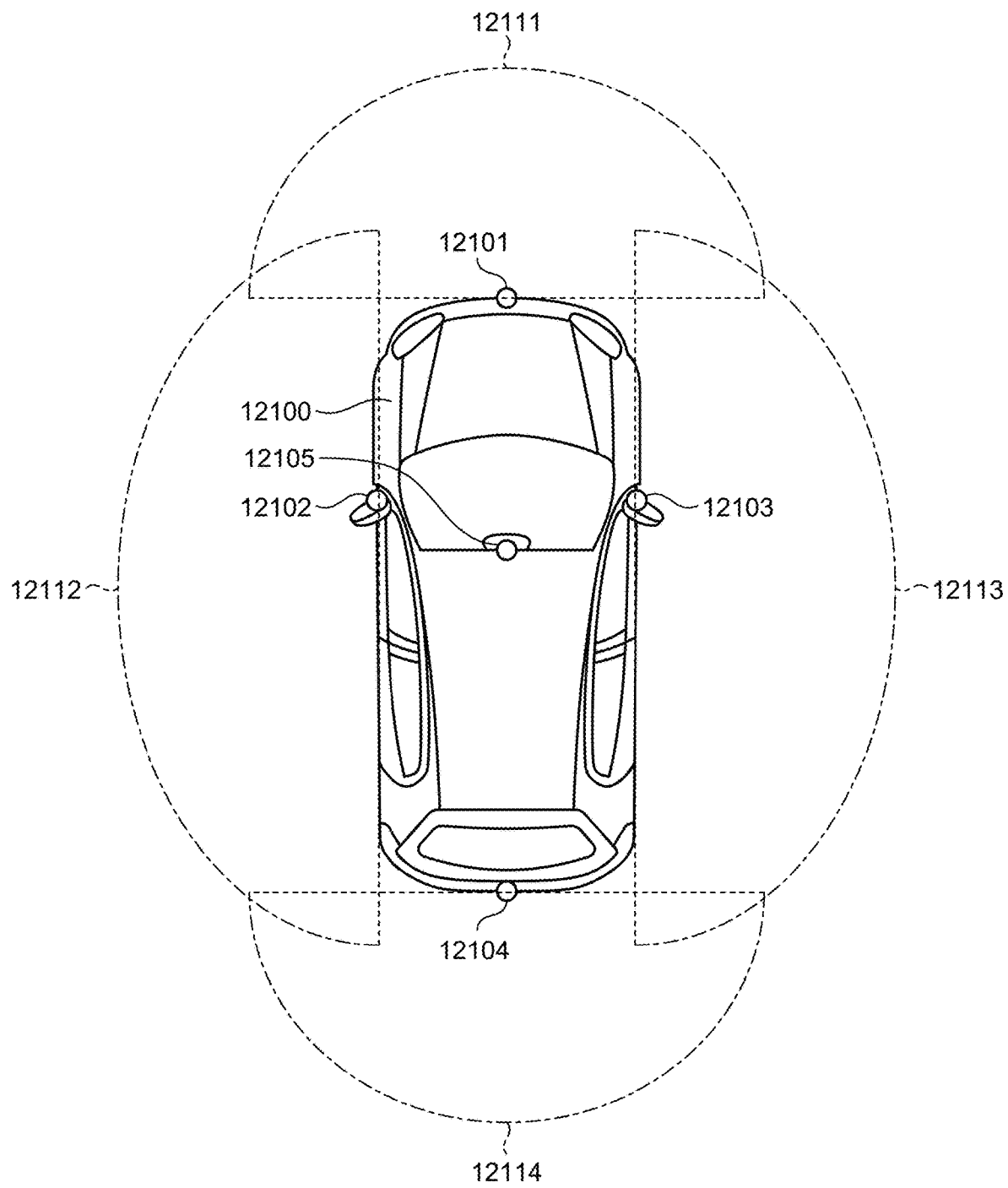
FIG. 66 is a view illustrating an example of installation positions of a vehicle exterior information detection unit and an imaging unit.

FIG. 66 is a view illustrating an example of an installation position of the imaging unit 12031. In FIG. 66, a vehicle 12100 has imaging units 12101, 12102, 12103, 12104, and 12105 as imaging units 12031.

For example, the imaging units 12101, 12102, 12103, 12104, and 12105 are installed at positions on a vehicle 12100, including a nose, a side mirror, a rear bumper, a back door, an upper portion of the windshield in a vehicle interior, or the like. The imaging unit 12101 provided on the front nose and the imaging unit 12105 provided on the upper portion of the windshield in the vehicle interior mainly acquire an image in front of the vehicle 12100. The imaging units 12102 and 12103 provided in the side mirrors mainly acquire images of the side of the vehicle 12100. The imaging unit 12104 provided in the rear bumper or the back door mainly acquires an image behind the vehicle 12100. The front view images acquired by the imaging units 12101 and 12105 are mainly used for detecting a preceding vehicle or a pedestrian, an obstacle, a traffic light, a traffic sign, a lane, or the like.

Note that FIG. 66 illustrates an example of the imaging range of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, by superimposing pieces of image data captured by the imaging units 12101 to 12104, it is possible to obtain a bird's-eye view image of the vehicle 12100 as viewed from above.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can calculate a distance to each of three-dimensional objects in the imaging ranges 12111 to 12114 and a temporal change (relative speed with respect to the vehicle 12100) of the distance based on the distance information obtained from the imaging units 12101 to 12104, and thereby can extract a three-dimensional object traveling at a predetermined speed (for example, 0 km/h or more) in substantially the same direction as the vehicle 12100 being the closest three-dimensional object on the traveling path of the vehicle 12100, as a preceding vehicle. Furthermore, the microcomputer 12051 can set an inter-vehicle distance to be ensured in front of the preceding vehicle in advance, and can perform automatic brake control (including follow-up stop control), automatic acceleration control (including follow-up start control), or the like. In this manner, it is possible to perform cooperative control for the purpose of autonomous driving or the like, in which the vehicle autonomously travels without depending on the operation of the driver.

For example, based on the distance information obtained from the imaging units 12101 to 12104, the microcomputer 12051 can extract three-dimensional object data regarding the three-dimensional object with classification into three-dimensional objects, such as a two-wheeled vehicle, a regular vehicle, a large vehicle, a pedestrian, and other three-dimensional objects such as a utility pole, and can use the data for automatic avoidance of obstacles. For example, the microcomputer 12051 distinguishes obstacles around the vehicle 12100 into obstacles having high visibility to the driver of the vehicle 12100 and obstacles having low visibility to the driver. Subsequently, the microcomputer 12051 determines a collision risk indicating the risk of collision with each of obstacles. When the collision risk is a set value or more and there is a possibility of collision, the microcomputer 12051 can output an alarm to the driver via the audio speaker 12061 and the display unit 12062, and can perform forced deceleration and avoidance steering via the drive system control unit 12010, thereby achieving driving assistance for collision avoidance.

At least one of the imaging units 12101 to 12104 may be an infrared camera that detects infrared rays. For example, the microcomputer 12051 can recognize a pedestrian by determining whether a pedestrian is present in the captured images of the imaging units 12101 to 12104. Such pedestrian recognition is performed, for example, by a procedure of extracting feature points in a captured image of the imaging units 12101 to 12104 as an infrared camera, and by a procedure of performing pattern matching processing on a series of feature points indicating the contour of the object to discriminate whether it is a pedestrian. When the microcomputer 12051 determines that a pedestrian is present in the captured images of the imaging units 12101 to 12104 and recognizes a pedestrian, the audio image output unit 12052 causes the display unit 12062 to perform superimposing display of a rectangular contour line for emphasis to the recognized pedestrian. Furthermore, the audio image output unit 12052 may cause the display unit 12062 to display an icon indicating a pedestrian or the like at a desired position.

Hereinabove, an example of the vehicle control system to which the technology according to the present disclosure is applicable has been described. The technology according to the present disclosure is applicable to the imaging unit 12031, for example, among the configurations described above. With application of the imaging apparatus 1 according to the present disclosure to the imaging unit 12031, it is possible to achieve both imaging for recognition processes and imaging for visual recognition, and to provide sufficient information for each of the recognition process and visual recognition by human.

The effects described in the present specification are merely examples, and thus, there may be other effects, not limited to the exemplified effects.

Note that the present technology can also have the following configurations.

(1) An imaging apparatus comprising:
an imaging unit that has a pixel region in which a plurality of pixels is arranged and that reads and outputs a pixel signal from the pixels included in the pixel region;
a unit-of-readout controller that controls a unit of readout set as a part of the pixel region:
a recognition unit that has learned training data for each of units of readout;
a first output unit that outputs a recognition result of recognition performed by the recognition unit for each of the units of readout;
a second output unit that outputs the pixel signal to a subsequent stage; and
a trigger generator that generates a trigger signal for controlling a first timing at which the first output unit outputs the recognition result and a second timing at which the second output unit outputs the pixel signal.

(2) The imaging apparatus according to (1),
wherein the trigger generator
generates the trigger signal that achieves synchronization between the first timing and the second timing.

(3) The imaging apparatus according to (1) or (2),
wherein the trigger generator outputs the trigger signal at a fixed period.

(4) The imaging apparatus according to any one of (1) to (3),
wherein the trigger generator generates the trigger signal in accordance with external control of the imaging apparatus.

(5) The imaging apparatus according to any one of (1) to (4),
wherein the trigger generator generates the trigger signal in accordance with a recognition confidence indicating a confidence level of the recognition result.

(6) The imaging apparatus according to any one of (1) to (5), further comprising
an output controller that controls an output of the recognition result by the first output unit and an output of the pixel signal by the second output unit,
wherein the output controller corrects a deviation between the recognition result output by the first output unit and the pixel signal output by the second output unit.

(7) The imaging apparatus according to (6),
wherein the output controller includes a holding unit that holds the recognition result output by the first output unit, and outputs the recognition result held by the holding unit in synchronization with the output of the pixel signal by the second output unit.

(8) The imaging apparatus according to (7),
wherein the holding unit further holds the pixel signal output by the second output unit, and
the output controller estimates a spatial deviation amount between the recognition result and the pixel signal held by the holding unit, corrects at least one of the recognition result or the pixel signal held by the holding unit based on the estimated deviation amount, and outputs the recognition result held by the holding unit and the corrected pixel signal held by the holding unit in synchronization with each other.

(9) The imaging apparatus according to any one of (1) to (8),
wherein the trigger generator instructs the imaging unit to perform readout of the pixel signal to be output by the second output unit, from the imaging unit, at a rate higher than a rate of performing readout of the pixel signal for recognition of the recognition unit, from the imaging unit, in accordance with an output of the trigger signal toward the first output unit.

(10) The imaging apparatus according to any one of (1) to (8)
wherein the trigger generator instructs the imaging unit to perform readout of the pixel signal for recognition of the recognition unit from the imaging unit at a rate higher than a rate of performing readout of the pixel signal to be output by the second output unit, from the imaging unit, in accordance with an output of the trigger signal toward the second output unit.

11. An imaging system comprising:
an imaging apparatus equipped with
an imaging unit that has a pixel region in which a plurality of pixels is arranged and that reads and outputs a pixel signal from the pixels included in the pixel region,
a unit-of-readout controller that controls a unit of readout set as a part of the pixel region,
a first output unit that outputs a recognition result of recognition performed by a recognition unit for each of the units of readout,
a second output unit that outputs the pixel signal to a subsequent stage, and
a trigger generator that generates a trigger signal for controlling a first timing at which the first output unit outputs the recognition result and a second timing at which the second output unit outputs the pixel signal; and
an information processing apparatus equipped with the recognition unit that has learned training data for each of the units of readout.

12. An imaging method executed by a processor, comprising:
a unit-of-readout control step of controlling a unit of readout set as a part of a pixel region in which a plurality of pixels is arranged, included in an imaging unit:
a recognition step in which learning of training data for each of the units of readout has been performed;
a first output step of outputting a recognition result of recognition performed by the recognition step for each of the units of readout;
a second output step of outputting a pixel signal read out from the pixel included in the pixel region to a subsequent stage; and
a trigger generating step of generating a trigger signal for controlling a first timing at which the first output step outputs the recognition result and a second timing at which the second output step outputs the pixel signal.

13. An imaging program causing a processor to execute:
a unit-of-readout control step of controlling a unit of readout set as a part of a pixel region in which a plurality of pixels is arranged, included in an imaging unit:
a recognition step in which learning of training data for each of the units of readout has been performed;
a first output step of outputting a recognition result of recognition performed by the recognition step for each of the units of readout;
a second output step of outputting a pixel signal read out from the pixel included in the pixel region to a subsequent stage; and
a trigger generating step of generating a trigger signal for controlling a first timing at which the first output step outputs the recognition result and a second timing at which the second output step outputs the pixel signal.

Furthermore, the present technology can also have the following configurations.

(14) An electronic apparatus including:
an imaging unit that generates image data;
a machine learning unit that executes a machine learning process using a learning model on image data for each of unit regions read out from the imaging unit; and
a function execution unit that executes a predetermined function based on a result of the machine learning process.

(15) The electronic apparatus according to (14),
in which the machine learning unit executes a machine learning process using a Convolution Neural Network (CNN) on the image data of the unit region first input among the image data of a same frame.

(16) The electronic apparatus according to (15),
in which, in a case where the machine learning process using the CNN for the image data with the first input unit region has failed, the machine learning unit executes a machine learning process using a recurrent neural network (RNN) on next input image data with the unit region in the same frame.

(17) The electronic apparatus according to any one of (14) to (16), further including
a control part that reads out image data from the imaging unit in units of line,
in which the image data is input to the machine learning unit in the unit of line.

(18) The electronic apparatus according to any one of (14) to (17),
in which the image data in the unit region is image data having a predetermined number of lines.

(19) The electronic apparatus according to any one of (14) to (17),
in which the image data in the unit region is image data in a rectangular region.

(20) The electronic apparatus according to any one of (14) to (19), further including
a memory that records a program of the learning model,
in which the machine learning unit executes the machine learning process performed by reading out the program from the memory and executing the program.

REFERENCE SIGNS LIST

1 IMAGING APPARATUS
10 SENSOR UNIT
11 SENSOR CONTROLLER
12 RECOGNITION PROCESSING UNIT
14 VISUAL RECOGNITION PROCESSING UNIT
110 READOUT UNIT
111 READOUT CONTROLLER
120 FEATURE DATA CALCULATION UNIT
121 FEATURE DATA STORAGE CONTROLLER
122 FEATURE DATA STORAGE UNIT
123 READOUT DETERMINER
124 RECOGNITION PROCESS EXECUTION UNIT
140 IMAGE DATA STORAGE CONTROLLER
141 IMAGE DATA STORAGE UNIT
143 IMAGE PROCESSING UNIT

The invention claimed is:

1. An imaging apparatus comprising:
an image sensor having a pixel region in which a plurality of pixels is arranged and that reads and outputs a pixel signal from the pixels included in the pixel region;
at least one circuit configured to
control a unit of readout set as a part of the pixel region;
sequentially read out the pixel signal for each unit of readout in the pixel region;
sequentially perform a recognition process for each unit of readout in the pixel region;
generating a trigger signal on condition that a threshold is exceeded, the trigger signal controlling a first timing at which a recognition result of recognition for each of the units of readout is output and a second timing at which the pixel signal is output on condition that a threshold is exceeded;
output a recognition result of recognition at the first timing in accordance with the trigger signal;
output the pixel signal at the second timing in accordance with the trigger signal; and
in accordance with the trigger signal, output the recognition result and the pixel signal,
correct a deviation between the recognition result output and the pixel signal output.

2. The imaging apparatus according to claim 1, wherein the trigger signal achieves synchronization between the first timing and the second timing.

3. The imaging apparatus according to claim 1, wherein the at least one circuit is configured to output the trigger signal at a fixed period.

4. The imaging apparatus according to claim 1, wherein the at least one circuit is configured to generate the trigger signal in accordance with external control of the imaging apparatus.

5. The imaging apparatus according to claim 1, wherein the at least one circuit is configured to generate the trigger signal on condition that a confidence level of the recognition result exceeds a recognition confidence threshold.

6. The imaging apparatus according to claim 1, wherein the at least one circuit is configured to hold the recognition result output, and output the recognition result held in synchronization with the output of the pixel signal in accordance with to the trigger signal.

7. The imaging apparatus according to claim 6, wherein the at least one circuit is configured to
hold the pixel signal output,
estimate a spatial deviation amount between the recognition result and the pixel signal held,
correct at least one of the recognition result or the pixel signal held based on the estimated deviation amount, and
output the recognition result held and the corrected pixel signal held in synchronization with each other in accordance with the trigger signal.

8. The imaging apparatus according to claim 1,
wherein the at least one circuit is configured to perform readout of the pixel signal to be output, from the image sensor, at a rate higher than a rate of performing readout of the pixel signal for recognition, from the image sensor, in accordance with the trigger signal.

9. The imaging apparatus according to claim 1,
wherein the at least one circuit is configured to instruct the image sensor to perform readout of the pixel signal for sequentially performing recognition from the image sensor for outputting the recognition result at a rate higher than a rate for sequentially performing readout of the pixel signal from the image sensor for outputting the pixel signal, in accordance with the trigger signal.

10. The imaging apparatus according to claim 1, wherein the recognition result is output more frequently than the pixel signal in response to the trigger signal.

11. An image processing circuit for processing signals output from an image sensor having a pixel region in which a plurality of pixels is arranged and that reads and outputs a pixel signal from the pixels included in the pixel region, the image processing circuit comprising:
at least one circuit configured to
control a unit of readout set as a part of the pixel region, sequentially read out the pixel signal for each unit of readout in the pixel region;
sequentially perform a recognition for each unit of readout in the pixel region;
generate a trigger signal on condition that a threshold is exceeded, the trigger signal controlling a first timing at which a recognition result of recognition for each of the units of readout is output and a second timing at which the pixel signal is output;
output a recognition result of recognition at the first timing in accordance with the trigger signal;
output the pixel signal at the second timing in accordance with the trigger signal; and
in accordance with the trigger signal, output the recognition result and the pixel signal,
correct a deviation between the recognition result output and the pixel signal output.

12. An imaging method executed by a processor, comprising:
controlling a unit of readout set as a part of a pixel region in which a plurality of pixels is arranged, included in an image sensor:
sequentially reading out the pixel signal for each unit of readout in the pixel region;
sequentially performing a recognition for each unit of readout in the pixel region;
generating a trigger signal on condition that a threshold is exceeded, the trigger signal controlling a first timing at which a recognition result of recognition is output and a second timing at which the pixel signal is output;
outputting a recognition result at the first timing in accordance with the trigger signal;
outputting a pixel signal read out from the pixel included in the pixel region to a subsequent stage at the second timing in accordance with the trigger signal; and wherein the processor is caused to execute:
controlling an output of the recognition result and an output of the pixel signal including correcting a deviation between the recognition result output and the pixel signal output.

13. The imaging method according to claim 12, wherein the processor is caused to execute:
performing readout of the pixel signal to be output, from the image sensor, at a rate higher than a rate of performing readout of the pixel signal for recognition, from the image sensor, in accordance with the trigger signal.

14. The imaging method according to claim 12, wherein the processor is caused to execute:
instructing the image sensor to perform readout of the pixel signal for sequential recognition from the image sensor for outputting the recognition result at a rate higher than a rate of performing sequential readout of the pixel signal from the image sensor for outputting the pixel signal, in accordance with the trigger signal.

15. A non-transitory computer readable storage device having an imaging program that when executed by a processor causes the processor to execute:
controlling a unit of readout set as a part of a pixel region in which a plurality of pixels is arranged, included in an image sensor:
sequentially reading out the pixel signal for each unit of readout in the pixel region;
sequentially performing a recognition for each unit of readout in the pixel region;
generating a trigger signal on condition that a threshold is exceeded, the trigger signal for controlling a first timing at which a recognition result of recognition for each of the units of readout is output and a second timing at which the pixel signal is output;
outputting a recognition result of recognition for each of the units of readout at the first timing in accordance with the trigger signal;
outputting a pixel signal read out from the pixel included in the pixel at the second timing in accordance with the trigger signal; and
controlling an output of the recognition result and an output of the pixel signal including correcting a deviation between the recognition result output and the pixel signal output.

16. The non-transitory computer readable storage device according to claim 13, wherein the processor is caused to execute:
performing readout of the pixel signal to be output, from the image sensor, at a rate higher than a rate of performing readout of the pixel signal for recognition, from the image sensor, in accordance with the trigger signal.

17. The non-transitory computer readable storage device according to claim 13, wherein the processor is caused to execute:
instructing the image sensor to perform readout of the pixel signal for sequential recognition from the image sensor for outputting the recognition result at a rate higher than a rate of sequential readout of the pixel signal from the image sensor for outputting the pixel signal, in accordance with the trigger signal.

* * * * *